(12) United States Patent
Nashida et al.

(10) Patent No.: US 11,683,471 B2
(45) Date of Patent: Jun. 20, 2023

(54) INFORMATION PROCESSING DEVICE AND INFORMATION PROCESSING METHOD

(71) Applicant: SONY CORPORATION, Tokyo (JP)

(72) Inventors: Tatsushi Nashida, Kanagawa (JP);
Masanori Mikami, Kanagawa (JP);
Tatsuya Yamazaki, Kanagawa (JP);
Naomasa Takahashi, Chiba (JP);
Yosuke Shimizu, Kanagawa (JP); Jun Nishikawa, Kanagawa (JP); Naoko Edamitsu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 331 days.

(21) Appl. No.: 16/348,846

(22) PCT Filed: Nov. 28, 2017

(86) PCT No.: PCT/JP2017/042690
§ 371 (c)(1),
(2) Date: May 9, 2019

(87) PCT Pub. No.: WO2018/101279
PCT Pub. Date: Jun. 7, 2018

(65) Prior Publication Data
US 2019/0289285 A1 Sep. 19, 2019

(30) Foreign Application Priority Data

Nov. 29, 2016 (JP) .............................. JP2016-231509
Nov. 29, 2016 (JP) .............................. JP2016-231510
(Continued)

(51) Int. Cl.
*H04N 13/366* (2018.01)
*H04N 13/363* (2018.01)
(Continued)

(52) U.S. Cl.
CPC ............. *H04N 13/366* (2018.05); *G06F 3/01* (2013.01); *H04N 9/3147* (2013.01);
(Continued)

(58) Field of Classification Search
CPC ..................................................... H04N 13/366
See application file for complete search history.

(56) References Cited

U.S. PATENT DOCUMENTS 5,909,208 A 6/1999 Blomdahl
2003/0200074 A1 10/2003 Cooper
(Continued)

FOREIGN PATENT DOCUMENTS

CN 1764871 A 4/2006
CN 101595512 A 12/2009
(Continued)

OTHER PUBLICATIONS

International Search Report and Written Opinion of PCT Application No. PCT/JP2017/042690, dated Jan. 9, 2018, 07 pages of ISRWO.

(Continued)

*Primary Examiner* — Daniel T Tekle
(74) *Attorney, Agent, or Firm* — Chip Law Group

(57) ABSTRACT

An information processing device includes: a displacement information acquisition unit that acquires displacement information corresponding to 3-dimensional displacement of a predetermined portion of an object that a user mounts in accordance with a body motion on the basis of positional information of the predetermined portion and an output control unit that performs control such that an output unit performs a predetermined output on the basis of the acquired displacement information. The object has, for example, a seatback on which a user can sit. The displacement information acquisition unit acquires a change in a position in at (Continued)

least one of front and rear directions, right and left directions, or upward and downward directions of a seatback.

25 Claims, 76 Drawing Sheets

(30) Foreign Application Priority Data

Mar. 9, 2017 (JP) .............................. JP2017-044963
Jul. 31, 2017 (WO) .................. PCT/JP2017/027786

(51) Int. Cl.
  *H04N 9/31* (2006.01)
  *H04N 21/431* (2011.01)
  *H04N 21/442* (2011.01)
  *G06F 3/01* (2006.01)

(52) U.S. Cl.
  CPC ......... *H04N 13/363* (2018.05); *H04N 21/431* (2013.01); *H04N 21/442* (2013.01)

(56) References Cited

U.S. PATENT DOCUMENTS

| | | | |
|---|---|---|---|
| 2006/0187421 A1* | 8/2006 | Hattori | H04N 5/74 353/69 |
| 2009/0135133 A1* | 5/2009 | Kunzler | G06F 3/011 345/156 |
| 2014/0309035 A1 | 10/2014 | Crawford | |
| 2014/0313295 A1* | 10/2014 | Dolim | H04N 13/366 348/51 |
| 2016/0320862 A1 | 11/2016 | Schradin | |

FOREIGN PATENT DOCUMENTS

| | | |
|---|---|---|
| CN | 104507545 A | 4/2015 |
| CN | 104870064 A | 8/2015 |
| EP | 2220550 A1 | 8/2010 |
| EP | 2458534 A1 | 5/2012 |
| JP | H07193900 A | 7/1995 |
| JP | 2000-019953 A | 1/2000 |
| JP | 2000019953 A | 1/2000 |
| JP | 2004135023 A | 4/2004 |
| JP | 2014169022 A | 9/2014 |
| WO | 2009/070468 A1 | 6/2009 |

OTHER PUBLICATIONS

Office Action for CN Patent Application No. 201780072301.7 dated Sep. 13, 2021, 5 pages of Office Action and 8 pages of English Translation.

Office Action for JP Application No. 2018-554167 dated Jul. 27, 2021, pp. 6.

Office Action for JP Patent Application No. 2018-554617 dated Mar. 1, 2022, 4 pages of Office Action and 3 pages of English Translation.

* cited by examiner

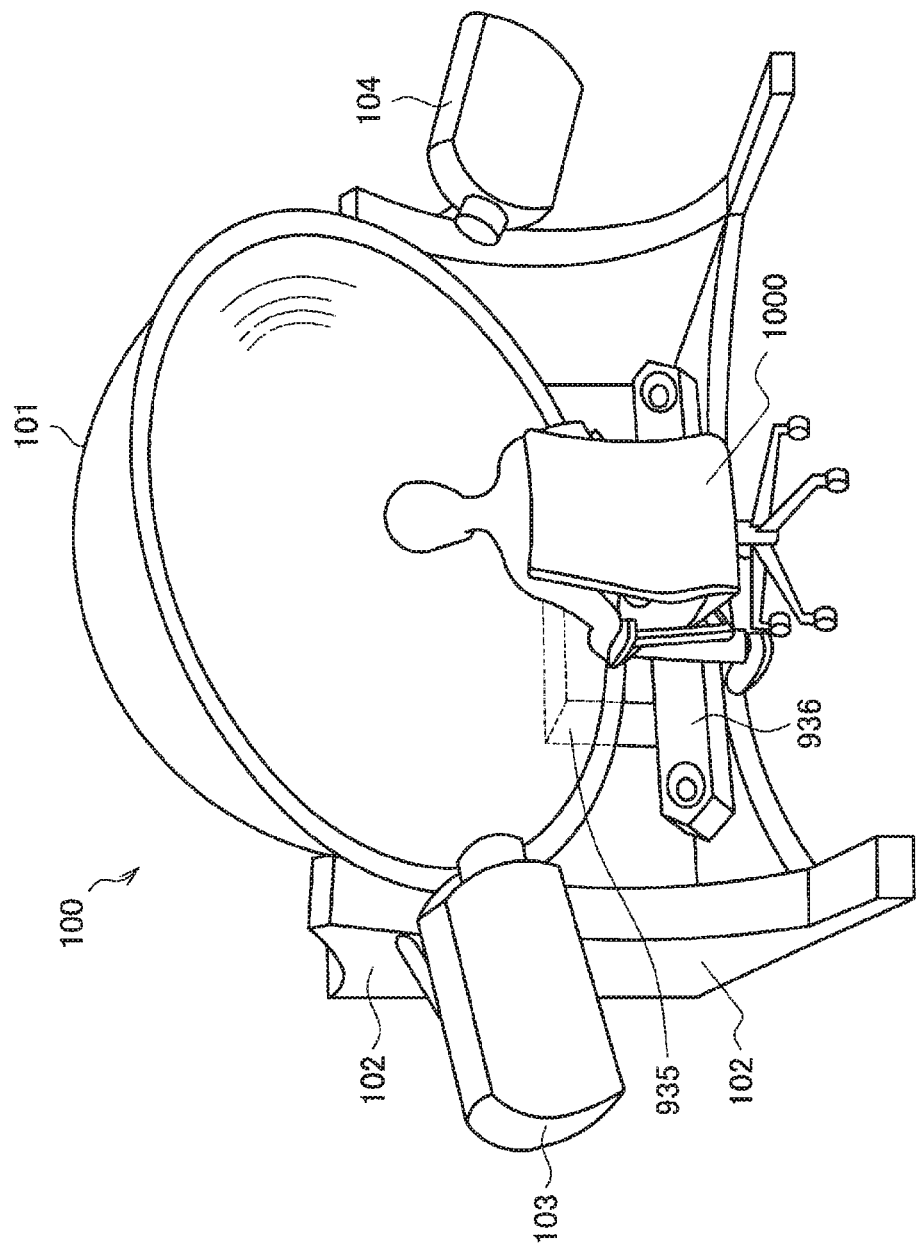

FIG. 35
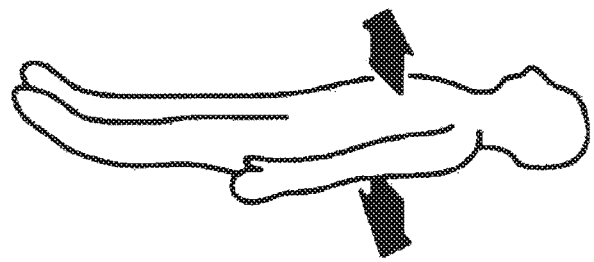
FIG. 36
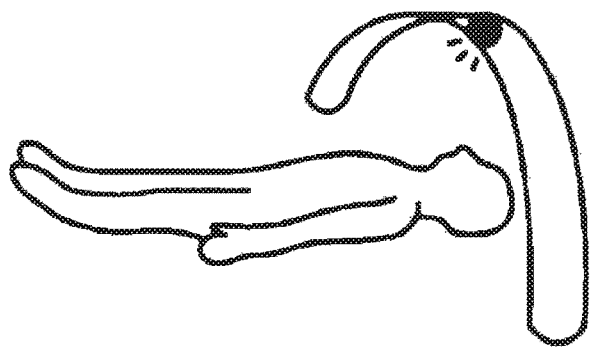
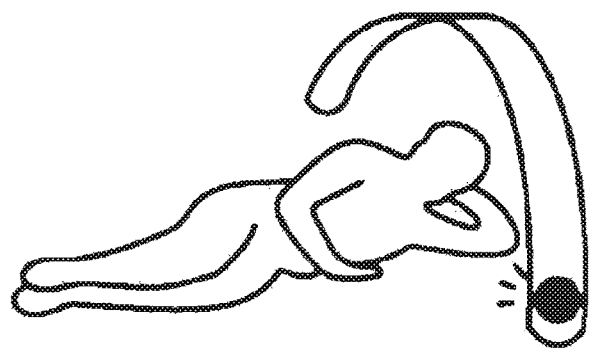
FIG. 37
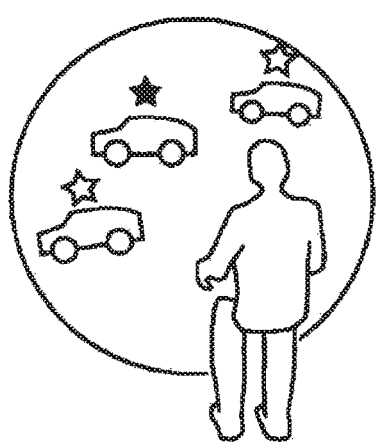 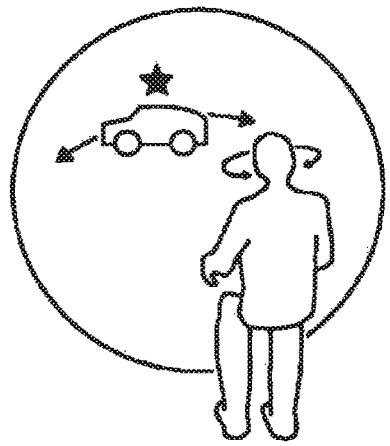

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/042690 filed on Nov. 28, 2017, which claims priority benefit of International Patent Application No. PCT/JP2017/027786 filed on Jul. 31, 2017 and also claims priority benefit of Japanese Patent Application No. JP 2016-231509 filed in the Japan Patent Office on Nov. 29, 2016 and also claims priority benefit of Japanese Patent Application No. JP 2016-231510 filed in the Japan Patent Office on Nov. 29, 2016 and also claims priority benefit of Japanese Patent Application No. JP 2017-044963 filed in the Japan Patent Office on Mar. 9, 2017. Each of the above-referenced applications is hereby incorporated herein by reference in its entirety.

TECHNICAL FIELD

A technology disclosed in the present specification relates to an information processing device, an information processing method, and a computer program controlling an output in accordance with an instruction from a user.

BACKGROUND ART

Services providing free viewpoint videos captured with multi-viewpoint cameras or wide angle cameras have increased. For example, videos of entertainment systems such as sports or concert broadcast, intangible cultural assets, educational content, and the like can be exemplified as main application fields of the technology. In addition, technologies related to free viewpoint videos are also spreading into virtual reality (VR) videos such as game content generated using computer graphics technologies.

A free viewpoint video is a video in which a user can arbitrarily change a viewpoint position or a visual line direction. For example, when a user views a free viewpoint video using a stationary display device, instructions about the viewpoint position or the visual line direction are input using a controller or a console. In addition, when a user views a free viewpoint video using a head-mounted display (HMD), the user can be provided with the experience of actually exploring the space in which the video was captured by changing the viewpoint position or the visual line direction on the basis of results obtained by detecting motions of the head of the user.

In addition, systems that generate augmented virtual reality scenes displayed in HMDs on the basis of inputs from dedicated controllers such as handheld controllers have been proposed (for example, see Patent Literature 1).

CITATION LIST

Patent Literature

Patent Literature 1: JP 2016-528942T

DISCLOSURE OF INVENTION

Technical Problem

An object of the technology disclosed in the present specification is to provide an excellent information processing device, information processing method, and computer program capable of appropriately controlling an output in accordance with an instruction from a user.

Solution to Problem

The technology disclosed herein has been devised in light of the problem described above, a first aspect thereof is an information processing device including: a displacement information acquisition unit configured to acquire displacement information corresponding to 3-dimensional displacement of a predetermined portion of a predetermined object that a user mounts in accordance with a body motion of the user on the basis of positional information of the predetermined portion; and an output control unit configured to perform control such that an output unit performs a predetermined output on the basis of the acquired displacement information.

In addition, a second aspect of the technology disclosed herein is an information processing method including: a displacement information acquisition step of acquiring displacement information corresponding to 3-dimensional displacement of a predetermined portion of a predetermined object that a user mounts in accordance with a body motion of the user on the basis of positional information of the predetermined portion; and an output control step of performing control such that an output unit performs a predetermined output on the basis of the acquired displacement information.

In addition, a third aspect of the technology disclosed herein is a computer program described in a computer-readable format for causing a computer to function as: a displacement information acquisition unit configured to acquire displacement information corresponding to 3-dimensional displacement of a predetermined portion of a predetermined object that a user mounts in accordance with a body motion of the user on the basis of positional information of the predetermined portion; and an output control unit configured to perform control such that an output unit performs a predetermined output on the basis of the acquired displacement information.

Advantageous Effects of Invention

According to the technology disclosed in the present specification, it is possible to provide an excellent information processing device, information processing method, and computer program capable of appropriately controlling an output in accordance with a body motion of a user.

Note that the advantageous effects described in this specification are merely for the sake of example, and the advantageous effects of the present technology are not limited thereto. Furthermore, in some cases the present technology may also exhibit additional advantageous effects other than the advantageous effects given above.

Further objectives, features, and advantages of the technology disclosed in this specification will be clarified by a more detailed description based on the exemplary embodiments discussed hereinafter and the attached drawings.

BRIEF DESCRIPTION OF DRAWINGS

FIG. 13 is a diagram illustrating a configuration example in which a commercially available subwoofer 935 and speaker 936 are used.

FIG. 35 is a diagram illustrating an example of a body motion of a user on a bed.

FIG. 36 is a diagram illustrating an example of a body motion of a user on a bed.

FIG. 37 is a diagram illustrating an aspect in which a user is controlling a UI menu and content in a free viewpoint video.

MODE(S) FOR CARRYING OUT THE INVENTION

An embodiment of the technique disclosed in the present specification will be described in detail below with reference to the drawings.

A. System Configuration

Figure 1:
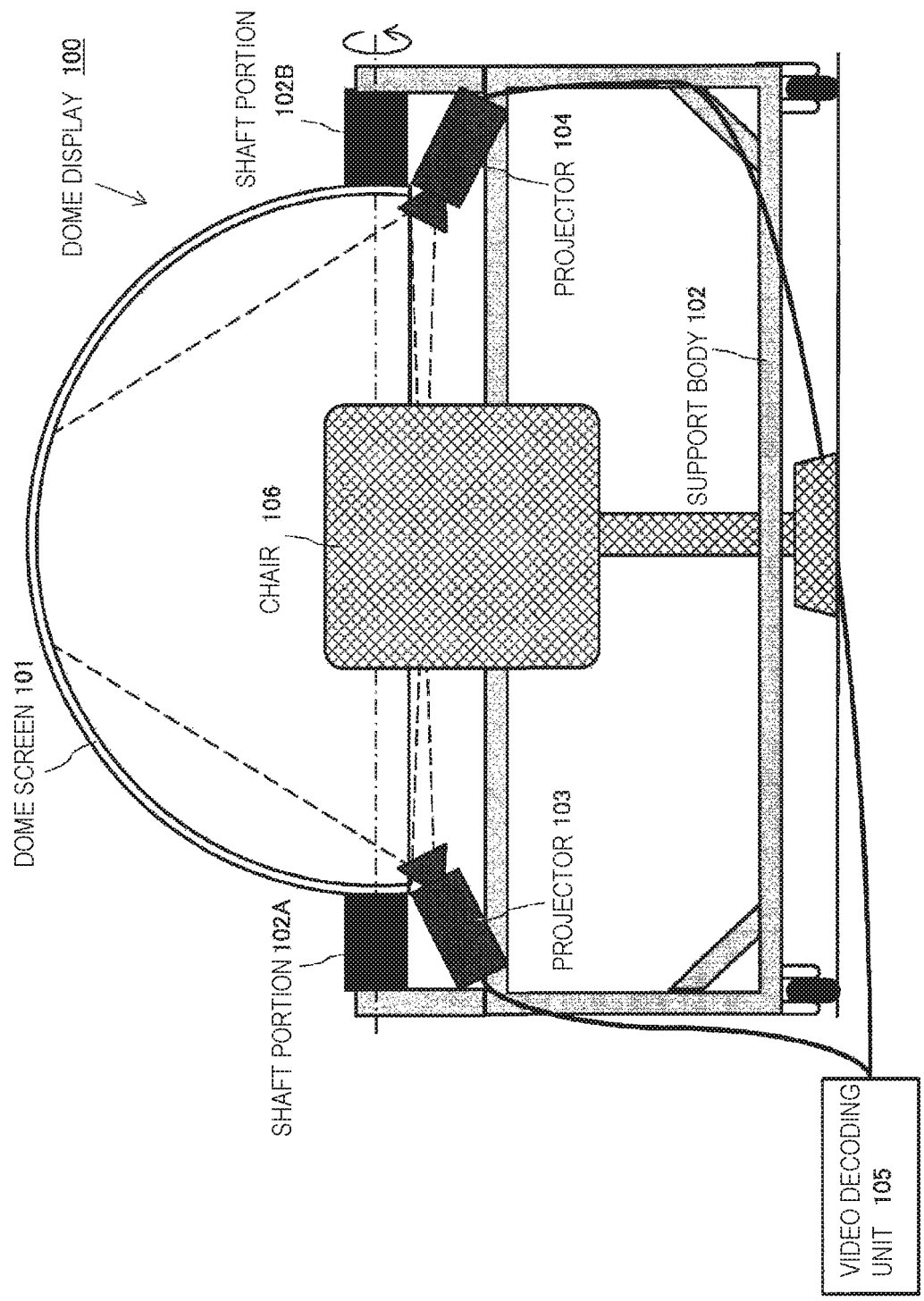
FIG. 1 is a diagram illustrating a configuration example of a dome display 100.
Figure 2:
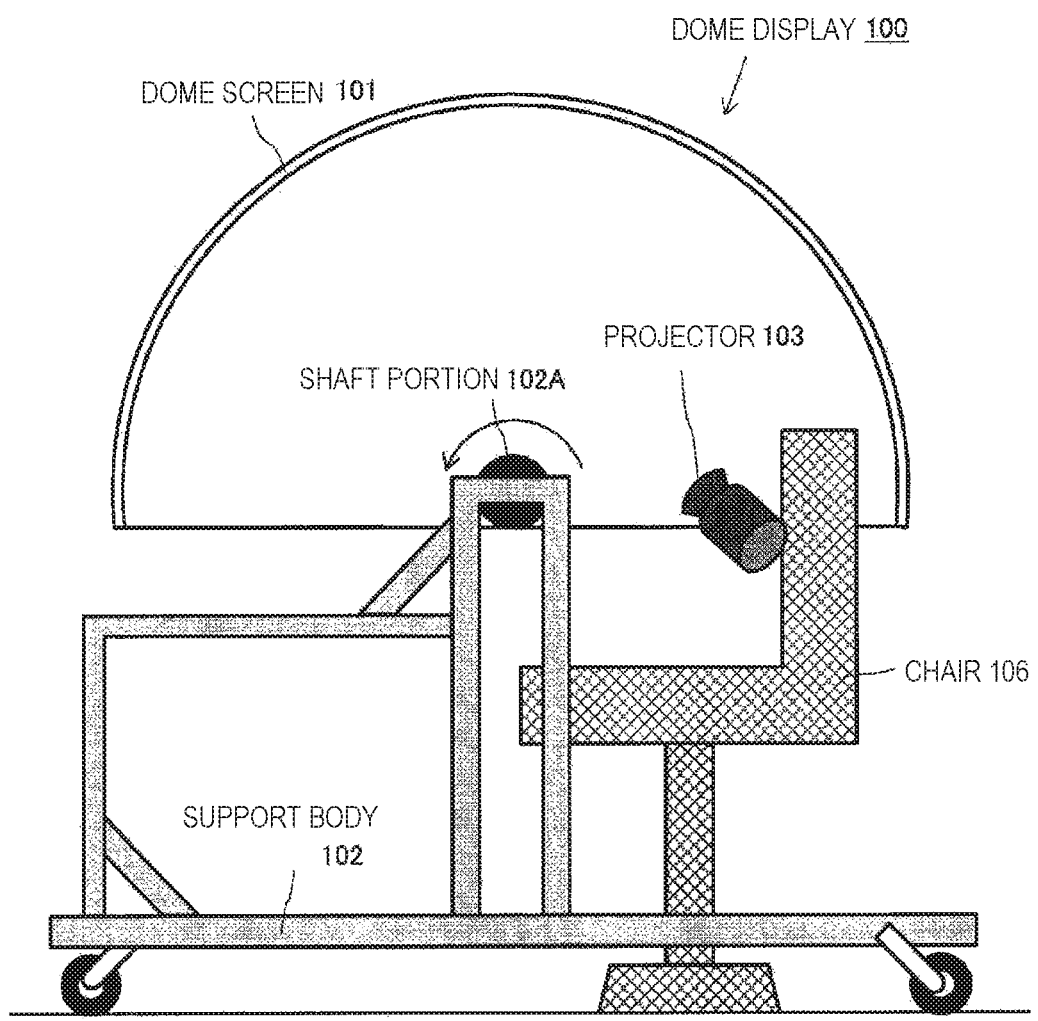
FIG. 2 is a diagram illustrating a configuration example of a dome display 100.

FIGS. 1 and 2 illustrate a configuration example of a dome display 100 which can be applied to display of a free viewpoint video or a VR video. A user can observe a projected video when the user enters the dome. FIG. 1 illustrates a cross-section of the dome screen 101 cut on a front plane, and FIG. 2 illustrates a cross-section of the dome screen 101 cut on a sagittal plane.

The illustrated dome display 100 includes the dome screen 101, a support body 102 supporting the dome screen 101, and two projectors 103 and 104. Each of the projectors 103 and 104 projects a video to the dome screen 101 on the basis of a baseband video signal. In addition, a chair 106 on which the user observing the projected videos sits is installed inside a space formed by the dome screen 101.

The dome screen 101 has an inner periphery which is a display surface of a projected image. The dome screen 101 is manufactured with, for example, a resin such as light fiber reinforced plastics (FRP), a metal, glass, acryl, or the like. It is preferable that painting or coating for preventing diffused reflection of light (projected video) or other surface treatment is applied on an inner periphery surface of the dome screen 101. The inner periphery of the dome screen 101 has a spherical or semispherical shape. By using the dome screen 101 having a spherical or semispherical shape, it is possible to project a video which has realistic sensation and which has a wide viewing angle in a horizontal direction and in a vertical direction. Note that an outer shape of the dome screen 101 is not particularly limited. In addition, the outer shape of the dome screen 101 is not particularly limited. For example, the dome screen 101 may be a foldable or storable dome screen (not illustrated).

The support body 102 includes a pair of shaft portions 102A and 102B having an identical rotation axis, and supports the dome screen 101 with the pair of shaft portions 102A and 102B so that the dome screen 101 is rotatable around the horizontal axis within a sagittal plane. However, the structure is not limited to the structure in which the dome screen 101 is supported with the pair of shaft portions 102A and 102B if the dome screen 101 can be supported so as to be rotatable around the horizontal axis within the sagittal plane. Further, the support body 102 may also include a mechanism for supporting the dome screen 101 so that the dome screen 101 is rotatable around a vertical axis. Still further, the support body 102 may have a structure which supports the dome screen 101 while allowing a degree of freedom other than rotation, such as up-and-down motion.

The two projectors 103 and 104 project video signals (video signals having a wide viewing angle) each supplied from each video decoding unit 105 on the inner periphery of the dome screen 101. It is assumed that each of the projectors 103 and 104 can project an image which has high color saturation and favorable color reproducibility on the dome screen 101 using a laser, an LED, a mercury lamp, or a xenon lamp, as a light source.

A relative position and attitude of each of the projectors 103 and 104 with respect to the dome screen 101 are fixed around a periphery of the dome screen 101 so that the whole display surface of the inner periphery of the dome screen 101 can be covered with projected images from the respective projectors 103 and 104. It is assumed that each of the projectors 103 and 104 is fixed at the dome screen 101 via, for example, a table (not illustrated) having six degrees of freedom in three axis directions and around respective axes, and can finely adjust each optical axis (projection direction). If the dome screen 101 is rotated around the horizontal axis (which will be described later), each of the projectors 103 and 104 also move in an integrated manner.

For example, performing stitching processing on a joint portion between images projected on the dome screen 101 from the respective projectors 103 and 104, it is possible to present a video with a wide viewing angle on the dome screen 101. Arbitrary algorithm can be applied to the stitching processing. Arbitrary algorithm can be applied to the stitching processing. Specifically, the video with the wide viewing angle may be presented on the dome screen 101 by performing geometric correction, edge blending, and the like on the joint portion between the projected images. Of course, any algorithm can be applied to the geometric correction or the edge blending process.

A projected video from each of the projectors 103 and 104 is assumed to have a 4K (around 4000 horizontal×2000 vertical) resolution. In addition, optical distortion that each of the projectors 103 and 104 has or distortion of a video with a wide viewing angle caused due to deformation (including a change over time) or the like of the inner circumference of the dome screen 101 may be corrected through image processing. Specifically, an individual difference in luminance or tone or optical distortion that each of the projectors 103 and 104 has or distortion of a video with a wide viewing angle caused due to deformation (including a change over time) of the inner circumference of the dome screen 101 can be corrected through image processing. To correct distortion of a video, for example, image processing of projecting a test pattern formed from an existing image from each of the projectors 103 and 104 to the dome screen 101 and cancelling distortion of the projected image of the test pattern may be performed. Specifically, image processing of projecting a test pattern formed from an existing shape from each of the projectors 103 and 104 to the dome screen 101, photographing projected the test pattern with an external camera or the like, and cancelling distortion of the projected image of the test pattern on the basis of the photographed image may be performed. In addition, a 3-dimensional measurement result of position and posture estimation of each of the projectors 103 and 104, shape estimation of the dome screen 101, or the like may be used for image processing of cancelling distortion on the basis of the photographed image. In addition, distortion of a projected image caused due to a position determination error when each of the projectors 103 and 104 is fixed to the dome screen 101 may also be corrected through image processing.

A graphical user interface (GUI) including menus, buttons, and the like may be displayed to overlap a full dome video projected from each of the projectors 103 and 104. The GUI may be manipulated by various kinds of input means of a hand gesture input, a visual line input, and the like.

Figure 3:
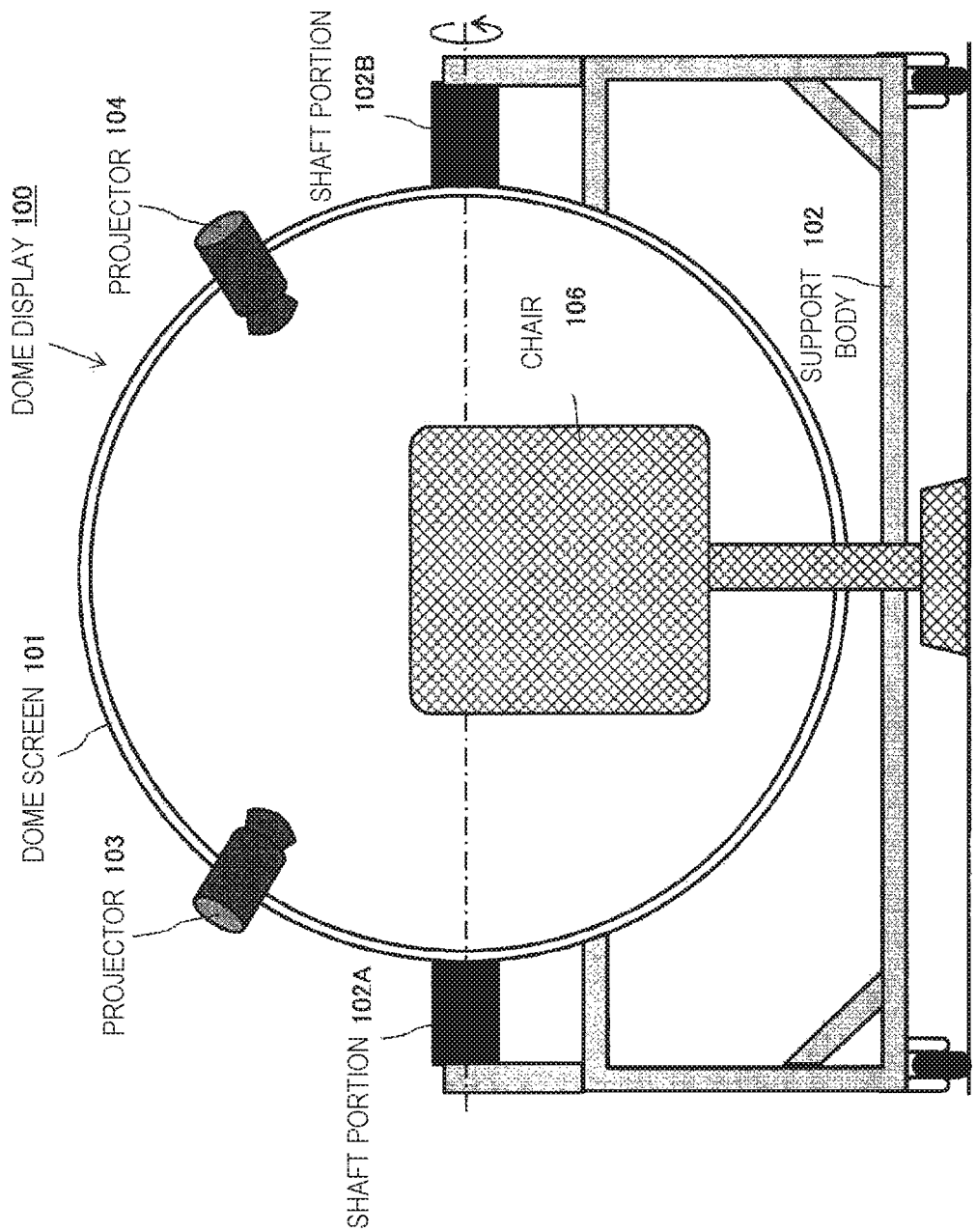
FIG. 3 is a diagram illustrating a configuration example of a dome display 100.
Figure 4:
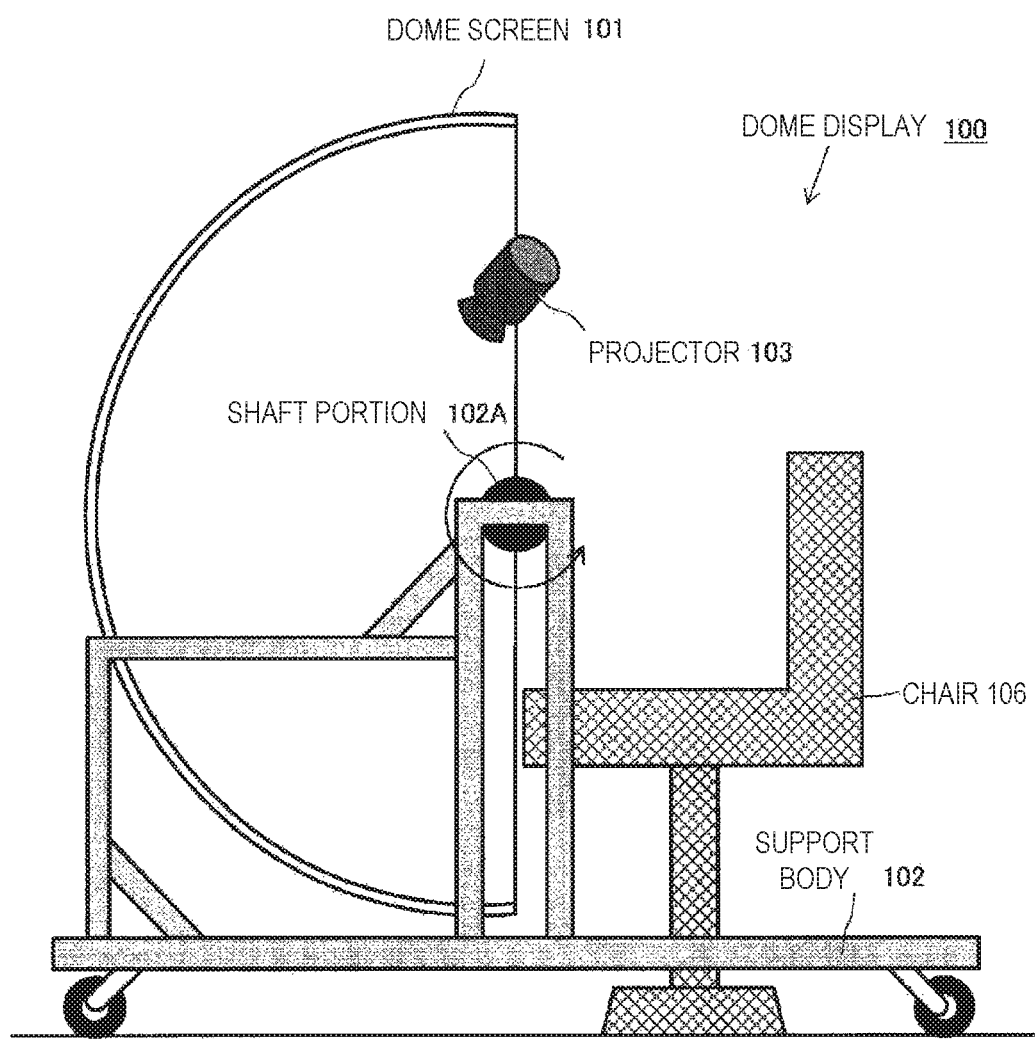
FIG. 4 is a diagram illustrating a configuration example of a dome display 100.
Figure 5:
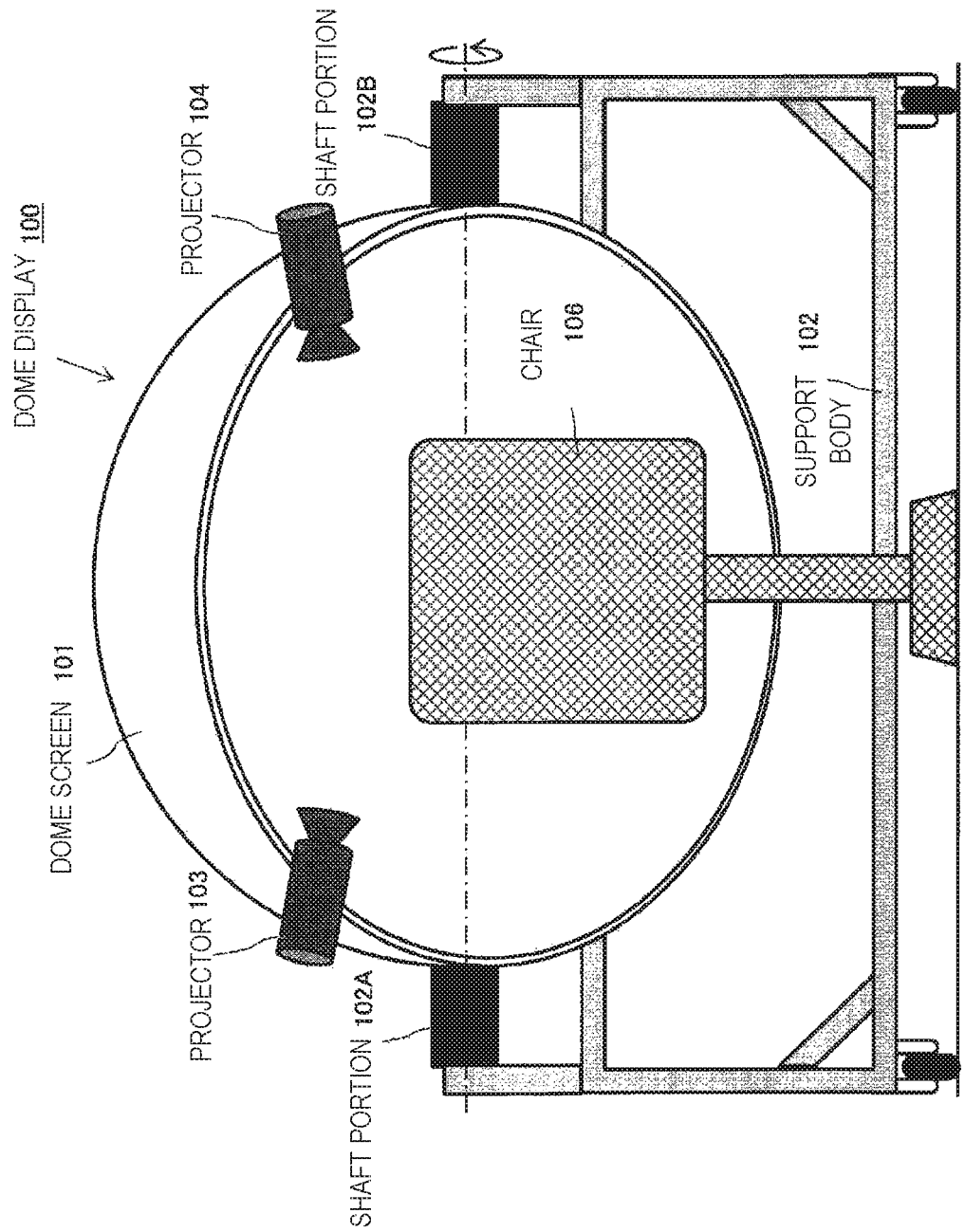
FIG. 5 is a diagram illustrating a configuration example of a dome display 100.
Figure 6:
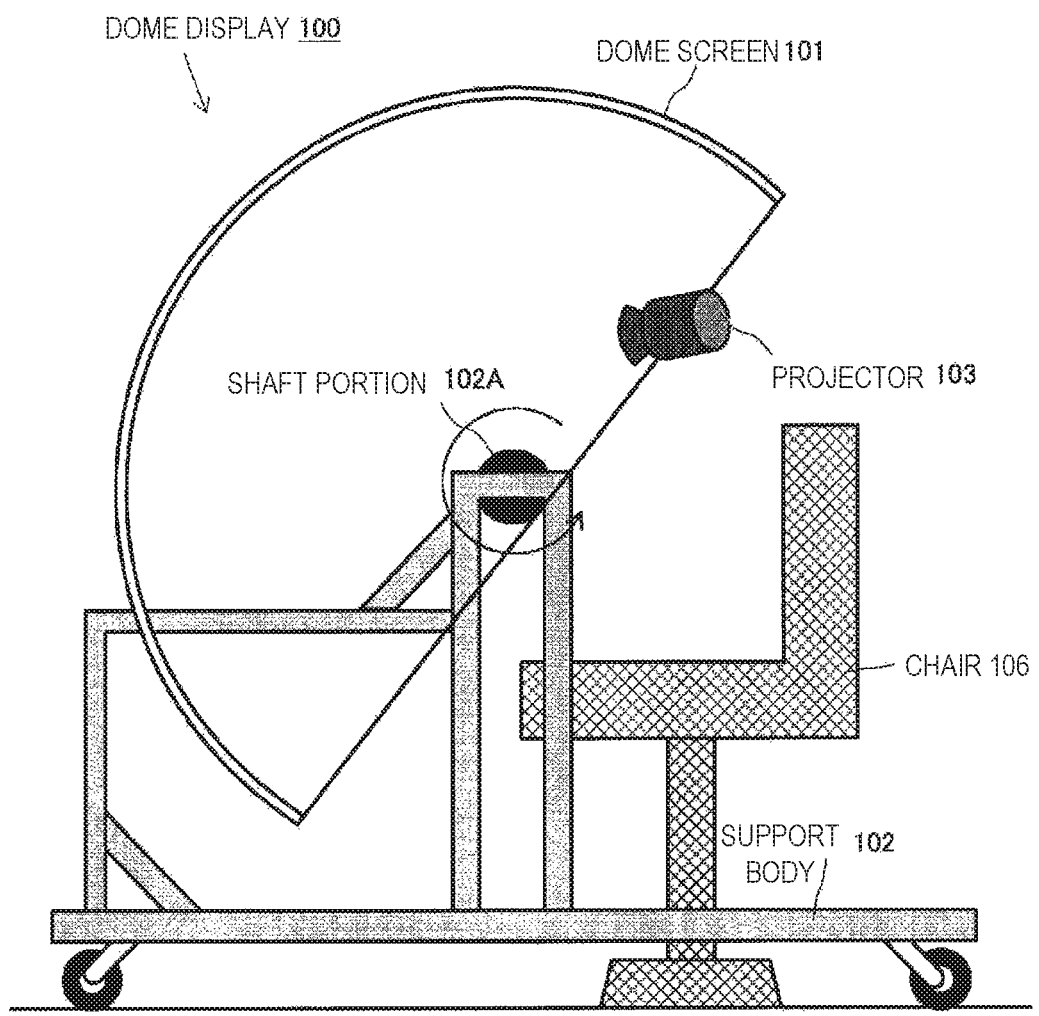
FIG. 6 is a diagram illustrating a configuration example of a dome display 100.

The dome screen 101 is supported so that the dome screen 101 can be rotated about the support body 102. As illustrated in FIG. 1 and FIG. 2, in the case where the dome screen 101 is substantially horizontally supported, it is possible to present a whole peripheral video of 360 degrees in a horizontal direction on the display surface of the dome screen 101. Meanwhile, as illustrated in FIG. 3 and FIG. 4, if the dome screen 101 is rotated around the rotation axis of the shaft portions 102A and 102B by 90 degrees around the horizontal axis within the sagittal plane, it is possible to present a whole peripheral video of 360 degrees in a vertical direction on the display surface of the dome screen 101. For example, in the case where a video with a wide viewing angle assuming the sky, an upper tier, or the like, is observed, as illustrated in FIG. 3 and FIG. 4, if the dome screen 101 is rotated by 90 degrees, it is possible to also present a video of a downward portion (for example, the ground). Further, it is also possible to use the dome display 100 by tilting the dome screen 101 at an arbitrary angle from 0 to 90 degrees around the horizontal axis within the sagittal plane as illustrated in FIG. 5 and FIG. 6, as well as provide the dome screen 101 in a horizontal direction or in a vertical direction as illustrated in FIG. 1 to FIG. 4.

Figure 7:
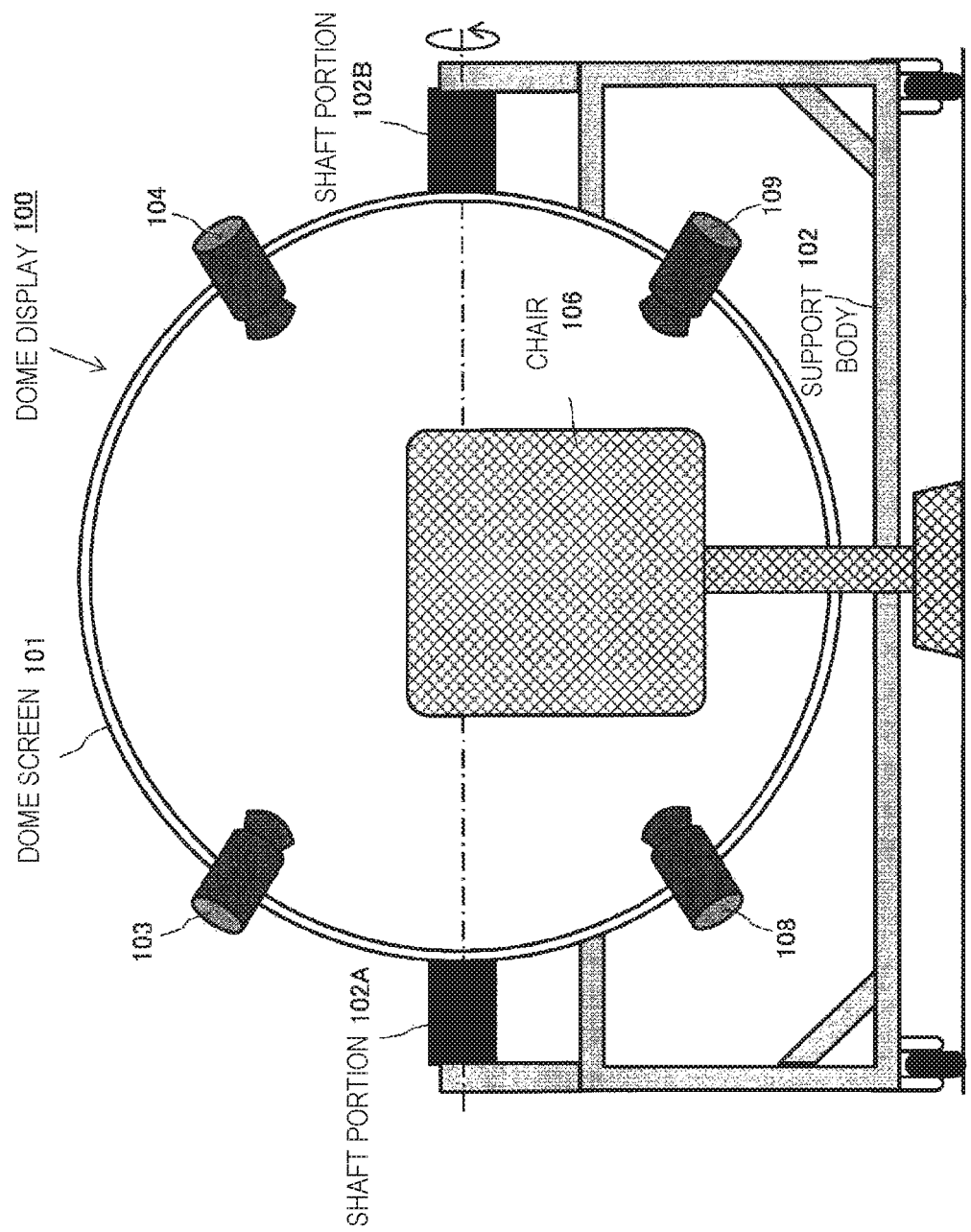
FIG. 7 is a diagram illustrating a configuration example of a dome display 100.

Further, while, in the configuration example illustrated in FIGS. 1 to 6, the dome display 100 includes two projectors 103 and 104, three or more projectors may be provided. FIG. 7 illustrates an example of configuration of the dome display 100 where, in addition to the projectors 103 and 104, further tow projectors 108 and 109 are attached to the dome screen 101.

Figure 8:
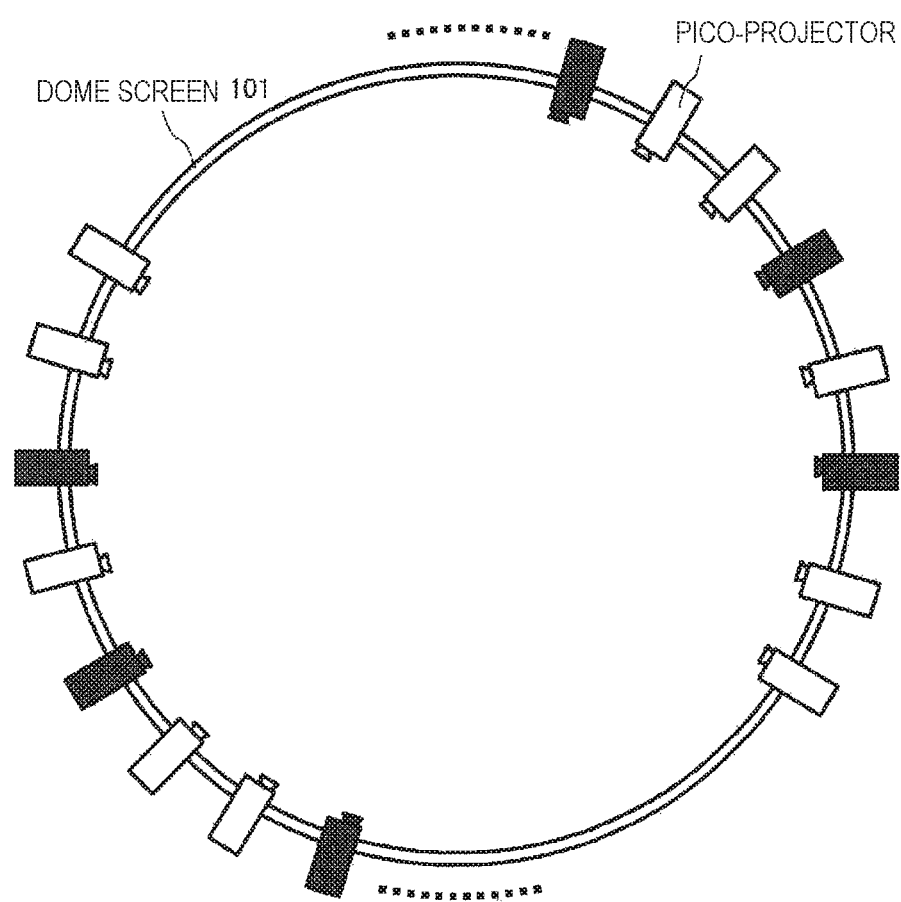
FIG. 8 is a diagram illustrating a configuration example of a dome display 100.

For example, a pico-projector with a high resolution can be adopted with a palm size as each of the projectors 103 and 104 that project a video to the dome screen 101. Since an installation area is not necessary for the pico-projector, the number of pico-projectors installed in the dome screen 101 can be increased. FIG. 8 illustrates an aspect in which many pico-projectors are installed in the dome screen 101. When the installation number of projectors is increased, the luminance, contrast, and resolution of a projected video can be improved.

In addition, when the user in the dome screen 101 performs a gesture motion, or the like, a projected video from a certain projector is obstructed by an overhanging hand of the user in some cases, but the blocked projected video can be supplemented by the projected videos of the other projectors. When many projectors are caused to be turned on, power consumption increases. Accordingly, all the installed projectors are not simultaneously driven, but only the necessary number of projectors may be caused to be partially operated appropriately.

For example, control may be performed such that the projectors for which projected images are not shaded are selected in accordance with a posture of the body, the position of a hand, or the like of the user in the dome screen 101 and are caused to be partially driven. A camera, a distance sensor, or the like may be installed for each projector, it may be detected whether there is an obstacle between a projector and the surface of the dome screen 101 or a shadow occurs on a projected video, projectors in which videos are not projected well may be turned off, and adjacent projectors may be turned on instead. In FIG. 8, it is assumed that the pico-projectors displayed in white are on and the pico-projectors displayed in gray are off.

A video projected to the dome screen 101 has the advantage that the user feels scale sensitivity of a subject more easily in a case where the user observes an enlarged virtual image with an HMD. For example, when the inner diameter of the dome screen 101 is set to about 1.5 to 2 meters, a video of a subject (a person or the like) that the user perceives as life-sized can be displayed and realism is increased. For example, in a case where a video obtained by photographing a person from a camera perspective is projected, the user can feel a strong experience of a realistic sensation in which a person in the video matches eyes with the user (makes eye contact). In addition, in the dome display 100, a greater sensation of freedom can be enjoyed than with an HMD. However, by presenting a full dome video of 360 degrees in the horizontal direction, the sensation of immersion is increased.

In short, a video projected to the dome screen 101 can be said to be a surrounding video that is closer to realism. Further, by combining a stereophonic sound using a speaker or a headphone and signal processing with the dome display 100, the user can be provided with the sensation of being at the place where a video and sound are photographed and recorded or being involved with the place.

Note that there is also an HMD as a display apparatus which enables viewing of a free viewpoint video or a VR video. Because the HMD is small and a location where the HMD is provided is not limited, the HMD can be utilized anywhere. On the other hand, there is a problem that because the head is tightened or the weight of the apparatus has to be supported with the neck when the user wears the HMD, the user gets tired if the HMD is used for a long period of time. Further, there is a problem that because the HMD is closely adhered to the skin of the user, the apparatus is damaged with sweating. Still further, there is also a problem that because the face and the viewing field of the user are covered if the user wears the HMD, the user has difficulty in using the HMD in combination with other input devices, the expression cannot be read, or there is a risk that the user stubs his/her arms or legs against an obstacle if the user moves.

In contrast, in the case of the dome display 100, since the user does not wear anything, there is the advantage that the user feels the sensation of freedom and can easily use the dome display for a long time. In addition, the user in the dome screen 101 can observe an image or the like photographed with the camera and face recognition (personal authentication) or expression recognition can be performed. In addition, when a plurality of people simultaneously enters the dome screen 101, it is easy to share viewing videos simply and realize collaborative work.

In addition, the dome display 100 may include a multi-modal interface for which a space enclosed in the dome is used. The multi-modal interface includes, for example, means for controlling an environment of a viewing space freely by adjusting a temperature or humidity in the dome, causing a smell to be generated, blowing wind (a breeze, a head wind, or an air blast) or a spray (a water blast) to the user, giving a sensation of touch (an effect of poking the back, a sensation of contact of anything with the back of the neck or the foot, or the like) to the body of the user or vibration or oscillation (a shock, a rumbling of the ground, or the like from below the chair 106), or providing a smell or scent. Since a working space is separated from the outside world by the dome screen 101, the multi-modal interaction is applied so that the user can be caused to experience a realistic sensation of a virtual realism space.

In the configuration example illustrated in FIG. 1 and the like, the dome display 100 is assumed to be installed and used indoors, but it may be installed and used outdoors. In addition, a moving component such as a caster may be mounted on the lower end of the support body 102 so that an installation place can be easily moved. In addition, it is assumed that the single dome display 100 is used not only by one person but also a plurality of people or in business to business (B2B). Alternatively, a ceiling or a wall surface of a room or a wall surface of the interior of a passenger car can also be considered to be used as a projection surface rather than the dome shape so that a free viewpoint video or a VR video can be displayed (as will be described below).

Note that, in the embodiment, the dome display 100 is assumed to be able to change a viewpoint position and a visual line direction of a free viewpoint video and display a stereoscopically visible video.

Movement of a viewpoint position includes, for example, continuous movement in which a moving device on which a multi-viewpoint camera or a wide angle camera that captures a free viewpoint video is mounted is caused to move (see FIG. 22) and discontinuous movement in which instantaneous movement (jump) between distant viewpoint positions is performed. In a case where a viewpoint position is continuously moved, a video projected to the dome screen 101 is also continuously changed. In a case where a viewpoint position is discontinuously changed, a video projected to the dome screen 101 is instantaneously changed to a video at a subsequent viewpoint position. Note that at least some of videos at the instantaneously moved viewpoint positions may be a VR video or a CG video rather than a real photographed video.

Figure 22:
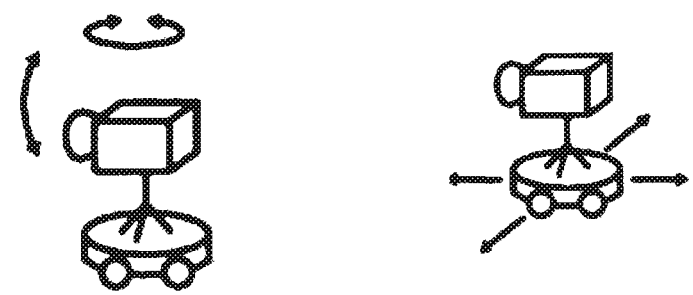
FIG. 22 is a diagram exemplifying video processing of affixing right and left tilting angle changes of a motion parallax to a free viewpoint video and changing a viewpoint position to the right and left.

In addition, a change in a visual line direction is equivalent to, for example, a change in a direction of a camera that captures a free viewpoint video (at least one of roll, pitch, or yaw around an axis) (see FIG. 22). When a visual line direction is changed, for example, a video (an angle of view) displayed in the front direction of the user of the dome screen 101 is moved in a direction in which the change in the visual line direction is cancelled (a display video is shifted to the left when a visual line is moved to the right, and a video region displayed to the right of the user before change is displayed in front).

In addition, in the embodiment, it is assumed that a UI menu is displayed on a free viewpoint video or content control is performed in an interaction format of picture in picture and CG (see FIG. 37).

Figure 9:
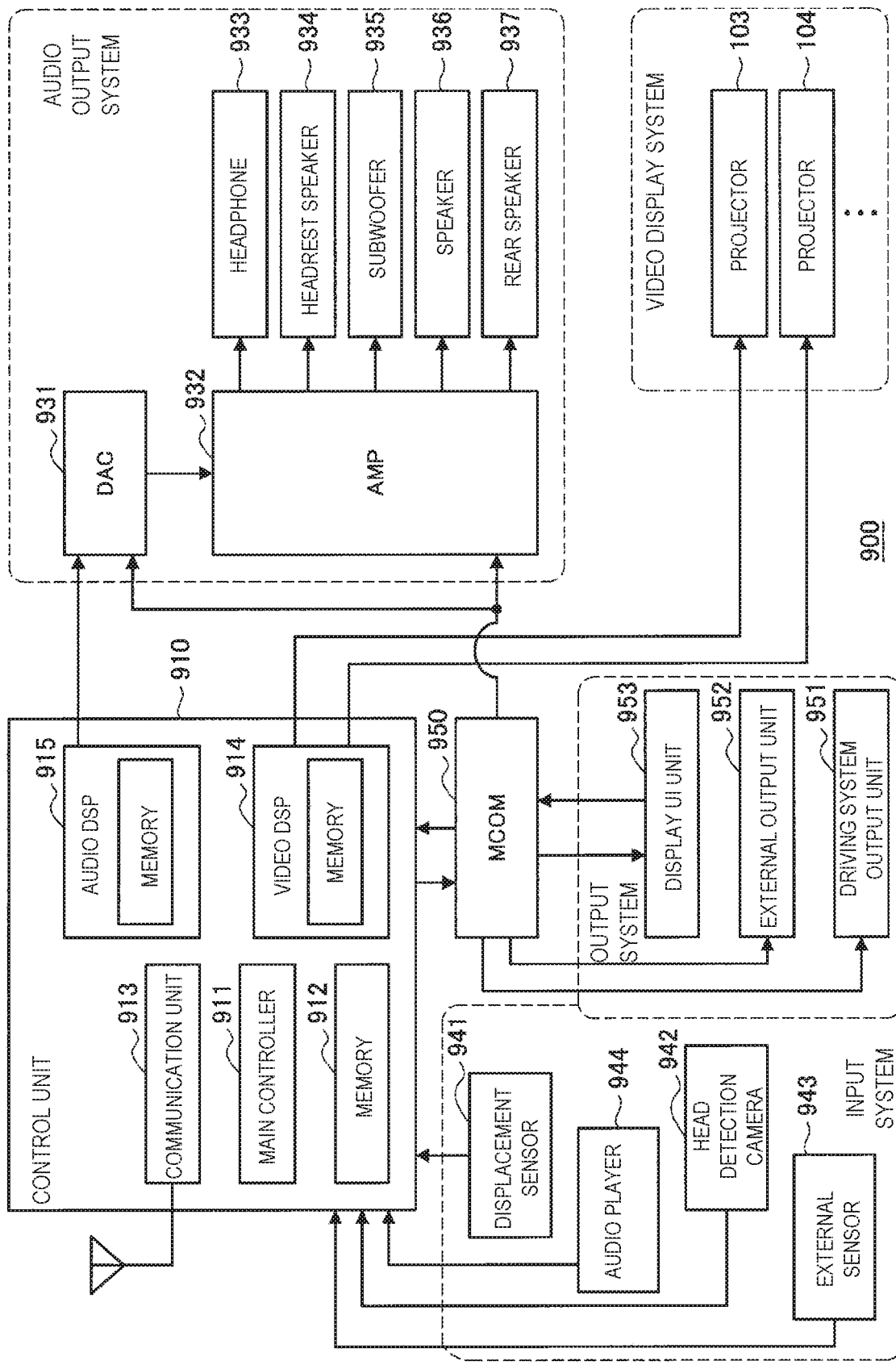
FIG. 9 is a diagram illustrating a configuration example of a system that realizes interaction with a user.

FIG. 9 illustrates a configuration example of the system 900 that displays a video and realizes interaction with a user on the dome display 100. Note that it should be fully understood that the interaction realized by the illustrated system 900 can be applied not only to the dome display 100 but also to various types of display devices that display a free viewpoint video or a VR video. That is, at least an output system of the system 900 can be substituted with an HMD. In addition, the system 900 can realize interaction even in a state in which the user does not wear anything, and thus has the advantage that a dedicated controller is not necessary. The details of this point will be described later.

The illustrated system 900 includes a video display system that causes a video to be displayed on a display screen such as the dome screen 101, an audio output system that outputs an audio sound in accordance with a displayed video, an input system to which sensor information regarding a user viewing and hearing the video and the audio sound in the dome is input, and an output system that outputs feedback in accordance with input information from the input system. An operation of each system is configured to be controlled generally by a control unit 910.

The control unit 910 is configured as, for example, an integrated circuit such as a system-on-a-chip (SoC). On the SoC serving as the control unit 910, a plurality of circuit modules that realizes functions of a main controller 911, a main memory 912, a communication unit 913, a video digital signal processing unit (video DSP) 914, an audio digital signal processing unit (audio DSP) 915, and the like are mounted.

The main controller 911 controls video and audio outputs in the dome screen 101 and controls a feedback output based on sensor information regarding the user. In the embodiment, it is assumed that the main controller 911 also functions as an "output control unit" that controls the feedback output on the basis of displacement information of an object in accordance with a body motion of the user in realization of interaction in accordance with the body motion of the user (as will be described below). In addition, as the output control unit, the main controller 911 may control a video output in accordance with an audio sound to be output.

The main memory 912 is configured as a flash memory or an SDRAM such as a double-data-rate (DDR) and is used as a working memory of the main controller 911.

The communication unit 913 is configured as a wireless communication module of wireless fidelity (Wi-Fi), Bluetooth (registered trademark), near field communication (NFC), or the like. For example, a free viewpoint video and a stereoscopic audio sound delivered in a streaming manner can be received by the communication unit 913 and reproduced by the dome display 100. Here, a video or audio source is not limited to the streaming. For example, a video or an audio sound recorded on a medium such as a Blu-ray disc (BD) can also be reproduced and output by the dome display 100. In addition, an audio signal from an audio player 944 to be described below may be received by the communication unit 913.

The video DSP 914 includes a memory (frame memory) therein. The video DSP 914 performs digital signal processing on a video signal received by the communication unit 913. In addition, the system 900 includes two or more projectors 103 104, and the like that project videos to the dome screen 101 as the video display system. The video DSP 914 is equivalent to the video decoding unit 105 of the dome display 100 illustrated in FIG. 1 and outputs video signals of an RGB format after signal processing to each of the projectors 103, 104, and the like.

The audio DSP 915 performs digital signal processing on an audio signal received by the communication unit 913 or an audio interface (not illustrated) and outputs the processed audio signal to the audio output system while buffering the audio signal in an internal memory. In addition, the system 900 includes at least one of a headphone 933, a headrest speaker 934, or a subwoofer 935 as the audio output system. When an audio signal processed by the DSP 915 is read from an internal memory, the audio signal is output via an interface such as an inter-integrated circuit ($I^2C$) and is converted into an analog signal by a digital to analog converter (DAC) 931. After the analog signal is further amplified by an amplification unit (AMP) 932, the amplified analog signal is output as an audio sound to any one of a speaker 936, the headphone 933, the headrest speaker 934, and the subwoofer 935.

The system 900 includes a displacement sensor 941, a head detection camera 942, and an external sensor 943 as the input system.

The displacement sensor 941 detects positional information of a predetermined portion of an object used by the user who is not wearing anything and acquires displacement information corresponding to 3-dimensional displacement of the predetermined portion in accordance with a body motion of the user. The object is, for example, furniture, fitness equipment, or the like used in daily life and displacement information is acquired by capturing motions of markers mounted on the surface of the object or feature points which can be extracted through an image recognition process. The details of a method of acquiring the displacement information will be described later. The acquired displacement information is received by the control unit 910 via an interface such as a serial peripheral interface (SPI) and is used for output control of feedback in accordance with a body motion of the user. The displacement sensor 941 functions as a "displacement information acquisition unit" in realization of interaction in accordance with a body motion of the user.

The head detection camera 942 is installed, for example, in front of the user in the dome screen 101, detects the head of the user using, for example, a skeleton detection or sound recognition function, and performs an RGB output of a captured video of the head of the user to the control unit 910. Note that an RGB camera, an existing motion capturing sensor including a depth sensor and the like, or an information processing device may be used as the head detection camera 942. Visual line information of the user can be acquired on the basis of a video input from the head detection camera 942.

The external sensor 943 is any of various sensors externally connected to the dome display 100 and outputs a detected signal of the sensor to the control unit 910 via an interface such as an SPI. The external sensor 943 first detects, for example, a temperature or humidity to detect a viewing environment of the user in the dome. In addition, in a case where the system 900 is incorporated in a passenger car (a vehicle or the like corresponding to automatic driving) rather than the dome display 100, the external sensor 943 can handle various kinds of detected information of a vehicle received via an on board diagnosis second generation (ODB2).

The audio player 944 is connected to, for example, the dome display 100 in a wireless or wired manner and outputs an audio signal to the control unit 910 via the communication unit 913 or an audio interface (not illustrated) such as a phone jack. The audio player 944 may store, for example, music data or read music data from a medium such as a compact disc (CD) in order to output the audio signal.

The output system included in the system 900 outputs feedback in accordance with input information from the foregoing input system. The output system functions as an "output unit" that performs an output based on displacement information of a predetermined portion of an object in accordance with a body motion of the user in realization of interaction in accordance with the body motion of the user (as will be described below).

In the example illustrated in FIG. 9, the system 900 can include a driving system output unit 951, an external output unit 952, and a display UI unit 953 as a feedback output system and can utilize the audio output unit such as the headphone 933, the headrest speaker 934, and the subwoofer 935 described above as the feedback output system. An MCOM 950 controls an output from the feedback output system in accordance with an instruction from the control unit 910 via an interface such as an SPI.

The driving system output unit 951 and the external output unit 952 configure a multi-modal interface and freely control an environment of the viewing space by adjusting a temperature or humidity in the dome, blowing wind (a breeze, a head wind, or an air blast) or a spray (a water blast) to the user, giving a sensation of touch (an effect of poking the back, a sensation of contact of the back of the neck or the foot with anything, or the like) to the body of the user, vibration or oscillation, light electric stimulation, or the like, or providing a smell or scent.

The driving system output unit 951 includes an actuator or the like that imparts vibration or oscillation to an object such as the chair 106 used by the user or tilts the object. The MCOM 950 controls an output from the driving system output unit 951 via, for example, an interface such as an SPI.

The external output unit 952 includes a device such as an air conditioner or a humidifier. In addition, in a case where the dome display 100 is incorporated in a vehicle, an air-conditioning electronic control unit (ECU) or the like is also equivalent to the external output unit 952. The MCOM 950 controls an output from the external output unit 952 via, for example, an interface such as an SPI. In addition, device control via a network is also included.

The display UI unit 953 is equivalent to a UI menu, CG, OSD, picture in picture, or the like displayed to overlap content such as a free viewpoint video on the dome screen 101. The MCOM 950 and the display UI unit 953 perform interaction via, for example, an interface such as an I²C.

In addition, the MCOM 950 can control the DAC 931 or the amplifier 932 via, for example, an interface such as an I²C to control a feedback output by an audio sound.

Figure 10A:
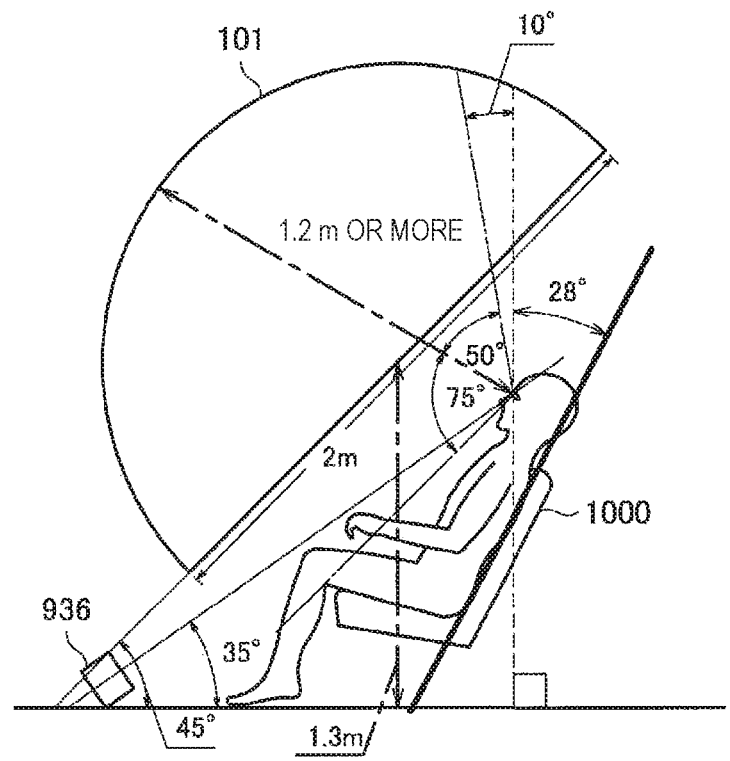
FIG. 10A is a schematic diagram illustrating an example of an aspect in which a user sitting on a chair 1000 is viewing a video projected to a dome screen 101.
Figure 10B:
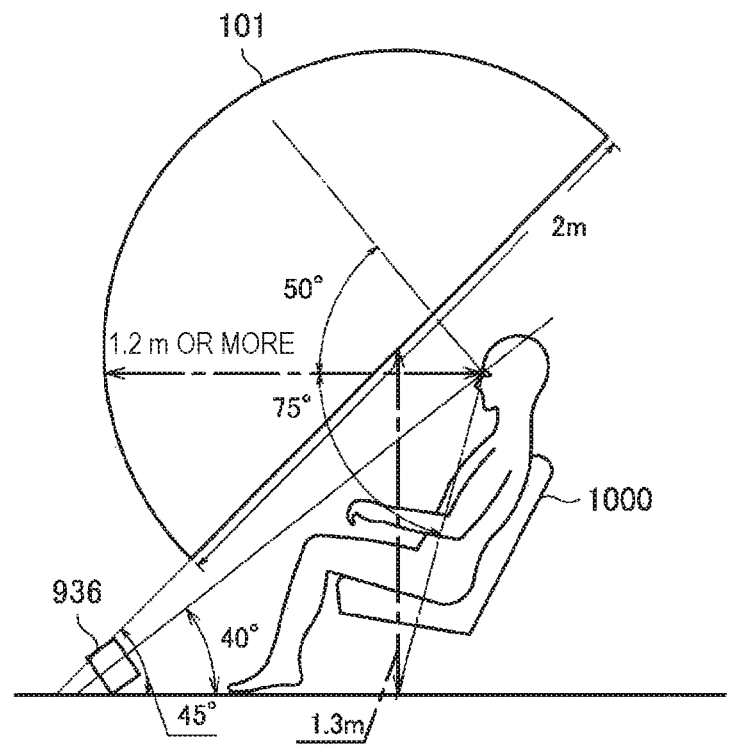
FIG. 10B is a schematic diagram illustrating an example of an aspect in which a user sitting on a chair 1000 is viewing a video projected to a dome screen 101.

The configuration example of the system 900 has been described above. Next, the disposition of the above-described configuration will be examined with reference to FIGS. 10A, 10B, 11A, 11B, 12A, 12B, 13, 14, 15, 16, 17, and 18. FIGS. 10A and 10B are schematic diagrams illustrating an example of an aspect in which a user sitting on a chair 1000 is viewing a video projected to the dome screen 101. Note that FIGS. 10A and 10B illustrate cross-sections of the dome screen 101 cut on a sagittal plane.

An angle of a seatback (backrest) of a reclining chair (an angle with a straight line vertical to a floor surface) can be said to be generally about 30 degrees. In the example illustrated in FIGS. 10A and 10B, an angle between the straight line vertical to the floor surface and the seatback of the chair 1000 is 28 degrees (see FIG. 10A). Note that FIG. 10A illustrates a state in which the head of the user is located at a position along the seatback of the chair 1000 and FIG. 10B illustrates a state in which a user pulls his or her chin down and maintains a horizontal visual line.

Here, an installation angle of the speaker 936 will be examined. Note that the speaker 936 may be, for example, a soundbar speaker. Here, as a frequency is higher and the size of a cone speaker to be used is smaller, directivity of the speaker is generally sharper. For example, in a sound speaker including a cone speaker with 60 mm in a bar portion, it is difficult to accompany diffusion from a frequency of about 5 kHz. Accordingly, in order for the user to hear up to a high frequency optimally, the direction of the speaker 936 is preferably oriented to the user (in particular, the face or ears of the user).

Accordingly, an angle between the floor surface and a straight line facing in a vibration direction of the speaker 936 which crosses the face of the user is about 35 degrees in a case where the head of the user is located at the position along the seatback, as illustrated in FIG. 10A, and is about 40 degrees in a case where a visual line of the user is maintained horizontally, as illustrated in FIG. 10B. Accordingly, for example, the speaker 936 is preferably installed so that an angle between the floor surface and the straight line facing in the vibration direction of the speaker 936 is in the range of about 35 degrees to 40 degrees. Note that, hereinafter, for example, the installation of the speaker 936 so that the angle between the floor surface and the straight line facing in the vibration direction of the speaker 936 is in the range of about 35 degrees to 40 degrees is expressed as installation of the speaker 936 at an angle of elevation of 35 degrees to 40 degrees, or the like, in some cases.

In order for the speaker 936 to be installed at an angle of elevation of 35 degrees to 40 degrees, for example, the support body of the dome screen 101 may have a configuration for installing the speaker 936 or a speaker stand for installing the speaker 936 may be prepared separately.

Further, in a case where the speaker 936 is installed on the floor surface below the dome screen 101, the dome screen 101 is installed at an angle of 45 degrees with respect to the floor surface in the example illustrated in FIGS. 10A and 10B so that the straight line facing in the vibration direction of the speaker 936 is not obstructed by the dome screen 101.

In addition, since a distance in which no convergence occurs is generally 1.2 meters, as illustrated in FIGS. 10A and 10B, each configuration is preferably disposed so that a distance between the eyes of the user and a position at which the user is gazing in the dome screen 101 is 1.2 meters or more. Note that since reflection of a sphere gathers at the center of the sphere, a viewing position of the user is preferably kept apart from the center of the dome screen 101 in order to avoid the problem of a stationary wave by reflection of an audio sound.

In addition, as described above, realism is increased by setting the inner diameter of the dome screen 101 to be about 1.5 to 2 meters. Therefore, in the example illustrated in FIGS. 10A and 10B, the inner diameter of the dome screen 101 is set to 2 meters. When the above-described information is comprehended, the central position of the diameter of the dome screen 101 is preferably about 1.3 meters, as illustrated in FIGS. 10A and 10B.

Here, for a human vertical viewing angle, an upward viewing angle is 50 degrees and a downward viewing angle is 75 degrees. Therefore, by disposing the dome screen 101 and the chair 1000, as illustrated in FIGS. 10A and 10B, the dome screen 101 can cover the upward viewing angle of 50 degrees of the user.

Here, as illustrated in FIGS. 10A and 10B, in a case where the dome screen 101 is installed at 45 degrees with respect to the floor surface, it is difficult to cover the downward viewing angle of 75 degrees of the user. Accordingly, to cover the downward viewing angle of 75 degrees as much as possible, for example, as illustrated in FIGS. 11A and 11B, the dome screen 101 can also be installed at 60 degrees with respect to the floor surface.

Figure 11A:
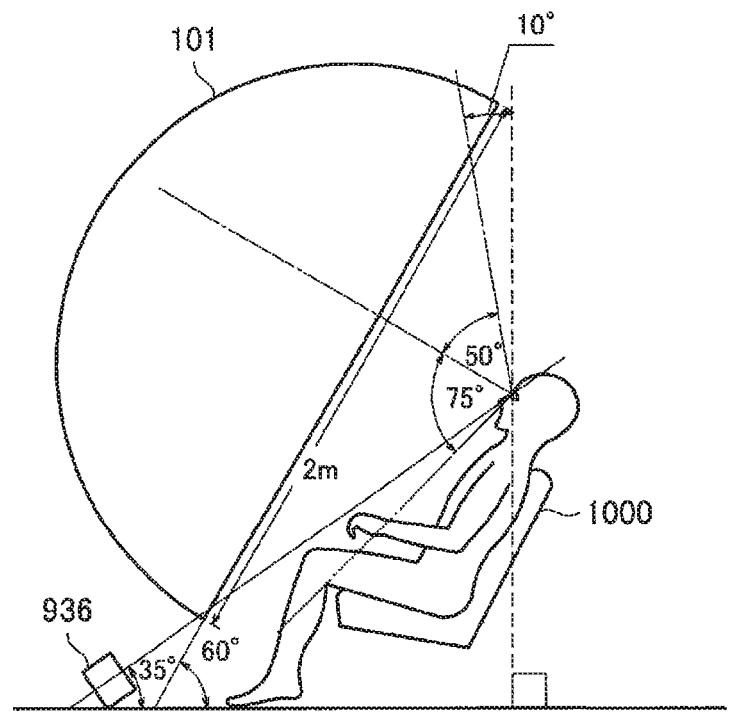
FIG. 11A is a schematic diagram illustrating an example of an aspect in which a user sitting on a chair 1000 is viewing a video projected to a dome screen 101.
Figure 11B:
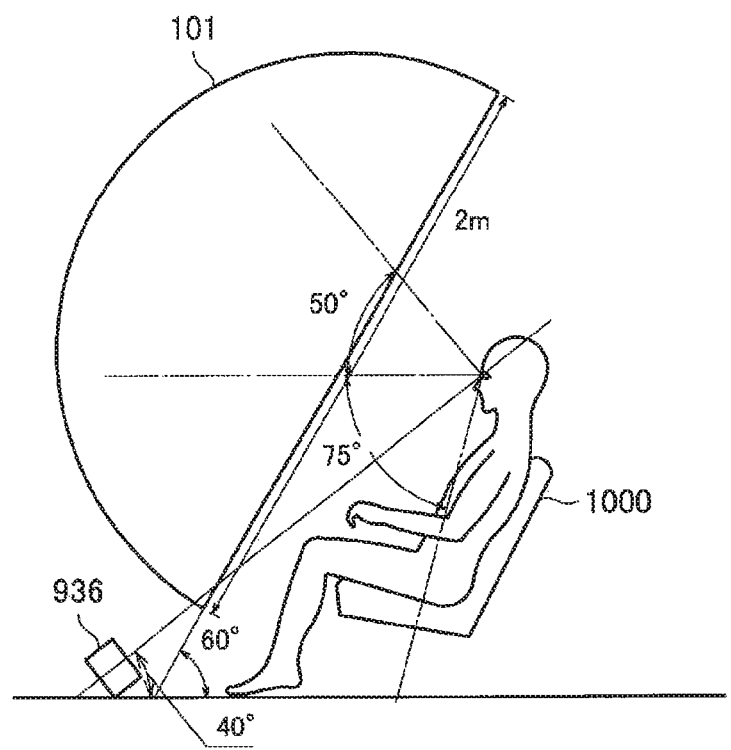
FIG. 11B is a schematic diagram illustrating an example of an aspect in which a user sitting on a chair 1000 is viewing a video projected to a dome screen 101.

FIGS. 11A and 11B are schematic diagrams illustrating an example of an aspect in which a user sitting on the chair 1000 is viewing a video projected to the dome screen 101 installed at 60 degrees with respect to the floor surface. Note that various values not illustrated in FIGS. 11A and 11B may be similar to those of the example illustrated in FIGS. 10A and 10B. In addition, FIG. 11A illustrates a state in which the head of the user is located at a position along the seatback of the chair 1000 and FIG. 11B illustrates a state in which a user pulls his or her chin down and maintains a horizontal visual line.

In the example illustrated in FIGS. 11A and 11B, the speaker 936 is preferably installed at an angle of elevation of 35 degrees to 40 degrees so that the straight line facing in the vibration direction of the speaker 936 crosses the face of the user. However, as illustrated in FIGS. 11A and 11B, when the speaker 936 is installed at an angle of elevation of 35 degrees to 40 degrees, the straight line facing in the vibration direction of the speaker 936 is obstructed by the dome screen 101. In a case where the speaker 936 is installed so that the straight line facing in the vibration direction of the speaker 936 is not obstructed by the dome screen 101, the speaker 936 is installed inside the dome screen 101. In this case, display may be hindered.

In order to output an audio sound without using the speaker 936, for example, a method of causing an actuator to vibrate the dome screen 101, a method of utilizing a transmission screen, or the like is considered. However, since reflection of a sphere gathers at the center of the sphere, it is considered that this method is not realistic because of occurrence of the problem of a stationary wave by reflection of an audio sound, the problem of screen intensity, the problem of deterioration in quality by transmission, or the like.

Accordingly, it is preferable to install the dome screen 101 at about 50 degrees with respect to the floor surface and install the speaker 936 immediately below the lower end of the dome screen 101. Because of this disposition, the straight line facing in the vibration direction of the speaker 936 can be caused not to be obstructed by the dome screen 101 between the speaker 936 and the face of the user while covering a portion which is at an angle greater than the downward viewing angle of 75 degrees.

Note that the speaker 936 may be a soundbar speaker including an array speaker in which a plurality of speakers is arranged. Then, an audio sound may be controlled so that widening of a surrounded sound and a wide listening spot can be realized by causing sound waves to arrive evenly from the plurality of speakers to a viewing area using the array speaker.

In addition, to enable a lower-pitched audio sound to be output, the subwoofer 935 that outputs a low-pitched audio sound is preferably installed in addition to the speaker 936. The subwoofer 935 has low directivity to output a low-pitched audio sound, but a sound pressure is inversely proportional to the square of a distance. Therefore, for example, at a short distance of about 1 meter, a user may feel directivity in accordance with a sound pressure. Accordingly, the subwoofer 935 is preferably installed immediately in the rear of the speaker 936 so that a distance to the user can be ensured, to match an arrival phase to a viewing position. In addition, when the subwoofer 935 is installed in the dome screen 101, there is concern of a direct sound causing reflection. Therefore, the subwoofer 935 is preferably installed at a position at which a direct sound does not arrive in the dome screen 101.

Figure 12A:
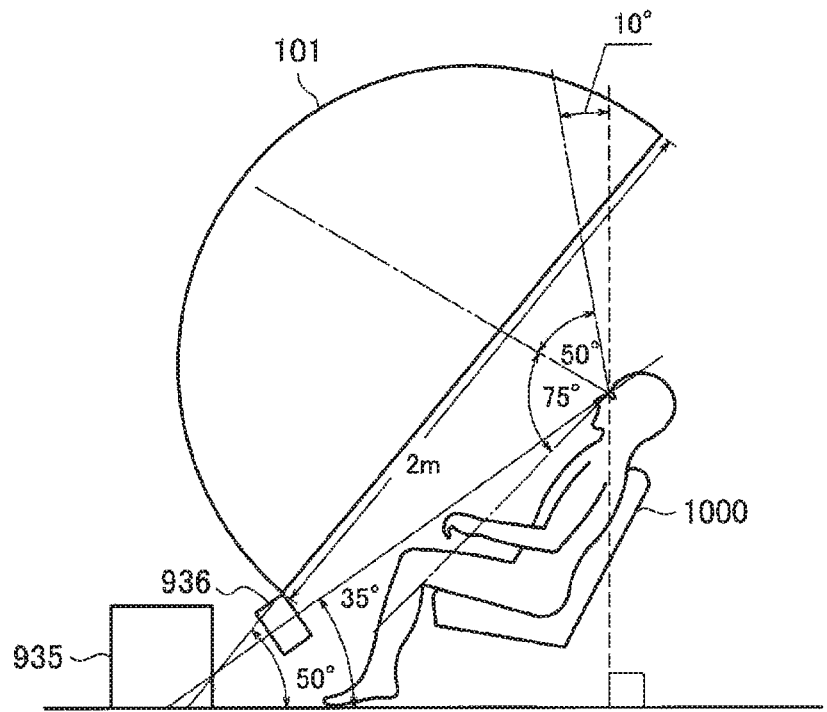
FIG. 12A is a schematic diagram illustrating an example of an aspect in which a user sitting on a chair 1000 is viewing a video projected to a dome screen 101.
Figure 12B:
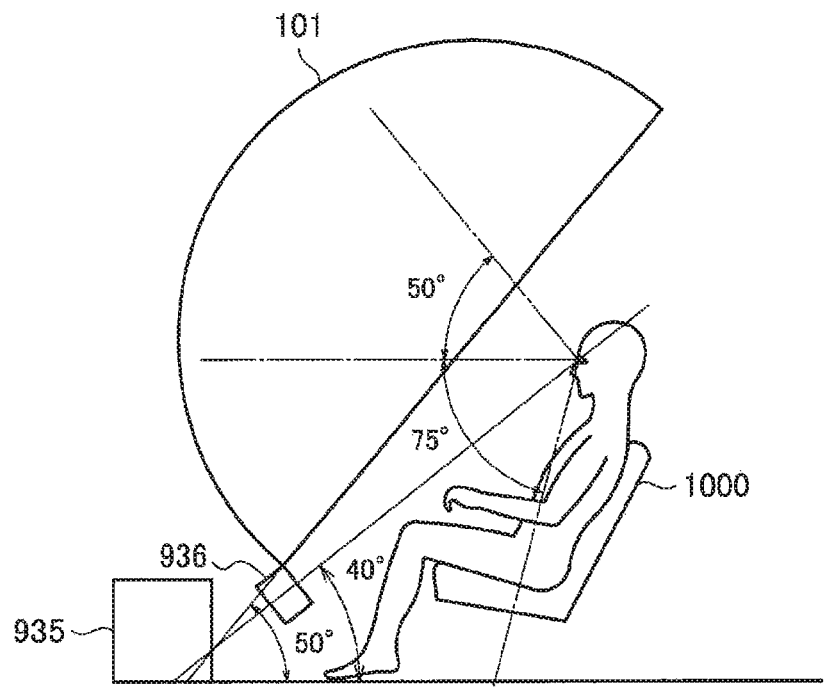
FIG. 12B is a schematic diagram illustrating an example of an aspect in which a user sitting on a chair 1000 is viewing a video projected to a dome screen 101.

On the basis of the above-described examination, an example of a preferable configuration is illustrated in FIGS. 12A and 12B. FIGS. 12A and 12B are schematic diagrams illustrating an example of an aspect in which a user sitting on the chair 1000 is viewing a video projected to the dome screen 101 installed at 50 degrees with respect to the floor surface. Note that various values not illustrated in FIGS. 12A and 12B may be similar to those of the example illustrated in FIGS. 10A and 10B. In addition, FIG. 12A illustrates a state in which the head of the user is located at a position along the seatback of the chair 1000 and FIG. 12B illustrates a state in which a user pulls his or her chin down and maintains a horizontal visual line. In addition, in each of FIGS. 12A and 12B, a more preferable angle of elevation of the speaker 936 is illustrated so that the straight line facing in the vibration direction of the speaker 936 crosses the face of the user. The speaker 936 may be installed at an angle of elevation of 35 degrees to 40 degrees.

FIG. 13 is a perspective view illustrating the configuration example illustrated in FIGS. 12A and 12B. As illustrated in FIGS. 12A, 12B, and 13, the subwoofer 935 is installed immediately in the rear of the speaker 936 (soundbar speaker). Note that in the examples illustrated in FIGS. 12A, 12B, and 13, the subwoofer 935, and the speaker 936 may be commercially available products which are widely used.

Figure 14:
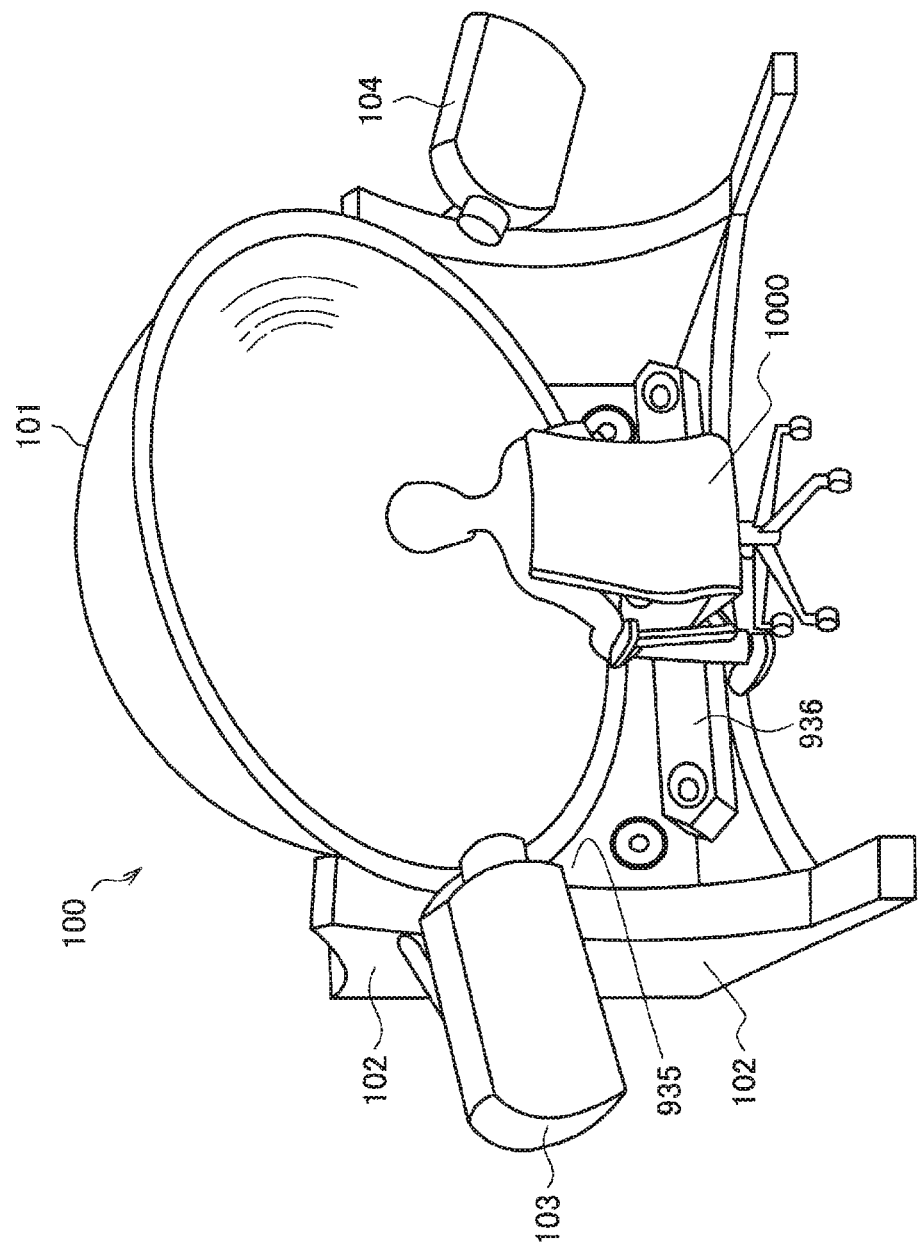
FIG. 14 is a diagram illustrating a configuration example in which the subwoofer 935 is installed to be embedded in a support body 102.
Figure 15:
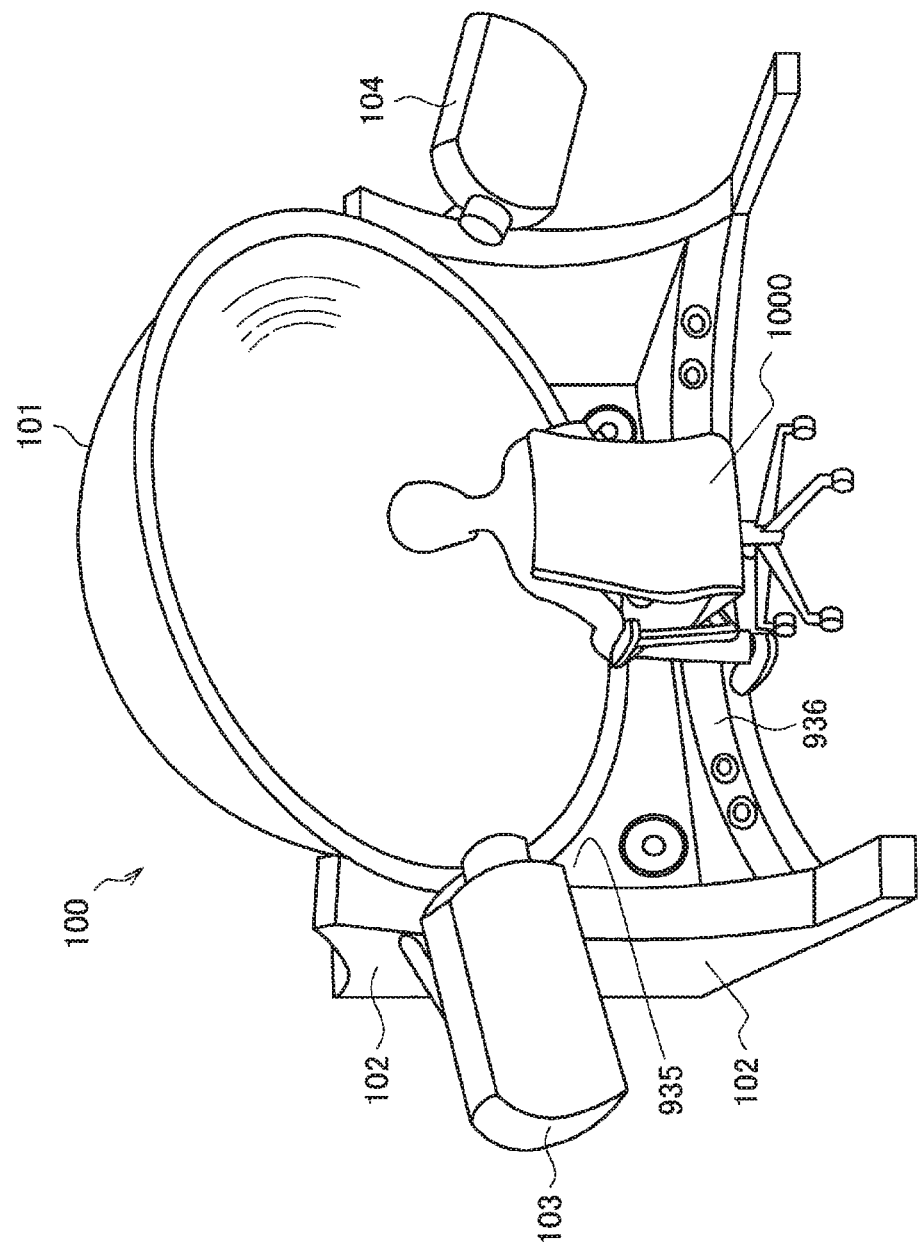
FIG. 15 is a diagram illustrating a configuration example in which the subwoofer 935 is installed to be embedded in a support body 102.
Figure 16:
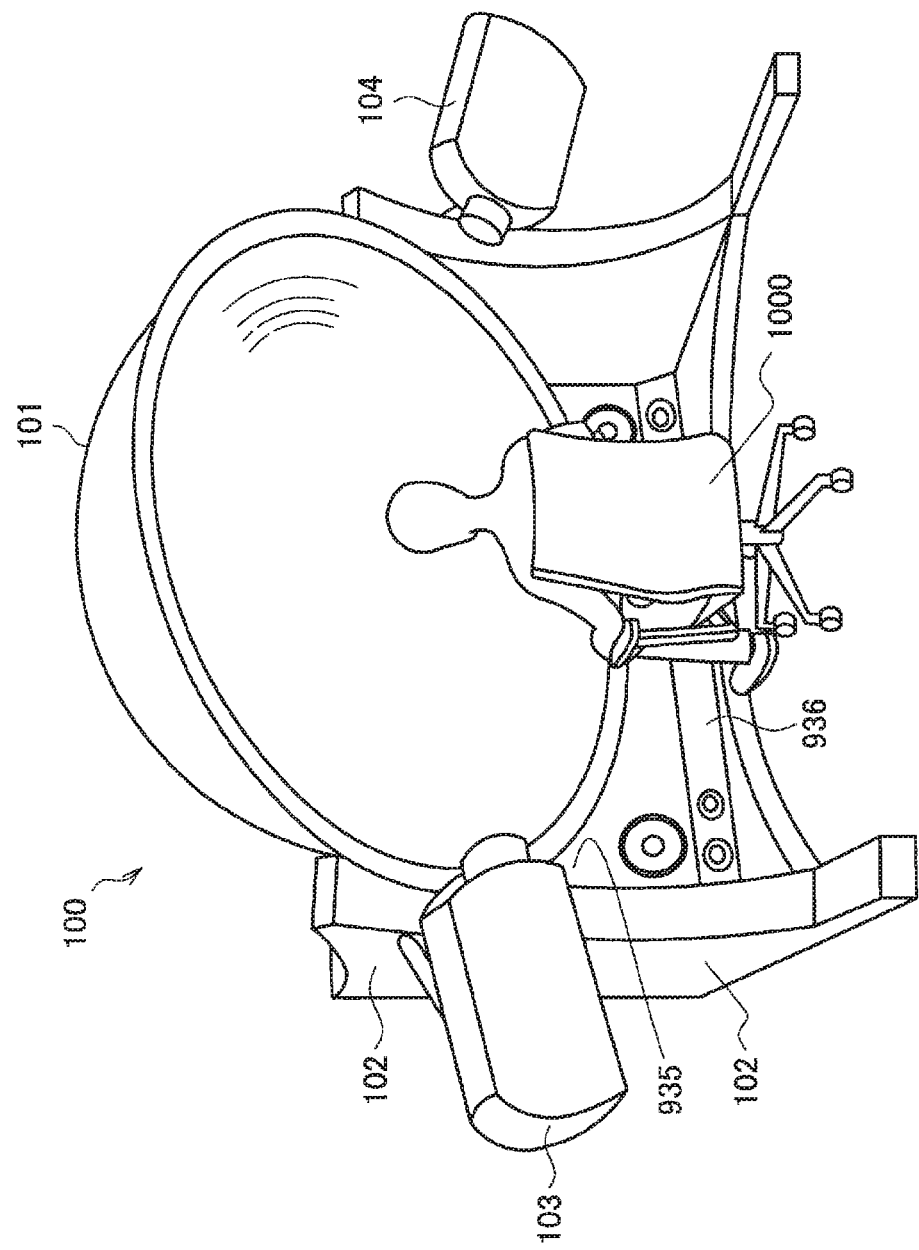
FIG. 16 is a diagram illustrating a configuration example in which the subwoofer 935 and the speaker 936 are installed to be embedded in the support body 102.

On the other hand, a customized dedicated system can also be used. FIG. 14 illustrates a configuration example in which the subwoofer 935 is installed to be embedded in the support body 102. In addition, FIG. 15 illustrates a configuration example in which the subwoofer 935 is embedded in the support body 102 and the speaker 936 is installed in the support body 102 to be curved in a concentric shape along a curved line of the dome screen 101 when viewed in the vertical direction. In addition, FIG. 16 illustrates a configuration example in which the subwoofer 935 and the speaker 936 are installed to be embedded in the support body 102. Note that the speaker 936 is preferably installed at an angle of elevation of 35 degrees to 40 degrees even in the variation configurations illustrated in FIGS. 14 to 16.

As described above, by using the customized dedicated system, it is possible to realize a more surrounded audio sound environment or an experience in which immersion is further possible without feeling the presence of the speaker because the speaker is embedded.

Note that FIGS. 12A, 12B, 13, 14, 15, and 16 illustrate the examples in which the subwoofer 935 and the speaker 936 are included as the audio output system, but the embodiment is not limited to these examples. For example, a headrest speaker or a rear speaker may be included as a new audio output system.

Figure 17:
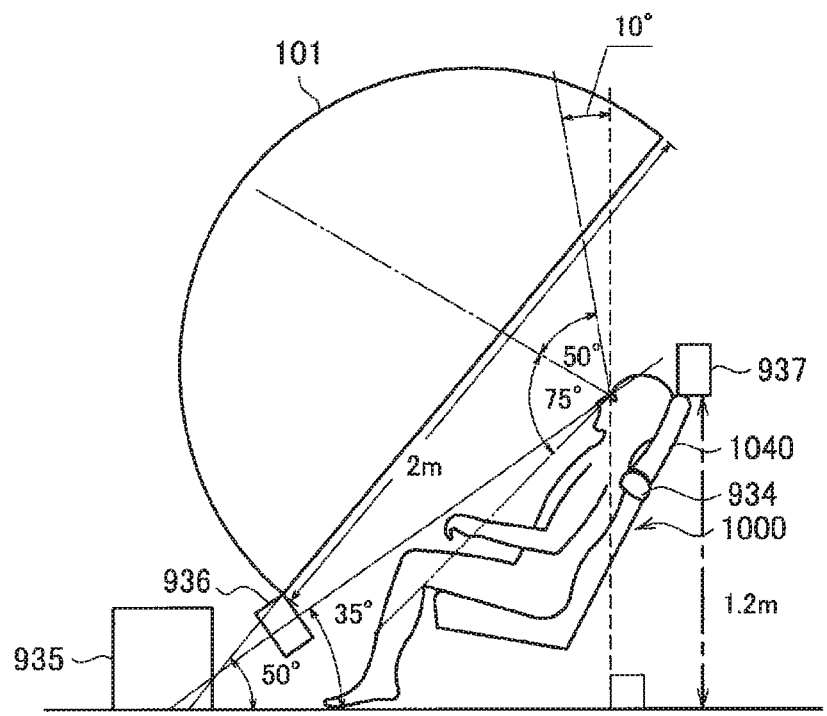
FIG. 17 is a diagram illustrating a configuration example in which a headrest speaker 934 and a rear speaker 937 are included in the chair 1000.

FIG. 17 illustrates a configuration example in which a headrest speaker 934 and a rear speaker 937 are included in the chair 1000. Note that the configuration example illustrated in FIG. 17 is similar to the configuration example illustrated in FIG. 12A except that the chair 1000 includes a headrest 1040, the headrest speaker 934, and the rear speaker 937. An audio environment in which an audio sound is output from the rear of the user to be surrounded is realized by installing the headrest speaker 934 and the rear speaker 937.

Figure 18:
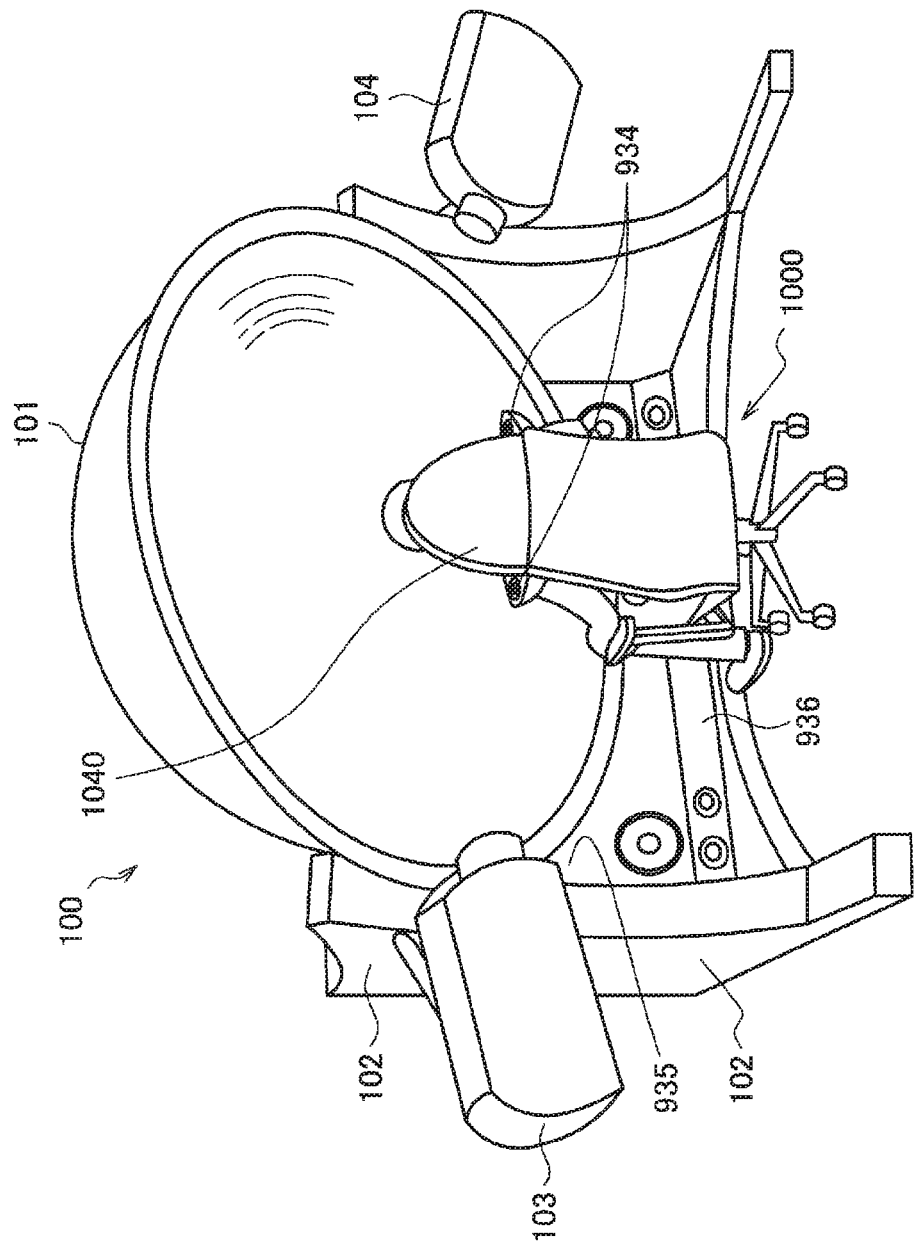
FIG. 18 is a perspective view illustrating a configuration example in which the headrest speaker 934 is included in the chair 1000.

Note that FIG. 17 illustrates the example in which the rear speaker 937 is included, but a sound source may be virtually disposed again at a preferable position (for example, the position of the rear speaker 937 illustrated in FIG. 17) by performing sound field correction through signal processing, instead of providing the rear speaker 937. FIG. 18 is a perspective view illustrating a configuration example in which the headrest speaker 934 is included in the chair 1000.

Note that by estimating the position of the head of the user on the basis of displacement information and controlling sound image localization or echoing toward the position of the head, the headrest speaker 934 installed to the right and left of the user may be utilized to output an audio sound subjected to signal processing in accordance with the position of the head of the user.

In addition, through signal processing in which the principle of reproduction of an audio sound subjected to so-called binaural recording is applied, both the subwoofer 935 and the speaker 936 (soundbar speaker) or only the speaker 936 can also be substituted with the headrest speaker 934 installed to the right and left of the user.

B. Interaction in Accordance with Motion of Body of User

In the configuration examples illustrated in FIGS. 1 to 7, it is assumed that the user entering the dome screen 101 sits on the chair 106, but a method of using the dome display 100 is not limited thereto. The user can enter the dome screen 101 and view a free viewpoint video or a VR video even in a state in which the user uses an object other than a chair. For example, an object such as existing furniture such as a sofa or a bed used in a daily life, fitness equipment such as a fitness bike or a treadmill, or the like can be installed in the dome screen 101 so that a user can view a video projected to the dome screen 101, using one of the objects.

A state in which a user uses an object is a state in which a user sits on a chair, leaning against a seatback, a state in which a user is pedaling on a fitness bike, a state in which a user is running or walking on a treadmill, a state in which a user lies on his or her back or lies on a bed or a soft, or the like. Any state is a state in which the user does not wear anything. In addition, the body of a user is basically in a state in which the user is free and is not constrained on the object which is being used, but the body of the user mounting an object, or the like, is in contact with the object. Therefore, when the body of a user such as a trunk or an upper half of the body is motioning, 3-dimensional positional information such as rotation or translation of a predetermined portion of the object is accordingly displaced.

Accordingly, the present specification proposes a technology for directly or indirectly deriving a motion of the trunk, the upper half of the body, or the like of a user on the basis of displacement information of an object used by the user and realizing interaction in accordance with a body motion of a user in a state in which the user does not wear any dedicated sensor.

When the user is using an object, for example, when the user is mounting the object, or the like, a predetermined portion of the object is displaced 3-dimensionally in accordance with a body motion of the user. Accordingly, on the basis of the positional information of the predetermined portion of the object, displacement information of the predetermined portion is acquired to directly or indirectly derive a motion of the trunk, the upper half of the body, or the like of the user.

Then, by controlling a feedback output in the dome display 100 on the basis of displacement information of the predetermined portion of the object, interaction in accordance with a body motion of the user is realized.

An output in the dome display 100 includes video display on the dome screen 101. For example, by controlling brightness or resolution of a video and a display position (an angle of view), a transition direction, a motion parallax, or the like in a free viewpoint video on the basis of the displacement information, it is possible to provide feedback of the video to the user. In addition, an output in the dome display 100 includes an audio output. For example, by estimating a position of the head of the user viewing a free viewpoint video on the basis of displacement information and controlling sound image location or echoing toward the position of the head, it is possible to provide feedback of an audio sound to the user. Note that so-called fovea centralis rendering may be applied to rendering of the dome display 100 in accordance with visual line information of the user.

Further, an output in the dome display 100 includes an environmental change in the dome, such as a temperature, wind, humidity, smell, or an audio effect obtained using a multi-modal interface and a sensation of touch, inclination, a sensation of acceleration, a sensation of gravity direction, vibration, oscillation, a light electric stimulation, and the like imparted to the user. By controlling an output of the multi-modal interface on the basis of the displacement information of the predetermined portion of the object in accordance with a motion of the body of the user, it is possible to provide the user with feedback in which the realistic sensation is presented.

The predetermined portion of the object mentioned herein is, for example, a feature portion which is on the surface of the object.

The feature portion of the object is a light-emitting element that emits visible light or invisible light such as infrared light and is mounted on a predetermined location or any location on the surface of the object. Alternatively, the feature portion may be a static visual marker formed as an existing 2-dimensional figure pattern rather than an active marker such as a light-emitting element. Accordingly, by tracking the feature portion with one camera or two or more cameras on which a wide angle lens or the like is mounted (performing motion capturing), it is possible to acquire displacement information of the feature portion. Alternatively, the feature portion of the object may not necessarily be a marker mounted on the surface of the object, but may be a feature point which can be extracted from a captured image of the object through an image recognition process, edge processing, or the like.

Then, 3-dimensional displacement information corresponding to a motion of the body of the user such as the trunk or the upper half of the body can be acquired on the basis of positional information of the predetermined portion of the object. For example, it is possible to measure displacement of two or more feature portions which are on the surface of the object and derive 3-dimensional displacement information in accordance with a body motion of the user such as the trunk or the upper half of the body.

Specifically, when the positions of at least two feature portions on the surface of the object are measured, it is possible to acquire first displacement information corresponding to rotational displacement of a straight line formed by at least the two feature portions in accordance with a body motion of the user. In addition, when the positions of at least three feature portions on the surface of the object are measured, it is possible to acquire the first displacement information corresponding to 3-dimensional rotational displacement of a plane formed by at least the three feature portions.

The first displacement information corresponding to the rotational displacement of the object directly or indirectly indicates 3-dimensional displacement of the trunk of the user using the object. In addition, by controlling feedback of video display of the dome display 100, an output or the like of the multi-modal interface, or the like on the basis of a rotational direction of the object acquired as the first displacement information or a displacement amount (or a rotational angular velocity or rotational angle acceleration) in the rotational direction, it is possible to realize interaction in accordance with a body motion of the user in a state in which the user does not wear any dedicated sensor.

In addition, when the positions of at least three feature portions on the surface of the object are measured, it is possible to acquire second displacement information corresponding to 3-dimensional translational displacement of a plane formed by at least the three feature portions. Further, it is possible to also acquire third displacement information corresponding to 3-dimensional reciprocative translational displacement of the plane formed by at least the three feature portions.

The second displacement information corresponding to the translational displacement of the object and the third displacement information corresponding to the reciprocative translational displacement of the object directly or indirectly indicate a body motion of the user using the object. In addition, by controlling feedback of video display of the dome display 100, an output of the multi-modal interface, or the like on the basis of the translational displacement, the reciprocative translational displacement (or the translational displacement direction, the translational displacement amount, the translational speed, or the translational acceleration), or the like of the object acquired as the second displacement information or the third displacement information, it is possible to realize interaction in accordance with a body motion of the user in a state in which the user does not wear any dedicated sensor.

As an object which is used by the user, for example, existing furniture such as a chair, a sofa, or a bed used in a daily life, fitness equipment such as a fitness bike or a treadmill, or the like can be exemplified. Many objects are used in a form in which the objects are placed on a floor (specifically, immediately below the dome screen 101) and users are mounting the objects. In this use form, a constraint condition that relative movement of the object to a floor is not substantially made even when the user performs a body motion (or a user does not perform a body motion of moving an object relatively to a floor) can be imposed. In addition, under the constraint condition, feedback control such as video display of the dome display 100, an output of the multi-modal interface, or the like may be performed on the basis of the first displacement information corresponding to the rotational displacement of the object, the second displacement information corresponding to the translational displacement of the object, or the third displacement information corresponding to the reciprocative translational displacement of the object.

An interaction technology in accordance with a body motion of the user, as disclosed in the present specification, is characterized in that it is not necessary for the user to wear any dedicated sensor and may not manipulate an input device such as a controller or a console.

In addition, any of various objects such as existing furniture such as a chair, a sofa, or a bed used in a daily life, fitness equipment such as a fitness bike or a treadmill, and the like used by the user may be any commercially available product which is widely used. By mounting elements that emit invisible light or visible light to the surface of the object which is a commercially available product or markers such as visual markers, a plurality of feature portions can be installed. Alternatively, by using a feature point which can be extracted through an image recognition process as a feature portion, it is possible to acquire displacement information regarding rotational displacement or translational displacement of the object in accordance with a body motion of such as the trunk of the user. That is, according to the technology disclosed in the present specification, interaction in accordance with a body motion of the user can be realized by obtaining any of various commodities which are commercially available or widespread and utilizing the commodity as an object which is displaced in accordance with a body motion of the user. Thus, a dedicated controller is not necessary.

The dome display 100 itself can reproduce a sensation that the user is at that place or a sensation that the user participates in that place by combining a surrounded video and audio environment (as described above), and thus the user can realize an experience in visiting various places although the user does not go the sites on purpose. Further, by utilizing the interaction technology proposed in the present specification, it is possible to also reproduce the sensation that the user participates in that place on the dome display 100.

Additionally, the interaction technology proposed in the present specification can be developed as an alternative input function substituted for a controller or a console for a disabled person of which a body motion is unnatural, since a body motion of the user such as displacement of the trunk can be detected through furniture such as a chair, a bed, or the like used in a daily life and can be substituted for an input. In addition, the interaction technology proposed in the present specification can be used not only in a general household but also a hospital, a rehabilitation facility, or the like. For example, for a user using a wheel chair, 3-dimensional displacement of the wheel chair can be detected and can be used for control of various external devices, such as a manipulation of opening and closing a door, a manipulation of raising or lowering a reclining bed, a manipulation of turning on or off a lamp, a nurse call, and curtain opening and closing. In this case, an external device to be controlled may be connected via a network or a camera detecting 3-dimensional displacement of a wheel chair. Further, the interaction technology proposed in the present specification can also be used for a moving body for which a space is limited, such as an airplane, a train, a bus, or a passenger car corresponding to automatic driving.

Hereinafter, examples related to a method of acquiring displacement information of a predetermined portion of an object in accordance with a body motion of a user in regard to each object used by the user and a method of controlling a feedback output based on the acquired displacement information will be described in detail.

Example 1

Figure 19:
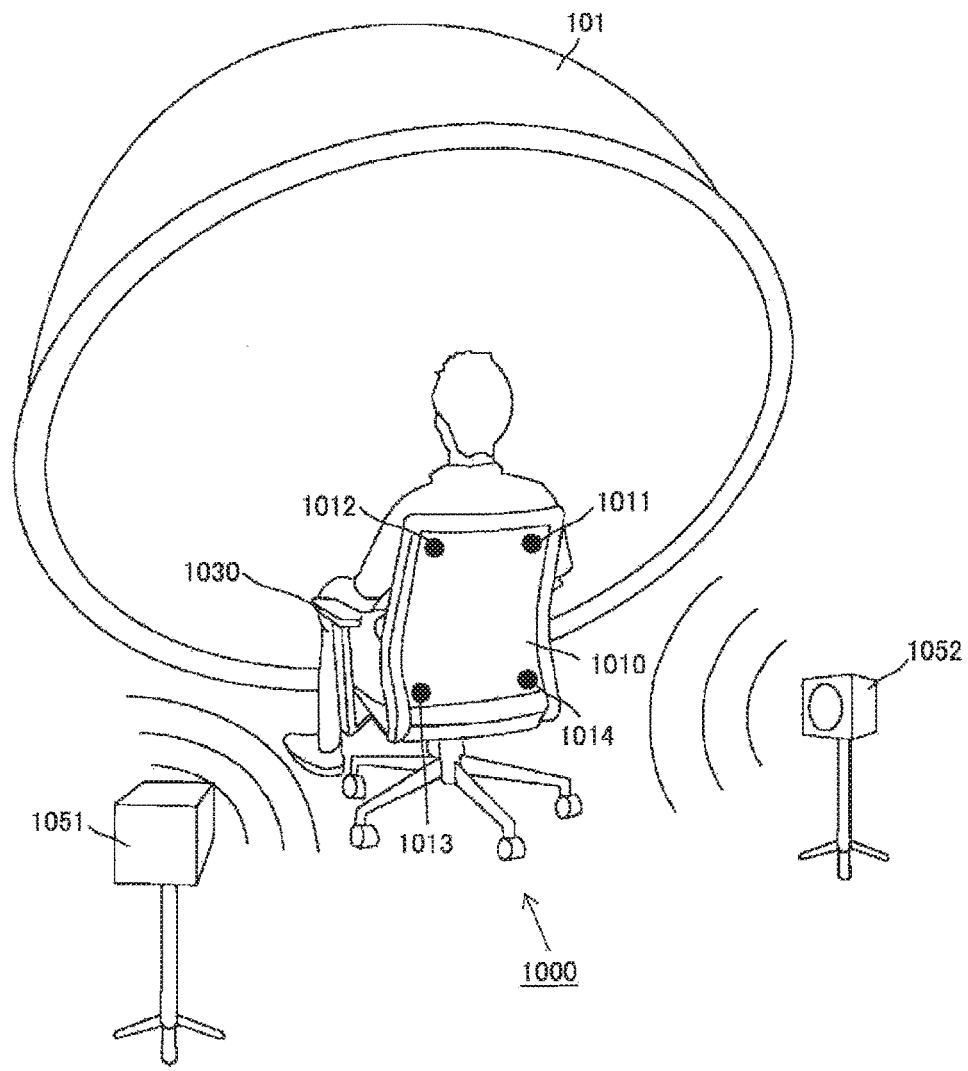
FIG. 19 is a diagram illustrating the chair 1000 as an example of an object that acquires displacement information in accordance with a body motion of a user.

In FIG. 19, the chair 1000 on which the user sit is exemplified as an object from which displacement information is acquired in accordance with a body motion of the user. The illustrated chair 1000 has a seatback and an armrest. The chair 1000 is installed below the dome screen 101, and thus the user can sit on the chair 1000 to view a video projected to the dome screen 101.

Markers 1011 to 1014 are mounted in four corners of the seatback 1010 of the chair 1000. Each of the markers 1011 to 1014 may be a light-emitting element that emits visible light or invisible light such as infrared light or a visual marker formed as an existing figure pattern. Alternatively, the markers 1011 to 1014 may not be mounted on the chair 1000 and a plurality of feature points which can be extracted through an image recognition process may be used instead of the markers. In addition, cameras 1021 and 1022 are installed on the slanted rear side of the right and left of the chair 1000. When the displacement sensor 941 serving as the displacement information acquisition unit detects images of the markers 1011 to 1014 from images captured by the cameras 1021 and 1022, 3-dimensional positional information of the markers 1011 to 1014 can be calculated on the basis of triangulation or the like.

In accordance with mainly a motion of the trunk or an inclination motion of the upper half of the body such as leaning of the user against the seatback 1010 when the user sits on the chair 1000, 3-dimensional positional information of each of the markers 1011 to 1014 is changed. The displacement sensor 941 serving as the displacement information acquisition unit can acquire 3-dimensional displacement information of each of the markers 1011 to 1014 in accordance with a body motion of the user by inputting an image captured by each of the cameras 1021 and 1022 and continuously tracking the positional information of each of the markers 1011 to 1014.

Note that although not illustrated in FIG. 19, a marker may be mounted on a sitting portion or an armrest 1030 of the chair 1000. In this case, 3-dimensional displacement information of a portion at which the marker is mounted on the armrest 1030 can be acquired in accordance with a body motion of the user, such as touching of an elbow of the user on the armrest 1030.

For example, the displacement sensor 941 serving as the displacement information acquisition unit can acquire the first displacement information corresponding to 3-dimensional rotational displacement of a straight line formed by two markers of the markers mounted on the seatback 1010 of the chair 1000 in accordance with a body motion of the user.

In addition, the displacement sensor 941 can acquire the first displacement information corresponding to 3-dimensional rotational displacement of a plane formed by three or more of the markers mounted on the seatback 1010 of the chair 1000 in accordance with a body motion of the user.

The displacement sensor 941 acquires, for example, information such as a rotational direction, a rotational displacement amount in the rotational direction, a rotational displacement amount (or a rotational angular velocity) per unit time, or rotational angle acceleration as the first displacement information corresponding to 3-dimensional rotational displacement. For example, a rotational displacement amount, a rotational angular velocity, or rotational angle acceleration related to a tilting angle of the seatback 1010 can be acquired. For example, right and left rotational angles (here, in a case where the chair 1000 has the rotational function for the seat) of the seatback 1010 or the seat of the chair 1000 or displacement information regarding a tilting angle in the front and rear or right and left directions can be acquired and input to the control unit 910 serving as an output control unit.

In addition, the displacement sensor 941 can acquire the second displacement information corresponding to translational displacement in accordance with a body motion of the user or the third displacement information corresponding to the reciprocative translational displacement in accordance with a body motion of the user with regard to at least one of the markers 1011 to 1014 mounted on the seatback 1010 of the chair 1000.

The displacement sensor 941 acquires, for example, information such as a direction of translation, a displacement amount in the translational direction, a translational displacement amount (or a translational speed) per unit time, or translational acceleration as the second translational information or the third translational information corresponding to the translational displacement or the reciprocative translation displacement. For example, translational information regarding movement in each of the upward and downward directions, the front and rear directions, and the right and left directions of the chair 1000 can be acquired and input to the control unit 910 serving as the output control unit.

A correspondent relation between a method of detecting the markers 1011 to 1014 mounted on the chair 1000 by the displacement sensor 941 and displacement information input to the control unit 910 is exemplified in Table 1 below.

TABLE 1

| Detection method | Input content |
| --- | --- |
| Detecting upward and downward movement amounts of chair per unit time through 3-dimensional detection of markers | Upward and downward movement amounts |
| Detecting right and left rotational angles per unit time in chair through 3-dimensional detection of markers | Right and left rotational angles |
| Detecting front and rear tilting angles of chair per unit time through 3-dimensional detection of markers | Front and rear tilting angles |
| Detecting right and left tilting angles of chair per unit time through 3-dimensional detection of markers | Right and left tilting angles |
| Detecting front and rear or right and left movement amounts of chair per unit time through 3-dimensional detection of markers | Front and rear or right and left movement amounts |

For example, the displacement sensor 941 inputs a result obtained by detecting displacement information of a 3-dimensional position of at least one of the markers 1011 to 1014 and detecting upward and downward movement amounts of the chair 1000 per unit time, as the upward and downward movement amounts of the chair 1000 to the control unit 910. The upward and downward movement amounts of the chair 1000 correspond to a motion in a height direction when the user sits on the chair 1000. Note that the movement amounts in the upward and downward directions of the chair 1000 can also be detected on the basis of markers (none of which is illustrated) mounted on the seat portion or the armrest 1030 rather than the markers 1011 to 1014 mounted on the seatback 1010.

In addition, the displacement sensor 941 inputs a result obtained by detecting right and left rotational angles of the chair 1000 per unit time and detecting displacement information of a 3-dimensional position of at least one of the markers 1011 to 1014, as the right and left rotational angles of the chair 1000 (here, in a case where the chair 1000 has a rotational function for the seat) to the control unit 910.

Figure 23:
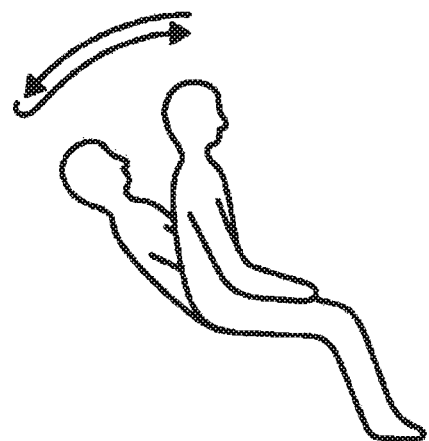
FIG. 23 is a diagram illustrating an aspect in which a user leaning against a seatback raises his or her body using a spring property of the seatback of the chair.

In addition, the displacement sensor 941 inputs a result obtained by detecting displacement information corresponding to 3-dimensional rotational displacement of a plane formed by at least three of the markers 1011 to 1014 and detecting tilting angles in the front and rear directions of the chair 1000 per unit time, as tilting angles in the front and rear directions of the chair 1000 per unit time to the control unit 910. The tilting angles in the front and rear directions of the chair 1000 correspond to a raising or leaning motion against the seatback 1010 when the user sits on the chair 1000. Note that in a case where a spring property of the seatback 1010 of the chair 1000 can be used, the displacement sensor 941 detects an angular velocity of a tilting angle exceeding a predetermined threshold of return when the user raises his or her body (see FIG. 23) leaning against the seatback 1010, and can input the angular velocity of the tilting angle to the control unit 910.

In addition, the displacement sensor 941 inputs a result obtained by detecting displacement information corresponding to 3-dimensional rotational displacement of a plane formed by at least three of the markers 1011 to 1014 and detecting tilting angles in the right and left directions of the chair 1000 per unit time, as tilting angles in the right and left directions of the chair 1000 to the control unit 910. The tilting angles in the right and left directions of the chair 1000 correspond to a motion raising or leaning against the armrest when the user sits on the chair 1000.

In addition, the displacement sensor 941 inputs a result obtained by detecting displacement information of a 3-dimensional position of at least one of the markers 1011 to 1014 and detecting movement amounts in the front, rear, right, and left directions of the chair 1000 per unit time, as movement amounts in the front, rear, right, and left directions of the chair 1000 to the control unit 910. The movement of the chair 1000 in the front, rear, right, and left directions corresponds to a motion in accordance with a motion of the user sitting on the chair 1000 with a caster and matching a position to the right, rear, right, or left with his or her legs. Note that the movement amounts in the front, rear, right, and left directions of the chair 1000 can also be detected on the basis of markers (none of which is illustrated) mounted on the seat portion or the armrest 1030 rather than the markers 1011 to 1014 mounted on the seatback 1010. In addition, oscillation or vibration when the user shakes the chair 1000 can also be detected as movement amounts in the front, rear, right, and left directions of the chair 1000.

Then, the control unit 910 serving as the output control unit realizes interaction in accordance with a body motion of the user sitting on the chair 1000 by controlling video processing or audio processing and an output of the multi-modal interface on the basis of the displacement information of the chair 1000 input from the displacement sensor 941.

A correspondent relation between displacement information of the chair 1000 corresponding to a body motion of the user and output control performed by the control unit 910 is exemplified in Table 2 below. Here, Table 2 describes the output control related to mainly video processing and audio processing as the output control. In addition, even in a case where certain displacement information is input, it is assumed that a video is displayed on an entire celestial sphere display such as the dome display 101 and an audio sound is reproduced by a surround audio system. In addition, the multi-modal interface may be used to combine an effect of blowing wind in accordance with movement of a viewpoint position or a visual line direction. In addition, a parallax range of a video may be controlled on the basis of visual line information of the user detected by the head detection camera 942 or the like.

TABLE 2

| | Output control | |
|---|---|---|
| Displacement information | Video processing | Audio processing |
| Upward and downward movement amounts | Affixing upward and downward changes of motion parallax to free viewpoint video during viewing at movement amounts proportional to upward and downward movement amounts per unit time | Controlling upward and downward changes of SSF in accordance with viewpoint position of video toward position of head of user estimated from upward and downward movement amounts per unit time |
| Right and left rotational angles | Affixing right and left changes of motion parallax to free viewpoint video during viewing at angles which are same as and proportional to rotational angles per unit time Causing cursor of UI menu to be moved | Controlling right and left changes of SSF in accordance with viewpoint position of video toward position of head of user estimated from right and left rotational angles per unit time |
| Front and rear tilting angles | ① Affixing tilting angle changes of motion parallax to | ① Controlling front and rear tilting angle changes of SSF in |

TABLE 2-continued

| Displacement information | Output control | |
|---|---|---|
| | Video processing | Audio processing |
| | free viewpoint video during viewing at angles which are same as and proportional to front and rear tilting angles per unit time. Causing cursor of UI menu to be moved ② Setting angular acceleration of tilting angle of return as ignition condition and performing selection of cursor of UI menu and instantaneous movement of viewpoint position of free viewpoint video | accordance with viewpoint position of video toward position of head of user estimated from front and rear tilting angles per unit time ② Causing sound effect of SSF to be produced in accordance with angular acceleration of front or rear tilting angle causing instantaneous movement of viewpoint position of free viewpoint video |
| Right and left tilting angles | Affixing right and left tilting angle changes of motion parallax to free viewpoint video during viewing at angles which are same as and proportional to right and left tilting angles per unit time and causing viewpoint position to be changed to right and left | Controlling front and rear tilting angle changes of SSF in accordance with viewpoint position of video toward position of head of user estimated from right and left tilting angles per unit time |
| Front and rear or right and left movement amounts | Affixing front, rear, right, and left changes of motion parallax to free viewpoint video during viewing at movement amounts which are same as and proportional to front, rear, right, and left movement amounts per unit time | Controlling front, rear, right, and left changes of SSF in accordance with viewpoint position of video toward position of head of user estimated from front, rear, right, and left movement amounts per unit time |

For example, when upward and downward movement amounts are input as displacement information of the chair 1000 on which the user sits, the control unit 910 serving as the output control unit performs video processing of affixing upward and downward changes of a motion parallax to a free viewpoint video during viewing at movement amounts proportional to the upward and downward movement amounts per unit time. In addition, the control unit 910 estimates a position of the head of the user on the basis of the upward and downward movement amounts per unit time and performs audio processing of controlling upward and downward changes in a surround sound field (hereinafter referred to as "SSF") in accordance with a viewpoint position of a video (an imaging position of a camera) toward the position of the head. Note that the control unit 910 may not continuously change the video processing or the audio processing in accordance with the upward and downward movement amounts of the chair 1000 but may perform stepwise output control such that a first output is performed when the movement amount reaches a first value, and a second output different from the first output is performed when the movement amount reaches a second value greater than the first value.

Figure 20:
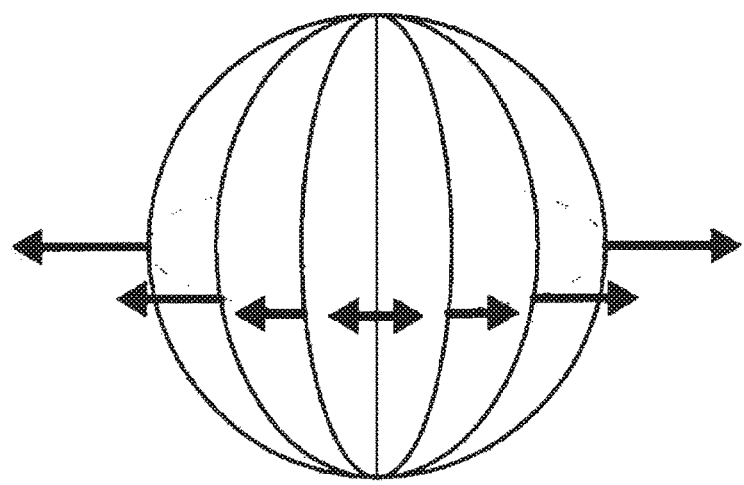
FIG. 20 is a diagram exemplifying video processing of affixing right and left changes of a motion parallax to a free viewpoint video.

In addition, when the right and left rotational angles are input as displacement information of the chair 1000 on which the user sits, the control unit 910 serving as the output control unit performs video processing of affixing right and left changes of a motion parallax to a free viewpoint video during viewing at angles which are the same as and proportional to the rotational angles per unit time (see FIG. 20). In addition, video processing of moving a cursor of a UI menu to the right or left in tandem with right or left rotation may be performed (see FIG. 37). In addition, the control unit 910 estimates a position of the head of the user on the basis of a right or left rotational angle per unit time and performs audio processing of controlling a right or left change of the SSF in accordance with a viewpoint position of a video (an imaging position of a camera) toward the position of the head. Note that the control unit 910 may not continuously change the video processing or the audio processing in accordance with the right or left rotational angle of the chair 1000, but may perform stepwise output control such that a first output is performed when the rotational angle reaches a first value, and a second output different from the first output is performed when the rotational angle reaches a second value greater than the first value.

Figure 21:
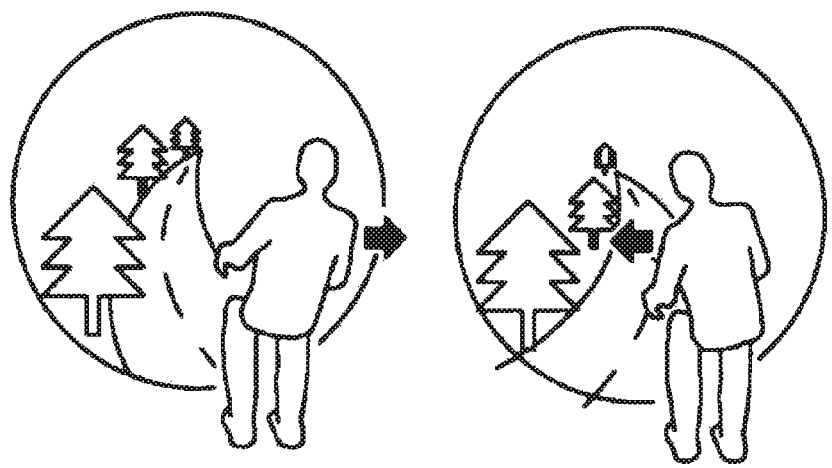
FIG. 21 is a diagram exemplifying video processing of affixing tilting angle changes before and after a motion parallax to a free viewpoint video.

In addition, when angles in the front and rear directions are input as displacement information of the chair 1000 on which the user sits, the control unit 910 serving as the output control unit performs video processing of affixing front and rear tilting angle changes of a motion parallax to a free viewpoint video during viewing at angles which are the same as and proportional to the front and rear tilting angles per unit time (see FIG. 21). In addition, video processing of moving a cursor of a UI menu in tandem with front and rear tilting angles may be performed (see FIG. 37). Alternatively, the control unit 910 may perform control such that a first output is performed when a first tilting angle is input, and a second output different from the first output is performed when a second tilting angle greater than the first tilting angle is input. In addition, the control unit 910 estimates a position of the head of the user on the basis of front and rear tilting angles per unit time and performs audio processing of controlling front and rear tilting angle change of the SSF in accordance with a viewpoint position of a video (an imaging position of a camera) toward the position of the head. Note that the control unit 910 may not continuously change the video processing or the audio processing in accordance with the angles in the front and rear directions of the chair 1000, but may perform stepwise output control such that a first output is performed when the angles in the front and rear directions reach a first value, and a second output different from the first output is performed when the angles in the front and rear directions reach a second value greater than the first value.

In addition, when the user leaning against the seatback 1010 raises his or her body using the spring property of the seatback 1010 as displacement information of the chair 1000 on which the user sits, angular acceleration of a tilting angle of return exceeding a predetermined threshold may be set as an ignition condition and the control unit 910 serving as the output control unit may perform video processing of performing selection of a cursor of a UI menu or instantaneous movement (content switching) to a free viewpoint video (or a VR video) at another viewpoint position (see FIG. 37). In addition, the control unit 910 performs audio processing of causing a sound effect of the SSF to be produced in accordance with the angular acceleration of a front or rear tilting angle causing the instantaneous movement (the content switching) of the viewpoint position of the free viewpoint video.

In addition, when an angle in a right or left direction is input as displacement information of the chair 1000 on which the user sits, the control unit 910 serving as the output control unit performs video processing of affixing right and left tilting angle changes of a motion parallax to a free viewpoint video during viewing at angles which are the same as and proportional to right and left tilting angles per unit time and causing the viewpoint position to be changed to the right and left (for example, causing an advancing direction of a moving device on which a camera capturing a free viewpoint video is mounted to be changed to the right and left) (see FIG. 22). In addition, the control unit 910 may control brightness of the video at angles which are the same as and proportional to the right and left tilting angles. In addition, the control unit 910 performs audio processing of estimating a position of the head of the user on the basis of the right or left tilting angle per unit time and controlling a change in the right or left tilting angle of the SSF in accordance with a viewpoint position of the video (an imaging position of a camera) toward the position of the head. Note that the control unit 910 may not continuously change the video processing or the audio processing in accordance with the angles in the right and left directions of the chair 1000, but may perform stepwise output control such that a first output is performed when the angles in the right and left directions reach a first value, and a second output different from the first output is performed when the angles in the right and left directions reach a second value greater than the first value.

In addition, when movement amounts in the front, rear, right, and left directions are input as displacement information of the chair 1000 on which the user sits, the control unit 910 serving as the output control unit performs video processing of affixing front, rear, right, left changes of a motion parallax to a free viewpoint video during viewing by movement amounts which are the same as and proportional to front, rear, right, and left movement amounts per unit time. In addition, the control unit 910 estimates a position of the head of the user on the basis of the front, rear, right, and left movement amounts per unit time and performs audio processing of controlling the front, rear, right, and left changes of the SSF in accordance with a viewpoint position of a video (an imaging position of a camera) toward the position of the head. In addition, when displacement information regarding movement in the front, rear, right, and left directions of the chair 1000 caused due to oscillation or vibration at the time of shaking of the chair 1000 by the user is input, the control unit 910 may perform output control corresponding to the shaking motion of the chair 1000 by the user.

Example 2

Next, an example in which displacement information is acquired from fitness equipment used by a user and interaction in accordance with a body motion of the user is realized will be described.

Figure 24:
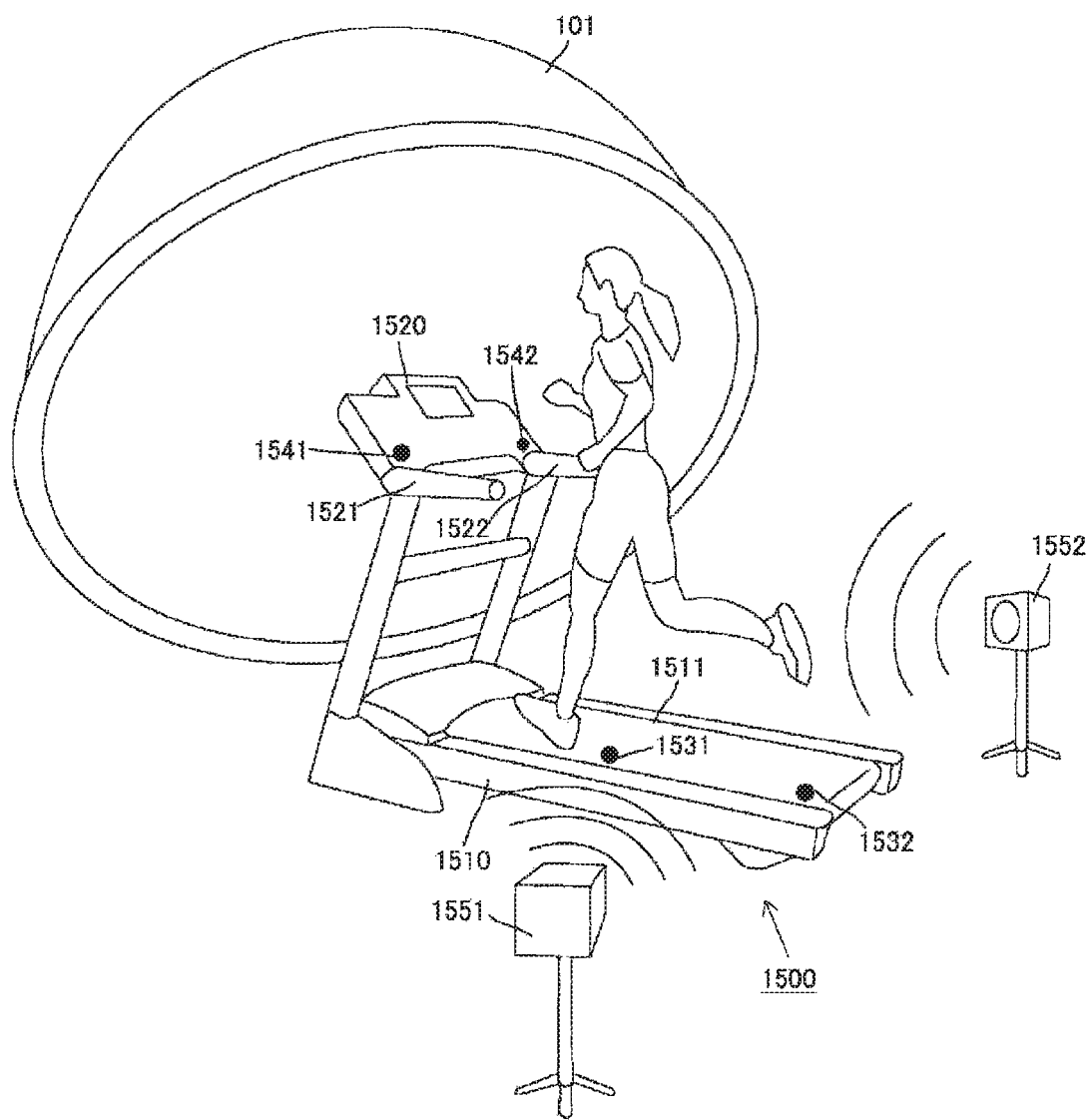
FIG. 24 is a diagram illustrating a treadmill 1500 as an example of the object that acquires displacement information in accordance with a body motion of a user.

FIG. 24 exemplifies a treadmill 1500 as an object from which displacement information in accordance with a body motion of the user is acquired. The illustrated treadmill 1500 includes a tread stand 1510 and a manipulation panel 1520. An endless belt 1511 is circularly moved on the upper surface of the tread stand 1510 and the user can run or walk on the endless belt 1511. The manipulation panel 1520 is disposed at a position which the user in a standing state on the endless belt 1511 faces. The user can adjust an inclination of the tread stand 1510 or a running speed of the endless belt 1511 through the manipulation panel 1520. In addition, exercise information such as a running distance, an average speed, a heart rate, and calorie consumption is displayed on the manipulation panel 1520. In addition, handrail frames 1521 and 1522 which the user can hold extend from both the right and left ends of the manipulation panel 1520 in a movement direction of the endless belt 1511.

The treadmill 1500 is installed below the dome screen 101, and thus the user can view a video projected to the dome screen 101, running or walking on the endless belt 1511. The user can also run or walk on the endless belt 1511, shifting from the center of gravity to one of the right and the left in some cases. In addition, the user holds his or her body on one or both of the handrail frames 1521 and 1522 on the right and left during running or walking on the endless belt 1511 in some cases.

A plurality of markers 1531, 1532, and the like are mounted on the endless belt 1511 of the treadmill 1500 in a circular movement direction. Any interval of the markers 1531, 1532, and the like may be used, but at least one marker 1531 is preferably exposed on the upper surface of the tread stand 1510 at any circular position of the endless belt 1511. In addition, the markers 1541 and 1542 are mounted on both the left and right ends of the manipulation panel 1520, respectively. Of course, three or more markers may be mounted on the manipulation panel 1520.

Each of the markers 1531, 1532, and the like and 1541 and 1542 is an element that emits visible light or invisible light such as infrared light or a visual marker formed as an existing figure pattern. In addition, cameras 1551 and 1552 are installed in the slanted rear side of the right and lefts of the treadmill 1500. When the displacement sensor 941 serving as the displacement information acquisition unit detects images of the markers 1531, 1532, and the like and 1541 and 1542 from images captured by the cameras 1551 and 1552, 3-dimensional position information of the markers 1531, 1532, and the like and 1541 and 1542 can be calculated on the basis of triangulation or the like.

When the endless belt 1511 moves circularly, the markers 1531, 1532, and the like mounted on the endless belt 1511 are moved straightly. Accordingly, the displacement sensor 941 serving as the displacement information acquisition unit can acquire a speed at which the user is running or walking on the endless belt 1511 on the basis of a movement amount per unit time of each of the markers 1531, 1532, and the like on the endless belt 1511. In other words, by installing the commercially available treadmill 1500 below the dome screen 101 and mounting the markers 1531, 1532, and the like on the endless belt 1511, the system 900 can acquire information regarding a running or walking speed of the user without being electrically connected to the treadmill 1500. Note that the treadmill 1500 has characteristics that the treadmill 1500 is mounted on a floor surface and relative movement to the floor is not substantially made even when the user performs a body motion. When X is defined as the right and left direction directions of the treadmill 1500, Y is defined as the upward and downward directions, and Z is defined as the front and rear directions (an advancing direction of the endless belt 1511), displacement information of translation of each of the markers 1531, 1532, and the like can be acquired under the constraint condition that the X direction is fixed. In addition, the Y direction is not fixed since, for example, a pace of the user can be detected in accordance with the displacement. The Z direction is not fixed since the endless belt 1511 is moving in that direction.

In addition, when user is running or walking on the endless belt 1511, shifting from the center of gravity to one of the right and the left or when the user holds his or her body on one or both of the handrail frames 1521 and 1522 on the right and left, the treadmill 1500 is inclined to one of the right and left. The right or left inclination indicates an intention of the user changing the advancing direction in a video to the right or left. When the displacement sensor 941 serving as the displacement information acquisition unit detects a right or left tilting angle of the manipulation panel 1520 or the body of the treadmill 1500 on the basis of 3-dimensional positional information of each of the markers 1541 and 1542 mounted on both the right and left ends of the manipulation panel 1520, the tilting angle can be input as information for intending a change in the right or left advancing direction to the control unit 910 serving as an output control unit. Alternatively, in a case where the right or left tilting angle is detected when the advancing direction of the video is fixed to a predetermined direction, the user may be considered to intend to finish training. Alternatively, by estimating that a running form is distracted on the basis of the detection of the right or left tilting angle and, feedback for correcting the form may be given to the user. Note that displacement information regarding rotation of each of the markers 1541 and 1542 can be acquired under the constraint condition that the rotation around the Y axis is fixed in consideration of the characteristics that the treadmill 1500 is mounted on a floor surface and relative movement to the floor is not substantially made even when the user performs a body motion. In addition, for example, front and rear positions of the user can be detected in accordance with rotational displacement around the X axis and are not fixed. For example, the right and left legs of the user can be detected in accordance with rotational displacement around the Z axis, and thus are not fixed.

Figure 25:
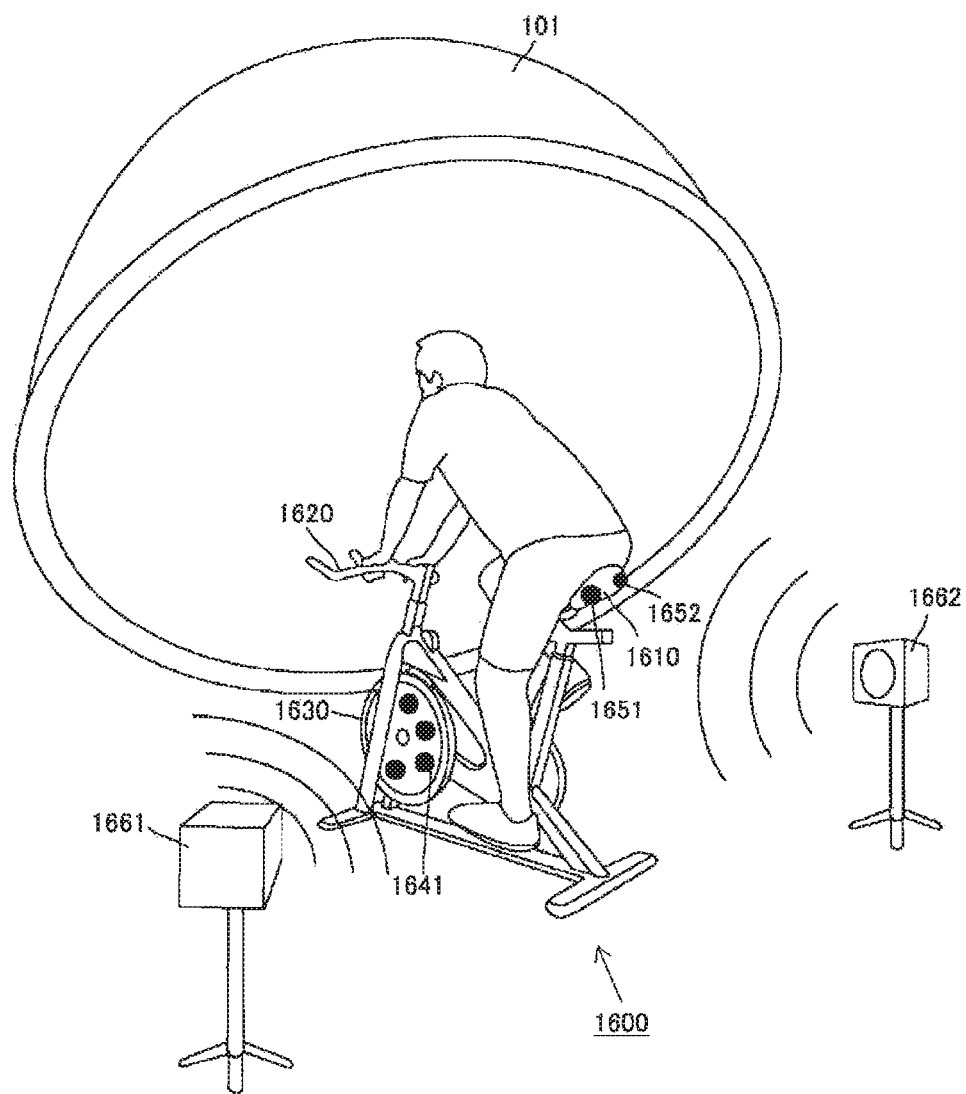
FIG. 25 is a diagram illustrating a fitness bike 1600 as an example of the object that acquires displacement information in accordance with a body motion of a user.

FIG. 25 exemplifies a fitness bike 1600 as an object from which displacement information in accordance with a body motion of the user is acquired. The illustrated fitness bike 1600 includes a saddle 1610, a handle 1620, and a front wheel 1630. The fitness bike 1600 is installed below the dome screen 101, and the user can view a video projected to the dome screen 101, running on the fitness bike 1600.

When the user sits astride the saddle 1610, the user takes a forward bending posture and holds the handle 1620 with both hands. In addition, the user is operating a pedal (not illustrated) astride the saddle 1610, but the front wheel 1630 is rotated in tandem with the rotation motion of the pedal (see FIG. 26). In addition, it is assumed that the user takes various postures, for example, the user is performing a stand-pedaling motion to raise a running speed of the fitness bike 1600 (see FIG. 27) or is performing a right or left tilting motion to take a cornering posture which forms a curve (see FIG. 28), or the like.

One or more markers 1641 are mounted on a side surface of the front wheel 1630 of the fitness bike 1600 in the rotational direction. Alternatively, although not illustrated, a marker may be mounted on at least one of the right or left pedal rather than the front wheel 1630. In addition, a pair of markers 1651 and 1652 is mounted on the right and left of the rear end edge of the saddle 1610. Alternatively, although not illustrated, a pair of markers may be mounted at right and left edges of the handle 1620 rather than the saddle 1610.

Each of the markers 1641, 1651, and 1652 is, for example, an element that emits visible light or invisible light such as infrared light and or a visual marker formed as an existing figure pattern. In addition, cameras 1661 and 1662 are installed on the slanted rear side of the right and left of the fitness bike 1600. When the displacement sensor 941 serving as the displacement information acquisition unit detects images of the markers 1641, 1651, and 1652 from images captured by the cameras 1661 and 1662, 3-dimensional positional information of the markers 1641, 1651, and 1652 can be calculated on the basis of triangulation or the like.

A correspondent relation between a method of detecting the markers 1641, 1651, and 1652 mounted on the fitness bike 1600 by the displacement sensor 941 and displacement information of the fitness bike 1600 input to the control unit 910 is exemplified in Table 3 below.

TABLE 3

| Detection method | Input content |
| --- | --- |
| Detecting number of rotations of wheel per unit time through 3-dimensional detection of markers | Rotational speed of wheel |
| Detecting upward or downward movement amount of saddle per unit time through 3-dimensional detection of markers | Upward and downward movement amounts |
| Detecting right or left tilting angle of saddle per unit time through 3-dimensional detection of markers | Right and left tilting angles |

Figure 26:
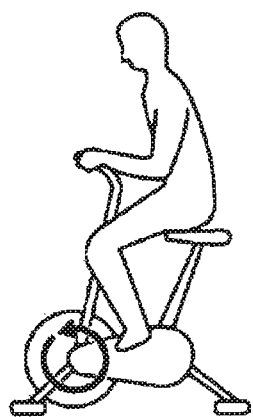
FIG. 26 is a diagram illustrating an aspect in which a user is operating a pedal of the fitness bike 1600 to rotate a front wheel.

When the user is pedaling to rotate the front wheel 1630, as illustrated in FIG. 26, the marker 1641 mounted on the side surface of the front wheel 1630 is also moved in the rotational direction. Accordingly, the displacement sensor 941 inputs a result detected by detecting 3-dimensional positional information of the marker 1641 mounted on the side surface of the front wheel 1630 and detecting the number of rotations of the front wheel 1630 per unit time as a rotational speed of the front wheel 1630 to the control unit 910. A running speed of the fitness bike 1600 can be converted from the rotational speed of the front wheel 1630. A running speed of the fitness bike 1600 can be acquired similarly even based on 3-dimensional positional information of the marker mounted on the pedal rather than the front wheel 1630. Note that the fitness bike 1600 has characteristics that the fitness bike 1600 is mounted on a floor surface and relative movement to the floor is not substantially made even when the user performs a body motion. When X is defined as the right and left directions of the fitness bike 1600, Y is defined as the upward and downward directions, and Z is defined as the front and rear directions, displacement information of each of the markers 1641, 1651, and 1652 can be acquired under the constraint condition that the X direction is fixed. In addition, the Y direction is not fixed since, for example, the weight of the user sitting on the saddle 1610 can be detected in accordance with the displacement. In addition, the Z direction is not fixed since the weight of the user is moved in the Z direction in accordance with a pedaling posture of the user and tilting angles in the front and rear directions of the body of the fitness bike 1600 are accordingly changed.

Figure 27:
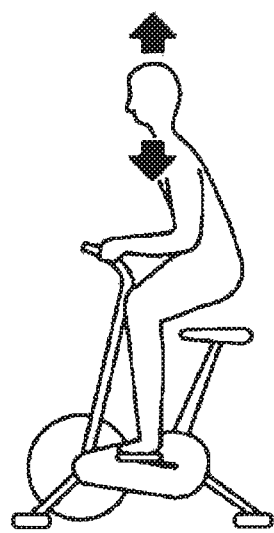
FIG. 27 is a diagram illustrating an aspect in which a user is performing a stand-pedaling motion on the fitness bike 1600.

In addition, when the user is performing a stand-pedaling motion to raise a running speed of the fitness bike 1600 or stops the stand-pedaling and the body of the user is moving upwards or downwards, as illustrated in FIG. 27, a weight applied to the saddle 1610 is changed, and thus the saddle is moved upwards or downwards. Accordingly, the displacement sensor 941 inputs a result obtained by detecting 3-dimensional positional information of at least one of the markers 1651 or 1652 mounted on the rear end edge of the saddle 1610 and detecting an upward or downward movement amount per unit time of the saddle 1610, as an upward or downward movement amount of the fitness bike 1600 produced with the stand-pedaling motion of the user to the control unit 910.

Figure 28:
FIG. 28 is a diagram illustrating an aspect in which a user is tilting to the right and left and pedaling on the fitness bike 1600.

In addition, when the user is tilting and pedaling to the right or left to take a cornering posture which forms a curve, as illustrated in FIG. 28, the saddle 1610 is also inclined to the right side or the left and right side. Accordingly, the displacement sensor 941 inputs a result obtained by detecting 3-dimensional positional information of at least one of the markers 1651 or 1652 mounted on the rear end edge of the saddle 1610 and detecting the right or left tilting angle per unit time of the saddle 1610, as a tilting angle caused in the cornering of the user to the control unit 910. Note that the displacement information is acquired without fixing the rotation of each of XYZ axes even in consideration of the characteristics that the fitness bike 1600 is mounted on a floor surface and relative movement to the floor is not substantially made even when the user performs a body motion. For example, the front or rear position at which the user sits on the saddle 1610 can be detected in accordance with the rotational displacement around the X axis of the body of the fitness bike 1600. In addition, rotation (twist) of the body of the user can be detected in accordance with the rotational displacement around the Y axis of the body of the fitness bike 1600. In addition, the right or left weight movement at the time of changing of the advancing direction of the user to the right or the left can be detected in accordance with the rotational displacement around the Z axis of the body of the fitness bike 1600.

Note that, although not described, even in a case where the user is running on the treadmill 1500, displacement information shown in Table 3 can be acquired on the basis of detection results of the sensors 1531, 1532, and the like mounted on the endless belt 1511 and the sensors 1541 and 1542 mounted on the manipulation panel 1520 and can be input to the control unit 910 serving as the output control unit.

Then, the control unit 910 serving as the output control unit realizes interaction in accordance with a body motion of the user using the fitness bike 1600 by controlling video processing or audio processing and an output of the multi-modal interface on the basis of the displacement information input from the displacement sensor 941.

A correspondent relation between displacement information of the fitness bike 1600 corresponding to a body motion of the user and output control performed by the control unit 910 is exemplified in Table 4 below. Here, Table 4 describes the output control related to mainly video processing and audio processing as the output control. In addition, even in a case where certain displacement information is input, it is assumed that a video is displayed on an entire celestial sphere display such as the dome display 101 and an audio sound is reproduced by a surround audio system. In addition, the multi-modal interface may be used to combine an effect of blowing wind in accordance with movement of a viewpoint position or a visual line direction. In addition, a parallax range of a video may be controlled on the basis of visual line information of the user detected by the head detection camera 942 or the like.

TABLE 4

| | Output control | |
| --- | --- | --- |
| Displacement information | Video processing | Audio processing |
| Rotational speed of wheel | Affixing change before and after motion parallax to free viewpoint video during viewing at speed which is same as and proportional to travel speed converted from rotational speed of wheel Causing viewpoint position of free viewpoint video during viewing to be changed to front, rear, right, or left | Controlling front and rear changes of SSF in accordance with viewpoint position of video toward position of head of user estimated from rotational speed of wheel |
| Upward and downward movement amounts | Affixing upward and downward changes of motion parallax to free viewpoint video during viewing at movement amount proportional to upward and downward movement amount per unit time | Controlling upward and downward changes of SSF in accordance with viewpoint position of video toward position of head of user estimated from upward and downward movement per unit time |
| Right and left tilting angles | Affixing right or left tilting angle change of motion parallax to free viewpoint video during viewing at angle which is same as proportional to right or left tilting angle per unit time | Controlling right or left tiling angle change of SSF in accordance with viewpoint position of video toward position of head of user estimated from right or left tilting angle per unit time |

For example, when a rotational speed of the front wheel 1630 is input as displacement information of the fitness bike 1600 used by the user, the control unit 910 serving as the output control unit performs video processing of affixing a change before and after a motion parallax to a free viewpoint video during viewing at a speed which is the same as and proportional to the running speed of the fitness bike 1600 converted from the rotational speed of the front wheel 1630. In addition, the control unit 910 performs video processing of causing a viewpoint position of a free viewpoint video during viewing to be changed to the front and rear or the right and left at the speed which is the same as and proportional to the converted running speed of the fitness bike 1600 (for example, causing an advancing direction of a moving device on which a camera capturing a free viewpoint video is mounted to be changed to the front and rear or the right and left) (see FIG. 22). In addition, the control unit 910 performs audio processing of estimating a position of the head of the user on the basis of the running speed of the fitness bike 1600 converted from the rotational speed of the front wheel 1630 and controlling a front, rear, right, or left change in the SSF in accordance with a viewpoint position of the video (an imaging position of a camera) toward the position of the head. Note that the control unit 910 may not continuously change the video processing or the audio processing in accordance with the rotational speed of the front wheel 1630, but may perform stepwise output control such that a first output is performed when the rotational speed of the front wheel 1630 reaches a first value, and a second output different from the first output is performed when the rotational speed of the front wheel 1630 reaches a second value greater than the first value.

In addition, when upward and downward movement amounts are input as displacement information of the fitness bike 1600 that is used by the user, the control unit 910 serving as the output control unit performs video processing of affixing upward and downward changes of a motion parallax to a free viewpoint video during viewing at movement amounts proportional to the upward and downward movement amounts per unit time. In addition, the control unit 910 estimates a position of the head of the user on the basis of an upward or downward movement amount per unit time and performs audio processing of controlling an upward or downward change of the SSF in accordance with a viewpoint position of a video (an imaging position of a camera) toward the position of the head. Note that the control unit 910 may not continuously change the video processing or the audio processing in accordance with the upward and downward movement amounts of the fitness bike 1600, but may perform stepwise output control such that a first output is performed when the upward and downward movement amounts reach a first value, and a second output different from the first output is performed when the upward and downward movement amounts reach a second value greater than the first value.

In addition, when a right or left tilting angle is input as displacement information of the fitness bike 1600 used by the user, the control unit 910 serving as the output control unit performs video processing of affixing a change in the right or left tilting angle of a motion parallax to a free viewpoint video during viewing at an angle which is the same as and proportional to the right or left tilting angle per unit time. In addition, the control unit 910 performs video processing of causing the advancing direction of the viewpoint position of a free viewpoint video during viewing to be changed to the right or left at an angle which is the same as and proportional to the right or left tilting angle per unit time (for example, causing an advancing direction of a moving device on which a camera capturing a free viewpoint video is mounted to be changed to the right or left) (see FIG. 22). In addition, the control unit 910 performs audio processing of estimating a position of the head of the user on the basis of the right or left tilting angle per unit time and controlling a change in the right or left tilting angle of the SSF in accordance with a viewpoint position of the video (an imaging position of a camera) toward the position of the head. Note that the control unit 910 may not continuously change the video processing or the audio processing in accordance with the right or left tilting angle of the fitness bike 1600, but may perform stepwise output control such that a first output is performed when the tilting angle reaches a first value, and a second output different from the first output is performed when the tilting angle reaches a second value greater than the first value.

Note that, although not described, even in a case where the user is running on the treadmill 1500, the control unit 910 serving as the output control unit can give the feedback similar to that shown in Table 4 to the user on the basis of a running or walking speed of the user on the treadmill 1500 or the displacement information such as an upward or downward movement amount, the right or left tilting angle, or the like of the treadmill 1500.

Example 3

The examples in which furniture such as a chair or fitness equipment is installed below the dome screen 101 basically on the assumption that a free viewpoint video is displayed on the dome display 100 illustrated in FIGS. 1 to 7 has been described above. However, a free viewpoint video or a VR video can be displayed using any of various devices such as a ceiling or a wall surface of a room or a wall surface of the interior of a passenger car. In addition, in accordance with a kind of display device, it is possible to realize interaction based on displacement information in accordance with a body motion of a user using any of various objects.

Figure 29:
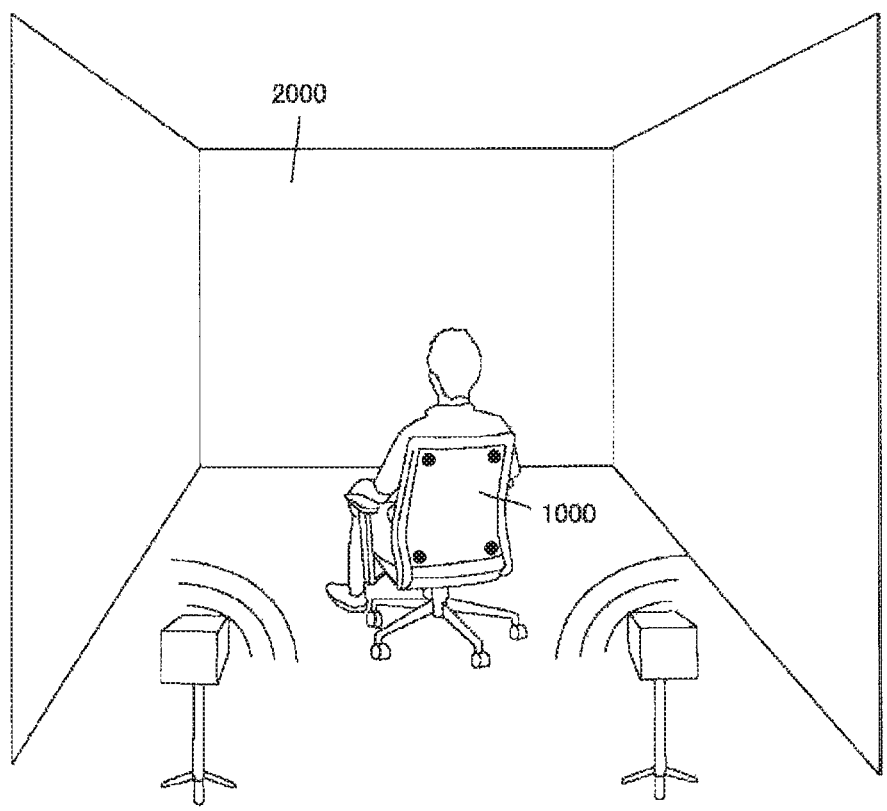
FIG. 29 is a diagram illustrating an aspect in which a user is viewing a video displayed on a ceiling or a wall surface of a room while sitting on a chair.

FIG. 29 illustrates an aspect in which a user is viewing a video displayed on a ceiling or a wall surface 2000 of a room, sitting on the chair 1000. According to a method similar to that described in Example 1, it is possible to detect 3-dimensional positional information of the marker mounted on the chair 1000 and acquire displacement information of the chair 1000 in accordance with a body motion of the user. In addition, video processing or audio processing similar to that of Example 1 may be performed in accordance with the acquired displacement information.

Figure 30:
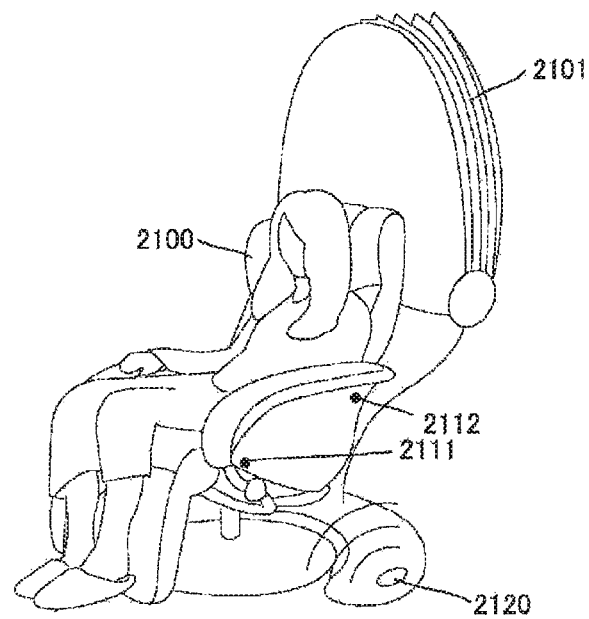
FIG. 30 is a diagram illustrating an aspect in which a user is sitting on a chair with a hood.
Figure 31:
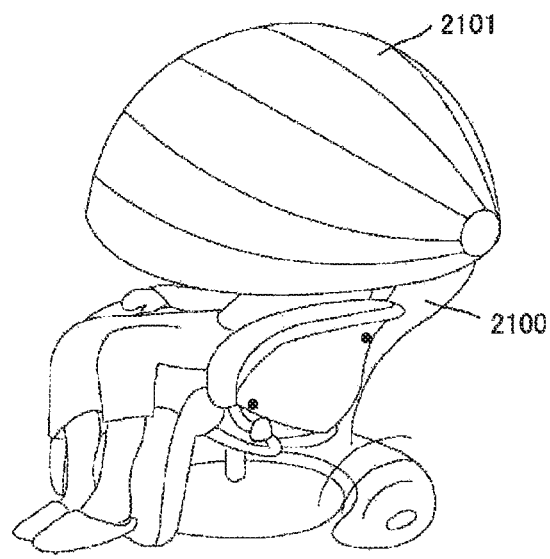
FIG. 31 is a diagram illustrating an aspect in which the user is sitting on the chair with the hood (a state in which the user is viewing a video with the hood enclosed).

FIGS. 30 and 31 illustrate an aspect in which a user sits on a chair 2100 with a hood 2101. An opening or closing manipulation can be performed on the hood 2101. As illustrated in FIG. 31, a free viewpoint video or a VR video can be projected using an inner wall surface of the enclosed hood 2101 as a screen. Accordingly, the user can sit on the chair 2100 and close the hood 2101 to view a video displayed on the inner wall surface of the hood 2101.

In addition, a plurality of markers 2111, 2112, and the like are mounted on an armrest 2102 of the chair 2100. Each of the markers 2111, 2112, and the like may be an element that emits visible light or invisible light such as infrared light or a visual marker formed as an existing figure pattern. A camera 2120 is installed to face the armrest 2102. When the displacement sensor 941 serving as the displacement information acquisition unit detects an image of each of the markers 2111, 2112, and the like from an image captured by the camera 2120, 3-dimensional positional information of each of the markers 2111, 2112, and the like can be calculated and displacement information of the chair 2100 can be acquired in accordance with a body motion of the user who is viewing the video.

In addition, although not illustrated, a marker can also be mounted on a seatback of the chair 2100, a camera imaging the marker is installed, and displacement information such as a tiling angle, tilting acceleration, or tilting angle acceleration in the front or rear direction of the chair 2100 in accordance with body motion of the user can be acquired.

Then, the control unit 910 serving as the output control unit realizes interaction in accordance with a body motion of the user sitting on the chair 2100 by controlling video processing or audio processing and an output of the multimodal interface on the basis of the displacement information of the chair 2100 input from the displacement sensor 941.

Figure 32:
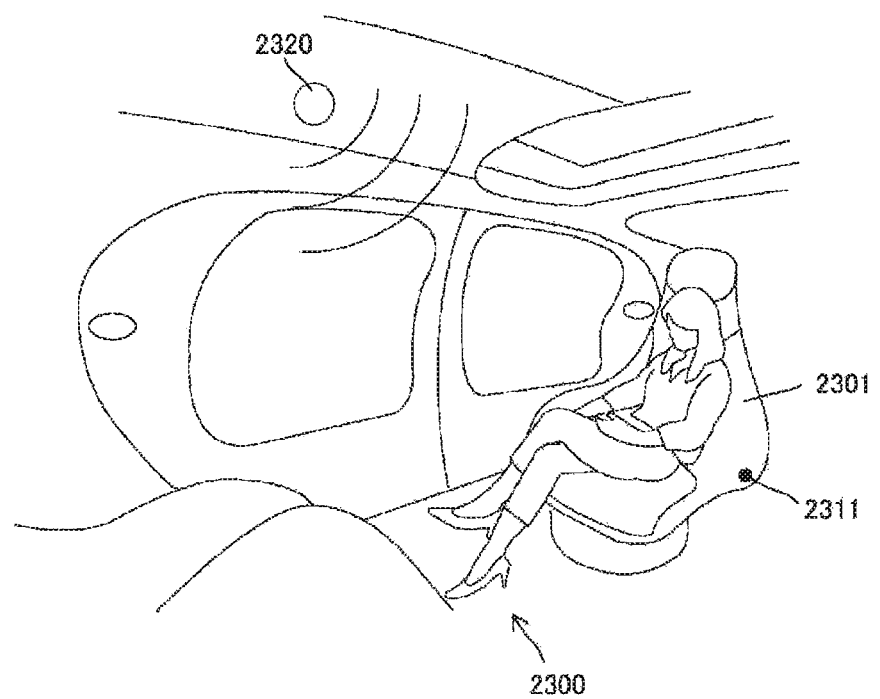
FIG. 32 is a diagram illustrating an aspect in which a user is sitting on a seat of a passenger car.

FIG. 32 illustrates an aspect in which the user sits on a seat 2301 in an interior 2300 of a passenger car. The passenger car is, for example, a vehicle corresponding to automatic driving and a free viewpoint video or a VR video can be projected using the wall surface of the interior 2300 as a screen, or it is assumed that a user gets in the interior 2300, carrying a display (not illustrated) that displays a video. The user can sit on the seat 2301 and view a displayed video.

In addition, a plurality of markers 2311 and the like are mounted on the seat 2301. Each of the markers 2311 and the like may be a light-emitting element that emits visible light or invisible light such as infrared light or a visual marker formed as an existing figure pattern. A camera 2320 is installed on a ceiling of the interior 2300. When the displacement sensor 941 serving as the displacement information acquisition unit detects an image of each of the markers 2311 and the like from an image captured by the camera 2120, 3-dimensional positional information of each of the markers 2311 can be calculated and displacement information of the seat 2301 in accordance with a body motion of the user who is viewing the video can be acquired.

Then, the control unit 910 serving as the output control unit realizes interaction in accordance with a body motion of the user sitting on the seat 2301 by controlling video processing or audio processing and an output of the multimodal interface on the basis of the displacement information of the seat 2301 input from the displacement sensor 941. The control unit 910 may perform video processing or audio processing similar to that of Example 1 in accordance with the acquired displacement information. Note that in a case where a plurality of users is in the interior 2300 of the passenger car, the control unit 910 serving as the output control unit may control an output of the video processing so that all the users are not shadowed or the faces of the users are illuminated with the video.

Example 4

Figure 33:
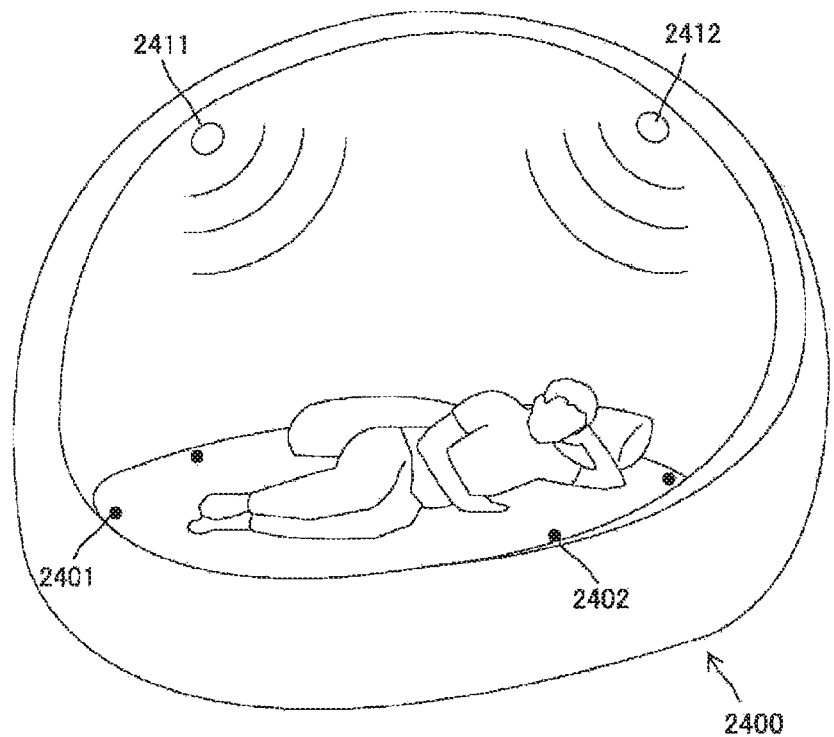
FIG. 33 is a diagram illustrating an aspect in which a user lies on a bed.
Figure 34:
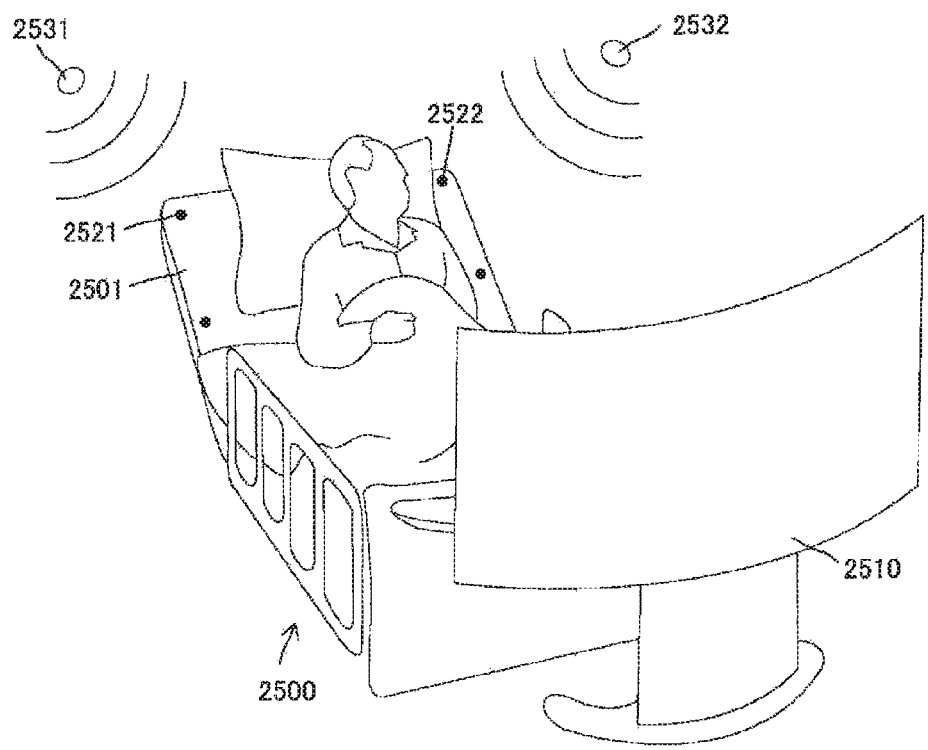
FIG. 34 is a diagram illustrating an aspect in which a user lies on a bed.

FIGS. 33 and 34 illustrate aspects in which a user lies on a bed 2400 or 2500. The user also lies on the bed or lies on the back to view a video in many cases. In the example illustrated in FIG. 33, the user who lies is assumed to view a video of a display (not illustrated). In addition, in the example illustrated in FIG. 34, the user lifts a reclining 2501 of the bed 2500 to view a video of a display 2510 installed in front of the bed 2500.

In addition, the user performs various body motions even on the bed. For example, the user performs a body motion, for example, the user turns over, lies and stretches himself or herself, adjusts the position or height of a pillow. When the user uses his or her elbow as a pillow or uses his or her arm, the user similarly performs a motion of adjusting the position or height of the pillow. In addition, as illustrated in FIG. 34, when the user uses the bed 2500 with the reclining 2501, the user performs a motion for a height adjustment manipulation of the reclining 2501.

The surface of the bed is moved upwards or downwards or moved to the front, rear, right, or left in accordance with the above-described body motion of the user on the bed. For example, a plurality of markers can be mounted on the surface of the bed and displacement information of the bed in accordance with a body motion of the user can be acquired on the basis of 3-dimensional positional information of each marker.

In the example illustrated in FIG. 33, a plurality of markers 2401, 2402, and the like are mounted on the surface of the bed 2400 and the surface of the bed 2400 is imaged by the two cameras 2411 and 2412 installed above the bed 2400. In addition, in the example illustrated in FIG. 34, a plurality of markers 2521, 2522, and the like are mounted on the reclining 2501 of the bed 2500 and the surface of the bed 2500 including the reclining 2501 is imaged by two cameras 2531 and 2532 installed above the bed 2500.

The markers 2401, 2402, and the like and the markers 2521, 2522, and the like may be light-emitting elements that emit visible light or invisible light such as infrared light or visual markers formed as an existing figure pattern. When the displacement sensor 941 serving as the displacement information acquisition unit detects an image of each of the markers 2401, 2402, and the like from images captured by the cameras 2411 and 2412, 3-dimensional positional information of each of the markers 2401, 2402, and the like can be calculated and the displacement information of the bed 2400 in accordance with a body motion of the user who is viewing a video can be acquired. Similarly, when the displacement sensor 941 detects an image of each of the markers 2521, 2522, and the like from images captured by the cameras 2531 and 2532, 3-dimensional positional information of each of the markers 2521, 2522, and the like can be calculated and the displacement information of the bed 2500 in accordance with a body motion of the user who is viewing a video can be acquired.

A correspondent relation between a method of detecting the markers mounted on the bed by the displacement sensor 941 and displacement information of the bed input to the control unit 910 is exemplified in Table 5 below.

TABLE 5

| Detection method | Input content |
| --- | --- |
| Detecting upward and downward movement amounts of surface of bed per unit time through 3-dimensional detection of markers | Upward and downward movement amounts |
| Detecting front, rear, right, and left movement amount of surface of bed per unit through 3-dimensional detection of markers | Front and rear or right and left movement amounts |

When the user performs a body motion in the upward and downward directions, for example, the user performs a reclining adjustment at the time of lying on a bed, stretching his or her legs, and leaning against a bed board over a pillow, adjusts the height of a pillow on the bed (including using of his or her elbow as a pillow or using of his or her arm), or taps the surface of the bed (see FIG. 35), the surface of the bed is moved in the upward and downward directions (including oscillation or vibration). Accordingly, the displacement sensor 941 inputs a result obtained by detecting 3-dimensional positional information of the markers mounted on the surface of the bend and detecting upward and downward movement amounts of the surface of the bed per unit time to the control unit 910.

In addition, when the user performs a body motion of turning over right and left at the time of lying on a bed, stretching his or her legs, and leaning against a bed board over a pillow (see FIG. 36), the surface of the bed is moved in the front and rear or right and left directions. Accordingly, the displacement sensor 941 inputs a result obtained by detecting 3-dimensional positional information of the markers mounted on the surface of the bend and detecting front and rear or right and left movement amounts of the surface of the bed per unit time to the control unit 910.

Then, the control unit 910 serving as the output control unit realizes interaction in accordance with a body motion of the user lying on the bed 2400 by controlling video processing or audio processing and an output of the multi-modal interface on the basis of the displacement information of the bed 2400 input from the displacement sensor 941.

A correspondent relation between displacement information of the bed corresponding to a body motion of the user and output control performed by the control unit 910 is exemplified in Table 6 below. Here, Table 6 describes the output control related to mainly video processing and audio processing as the output control. In addition, even in a case where certain displacement information is input, it is assumed that a video is displayed on an entire celestial sphere display such as the dome display 101 and an audio sound is reproduced by a surround audio system. In addition, the multi-modal interface may be used to combine an effect of blowing wind in accordance with movement of a viewpoint position or a visual line direction. In addition, a parallax range of a video may be controlled on the basis of visual line information of the user detected by the head detection camera 942 or the like.

TABLE 6

| | Output control | |
|---|---|---|
| Displacement information | Video processing | Audio processing |
| Upward and downward movement amounts | Affixing upward and downward changes of motion parallax to free viewpoint video during viewing at movement amounts proportional to upward and downward movement amounts per unit time Setting upward and downward movement acceleration exceeding threshold as ignition condition and causing selection of cursor of UI menu and instantaneous movement of viewpoint position of free viewpoint video | Controlling upward and downward changes of SSF combined with viewpoint position of video toward position and front direction of head of user estimated from front, rear, right, and left movement amounts combined with upward and downward movement amounts per unit time |
| Front and rear or right and left movement amounts | Estimating position and front direction of head of user from front, rear, right, and left movement amounts combined with upward and downward movement amounts per unit time and controlling position and angle changes of motion parallax to free viewpoint video during viewing by same movement amount and movement angle and proportional movement amount and movement angle Causing right and left advancing direction of viewpoint position of free viewpoint video to be changed and performing movement of cursor of UI menu and movement of display position of content and UI menu | Controlling position and angle changes of SSF combined with viewpoint position of video toward position and front direction of head of user estimated from front, rear, right, and left movement amounts combined with upward and downward movement amounts per unit time |

When the upward and downward movement amounts are input as the displacement information of the bed on which the user lies, the control unit 910 serving as the output control unit performs video processing of affixing upward and downward changes of a motion parallax to a free viewpoint video during viewing by movement amounts proportional to the upward and downward movement amounts per unit time (see FIG. 22). In addition, the control unit 910 serving as the output control unit may perform video processing of setting upward and downward movement acceleration exceeding a predetermined threshold at the time of tapping the surface by the user using a spring property of the bed as an ignition condition and performing selection of a cursor of a UI menu or instantaneous movement (content switching) to a free viewpoint video (or a VR video) at another viewpoint position (see FIG. 37). In addition, the control unit 910 performs audio processing of estimating a position and a front direction of the head of the user on the basis of the front, rear, right, and left movement amounts combined with the upward and downward movement amounts per unit time and controlling upward and downward changes of the SSF in accordance with a viewpoint position of the video (an imaging position of a camera) toward the position of the head. Note that the control unit 910 may not continuously change the video processing or the audio processing in accordance with the upward and downward movement amounts of the bed, but may perform stepwise output control such that a first output is performed when the upward and downward movement amounts reach a first value, and a second output different from the first output is performed when the upward and downward movement amounts reach a second value greater than the first value. In addition, when displacement information regarding the upward and downward movement caused due to the tapping of the user on the bed is input, the control unit 910 may perform output control corresponding to a motion of tapping the bed by the user.

In addition, when front, rear, right, and left movement amounts are input as displacement information of the bed on which the user lies, the control unit 910 serving as the output control unit performs video processing of estimating a position and a front direction of the head of the user from the front, rear, right, and left movement amounts combined with the upward and downward movement amounts per unit time and affixing position and angle changes of a motion parallax to a free viewpoint video during viewing at the same movement amount and movement angle and proportional movement amount and movement angle (see FIG. 22). In addition, the control unit 910 serving as the output control unit may perform video processing of estimating a position and a front direction of the head of the user from the front, rear, right, and left movement amounts combined with the upward and downward movement amounts per unit time, causing the right and left advancing direction of the viewpoint position of a free viewpoint video during viewing to be changed at the same movement amount and movement angle and proportional movement amount and movement angle, and performing movement of a cursor of the UI menu or movement of a display position of the UI menu and content (see FIG. 37). In addition, the control unit 910 may control a direction of the video on the basis of the input displacement information to face the direction of the head when the user lies down or turns over right and left on the bed. In addition, the control unit 910 performs audio processing of estimating a position and a front direction of the head of the user on the basis of the front, rear, right, and left movement amounts combined with the upward and downward movement amounts per unit time and controlling position and angle changes of the SSF in accordance with a viewpoint position of the video (an imaging position of a camera) toward the position of the head. Note that the control unit 910 may not continuously change the video processing or the audio processing in accordance with the front, rear, right, and left movement amounts of the bed, but may perform stepwise output control such that a first output is performed when the front, rear, right, and left movement amounts reach a first value, and a second output different from the first output is performed when the front, rear, right, and left movement amounts reach a second value greater than the first value.

Similarly to the chair, the bed can be said to be furniture from which displacement information in accordance with a body motion of the user can be acquired as in the chair. The bed can also be important furniture which a user uses for a long time equal or greater than a chair and to which the technology disclosed in the present specification can be applied. Further, the technology disclosed in the present specification can also be developed in a hospital, a rehabilitation facility, or the like in which a bed is used.

Example 5

Figure 38:
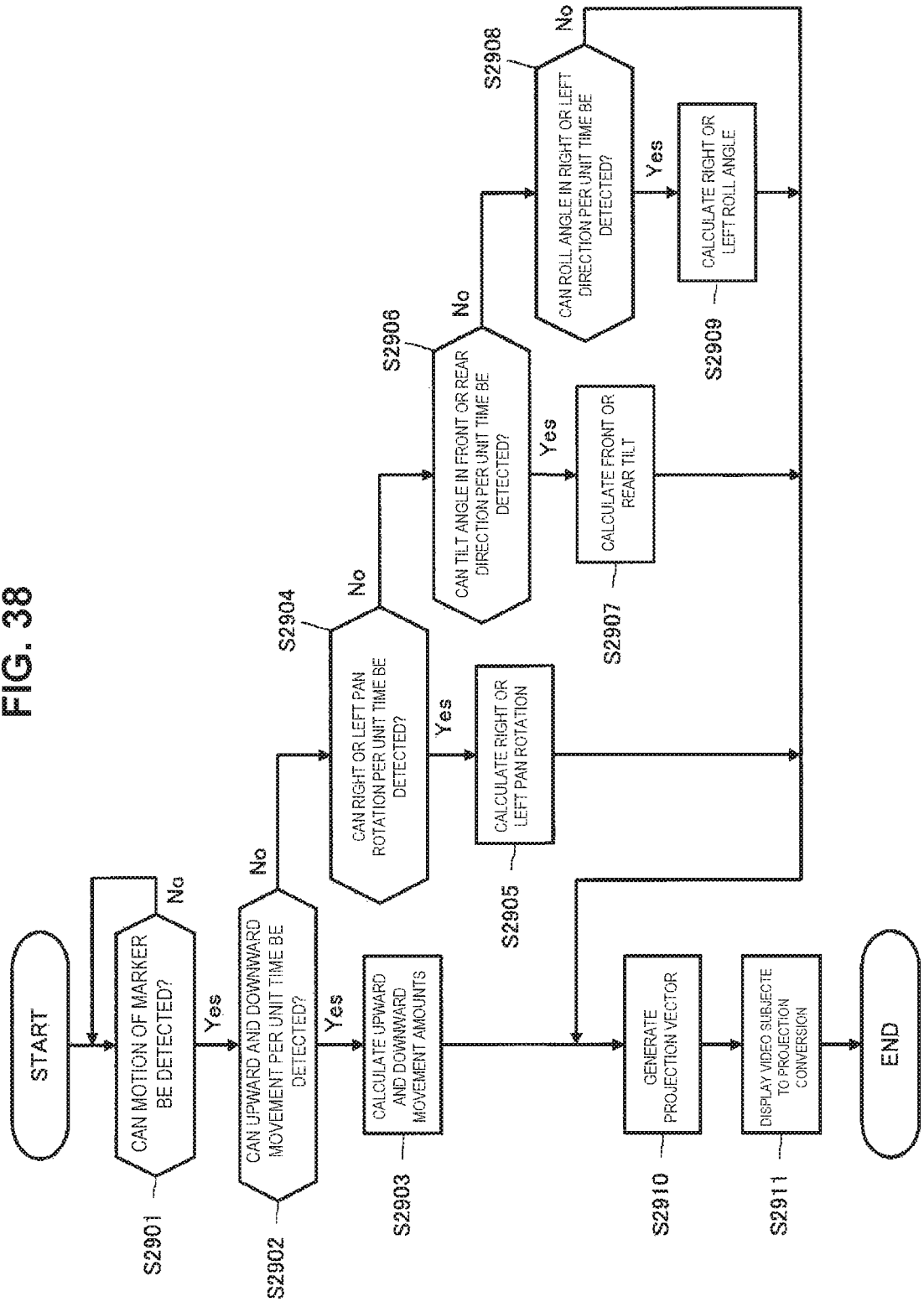
FIG. 38 is a flowchart illustrating a process procedure of controlling interaction with a user on the basis of displacement information of the object in accordance with a body motion of the user.

FIG. 38 illustrates a process procedure for controlling interaction with a user on the basis of displacement information of an object in accordance with a body motion of the user in the system 900 in the form of a flowchart. Here, to facilitate the description, a process procedure limited to interaction related to a video is illustrated.

When the displacement sensor 941 serving as the displacement information acquisition unit can detect a motion of a marker from an object used by the user (Yes in step S2901), the displacement sensor 941 attempts to detect upward or downward movement per unit time of the marker (step S2902). Then, when the upward and downward movements of the marker can be detected (Yes in step S2902) and the displacement sensor 941 calculates displacement information such as a movement amount, a movement speed, or movement acceleration related to the upward and downward movements of the marker (step S2903), the displacement information is output as displacement information of the object in accordance with a body motion of the user to the control unit 910 serving as the output control unit.

Conversely, when the displacement sensor 941 may not detect the upward and downward movement of the marker (No in step S2902), the displacement sensor 941 attempts to detect right or left pan rotation of the marker per unit time (step S2904). Then, when the right or left pan rotation of the marker per unit time can be detected (Yes in step S2904) and the displacement sensor 941 calculates displacement information such as a rotational angle, rotational angular velocity, or rotational angle acceleration related to the right or left pan rotation of the marker (step S2905), the displacement information is output as displacement information of the object in accordance with a body motion of the user to the control unit 910 serving as the output control unit.

In addition, when the displacement sensor 941 may not detect the right or left pan rotation of the marker (No in step S2904), the displacement sensor 941 continuously attempts to detect a tilt angle of the marker in the front or rear direction per unit time (step S2906). Then, when the displacement sensor 941 can detect the tilt angle of the marker in the front or rear direction (Yes in step S2906) and the displacement sensor 941 calculates displacement information regarding the tilt angle of the marker in the front or rear direction, such as a rotational angle, a rotational angular velocity, or rotational angle acceleration (step S2907), the displacement sensor 941 outputs the displacement information as displacement information of the object in accordance with the body motion of the user to the control unit 910 serving as the output control unit.

Conversely, when the displacement sensor 941 may not detect the tilt angle of the marker in the front or rear direction (No in step S2906), the displacement sensor 941 further attempts to detect a roll angle of the marker in the right or left direction per unit time (step S2908). Then, when the displacement sensor 941 can detect the roll of the marker in the right or left direction (Yes in step S2908) and the displacement sensor 941 calculates displacement information regarding the roll of the marker in the right or left direction, such as a rotational angle, a rotational angular velocity, or rotational angle acceleration (step S2909), the displacement sensor 941 inputs the displacement information as displacement information of the object in accordance with the body motion of the user to the control unit 910 serving as the output control unit.

When the position of the head of the user using the object is estimated on the basis of the displacement information of the object input from the displacement sensor 941, the control unit 910 serving as the output control unit generates a projection vector for converting a free viewpoint video which the user is viewing into a video seen from the position of the head (step S2910) and displays the video converted with the projection vector (projects the video from the projectors) (step S2911).

In addition, the control unit 910 may estimate the position of the head of the user on the basis of the displacement information of the object in parallel with the processes of steps S2910 and S2911, and can control a change in the SSF in accordance with a viewpoint position of the video or control an output of the multi-modal interface on the basis of the displacement information of the object.

Depending on a kind of object, a kind of displacement information of the object to be acquired from a motion of the marker (in other words, displacement information used to control a feedback output to the user) differs. For example, when the object is a chair, it is necessary to mainly acquire displacement information regarding front, rear, upward, downward, right, or left movement of the seatback or front or rear tilting angle. When the object is fitness equipment such as a fitness bike or a treadmill, it is necessary to mainly acquire a running direction, a speed, acceleration, or displacement information regarding the running direction. When the object is a bed, it is necessary to acquire displacement information regarding the upward and downward directions and plane directions of the front, rear, right, and left sides of the bed.

Accordingly, when a kind of object is specified, the displacement sensor 941 serving as the displacement information acquisition unit may calculate displacement information in accordance with the specified kind of object from information of a 3-dimensional position of each marker (that is, a motion of the marker) detected from the object and input the displacement information to the control unit 910 serving as the output control unit.

In the system 900, as a method of specifying a kind of object, a method of automatically determining a kind of object on the basis of a motion of a marker mounted on the object, a method of using a marker unique to a kind of object, or the like can be exemplified. Of course, an operator of the system 900 or the user using an object may manually input a kind of object to the system 900. In addition, a kind of object may be specified from image data of object using machine learning or deep learning without using a marker.

Figure 39:
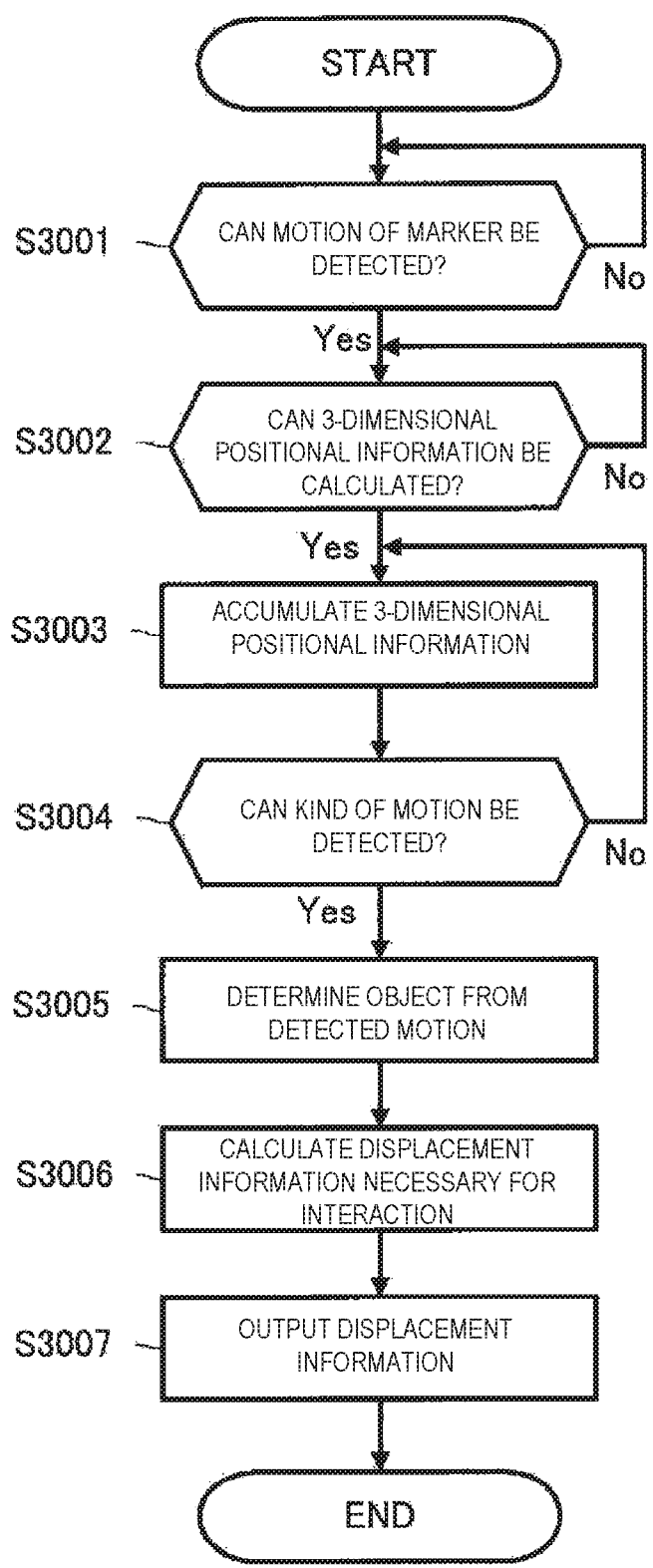
FIG. 39 is a flowchart illustrating a process procedure of automatically determining a kind of object on the basis of a movement of a marker and acquiring displacement information.

FIG. 39 illustrates a process procedure in which the displacement sensor 941 serving as the displacement information acquisition unit automatically determines a kind of object on the basis of a motion of the marker and acquires displacement information in the form of the flowchart.

When the displacement sensor 941 can detect a motion of the marker from an image captured by a camera imaging the object (Yes in step S3001), the displacement sensor 941 attempts to calculate 3-dimensional positional information of each marker (step S3002). Then, the calculated 3-dimensional positional information of the marker is accumulated (step S3003).

Subsequently, the displacement sensor 941 attempts to detect a kind of motion of the marker from the accumulated 3-dimensional positional information (step S3004). Then, when the displacement sensor 941 can detect the kind of motion of the marker (Yes in step S3004), the displacement sensor 941 determines the kind of object on the basis of the detected motion (step S3005).

For example, when the object is a chair, a motion of the marker equivalent to front, rear, upward, downward, right, or left movement or a front or left tilting angle of the seatback can be mainly detected. In addition, when the object is a fitness bike, a motion of the marker equivalent to rotation of a front wheel or a pedal or a right or left tilting angle of the saddle or the handle can be detected. In addition, when the object is a treadmill, a motion of the marker equivalent to movement of the endless belt in the front or rear direction or a front, rear, right, or left tilting angle of the manipulation panel or the tread stand can be detected. In addition, when the object is a bed, a motion of the marker equivalent to an upward or downward direction of the bed or a plane direction of the front, rear, right, or left of the bed can be detected. In step S3005, the displacement sensor 941 determines whether the motion of the marker detected in step S3004 is equivalent or analogous to a certain motion of a certain object. For example, machine learning may be introduced to the determination process to improve determination precision.

Subsequently, in a case where the object determined in step S3005 is used, the displacement sensor 941 calculates displacement information necessary to perform output control in accordance with a body motion of the user (that is, interaction with the user who does not wear anything) on the basis of the 3-dimensional positional information accumulated in step S3003 (step S3006).

For example, when the object is a chair, the displacement sensor 941 calculates displacement information regarding front, rear, upward, downward, right, or left movement or front or rear tilting angle of the seatback. In addition, when the object is a fitness bike, the displacement sensor 941 calculates displacement information regarding a rotation speed of a front wheel or a pedal or a right or left tilting angle of the saddle or the handle. In addition, when the object is a treadmill, the displacement sensor 941 calculates displacement information regarding a movement speed of the endless belt in the front or rear direction or a front, rear, right, or left tilting angle of the manipulation panel or the tread stand. In addition, when the object is a bed, the displacement sensor 941 calculates displacement information regarding a plane direction of the upward, downward, front, rear, right, or left of the bed.

Then, the displacement sensor 941 inputs the displacement information calculated in accordance with the kind of object to the control unit 910 serving as the output control unit (step S3007).

Figure 40:
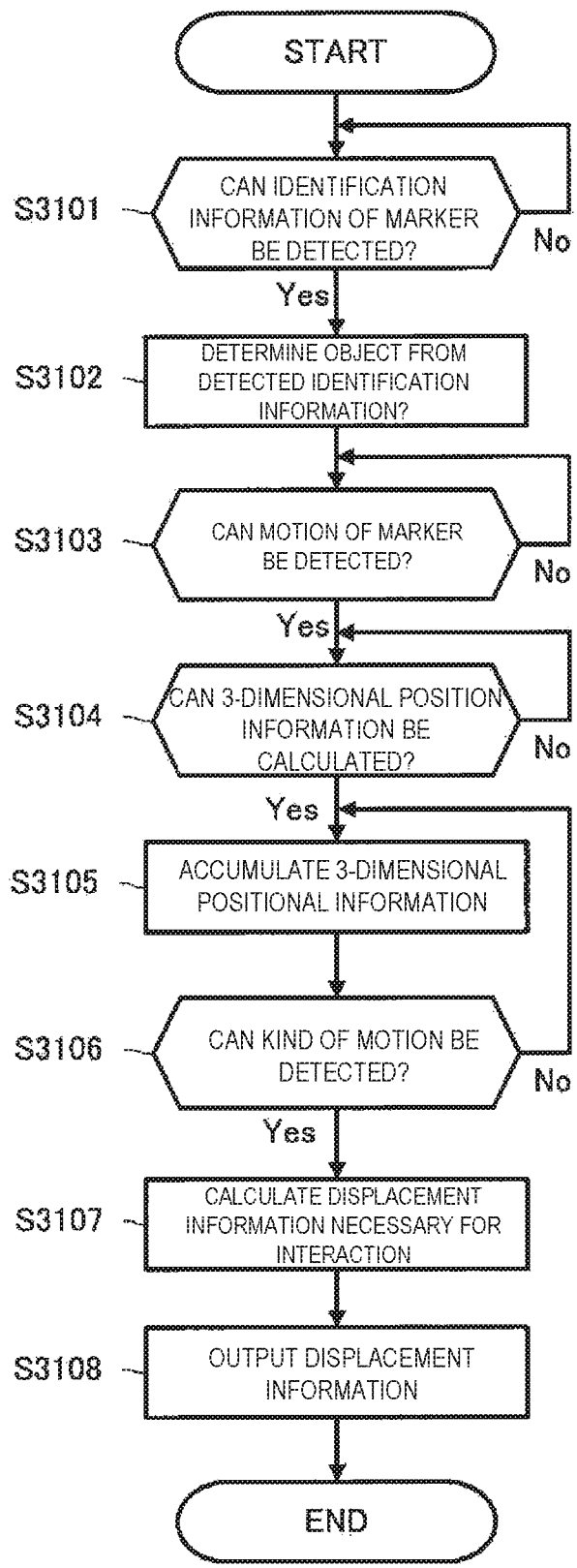
FIG. 40 is a flowchart illustrating a process procedure of automatically determining a kind of object on the basis of a proper marker and acquiring displacement information.

In addition, FIG. 40 illustrates a process procedure in which the displacement sensor 941 serving as the displacement information acquisition unit automatically determines a kind of object on the basis of the proper marker and acquires displacement information in the form of the flowchart.

The proper marker is, for example, an element that emits visible light or invisible light in a blink pattern indicating identification information of an object or a visual marker formed in a figure pattern indicating the identification information of the object.

When the displacement sensor 941 can detect the identification information of the object from the marker included in an image captured by the camera (Yes in step S3101), the displacement sensor 941 specifies the kind of object on the basis of the detected identification information (step S3102).

Then, when the displacement sensor 941 can detect a motion of the marker from an image captured by a camera imaging the object (Yes in step S3103), the displacement sensor 941 attempts to calculate 3-dimensional positional information of each marker (step S3104). Then, the calculated 3-dimensional positional information of the marker is accumulated (step S3105).

Subsequently, the displacement sensor 941 attempts to detect a kind of motion of the marker corresponding to the object specified in step S3102 from the accumulated 3-dimensional positional information (step S3106).

For example, when the object is a chair, a motion of the marker equivalent to front, rear, upward, downward, right, or left movement or a front or left tilting angle of the seatback can be mainly detected. In addition, when the object is a fitness bike, a motion of the marker equivalent to rotation of a front wheel or a pedal or a right or left tilting angle of the saddle or the handle can be detected. In addition, when the object is a treadmill, a motion of the marker equivalent to movement of the endless belt in the front or rear direction or a front, rear, right, or left tilting angle of the manipulation panel or the tread stand can be detected. In addition, when the object is a bed, a motion of the marker equivalent to an upward or downward direction of the bed or a plane direction of the front, rear, right, or left of the bed can be detected.

Then, when the displacement sensor 941 can detect the kind of motion of the marker corresponding to the object (Yes in step S3106), the displacement sensor 941 calculates displacement information necessary to perform output control in accordance with a body motion of the user (that is, interaction with the user who does not wear anything) on the basis of the 3-dimensional positional information accumulated in step S3105 (step S3107).

For example, when the object is a chair, the displacement sensor 941 calculates displacement information regarding front, rear, upward, downward, right, or left movement or front or rear tilting angle of the seatback. In addition, when the object is a fitness bike, the displacement sensor 941 calculates displacement information regarding a rotation speed of a front wheel or a pedal or a right or left tilting angle of the saddle or the handle. In addition, when the object is a treadmill, the displacement sensor 941 calculates displacement information regarding a movement speed of the endless belt in the front or rear direction or a front, rear, right, or left tilting angle of the manipulation panel or the tread stand. In addition, when the object is a bed, the displacement sensor 941 calculates displacement information regarding a plane direction of the upward, downward, front, rear, right, or left of the bed.

Then, the displacement sensor 941 inputs the displacement information calculated in accordance with the kind of object to the control unit 910 serving as the output control unit (step S3108).

Example 6

Figure 41:
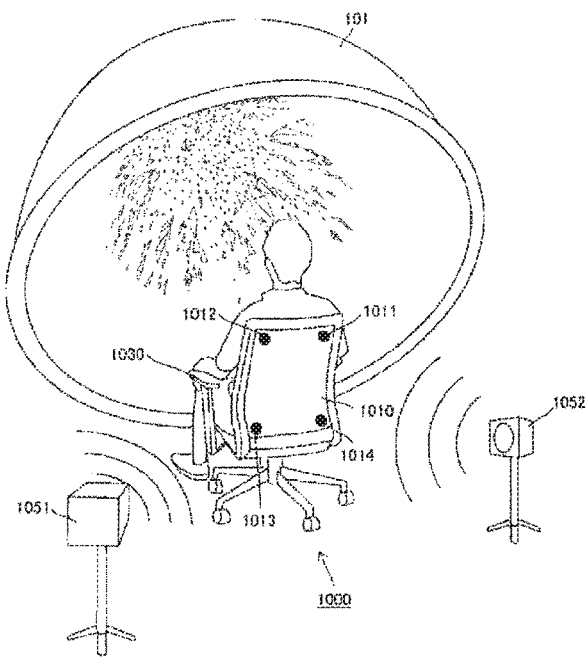
FIG. 41 is a diagram illustrating a configuration example of an example in which a visualizer function of causing a video to be displayed is included in accordance with an audio signal.
Figure 42:
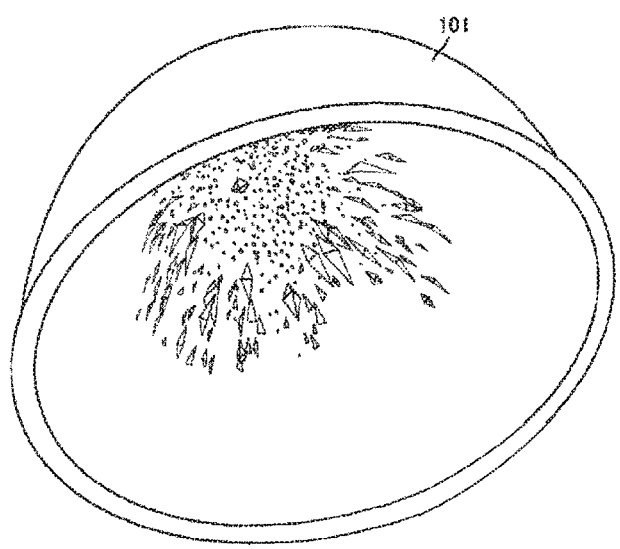
FIG. 42 is a diagram illustrating only a dome screen 101 in the configuration illustrated in FIG. 41.
Figure 43:
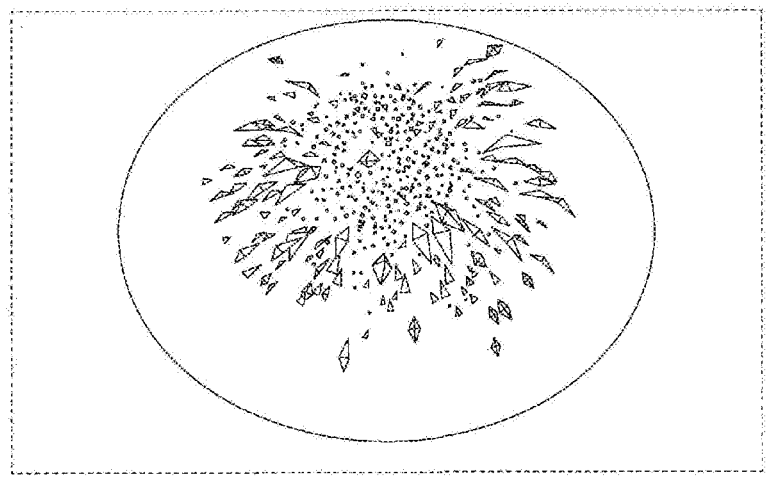
FIG. 43 is a diagram illustrating a viewing field of a user illustrated in FIG. 41 at a viewpoint substantially facing the dome screen 101.
Figure 44:
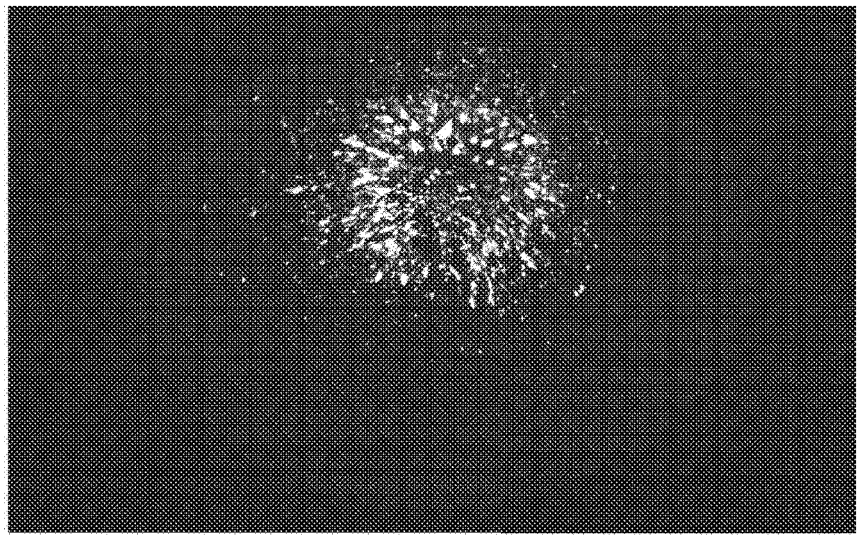
FIG. 44 is a diagram illustrating an example of a change in an effect image displayed on the dome screen 101.
Figure 45:
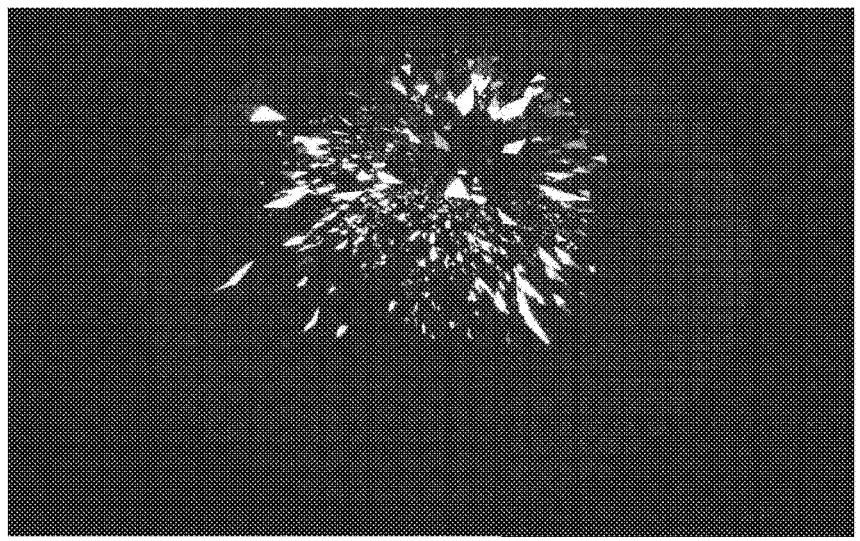
FIG. 45 is a diagram illustrating an example of a change in an effect image displayed on the dome screen 101.
Figure 46:
FIG. 46 is a diagram illustrating an example of a change in an effect image displayed on the dome screen 101.
Figure 47:
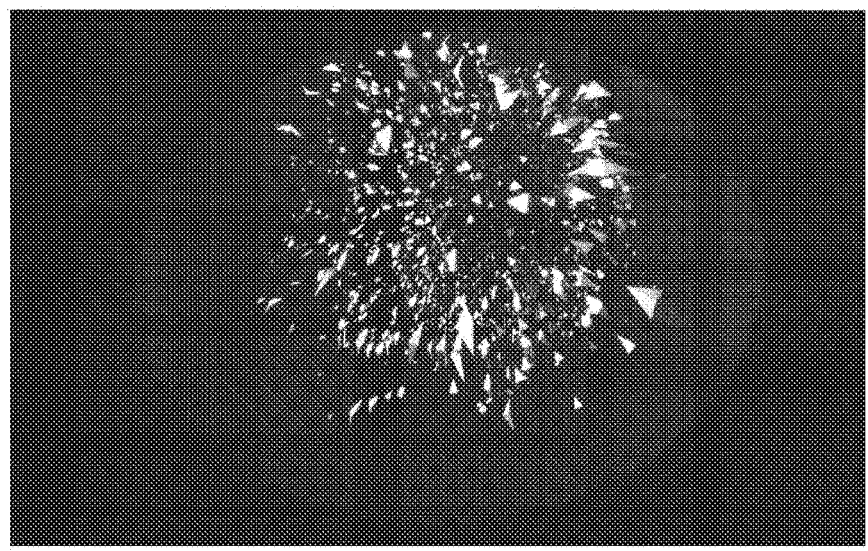
FIG. 47 is a diagram illustrating an example of a change in an effect image displayed on the dome screen 101.
Figure 48:
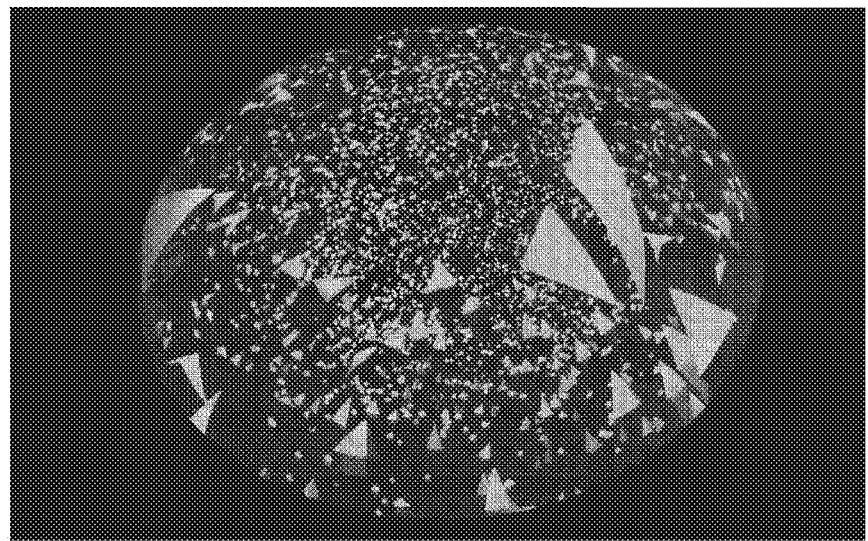
FIG. 48 is a diagram illustrating an example of a change in an effect image displayed on the dome screen 101.
Figure 49:
FIG. 49 is a diagram illustrating an example of a change in an effect image displayed on the dome screen 101.
Figure 50:
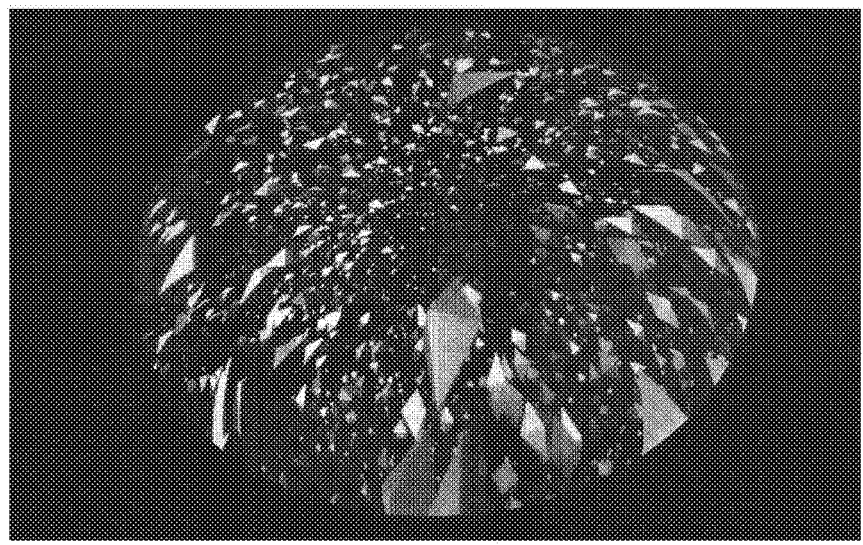
FIG. 50 is a diagram illustrating an example of a change in an effect image displayed on the dome screen 101.
Figure 51:
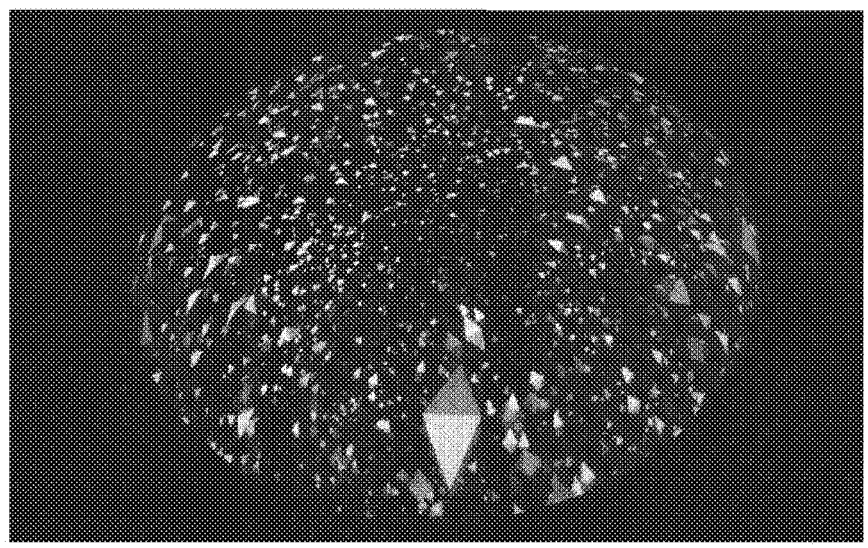
FIG. 51 is a diagram illustrating an example of a change in an effect image displayed on the dome screen 101.
Figure 52:
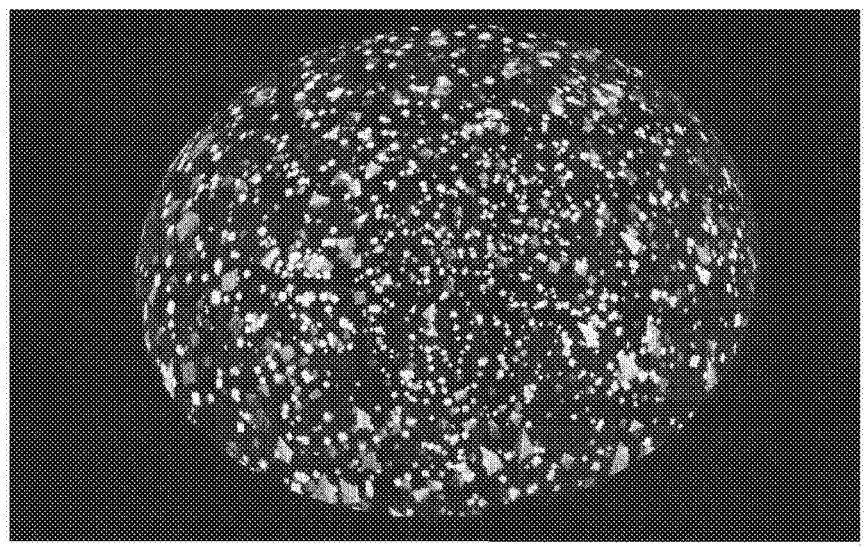
FIG. 52 is a diagram illustrating an example of a change in an effect image displayed on the dome screen 101.
Figure 53:
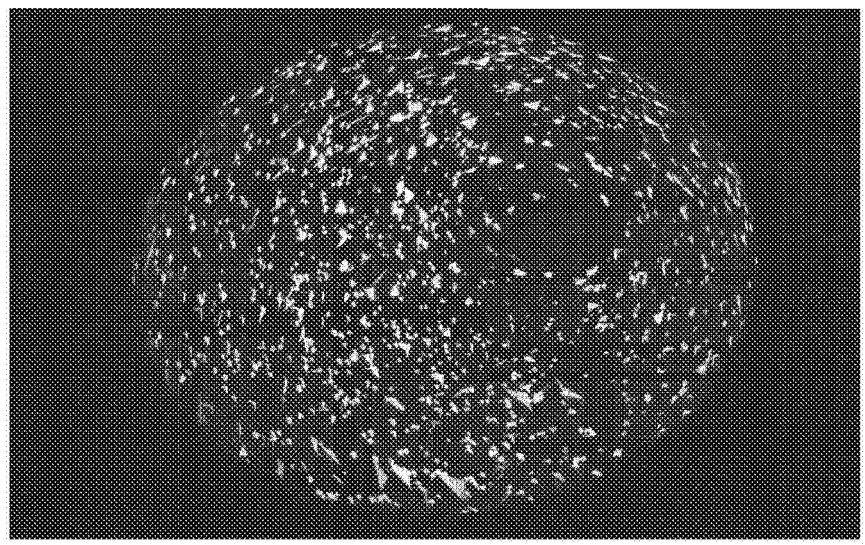
FIG. 53 is a diagram illustrating an example of a change in an effect image displayed on the dome screen 101.
Figure 54:
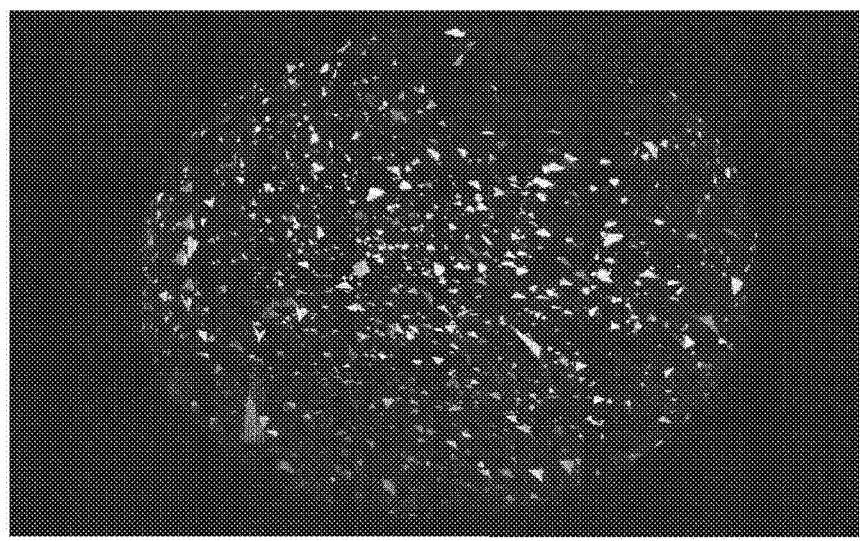
FIG. 54 is a diagram illustrating an example of a change in an effect image displayed on the dome screen 101.
Figure 55:
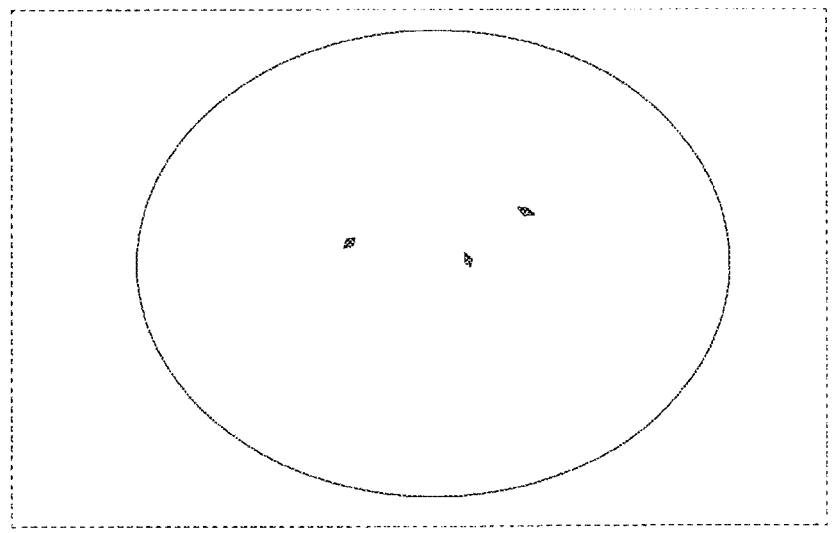
FIG. 55 is a diagram illustrating only some of the particles included in the effect image.
Figure 56:
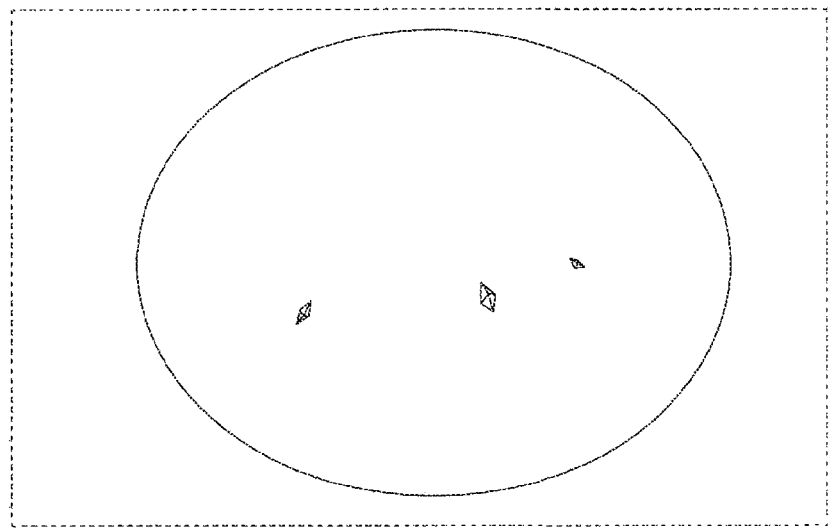
FIG. 56 is a diagram illustrating only some of the particles included in the effect image.
Figure 57:
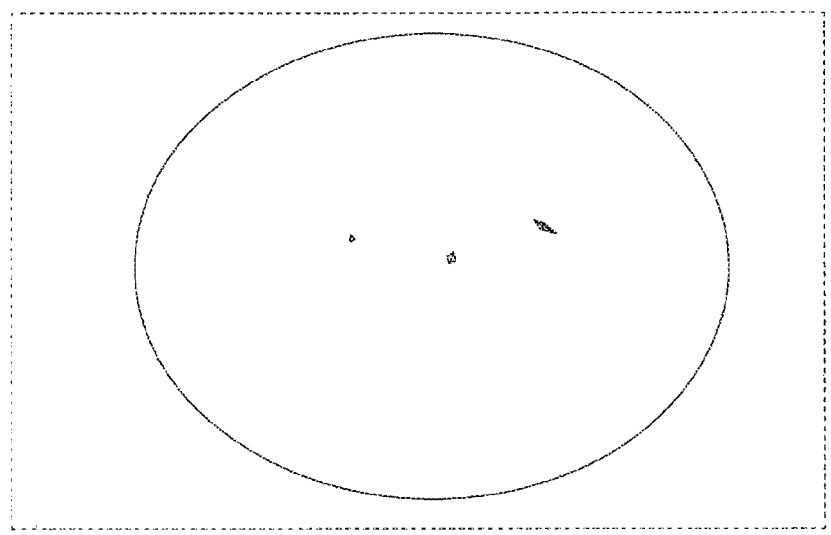
FIG. 57 is a diagram illustrating only some of the particles included in the effect image.
Figure 58:
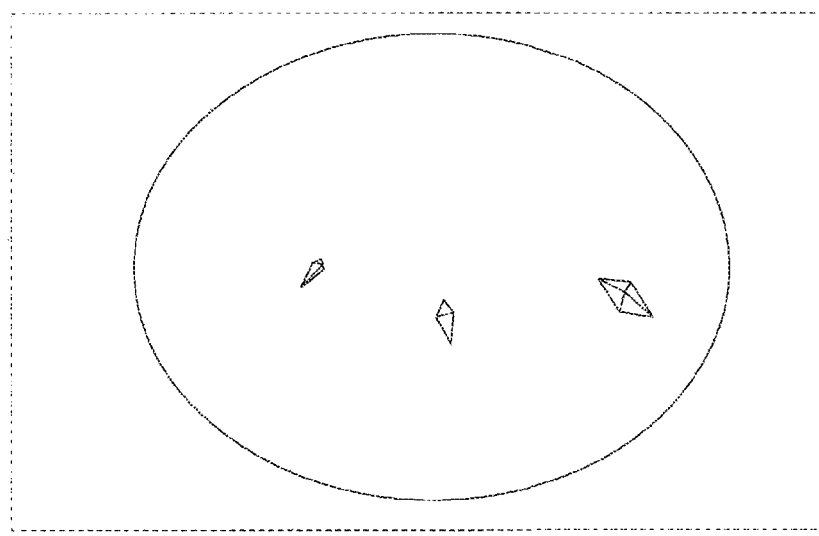
FIG. 58 is a diagram illustrating only some of the particles included in the effect image.
Figure 59:
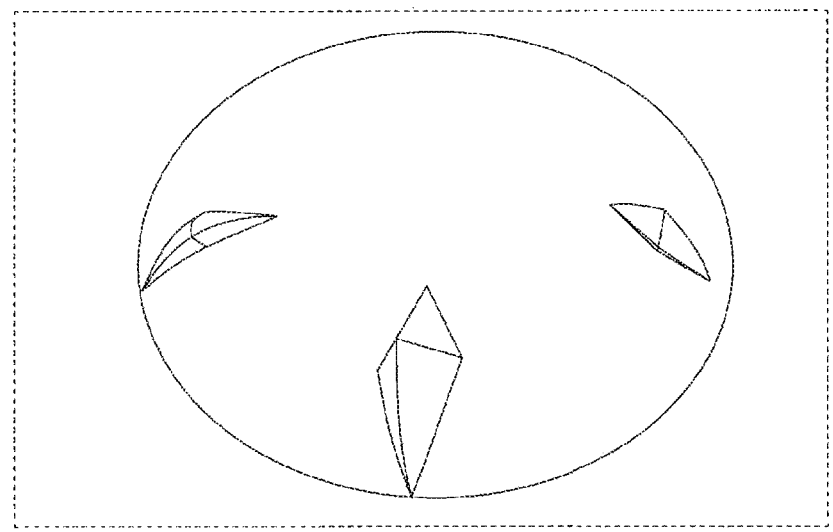
FIG. 59 is a diagram illustrating only some of the particles included in the effect image.
Figure 60:
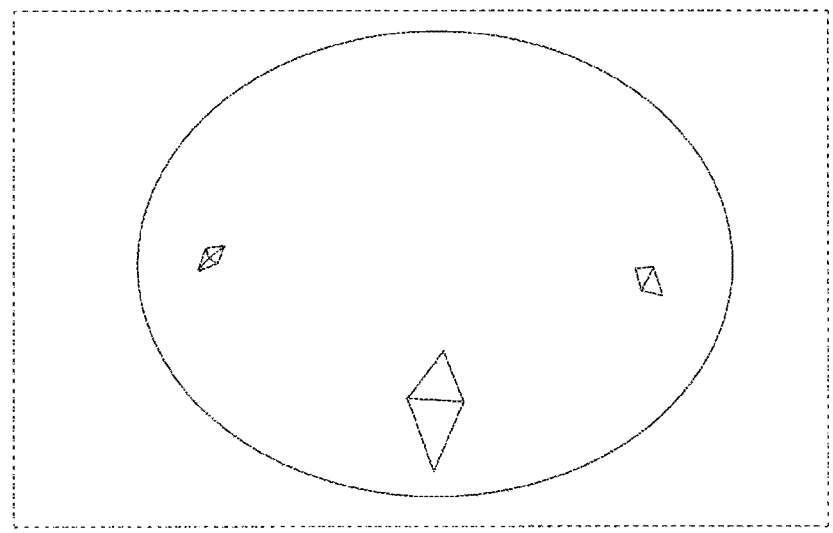
FIG. 60 is a diagram illustrating only some of the particles included in the effect image.
Figure 61:
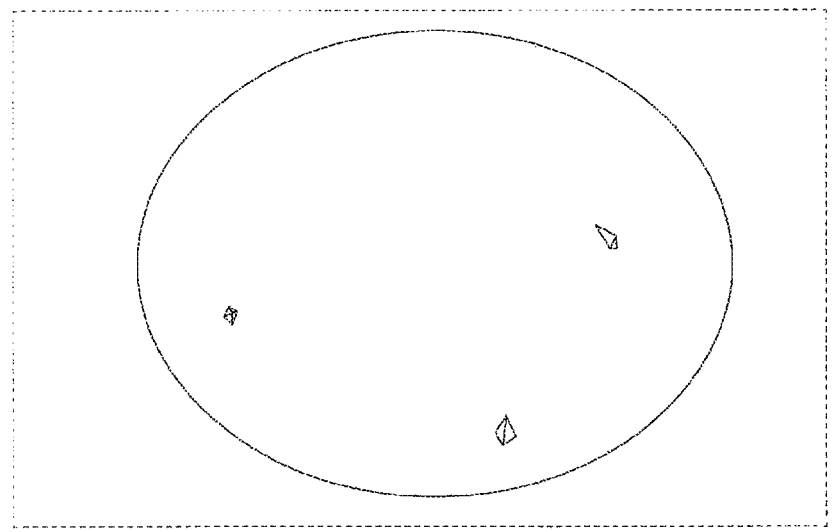
FIG. 61 is a diagram illustrating only some of the particles included in the effect image.
Figure 62:
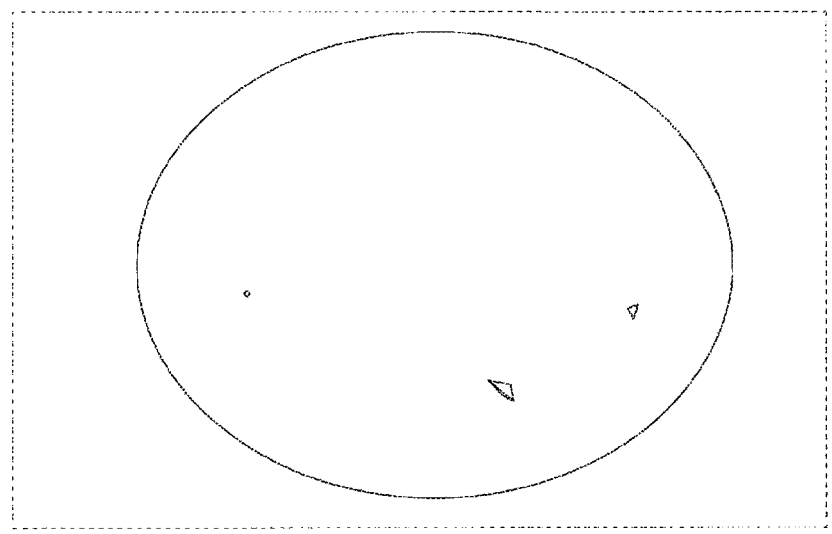
FIG. 62 is a diagram illustrating only some of the particles included in the effect image.

Next, an example in which the control unit 910 serving as the output control unit has a visualizer function of causing an image to be displayed in accordance with an audio signal will be described as an example of video display. FIG. 41 illustrates a configuration example of the present example and FIG. 42 illustrates only the dome screen 101 in the configuration illustrated in FIG. 41. Further, FIG. 43 illustrates a viewing field of the user illustrated in FIG. 41 at a viewpoint substantially facing the dome screen 101.

The present example can be applied to a digital content reproducer that has the visualizer function capable of outputting an effect image dynamically changed in accordance with a change in an audio signal when digital content such as game or video content is reproduced or executed.

A visualizer is a function that the control unit 910 serving as the output control unit has in the present example and is a function of outputting (displaying) an effect image dynamically changed in accordance with a change in an audio signal. The effect image is an image for performing display necessary in order for the control unit 910 serving as the output control unit to achieve the visualizer function. In a case where the user views the effect image displayed on the dome screen 101 and the effect image does not meet preference of the user, digital content to be reproduced may be exchanged. In the configuration, an effect image meeting the preference of the user can be searched for and reproduced using the visualizer function.

Note that a display unit (the dome screen 101) on which an effect image is displayed has a dome shape in the present example, but the display unit on which an effect image is displayed may be a flat screen or may be a television screen.

The effect image in the present example is reproduced so that the user sits the chair 1000 disposed in a predetermined space and can experience the effect image. Note that FIG. 41 illustrates an example in which the chair 1000 is installed. However, as described with reference to FIGS. 24 and 25, fitness equipment such as a fitness bike or a treadmill, or the like may be installed instead of the chair 1000 so that a viewer can experience the visualizer function according to the present example.

The control unit 910 serving as the output control unit may cause the visualizer function to be realized by causing the effect image displayed on the dome screen 101 to be changed in accordance with an analysis result of an audio signal, such as a pitch or volume of a sound, a beat, or frequency characteristics of the audio signal. Note that the control unit 910 may acquire an analysis result of an audio sound using a tune analysis algorithm (12-tone analysis) or may have a function of analyzing a signal of a so-called high resolution region.

In addition, the control unit 910 serving as the output control unit causes the effect image to be output in accordance with the analysis result of the input audio signal and causes the audio sound to be output (reproduced) from an audio output system in accordance with the audio signal.

FIGS. 44 to 54 illustrate examples of changes in the effect image displayed on the dome screen 101 in sequence. As illustrated in FIGS. 44 to 54, in the effect image, particles (a 3D model) with diamond shapes are changed in accordance with the analysis result of the audio signal.

In addition, FIGS. 55 to 62 illustrate only particles included in the effect image to illustrate the change in the effect image in more detail. Note that, FIGS. 44 and 55 correspond to each other, FIGS. 45 and 56 correspond to each other, FIGS. 46 and 57 correspond to each other, FIGS. 47 and 58 correspond to each other, FIGS. 49 and 59 correspond to each other, FIGS. 51 and 60 correspond to each other, FIGS. 52 and 61 correspond to each other, and FIGS. 53 and 62 correspond to each other.

In the case of the present example illustrated in FIGS. 55 to 62, when a single particle included in the effect image of a visualizer according to the present example and displayed is focused on, each particle has characteristics that the particle considerably moves around as a whole while causing a position, a size, an orientation, an angle, and the like in a virtual space to be changed in a plurality of stages in a radiation direction from the vicinity of the center of the inner wall to the outer edge of the dome screen 101.

The particle group illustrated in FIGS. 55 to 62 may be considered to include a single particle group layer. In this case, note that three particles illustrated in FIGS. 55 to 62 are merely some of the particles included in the particle group layer and each particle group layer may include four or more particles. In this configuration, an image in which a plurality of mutually different particle group layers overlaps in the depth direction in a virtual space can include effect images illustrated in FIGS. 44 to 54. In this case, the effect images illustrated in FIGS. 44 to 54 include, for example, particle group layers of about 10 layers. The plurality of particle group layers moves away from or toward each other in the depth direction in the virtual space in tandem with a change in the audio signal. A separation speed (approach speed) between the particle group layers can be appropriately set. For example, the separation speed (approach speed) may be set to be faster as the tempo of music is faster. When the plurality of particle group layers move away from each other, the particle group layer on the front sides comes closer to the outer edge of the dome screen 101. In addition, the particle group layers diffuse radially in the layers (2-dimensionally) as the particle group layers approach a viewer. As a result, the plurality of particle group layers are observed by the viewer so that the particle group layers expand 3-dimensionally in the virtual space. Accordingly, according to the present example, a visualizer function representing a sensation of high immersion can be provided to the viewer. Note that in order to improve the sensation of immersion, at least one particle group layer of the plurality of particle group layers may be configured to move from the front position of the viewer to the rear position. Thus, it is possible to provide a sensation surrounded in the effect image to the viewer. The particle group layer moving from the front position to the rear position of the viewer may be the particle group layer located on the foremost side in a state in which the plurality of particle group layers are contracted. That is, in state in which the plurality of particle group layers are contracted, all the particle group layers may be located in front of the viewer. In this configuration, the viewer can experience a transition video from a state in which the sensation is not surrounded in the effect image to a state in which the sensation is surrounded in the effect image and obtain the sensation of high immersion.

Note that display may be controlled until start of music so that the particles disposed in the virtual space drift disorderly in the virtual space. Then, by collecting the scattering particles to the front of the user, display may be controlled so that the effect image in FIG. 43 is formed with start of music. Note that in a state before the music starts, the shapes of the particles may be shapes different from the diamond shapes, such as spherical shapes and display may be controlled so that the shapes are changed to the diamond shapes with start of the music. In addition, the display may be returned with end of the music so that the particles drift in the virtual space disorderly while the diamond shapes of the particles are released. In this configuration, the viewer can maintain the sensation surrounded by the displayed particles even while the heard music is changed. Therefore, the viewer can obtain the sensation of high immersion.

According to the present example, the effect image is configured so that relative lengths of the particles displayed as the effect image extend as the particles come closer to the vicinity of the outer edge of the inner wall of the dome screen 101. Therefore, the user who tends to gaze the vicinity of the center of the inner wall can enjoy a simulated experience of the sensation of immersion as if the viewer is in a 3-dimensional virtual space.

Note that not only a position, a size, an orientation, an angle, and the like in the virtual space but also colors, brightness, or the like of the particles may be changed. In addition, FIGS. 41 to 62 illustrate examples in which the particles with the diamond shapes are displayed, but a 3D model with a different shape may be displayed.

In addition, in the present example, the effect images dynamically changed by the visualizer function of the digital content reproducer, as illustrated in FIGS. 44 to 54, can also be ascertained as a display screen with a dome shape or a flat shape expressed in the inner wall portion or a digital content reproducer including the display screen as a constituent element.

In addition, in the present example, the control unit 910 serving as the output control unit may also perform control such that a feedback output is performed on the basis of displacement information corresponding to 3-dimensional displacement in accordance with a body motion of the user. For example, the control unit 910 serving as the output control unit may perform audio processing so that a front and rear or right and left motion parallax of an effect image is changed in accordance with displacement information regarding a tilting angle in the front and rear directions or the right and left directions of the chair 1000 (see FIGS. 20 and 21).

As described above, according to the interaction technology proposed in the present specification, a dedicated controller is not necessary and a UI manipulation or an input of a device can be performed using a general object. On the other hand, since a dedicated controller is not used, there is a possibility of a user scarcely ascertaining a method of manipulating an object and being bewildered with a manipulation of an object. Accordingly, for example, when the user starts using an object, a manipulation which can be used using the object may be displayed on the display unit. At this time, a kind of object recognized by the system is preferably displayed. In addition, whether or not the user starts using an object may be determined on the basis of displacement information of the object acquired by the system. Note that initial setting of the control which can be manipulated with the recognized object may be automatically acquired from a network in accordance with the specified kind of object. In addition, there is a possibility of the user forgetting an available manipulation in the middle of an input manipulation with the object. Accordingly, a manipulation list of currently available objects may be displayed in accordance with a specific manipulation (for example, tapping a chair). Of course, an available manipulation with an object may be changed appropriately by the user.

Example 7

Figure 63:
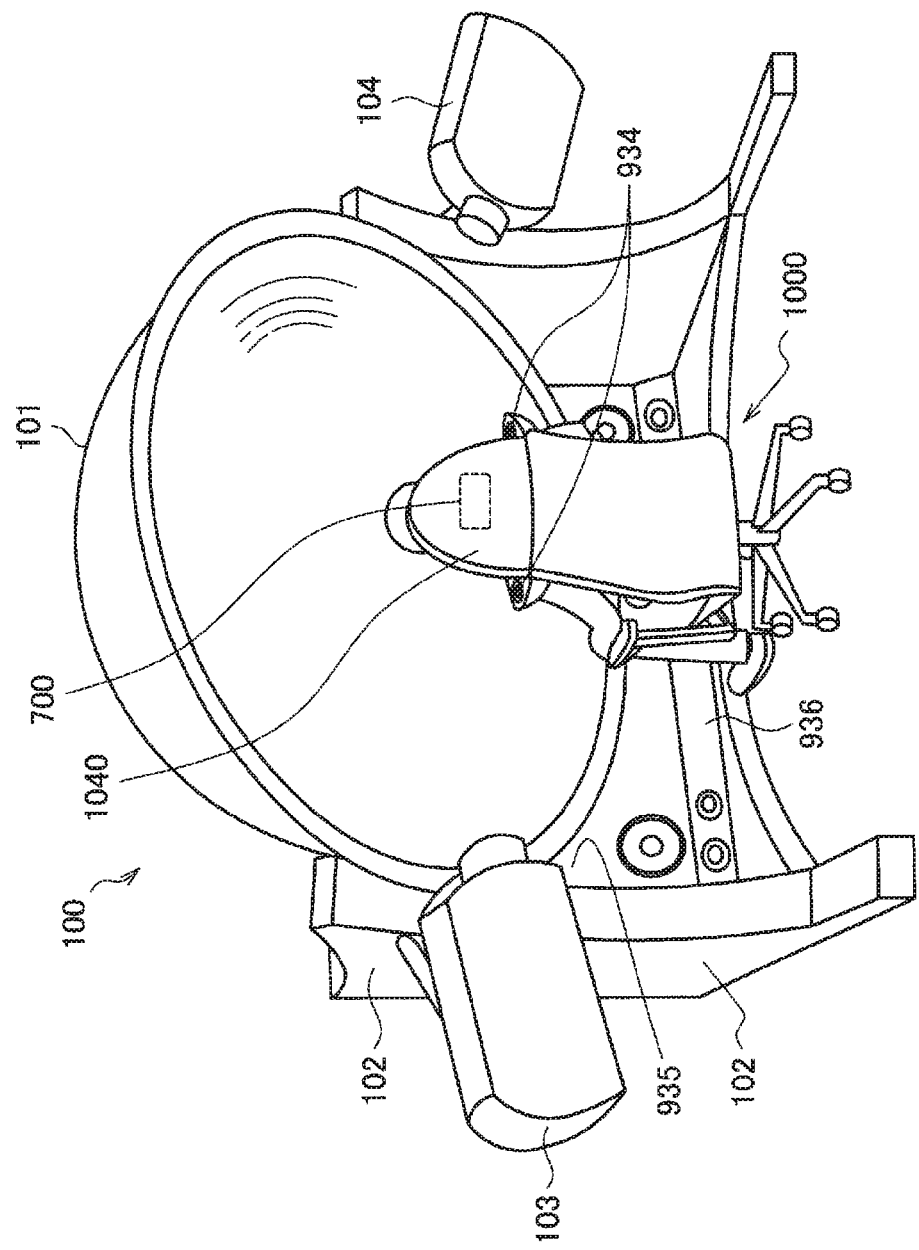
FIG. 63 is a perspective view illustrating a configuration example in which a user terminal 700 is disposed.

Next, an example in which a user terminal carried by a user is used will be described. FIG. 63 is a perspective view illustrating a configuration example in which a user terminal 700 is disposed. The user terminal 700 is, for example, a terminal (information processing device) which the user usually uses and may be a terminal used by the user even when the user does not use the system 900. In the present specification, an information processing device (the system) including an output unit (the video output system or the audio output system) and an output control unit is provided. As will be described in detail, the output control unit according to the present example is configured to control an output unit on the basis of sensor information regarding a body motion of the user and terminal information acquired from the user terminal 700.

Note that FIG. 63 illustrates an example in which the user terminal 700 is a smartphone, but the user terminal 700 is not limited to this example. The user terminal 700 may be a portable (hand-held) terminal usually carried by the user or a wearable terminal worn to be used. For example, the portable terminal may be a tablet terminal and the wearable terminal (wearable device) worn by the user may be a wristwatch type smartwatch or the like.

In addition, the example illustrated in FIG. 63 is an example in which an object acquiring displacement information in accordance with a body motion of the user is the chair 1000, but the present technology is not limited to this example. For example, the user terminal 700 may be used even in a case where the object acquiring displacement information in accordance with a body motion of the user is the fitness equipment such as the treadmill or the fitness bike or the furniture such as the soft or the bed, as described above.

Further, the example illustrated in FIG. 63 is an example in which the user terminal 700 is disposed in a cavity formed in the headrest 1040 of the chair 1000, but the disposition of the user terminal 700 is not limited to this example. For example, the user terminal 700 may be disposed on the armrest of the chair 1000, may be disposed on the knee of the user, may be held by the user, or may be put in a chest pocket of the user. In addition, even in a case where the object acquiring displacement information in accordance with a body motion of the user is not the chair 1000, the user terminal 700 may be disposed at a predetermined position of the object. In addition, in a case where the user terminal 700 is a wearable device such as a smartwatch, the user terminal 700 may be mounted on an arm or the like of the user.

Figure 64:
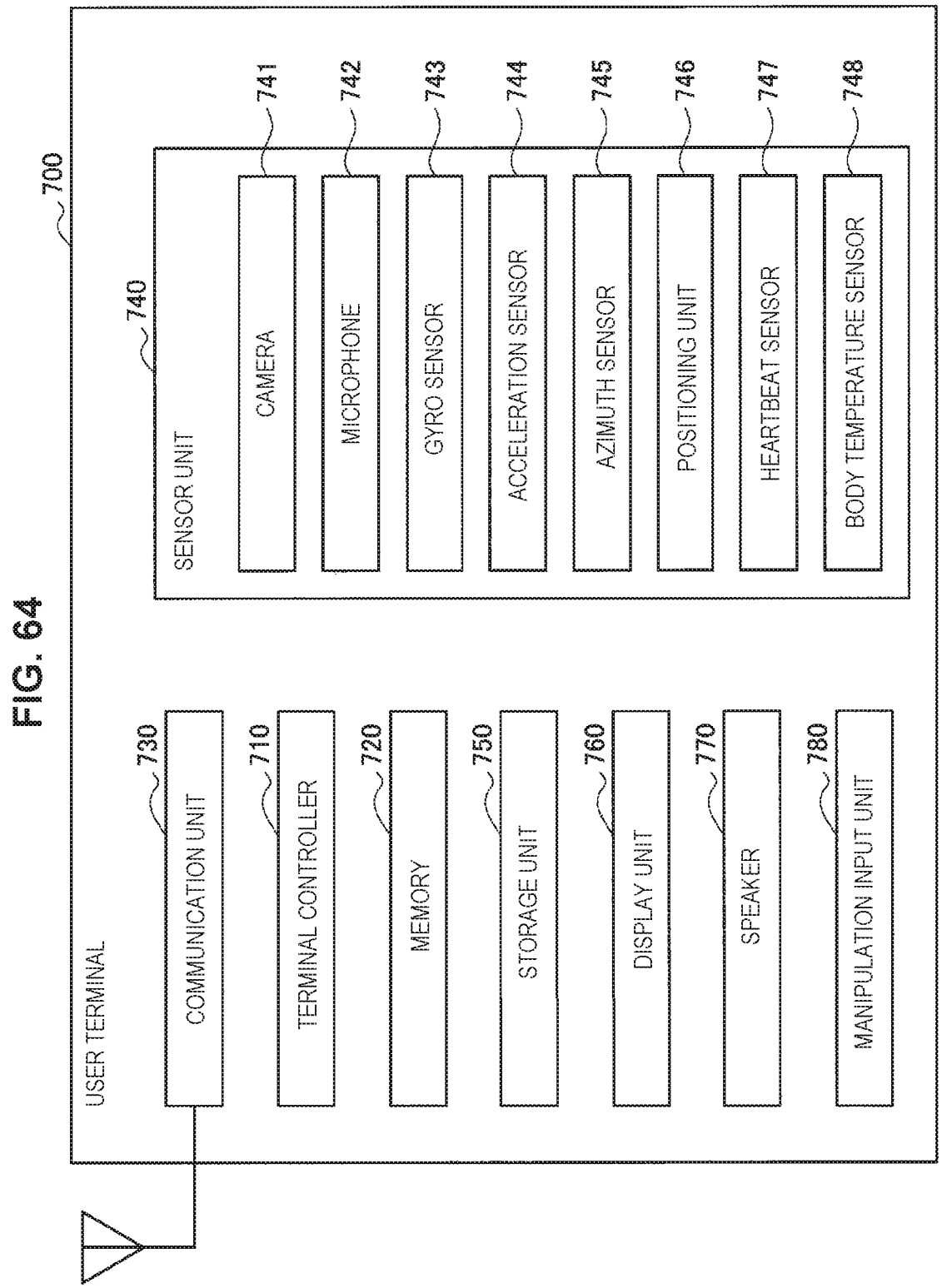
FIG. 64 is a diagram illustrating a configuration example of the user terminal 700.

FIG. 64 illustrates a configuration example of the user terminal 700. As illustrated in FIG. 64, the user terminal 700 is an information processing device that includes a terminal controller 710, a memory 720, a communication unit 730, a sensor unit 740, a storage unit 750, a display unit 760, a speaker 770, and a manipulation input unit 780.

The terminal controller 710 controls the entire user terminal 700. In addition, the terminal controller 710 executes various applications (for example, voice dialog applications). In addition, the terminal controller 710 may perform recognition (for example, sound recognition or the like) based on the sensor information acquired by the sensor unit 740. Note that in a case where the system 900 and the user terminal 700 cooperate, recognition or an application executed by the terminal controller 710 will be described below.

The memory 720 includes an SDRAM such as a double-data-rate (DDR) or a flash memory and is used as a working memory of the terminal controller 710.

The communication unit 730 includes a wireless communication module such as a wireless fidelity (Wi-Fi), Bluetooth (registered trademark), or near field communication (NFC). The communication unit 730 may be connected with the communication unit 913 of the system 900 described with reference to FIG. 9 or may transmit, for example, sensor information or the like acquired by the sensor unit 740 to the communication unit 913. In this configuration, the system 900 can cooperate with the user terminal 700 to realize more various functions. The details of the cooperation of the system 900 and the user terminal 700 will be described below.

The sensor unit 740 has a function of acquiring (sensing) various kinds of information (environmental information) regarding the user or a surrounding environment. For example, as illustrated in FIG. 64, the sensor unit 740 includes a camera 741, a microphone 742, a gyro sensor 743, an acceleration sensor 744, an azimuth sensor 745, a positioning unit 746, a heartbeat sensor 747, and a body temperature sensor 748.

The camera 741 acquires information regarding a real space as a captured image. The camera 741 includes a lens system that includes an imaging lens, a diaphragm, a zoom lens, and a focus lens, a driving system that performs a focus operation or a zoom operation on the lens system, and a solid-state image sensor array that photoelectrically converts imaging light obtained with the lens system to generate an imaging signal. The solid-state image sensor array may be realized by, for example, a charge coupled device (CCD) sensor array or a complementary metal oxide semiconductor (CMOS) sensor array.

In addition, the plurality of cameras 741 may be provided. In a case where the plurality of cameras 741 are provided, the plurality of cameras 741 may be installed to perform imaging in the same direction or may be provided to perform imaging in different directions. For example, the camera 741 may include an inward camera that mainly images in a direction of the user and an outward camera that mainly images a viewing field direction of the user.

The microphone 742 collects a voice of the user or a surrounding environmental sound and acquires an audio signal.

The gyro sensor 743 is realized by, for example, a triaxial gyro sensor to detect an angular velocity (rotational speed).

The acceleration sensor 744 is realized by, for example, a triaxial acceleration sensor (also referred to as a G sensor) to detect acceleration at the time of movement.

The azimuth sensor 745 is realized by, for example, a triaxial geomagnetic sensor (compass) to detect an absolute direction (azimuth).

The positioning unit 746 has a function of detecting a current position of the user terminal 700 on the basis of a signal acquired from the outside. For example, the positioning unit 746 is realized by a global positioning system (GPS) positioning unit, receives radio waves from GPS satellites, detects a position at which there is the user terminal 700, and acquires positional information. In addition, the positioning unit 746 may perform transmission and reception with, for example, Wi-Fi (registered trademark), Bluetooth (registered trademark), or portable PHS smartphone in addition to GPS or detect a position through short-range communication or the like.

The heartbeat sensor 747 detects heartbeats of the user carried by the user terminal 700 and acquires heartbeat information.

The body temperature sensor 748 detects a body temperature of the user carried by the user terminal 700 and acquires body temperature information.

Note that the sensors included in the sensor unit 740 illustrated in FIG. 64 are exemplary and the present technology is not limited to this example. For example, the sensor unit 740 may not include all of the illustrated sensors and each sensor may be configured as a plurality of sensors. In addition, the sensor unit 740 may include other sensors or may include, for example, sensors that acquire biological information such as perspiration, a blood pressure, perspiration, a pulse, respiration, nictation, eye movement, a gazing time, the size of a pupil diameter, a blood pressure, a brain wave, a body motion, a posture, a skin temperature, electric resistance of skin, micro-vibration (MV), a myogenic potential, or SPO2 (blood oxygen saturation) of the user.

In addition, various sensors preferably perform calibration from sensor information obtained from the various sensors since there is dependency on types of devices. For example, in accordance with an instruction on a dedicated application, correction parameters may be calculated and calibration may be performed on the basis of the sensor information obtained from the various sensors by performing a specific motion or operation, a manipulation, or the like decided in advance.

In addition, a sensing target of the sensor unit 740 and a reflection target of a sensing result in a case where the system 900 and the user terminal 700 cooperate will be described below.

The storage unit 750 stores parameters or programs used for the above-described terminal controller 710 to perform processes. In addition, the storage unit 750 may store profile information regarding the user using the user terminal 700.

The profile information may include history information, for example, the user uses the user terminal 700. The history information may include, for example, a reproduction history related to reproduction of content in the user terminal 700, a manipulation history related to manipulations of the user terminal 700, and the like.

In addition, the profile information may include personal information regarding the user. The personal information may include, for example, information such as nationality, an age, sex, a body height, a sitting height, a body weight, or scheduling of the user. Note that the personal information may be, for example, information obtained on the basis of an explicit manipulation of the user or may be information obtained through estimation based on a content viewing history, a manipulation history, or the like of the user.

In addition, the profile information may include preference information indicating preference of the user. The preference information may include, for example, content reference information indicating preference for content and output adjustment value preference information indicating preference for an adjustment value related to an output of the display unit 760 or the speaker 770. Note that the preference information may be, for example, information obtained on the basis of an explicit manipulation of the user or may be information obtained by learning based on a content viewing history, a manipulation history, or the like of the user.

Note that utilization of the profile information in the case where the system 900 and the user terminal 700 cooperate will be described below.

The display unit 760 is realized by, for example, a liquid crystal display (LCD) device, an organic light emitting diode (OLED) device, or the like and displays various screens under the control of the terminal controller 710.

The speaker 770 outputs an audio sound under the control of, for example, the terminal controller 710.

The manipulation input unit 780 is realized by a manipulation member that has a physical structure used for the user to input information, such as a touch sensor, a mouse, a keyboard, a button, a switch, and a lever. In the present disclosure, information input to the user terminal 700 in order for the user to perform a certain manipulation is referred to as "input manipulation information" in some cases. Note that an input manipulation by the user is not limited to a manipulation performed through the foregoing manipulation member and can include, for example, a gesture input manipulation, a sound input manipulation, and the like acquired by the sensor unit 740.

The configuration example of the user terminal 700 has been described above. Next, sensing targets and reflection targets of sensing results of the sensor unit 740 in the case where the system 900 and the user terminal 700 cooperate will be described in sequence below. A correspondent relation between a sensing target and each sensor included in the sensor unit 740 is exemplified in Table 7 below.

TABLE 7

| | sensors | | | | | | | |
|---|---|---|---|---|---|---|---|---|
| Sensing target | Camera | Microphone | Gyro sensor | Acceleration sensor | Azimuth sensor | Positioning unit | Heart beat sensor | Body temperature sensor |
| Chair | ○ | Cooperate with other sensors | Cooperate with other sensors | Cooperate with other sensors | Cooperate with other sensors | — | — | — |
| Treadmill | ○ | Cooperate with other sensors | Cooperate with other sensors | Cooperate with other sensors | Cooperate with other sensors | — | — | — |
| Fitness bike | ○ | Cooperate with other sensors | Cooperate with other sensors | Cooperate with other sensors | Cooperate with other sensors | — | — | — |
| Bed | ○ | Cooperate with other sensors | Cooperate with other sensors | Cooperate with other sensors | Cooperate with other sensors | — | — | — |
| Head position and posture | ○ | Cooperate with other sensors | Cooperate with other sensors | Cooperate with other sensors | Cooperate with other sensors | — | — | — |
| Body inclination | ○ | Cooperate with other sensors | Cooperate with other sensors | Cooperate with other sensors | Cooperate with other sensors | — | — | — |
| Hand motion | ○ | Cooperate with other sensors | Cooperate with other sensors | Cooperate with other sensors | Cooperate with other sensors | — | — | — |
| Preference of luminance/luminance adjustment value | ○ | — | — | — | — | — | ○ | ○ |
| Preference of image quality/image quality adjustment value | ○ | — | — | — | — | — | ○ | ○ |
| Preference of content | ○ | — | — | — | — | — | ○ | ○ |
| Preference of volume/volume adjustment value | — | ○ | — | — | — | — | ○ | ○ |
| Preference of sound quality/sound quality adjustment value | — | ○ | — | — | — | — | ○ | ○ |
| Place | — | — | Cooperate with other sensors | Cooperate with other sensors | Cooperate with other sensors | ○ | — | — |

For example, in a case where the user sits on a chair, displacement information of the chair in accordance with a body motion of the user may be acquired on the basis of sensing of the sensor unit 740. In this case, the user terminal 700 can function as a displacement information acquisition unit. In addition, in this case, the displacement information of the chair may be similar to, for example, the displacement information of the chair 1000 described in Example 1. Note that in the present disclosure, the sensor unit 740 that acquires sensor information regarding a body motion of the user may be regarded as a "first sensor unit."

The displacement information of the chair may be acquired on the basis of, for example, an image captured by the camera 741 of the sensor unit 740. Note that a method of acquiring displacement information based on the image captured by the camera 741 may be similar to the method of acquiring the displacement information described in Example 1.

In addition, the displacement information of the chair may be acquired by combining sensor information acquired by at least one sensor among the microphone 742, the gyro sensor 743, the acceleration sensor 744, and the azimuth sensor 745 of the sensor unit 740.

In addition, in a case where the user uses a treadmill, displacement information of the treadmill in accordance with a body motion of the user may be acquired on the basis of sensing of the sensor unit 740. In this case, the user terminal 700 can also function as a displacement information acquisition unit. In addition, in this case, the displacement information of the treadmill may be similar to, for example, the displacement information of the treadmill 1500 described in Example 2.

The displacement information of the treadmill may be acquired on the basis of, for example, an image captured by the camera 741 of the sensor unit 740. Note that a method of acquiring displacement information based on the image captured by the camera 741 may be similar to the method of acquiring the displacement information described in Example 2.

In addition, the displacement information of the treadmill may be acquired by combining sensor information acquired by at least one sensor among the microphone 742, the gyro sensor 743, the acceleration sensor 744, and the azimuth sensor 745 of the sensor unit 740.

In addition, in a case where the user uses a fitness bike, displacement information of the fitness bike in accordance with a body motion of the user may be acquired on the basis of sensing of the sensor unit 740. In this case, the user terminal 700 can also function as a displacement information acquisition unit. In addition, in this case, the displacement information of the fitness bike may be similar to, for example, the displacement information of the fitness bike 1600 described in Example 2.

The displacement information of the fitness bike may be acquired on the basis of, for example, an image captured by the camera 741 of the sensor unit 740. Note that a method of acquiring displacement information based on the image captured by the camera 741 may be similar to the method of acquiring the displacement information described in Example 2.

In addition, the displacement information of the fitness bike may be acquired by combining sensor information acquired by at least one sensor among the microphone 742, the gyro sensor 743, the acceleration sensor 744, and the azimuth sensor 745 of the sensor unit 740.

In addition, in a case where the user lies on a bed, displacement information of the bed in accordance with a body motion of the user may be acquired on the basis of sensing of the sensor unit 740. In this case, the user terminal 700 can also function as a displacement information acquisition unit. In addition, in this case, the displacement information of the bed may be similar to, for example, the displacement information of the bed 2400 or the bed 2500 described in Example 4.

The displacement information of the bed may be acquired on the basis of, for example, an image captured by the camera 741 of the sensor unit 740. Note that a method of acquiring displacement information based on the image captured by the camera 741 may be similar to the method of acquiring the displacement information described in Example 2.

In addition, the displacement information of the bed may be acquired by combining sensor information acquired by at least one sensor among the microphone 742, the gyro sensor 743, the acceleration sensor 744, and the azimuth sensor 745 of the sensor unit 740.

As described above, in a case where the user terminal 700 functions as the displacement information acquisition unit, the system 900 may not include the displacement sensor 941, and thus there is an advantageous effect of simplifying the configuration.

In addition, information regarding a head position and a head posture of the user may be acquired on the basis of sensing of the sensor unit 740. The head position and the head posture may be estimated on the basis of the above-described displacement information or the information regarding the head position and the head posture may be sensed more directly. For example, the information regarding the head position and the head posture of the user may be acquired on the basis of an image captured by the camera 741 of the sensor unit 740. For example, a position and a posture of the head of the user shown in an image of the inward camera imaging a user direction may be estimated on the basis of correspondence between a projected video and an image captured by the outward camera imaging a viewing field direction of the user. In addition, the user terminal 700 may detect the head of the user from an image captured by the camera 741 and transmit a video of the head of the user to the control unit 910 as in the above-described head detection camera 942. In this case, the system 900 may not include the head detection camera 942, and thus there is an advantageous effect of simplifying the configuration.

In addition, the information regarding a head position or a head posture of the user may be acquired by combining sensor information acquired by at least one sensor among the microphone 742, the gyro sensor 743, the acceleration sensor 744, and the azimuth sensor 745 of the sensor unit 740.

In addition, information regarding a body inclination of the user may be acquired on the basis of sensing of the sensor unit 740. Information regarding the body inclination may include, for example, fluctuation of center of gravity and swing information. For example, the information regarding the body inclination may be acquired on the basis of an image captured by the camera 741 of the sensor unit 740. In addition, the information regarding the body inclination may be acquired by combining sensor information acquired by at least one sensor among the microphone 742, the gyro sensor 743, the acceleration sensor 744, and the azimuth sensor 745 of the sensor unit 740.

In addition, information regarding a hand motion (hand gesture) of the user may be acquired on the basis of sensing of the sensor unit 740. The information regarding the hand motion may include, for example, information regarding a hand motion such as clapping, hand waving, or arm folding. For example, the information regarding the hand motion may be acquired on the basis of an image captured by the camera 741 of the sensor unit 740. In addition, the information regarding the hand motion may be acquired by combining sensor information acquired by at least one sensor among the microphone 742, the gyro sensor 743, the acceleration sensor 744, and the azimuth sensor 745 of the sensor unit 740.

In addition, information regarding luminance on the dome screen 101 and preference of a luminance adjustment value projected from each of the projectors 103 and 104 may be acquired on the basis of sensor information of the sensor unit 740. For example, information regarding the luminance may be acquired on the basis of an image captured by the camera 741 of the sensor unit 740. In addition, the information regarding the preference of the luminance adjustment value may be acquired for each user on the basis of heartbeats or a body temperature acquired by the heartbeat sensor or the body temperature sensor of the sensor unit 740.

In addition, information regarding image quality on the dome screen 101 and preference of an image quality adjustment value projected from each of the projectors 103 and 104 may be acquired on the basis of sensor information of the sensor unit 740. For example, information regarding the image quality may be acquired on the basis of an image captured by the camera 741 of the sensor unit 740. In addition, the information regarding the preference of the image quality adjustment value may be acquired for each user on the basis of heartbeats or a body temperature acquired by the heartbeat sensor or the body temperature sensor of the sensor unit 740.

In addition, information regarding preference of content output by the system 900 may be acquired for each user on the basis of sensor information of the sensor unit 740. For example, the information regarding the preference of the content may be acquired for each user on the basis of heartbeats or a body temperature acquired by the heartbeat sensor or the body temperature sensor of the sensor unit 740.

In addition, information regarding preference of a volume and a volume adjustment value of an audio sound output from the audio output system of the system 900 may be acquired on the basis of sensor information of the sensor unit 740. For example, information regarding the volume may be acquired on the basis of an audio signal (sound information) acquired by the microphone 742 of the sensor unit 740. In addition, the information regarding the preference of the volume adjustment value may be acquired for each user on the basis of heartbeats or a body temperature acquired by the heartbeat sensor or the body temperature sensor of the sensor unit 740.

In addition, information regarding preference of sound quality and a sound quality adjustment value of an audio sound output from the audio output system of the system 900 may be acquired on the basis of sensor information of the sensor unit 740. For example, information regarding the sound quality may be acquired on the basis of an audio signal acquired by the microphone 742 of the sensor unit 740. In addition, the information regarding the preference of the sound quality adjustment value may be acquired for each user on the basis of heartbeats or a body temperature acquired by the heartbeat sensor or the body temperature sensor of the sensor unit 740.

In addition, information regarding a place may be acquired on the basis of sensor information of the sensor unit 740. For example, the information regarding the place may be acquired by the positioning unit 746 of the sensor unit 740. In addition, the information regarding the place may be acquired by combining sensor information acquired at least one sensor among the gyro sensor 743, the acceleration sensor 744, and the azimuth sensor 745 of the sensor unit 740. Note that the information regarding the place is preferably acquired in a case where the technology proposed in the present specification is applied to, for example, a moving body such as an airplane, a train, a bus, or a passenger car.

The examples of the sensing target of the sensor unit 740 have been described above. Note that a process of acquiring the information on the basis of the captured image described above and a process of acquiring information by combining the sensor information may be performed by the terminal controller 710 of the user terminal 700 or may be performed by the main controller 911 of the system 900.

Next, reflection targets of sensing results will be described. The control unit 910 serving as the output control unit causes a sensing result by the sensor unit 740 to be reflected in interaction. A correspondent relation between the sensing targets and reflection targets of sensing results is exemplified in Table 8 below.

TABLE 8

| Sensing target | Reflection target of sensing result |
| --- | --- |
| Chair | Video processing |
| Treadmill | Audio processing |
| Fitness bike | |
| Bed | |
| Head position and posture | |
| Body inclination | |
| Hand motion | UI manipulation of switching content |
| Preference of luminance/luminance adjustment value | Luminance adjustment |
| Preference of image quality/image quality adjustment value | Color, contrast, sharpness adjustment |
| Preference of content | Switching of content Recommendation of content |
| Preference of volume/volume adjustment value | Volume adjustment |
| Preference of sound quality/sound quality adjustment value | Adjustment of frequency characteristics, phase characteristics, delay characteristics of audio output system |
| Place | Switching of content |

For example, in a case where displacement information of a chair is acquired on the basis of sensing of the sensor unit 740, the control unit 910 serving as the output control unit may control an output of video processing or audio processing on the basis of the displacement information of the chair. Note that the output control related to the video processing or the audio processing based on the displacement information of the chair may be similar, for example, the output control related to the video processing or the audio processing based on the displacement information of the chair 1000 described in Example 1. Note that the control unit 910 serving as the output control unit may perform audio processing of causing a volume of an audio sound to be changed in accordance with the displacement information of the chair. In addition, the control unit 910 serving as the output control unit may perform video processing or audio processing of switching content caused to be output on the basis of the displacement information of the chair.

In addition, in a case where displacement information of a treadmill is acquired on the basis of sensing of the sensor unit 740, the control unit 910 serving as the output control unit may control an output of video processing or audio processing on the basis of the displacement information of the treadmill. Note that the output control related to the video processing or the audio processing based on the displacement information of the treadmill may be similar to, for example, the output control related to the video processing or the audio processing based on the displacement information of the treadmill 1500 described in Example 2. Alternatively, the control unit 910 serving as the output control unit may perform video processing of causing a screen drawing speed to be changed on the basis of displacement information such as a running or walking speed of the user on the treadmill or an upward or downward movement amount, a right or left tilting angle, or the like of the treadmill. In addition, the control unit 910 serving as the output control unit may perform video processing or audio processing of switching content caused to be output on the basis of the displacement information of the treadmill.

In addition, in a case where displacement information of a fitness bike is acquired on the basis of sensing of the sensor unit 740, the control unit 910 serving as the output control unit may control an output of video processing or audio processing on the basis of the displacement information of the fitness bike. Note that the output control related to the video processing or the audio processing based on the displacement information of the fitness bike may be similar to, for example, the output control related to the video processing or the audio processing based on the displacement information of the fitness bike 1600 described in Example 2. Note that the control unit 910 serving as the output control unit may perform the video processing of causing a screen drawing speed to be changed or the audio processing of causing a pitch or a tempo of an audio sound to be changed in accordance with a rotational speed of a wheel (an example of the displacement information of the fitness bike). In addition, the control unit 910 serving as the output control unit may perform the video processing or the audio processing of switching content to be output on the basis of the displacement information of the fitness bike.

In addition, in a case where displacement information of a bed is acquired on the basis of sensing of the sensor unit 740, the control unit 910 serving as the output control unit may control an output of video processing or audio processing on the basis of the displacement information of the bed. Note that the output control related to the video processing or the audio processing based on the displacement information of the bed may be similar, for example, the output control related to the video processing or the audio processing based on the displacement information of the bed 2400 or 2500 described in Example. Note that the control unit 910 serving as the output control unit may perform audio processing of causing a volume of an audio sound to be changed in accordance with the displacement information of the bed. In addition, the control unit 910 serving as the output control unit may perform video processing or audio processing of switching content caused to be output on the basis of the displacement information of the bed.

In addition, in a case where information regarding a head position or a head posture of the user is acquired on the basis of sensing of the sensor unit 740, the control unit 910 serving as the output control unit may control an output of video processing or audio processing on the basis of the information regarding the head position and the head posture. For example, the control unit 910 serving as the output control unit may perform video processing of causing a viewpoint position of a free viewpoint video during viewing to be changed on the basis of the information regarding the head position and the head posture. In addition, the control unit 910 serving as the output control unit may control a change of the SSF in accordance with the viewpoint position of a video on the basis of the information regarding the head position and the head posture. Alternatively, the control unit 910 serving as the output control unit may perform audio processing of causing a volume of an audio sound to be changed on the basis of the information regarding the head position and the head posture. In addition, the control unit 910 serving as the output control unit may perform video processing or audio processing of switching content to be output on the basis of the information regarding the head position and the head posture. In addition, the control unit 910 serving as the output control unit may perform video processing related to a manipulation of a UI menu on the basis of the information regarding the head position and the head posture.

In addition, in a case where information regarding the body inclination of a user is acquired on the basis of sensing of the sensor unit 740, the control unit 910 serving as the output control unit may control an output of video processing or audio processing on the basis of the information regarding the body inclination. For example, the control unit 910 serving as the output control unit may perform video processing of causing a viewpoint position of a free viewpoint video during viewing to be changed on the basis of the information regarding the body inclination. In addition, the control unit 910 serving as the output control unit may control a change of the SSF in accordance with the viewpoint position of a video on the basis of the information regarding the body inclination. Alternatively, the control unit 910 serving as the output control unit may perform audio processing of causing a volume of an audio sound to be changed on the basis of the information regarding the body inclination. In addition, the control unit 910 serving as the output control unit may perform video processing or audio processing of switching content caused to be output on the basis of the information regarding the body inclination. In addition, the control unit 910 serving as the output control unit may perform video processing related to a manipulation of a UI menu on the basis of the information regarding the body inclination.

In addition, in a case where information regarding a hand motion of the user is acquired on the basis of sensing of the sensor unit 740, the control unit 910 serving as the output control unit may perform video processing or audio process of switching content to be output on the basis of the information of the hand motion. In addition, the control unit 910 serving as the output control unit may perform video processing related to a manipulation of a UI menu on the basis of the information regarding the hand motion.

In addition, in a case where information regarding luminance on the dome screen 101 is acquired on the basis of sensor information of the sensor unit 740, the control unit 910 serving as the output control unit may perform luminance adjustment of each of the projectors 103 and 104 on the basis of the information regarding the luminance. In addition, similarly, in a case where information regarding preference of a luminance adjustment value is acquired on the basis of the sensor information of the sensor unit 740, the control unit 910 serving as the output control unit may perform luminance adjustment of each of the projectors 103 and 104 on the basis of the information regarding the preference of the luminance adjustment value.

In addition, in a case where information regarding image quality on the dome screen 101 is acquired on the basis of sensor information of the sensor unit 740, the control unit 910 serving as the output control unit may perform image quality adjustment of each of the projectors 103 and 104 on the basis of the information regarding the image quality. In addition, similarly, in a case where information regarding preference of an image quality adjustment value is acquired on the basis of sensor information of the sensor unit 740, the control unit 910 serving as the output control unit may perform image quality adjustment of each of the projectors 103 and 104 on the basis of the information regarding the preference of the image quality adjustment value. Note that the image quality adjustment performed by the control unit 910 serving as the output control unit may include, for example, adjustment of color, contrast, or sharpness.

In addition, in a case where information regarding preference of content is acquired on the basis of sensor information of the sensor unit 740, the control unit 910 serving as the output control unit may perform video processing or audio processing of switching content to be output on the basis of the information regarding the preference of the content. In addition, the control unit 910 serving as the output control unit may perform output control such that content is recommended to the user (for example, recommended content is caused to be displayed) on the basis of the information regarding the preference of the content.

In addition, in a case where information regarding a volume of an audio sound output from the audio output system of the system 900 is acquired on the basis of sensor information of the sensor unit 740, the control unit 910 serving as the output control unit may perform volume adjustment of the audio sound output from the audio output system of the system 900 on the basis of the information regarding the volume. In addition, similarly, in a case where information regarding preference of a volume adjustment value is acquired on the basis of sensor information of the sensor unit 740, the control unit 910 serving as the output control unit may perform volume adjustment on the basis of the information regarding the preference of the volume adjustment value.

In addition, in a case where information regarding sound quality of an audio sound output from the audio output system of the system 900 is acquired on the basis of sensor information of the sensor unit 740, the control unit 910 serving as the output control unit may perform sound quality adjustment of the audio sound output from the audio output system of the system 900 on the basis of the information regarding the sound quality. In addition, similarly, in a case where information regarding preference of a sound quality adjustment value is acquired on the basis of sensor information of the sensor unit 740, the control unit 910 serving as the output control unit may perform volume adjustment on the basis of the information regarding the preference of the sound quality adjustment value. Note that the sound quality adjustment performed by the control unit 910 serving as the output control unit may include, for example, adjustment of frequency characteristics, phase characteristics, delay characteristics of the audio output system.

In addition, in a case where information regarding a place is acquired from sensor information of the sensor unit 740, the control unit 910 serving as the output control unit may perform video processing or audio processing of switching content to be output on the basis of the information regarding the place. For example, the control unit 910 serving as the output control unit may cause content for guiding a nearby famous place or the like to be output or may output content for advertising a nearby store or the like on the basis of the information regarding the place.

The sensing targets and the reflection targets of the sensing results of the sensor unit 740 in the case where the system 900 and the user terminal 700 cooperate have been described above. Note that the examples in which the sensing result is reflected mainly in the output control related to the video processing or the audio processing have been described above, but the present technology is not limited to these examples. For example, the control unit 910 serving as the output control unit may control an output of an air conditioner included in the external output unit 952 on the basis of information regarding a body temperature acquired by the body temperature sensor 748. In addition, the sensing of the sensor unit 740 when the user uses the system 900 has been mainly described above, but the present technology is not limited to the example. For example, when the dome display 101 is installed, geometric correction or an edge blending process may be performed on the basis of an image captured by the camera 741 of the sensor unit 740. In addition, when a shift changed over time is corrected, correction may also be performed on the basis of an image captured by the camera 741.

Next, utilization of the profile information when the system 900 and the user terminal 700 cooperate will be described. The control unit 910 serving as the output control unit may control interaction on the basis of profile information stored in the storage unit 750 of the user terminal 700.

For example, the control unit 910 serving as the output control unit may cause content to be output on the basis of history information included in the profile information. For example, the control unit 910 serving as the output control unit may cause content analogous to content previously reproduced by the user to be output on the basis of the reproduction history. In addition, the control unit 910 serving as the output control unit may cause content previously reproduced frequently by the user to be output on the basis of the reproduction history.

In addition, the control unit 910 serving as the output control unit may control an output on the basis of personal information included in the profile information. For example, the control unit 910 serving as the output control unit may cause appropriate content to be output in accordance with the personal information. In addition, the control unit 910 serving as the output control unit may cause the size of text to be displayed to be larger in a case where the user is aged. In addition, the control unit 910 serving as the output control unit may perform video processing of causing a viewpoint position of a free viewpoint video during viewing to be changed in accordance with information regarding the height or sitting height of the user. In addition, the control unit 910 serving as the output control unit may cause a schedule to be displayed or cause a plan included in the schedule to be notified of on the basis of the information of the schedule of the user. Note that in a case where the profile information such as information regarding the schedule is caused to overlap on a content video when the user is viewing the content, the profile information is preferably disposed in a region other than a region corresponding to the front of the user so that the viewing of the content is not inhibited.

In addition, the control unit 910 serving as the output control unit may control the output on the basis of preference information included in the profile information. For example, the control unit 910 serving as the output control unit may cause content estimated to be preferred by the user to be output in accordance with content preference information.

In addition, the control unit 910 serving as the output control unit may perform adjustment related to an output of luminance, image quality, a volume, a sound quality, or the like on the basis of output adjustment value preference information. In this configuration, since the adjustment for each user is quickly performed, for example, sickness induced by a video can be reduced. In a case where a shift of the user is frequent in a store or the like, the adjustment for each user based on the profile information is particularly effective.

The utilization of the profile information when the system 900 and the user terminal 700 cooperate has been described above. Note that utilization of information stored in the storage unit 750 when the system 900 and the user terminal 700 cooperate is not limited to the above utilization. For example, the control unit 910 serving as the output control unit may cause content stored in the storage unit 750 to be output.

Next, examples in which other functions of the user terminal 700 cooperate when the system 900 and the user terminal 700 cooperate will be described. The control unit 910 serving as the output control unit may control an output on the basis of various functions of the user terminal 700.

For example, in a case where the user terminal 700 has a video telephone function, the control unit 910 serving as the output control unit may perform video processing or audio processing related to video telephone using the dome display 100.

In addition, in a case where the user terminal 700 has a sound recognition function, the control unit 910 serving as the output control unit may perform video processing and audio processing in accordance with the sound recognition function. In particular, in a case where the user terminal 700 has a voice dialog function, a manipulation related to the system 900 may be performed through voice dialog.

Note that in a case where the control unit 910 serving as the output control unit controls an output on the basis of a video telephone function, a sound recognition function, a voice dialog function, or the like of the user terminal 700, the user speaks in front of the dome screen 101. When the user speaks in front of the dome screen 101, an echo is produced and there is concern of the microphone 742 of the user terminal 700 not being able to appropriately acquire an audio signal of the voice. Accordingly, the microphone 742 is preferably calibrated in advance. For example, by measuring an audio impulse response, it is also possible to perform calibration to cancel unique reflection characteristics of the dome screen 101 in accordance with the position of the user terminal 700. As a result, it is possible to acquire an audio signal of the voice from which the echo is removed (cancelled).

In addition, in a case where the user terminal 700 has a telephone function, the control unit 910 serving as the output control unit may reduce a volume on the basis of arrival of a call in the user terminal 700.

In addition, the control unit 910 serving as the output control unit may control an audio output of the speaker 770 of the user terminal 700. The control unit 910 serving as the output control unit may control an audio output of the speaker 770 in accordance with disposition of the user terminal 700. For example, in a case where the user terminal 700 is near the headrest 1040, as illustrated in FIG. 63, the control unit 910 serving as the output control unit may cause an audio sound to be output instead of the headrest speaker 934. In this configuration, the system 900 may not include the headrest speaker 934, and thus there is an advantageous effect of simplifying the configuration.

In addition, the control unit 910 serving as the output control unit may control the output on the basis of a user manipulation through the manipulation input unit 780 of the user terminal 700. For example, the control unit 910 serving as the output control unit may perform video processing of causing a viewpoint position of a free viewpoint video during viewing to be changed on the basis of a user manipulation through the manipulation input unit 780.

The cooperation of the system 900 and the user terminal 700 has been described above. Note that the examples in which the communication unit 913 of the system 900 and the communication unit 730 of the user terminal 700 are connected and the system 900 and the user terminal 700 cooperate have been described above, but the present technology is not limited to these examples. For example, in a case where the user terminal 700 may be embedded in the system 900, the user terminal 700 may have a function of the control unit 910 or the input system instead of the control unit 910 or the input system.

Figure 65:
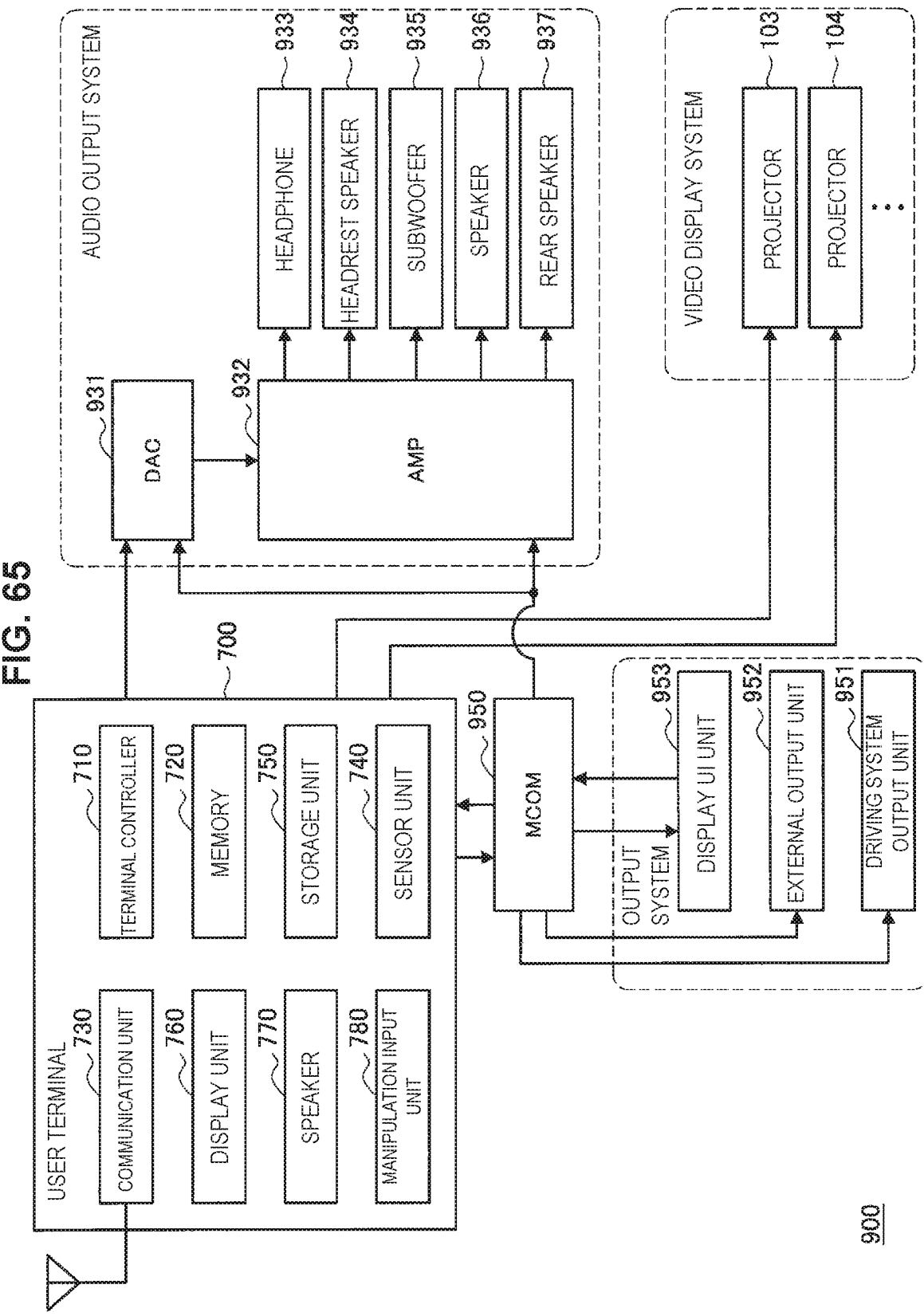
FIG. 65 is a diagram illustrating a configuration example in which a system 900 includes the user terminal 700.

FIG. 65 illustrates a configuration example of the system 900 including the user terminal 700. The system 900 illustrated in FIG. 65 is different from the system 900 illustrated in FIG. 9 in that the control unit 910, the displacement sensor 941, the head detection camera 942, the external sensor 943, and the audio player 944 are not included instead of including the user terminal 700.

The function of the communication unit 913 of the control unit 910 can be substituted with the communication unit 730 of the user terminal 700. In addition, the functions of the main controller 911, the main memory 912, the video DSP 914, and the audio DSP 915 of the control unit 910 (including a function serving as an output control unit) can be substituted with the terminal controller 710 and the memory 720 of the user terminal 700. Note that the user terminal 700 may include a video DSP or an audio DSP.

In addition, in the input system, the functions of the displacement sensor 941, the head detection camera 942, and the external sensor 943 can be substituted with the sensor unit 740. Note that examples of specific sensors included in the sensor unit 740 are omitted in FIG. 65, but may be similar to, for example, the examples of the specific sensors included in the sensor unit 740 illustrated in FIG. 64.

In addition, in the input system, the function of the audio player 944 can be substituted with, for example, the terminal controller 710 and the storage unit 750.

Note that all of the functions of the input system or the control unit 910 described above may not be substituted and the system 900 may have some or all of the functions of the input system or the control unit 910 along with the user terminal 700.

In addition, the user terminal 700 may be wirelessly connected to the audio output system and the video display system through wireless communication by the communication unit 730 or may be wired-connected to the audio output system and the video display system. In a case where the user terminal 700 is wirelessly connected to the audio output system and the video display system, for example, a technology such as Miracast (registered trademark) or AirPlay (registered trademark) may be used. In a case where the user terminal 700 is wired-connected to the audio output system and the video display system, the user terminal 700 may be connected to the audio output system and the video display system through, for example, mobile high-definition link (MHL), high-definition multimedia interface (HDMI) (registered trademark). Note that connection between the user terminal 700, and the audio output system and the video display system is not limited to the examples, but the user terminal 700 may be connected to the audio output system and the video display system through Bluetooth (registered trademark), Universal Serial Bus (USB), or the like.

In addition, FIG. 65 illustrates the example in which the system 900 includes one user terminal 700, but the system 900 may include the plurality of user terminals 700. In addition, one user terminal 700 may be connected to each of the projectors 103 and 104. In this case, video output timings are preferably synchronized between the plurality of user terminals 700. For example, times between the user terminals 700 may be caused to be synchronized using a protocol such as Precision Time Protocol (PTP) to start outputting a video at a predetermined time.

The example in which the system 900 includes the user terminal 700 has been described above. As described above, the functions of the control unit 910 or the input system are substituted with the user terminal 700, and thus there is an advantageous effect of simplifying the configuration. Note that in a configuration in which the system 900 described with reference to FIG. 65 includes the user terminal 700, interaction in which the sensing result by the above-described sensor unit 740 is reflected, interaction in which the profile information is utilized, or interaction based on the function of the user terminal 700 can also be performed.

Of course, in the above-described Example 7, a system in which at least some or all of the constituent elements of the control unit, the input system, and the like omitted in FIG. 65 are provided may be adopted. That is, the system 900 of FIG. 9 which can function alone may include the user terminal 700 as an auxiliary manipulation terminal and the system 900 and the user terminal 700 may be configured to operate in cooperation. In this configuration, a video of the video display system can be controlled on the basis of various signals (information) from the input system illustrated in FIG. 9 in addition to manipulation input information, sensor information, or the like from the user terminal 700. That is, for example, in a case where an object is a chair, a video of the video display system can be controlled on the basis of operation information of the chair and information from the user terminal 700.

In the foregoing configuration, for example, the sensor unit 740 (the first sensor unit) of the user terminal 700 may acquire sensor information regarding a body motion of the user. On the other hand, the displacement sensor 941 (a second sensor unit) illustrated in FIG. 9 may also acquire sensor information regarding a body motion of the user. By controlling the output unit on the basis of the sensor information acquired by each of the sensor unit 740 and the displacement sensor 941, it is possible to provide the user with a more abundant user experience than in the configuration of FIG. 9 without using a dedicated controller.

For example, in a case where the user sitting on a chair is viewing a video provided to the display unit with a dome shape it is assumed that a parallax of the video is caused to be changed in accordance with a body motion of the user, as shown in Table 2. In this configuration, a parallax of a video presented to the display unit may be controlled on the basis of sensor information acquired by each of the sensor unit 740 and the displacement sensor 941. In this configuration, the parallax may be caused to be changed more considerably than in FIG. 9. More specifically, for example, the parallax can be caused to be changed more considerably while maintaining a state in which the user views the front side by combining right or left turn and an input manipulation to the user terminal 700.

Example 8

Next, a new configuration example of the dome display 100 will be described according to Example 8. An object of several configuration examples of the dome display 100 to be described below according to Example 8 can be to miniaturize the dome display 100 or the entire system. Several configuration example of the dome display 100 to be described below according to Example 8 according to Example 8 may be combined with the above-described Examples 1 to 7 for implementation.

(First Configuration Example of further Miniaturized Dome Display 100)

Figure 66:
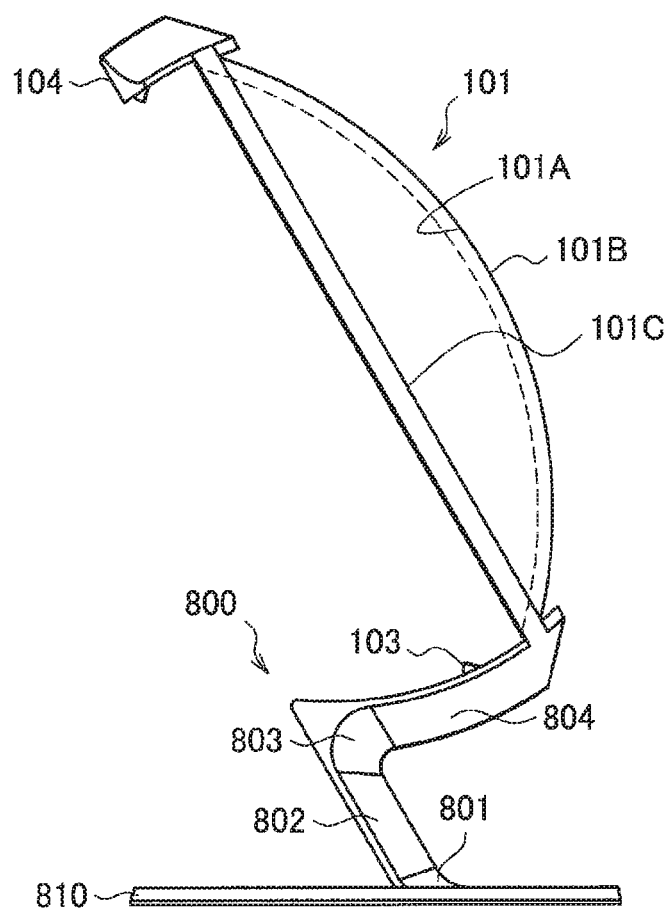
FIG. 66 is a diagram illustrating a first configuration example of the smaller dome display 100.
Figure 67:
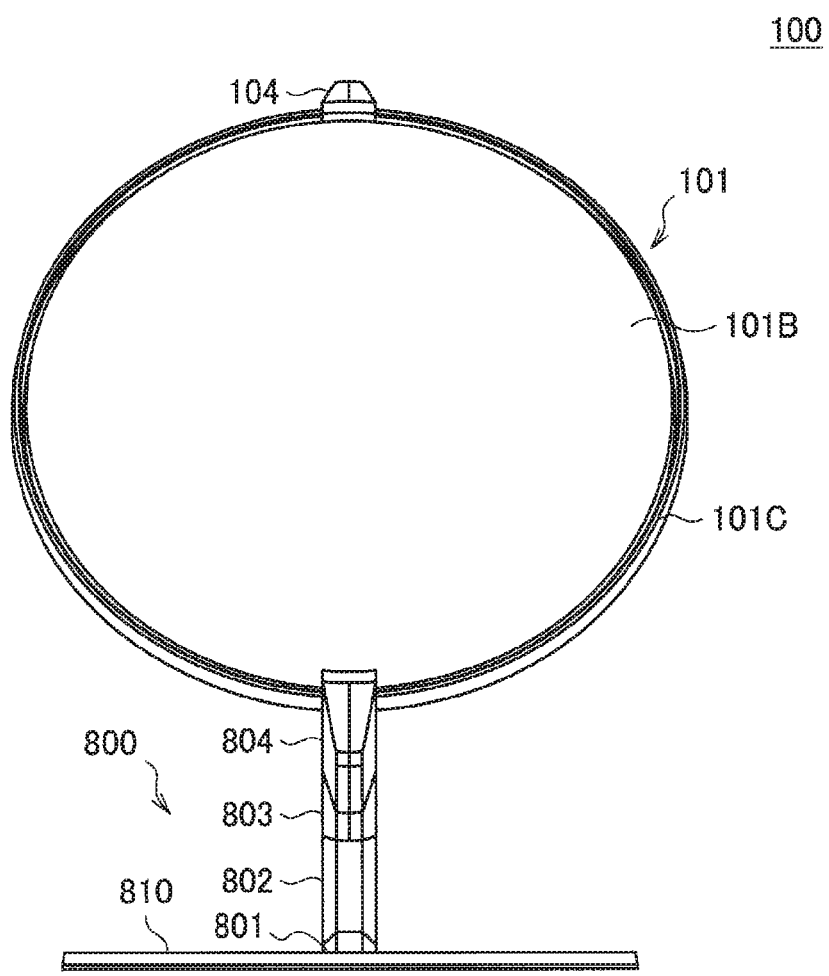
FIG. 67 is a diagram illustrating a first configuration example of the smaller dome display 100.
Figure 68:
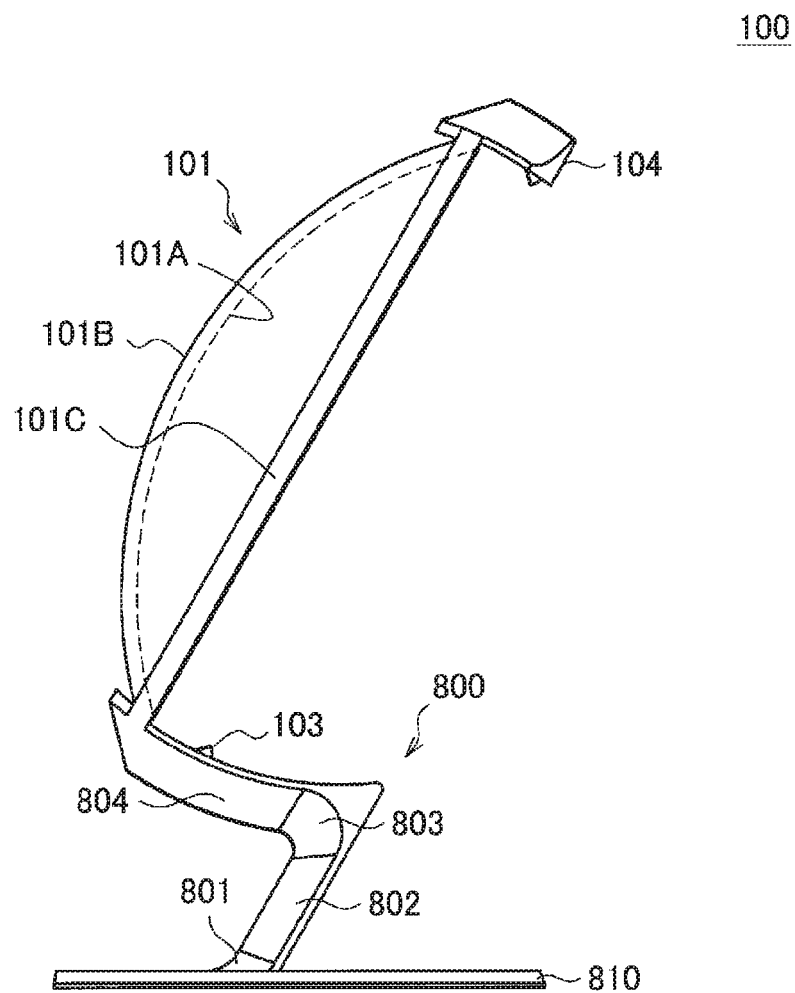
FIG. 68 is a diagram illustrating a first configuration example of the smaller dome display 100.
Figure 69:
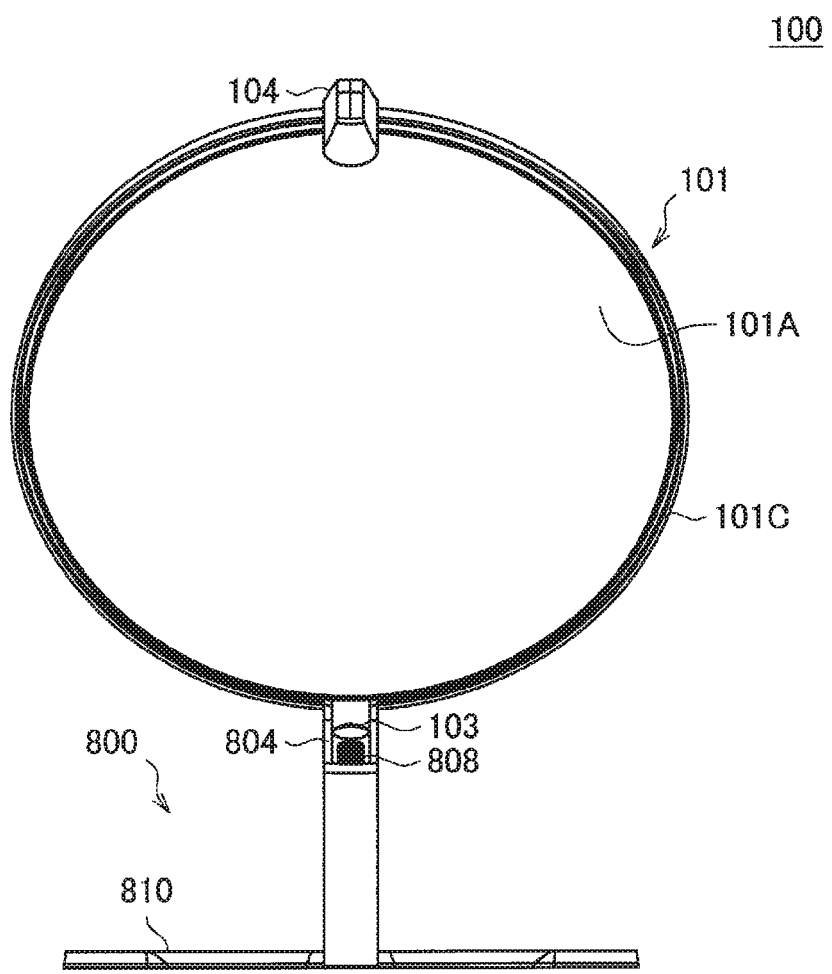
FIG. 69 is a diagram illustrating a first configuration example of the smaller dome display 100.
Figure 70:
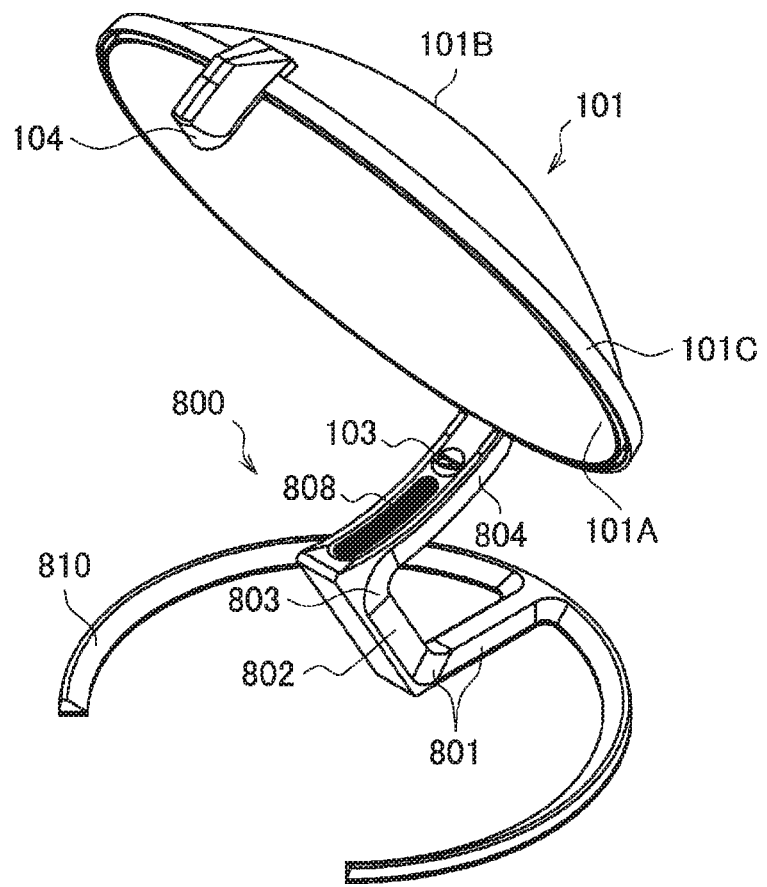
FIG. 70 is a diagram illustrating a first configuration example of the smaller dome display 100.
Figure 71:
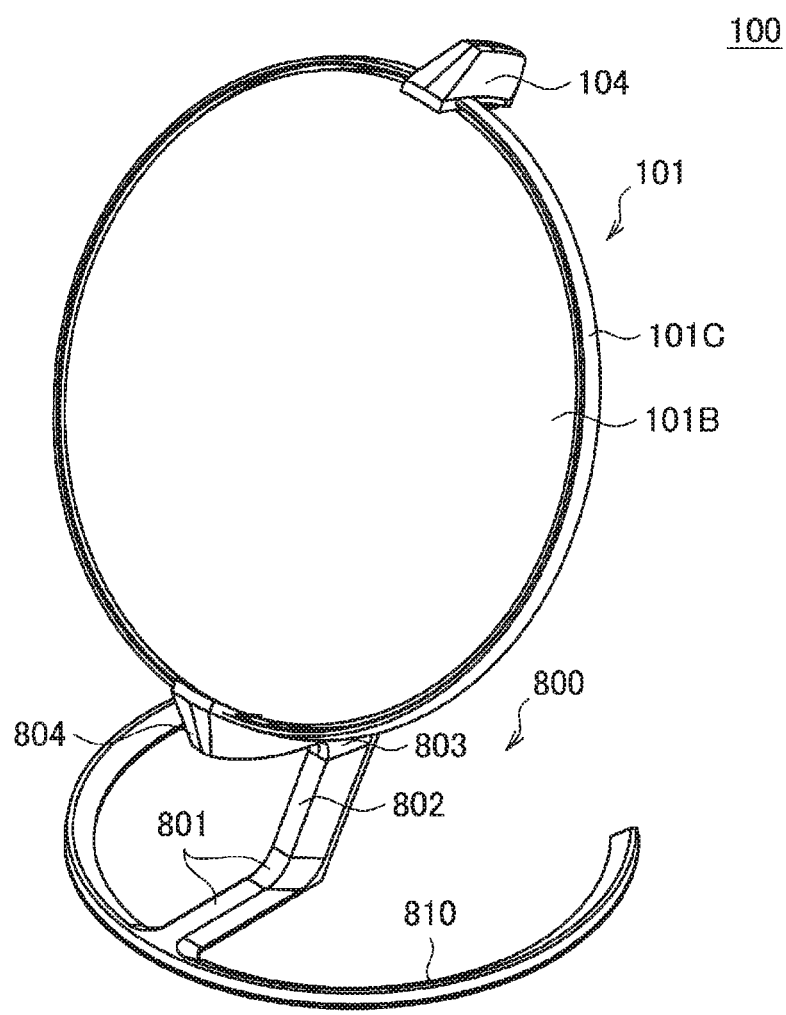
FIG. 71 is a diagram illustrating a first configuration example of the smaller dome display 100.

FIGS. 66 to 71 are diagrams illustrating a first configuration example of the further miniaturized dome display 100. FIGS. 66 to 71 are diagrams illustrating the same dome display 100 when viewed in different directions. FIG. 66 is a right-side view, FIG. 67 is a rear-side view, FIG. 68 is a left-side view, FIG. 69 is a front-side view, and FIGS. 70 and 71 are perspective views.

The dome display 100 illustrated in FIGS. 66 to 71 is a display device that includes the dome screen 101 that has a substantial dome shape, the projector 103, the projector 104, and a support body 800.

The dome screen 101 includes a dome projection surface 101A (dome surface) to which a video is projected, a dome outer surface 101B, and a dome support frame 101C. In the example illustrated in FIGS. 66 to 71, a width between the dome projection surface 101A and the dome outer surface 101B may be constant (an equal width). For example, the shapes of the dome projection surface 101A and the dome outer surface 101B may be parts of spheres that share a center and different diameters. In addition, the dome projection surface 101A viewed from the side surfaces as in FIGS. 66 and 68 may have a circular arc shape with a diameter of 2200 mm.

In the example illustrated in FIGS. 66 to 71, the side of the dome projection surface 101A of the dome screen 101 is inclined toward a user (not illustrated). In this configuration, dust is rarely attached and indoor light rarely reaches the dome projection surface 101A, and thus a sensation of immersion is configured to be rarely inhibited. Note that in the example illustrated in FIGS. 66 to 71, an angle between the dome screen 101 and the surface of a floor is about 60 degrees, but is not limited to this example.

While the dome support frame 101C is connected to the support body 800 and is inclined with respect to the side of the user (not illustrated) to extend upwards, the dome support frame 101C supports the dome projection surface 101A and the dome outer surface 101B, thereby improving rigidity (solidity) of the entire device. In the example illustrated in FIGS. 66 to 71, the dome support frame 101C is a frame that has a ring shape fixed along the edge of the dome screen 101. Although not illustrated, an electric system (for example, an electric wiring or the like) capable of supplying at least power to the plurality of projectors 103 and 104 may be provided inside the dome support frame 101C. In addition, although not illustrated, in the dome support frame 101C, connection units (for example, plug-in ports, outlets, or the like) to which power from the electric system can be supplied to the plurality of projectors 103 and 104 may be provided. The projector 104 may be detachably mounted on any spot of the dome support frame 101C, for example, appropriately mounted on a portion in which a connection unit of the dome support frame 101C is provided or the vicinity of the connection unit so that power is supplied from the connection unit to the projector 104.

Note that for miniaturization and weight reduction of the entire dome display 100, the dome screen 101 is preferably lightweight and is more preferably formed of a lightweight or rigid material.

The projectors 103 and 104 are fixed to the dome screen 101 and project a video to the dome screen 101 in cooperation on the basis of a baseband video signal. Note that, in the present disclosure, the fixing to the dome screen 101 means disposition in a state in which a relative positional relation with the dome screen 101 is fixed and is not limited to direct connection to the dome screen 101. In addition, in the present disclosure, an expression of the fixing is used as an expression including detachable fixing.

In addition, the projectors 103 and 104 are fixed to the edge of the dome screen 101. In the example illustrated in FIGS. 66 to 71, the projector 103 (a first projector) is disposed inside the support 800 and is disposed in a portion connected to the dome screen 101 in the support body 800 (a first edge of the dome screen 101). In addition, in the example illustrated in FIGS. 66 to 71, the projector 104 (a second projector) is disposed in a portion (a second edge of the dome screen 101) above the dome support frame 101C facing the first edge in the vertical direction. That is, the projector 104 is disposed above the projector 103.

Note that for miniaturization and weight reduction of the entire dome display 100, the projectors 103 and 104 are preferably small and lightweight.

In this way, in the example illustrated in FIGS. 66 to 71, the projectors 103 and 104 are disposed in the lower edge and the upper edge of the dome screen 101. As in the example illustrated in FIG. 13 or the like, in the example illustrated in FIGS. 66 to 71, the projectors 103 and 104 do not protrude to both sides of the dome screen 101 in the horizontal direction, compared to the example in which the projectors are disposed to protrude to both sides of the dome screen 101 in the horizontal direction. In this configuration, for example, it is possible to suppress occurrence of an event in which a person passing near the dome display 100 collides with the projectors and the disposition of the projectors is shifted, and a relative positional relation between the dome screen 101 and the projectors is rarely changed.

The support body 800 is disposed below the dome screen 101 and supports the dome screen 101. In the example illustrated in FIGS. 66 to 71, the support body 800 includes a first support unit 801, a second support unit 802, a third support unit 803, a fourth support unit 804, and a base unit 810. Note that the first support unit 801, the second support unit 802, the third support unit 803, and the fourth support unit 804 are collectively referred to as a support unit.

The first support unit 801 is grounded on the surface of a floor or the surface of the ground and is connected to the base unit 810. The second support unit 802 is connected to the first support unit 801 to extend to the upper side of the first support unit 801. The third support unit 803 connects the second support unit 802 to the fourth support unit 804. Note that the second support unit 802 and the third support unit 803 support a load of the dome screen 101 as one brace, as will be described below. The fourth support unit 804 connects the third support unit 803 to the dome screen 101 and extends from the third support unit 803 to the side of the dome screen 101 on the front side when viewed from the user side (not illustrated). The fourth support unit 804 may contain the projector 103.

In addition, a wind blowing fan 808 is provided inside the fourth support unit 804. The wind blowing fan 808 is controlled by the above-described control unit 910 (an output control unit) to output (blow) a wind to the user. For example, in a case where the wind blowing fan 808 is combined with the above-described fitness bike 1600, the control unit 910 may control an output of the wind blowing fan 808 such that a wind is output in accordance with a speed at which the user is pedaling the fitness bike 1600.

Note that, although not illustrated, an audio device such as the speaker 936 or other devices may be provided inside the fourth support unit 804, the first support unit 801, the second support unit 802, or the third support unit 803. In this configuration, an unnecessary unit is rarely within a viewing field of the user other than the dome screen 101, and thus the user can further obtain a sensation of immersion. In addition, in this configuration, the installation is easy and choices of installation spots increase.

The base unit 810 is connected to the first support unit 801, ensures a grounding area so that the load of the entire dome display 100 can be withstood, and supports the entire dome display 100. The base unit 810 may have a concave shape or may have a substantially circular arc shape, for example, as illustrated in FIGS. 70 and 71. In this configuration, an object such as the above-described chair 1000 or fitness bike 1600 which the user can mount can be disposed inside the base unit 810 (inside the concave shape) and the user can view a video at a position at which the user can obtain a sensation of immersion.

Note that each configuration of the dome display 100 described above may be integrated. In particular, the first support unit 801, the second support unit 802, the third support unit 803, the fourth support unit 804, and the entire support body 800 may be formed to be integrated.

Compared to the configuration examples of the dome display 100 illustrated in FIGS. 1 to 7 and 13 to 16, the entire configuration of the dome display 100 illustrated in FIGS. 66 to 71 is miniaturized. In particular, compared to the support body 102 illustrated in FIGS. 1 to 7, 13 to 16, or the like, the support body 800 illustrated in FIGS. 66 to 71 has a miniature (simple) configuration, and thus the weight can also be reduced. However, for miniaturization, stability of the dome display 100 is lost. For example, it is not preferable that the dome display 100 be overturned. Therefore, the support body 800 illustrated in FIGS. 66 to 71 is configured to be able to support the weight of the dome screen 101 and the projectors 103 and 104 more efficiently since stability is maintained and overturning is suppressed.

Specifically, weight balance of the dome display 100 will be described with reference to FIGS. 66 and 68 which are side views. A sum load of the projectors 103 and the dome screen 101 is mainly applied to the fourth support unit 804 that contains the projector 103. On the other hand, a load of the projector 104 is mainly applied to the projector 104 located above the fourth support unit 804 that contains the projector 103. Accordingly, in a case where the weights of the projectors 103 and 104 are nearly the same, a larger load is applied to the fourth support unit 804 that contains the projector 103 located lower than on the projector 104 located higher. Therefore, the load is concentrated on the second support unit 802 and the third support unit 803 located between the projectors 103 and 104 and serving as one supporting brace in the horizontal direction. Further, the load applied to the second support unit 802 and the third support unit 803 is applied to the base unit 810 that has a larger grounding area and also expands in the horizontal direction via the grounding first support unit 801. In this way, although the support body 800 illustrated in FIGS. 66 to 71 is configured to be more miniature than the support body 102 illustrated in FIGS. 1 to 7 or 13 to 16, the support body 800 can efficiently support the weight and can also suppress overturning.

The first configuration example of the more miniature dome display 100 has been described above with reference to FIGS. 66 to 71. Note that the example in which the dome display 100 includes two projectors 103 and 104 has been described with reference to FIGS. 66 to 71, but the dome display 100 may include more projectors. By including more projectors, the dome display 100 can improve luminance and a resolution of a video to be displayed.

Figure 72:
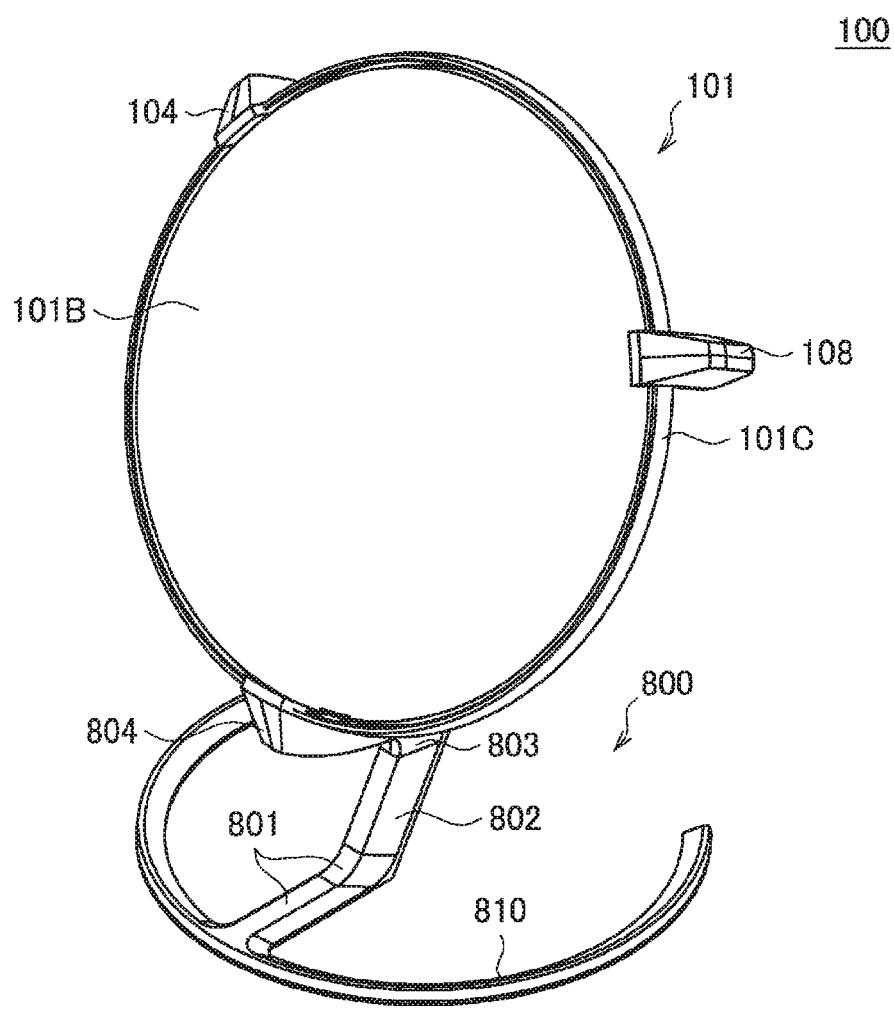
FIG. 72 is a diagram illustrating a configuration example in which the dome display 100 includes three projectors in the configuration example.
Figure 73:
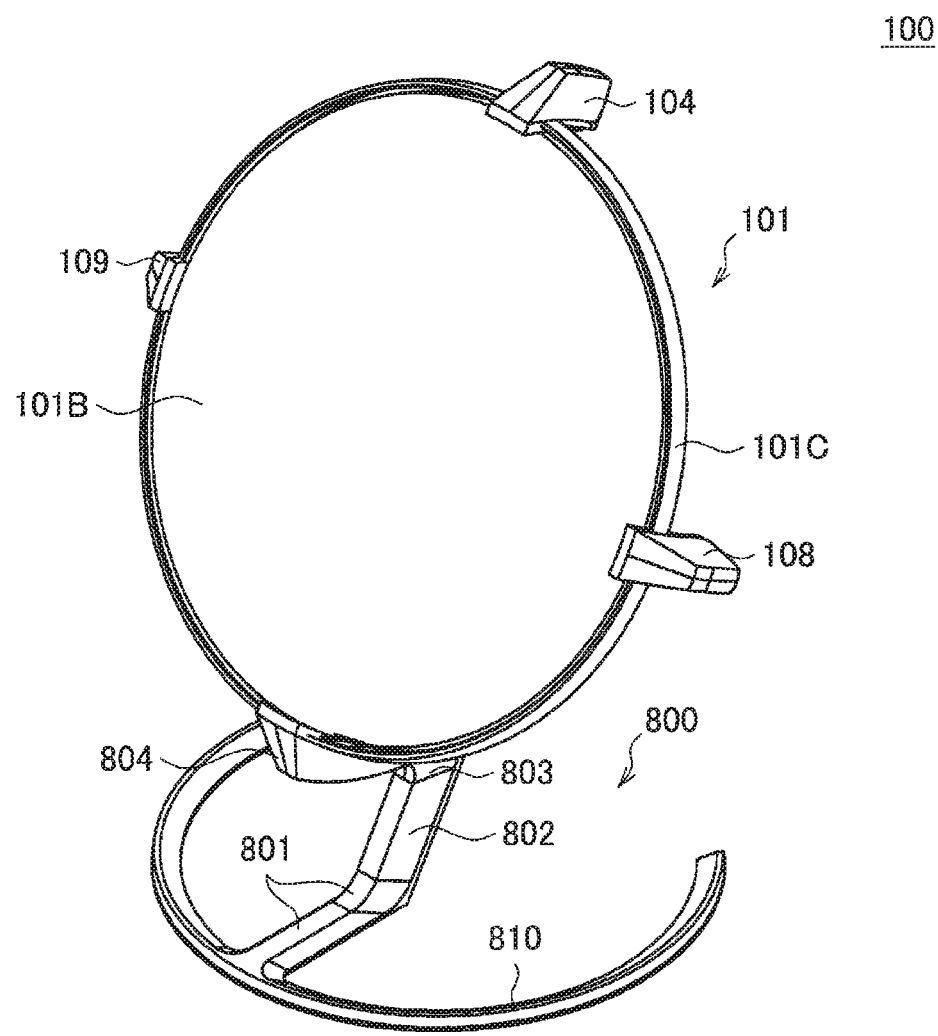
FIG. 73 is a diagram illustrating a configuration example in which the dome display 100 includes four projectors in the configuration example.

FIG. 72 is a diagram illustrating a configuration example in which the dome display 100 includes three projectors in the present configuration example. In addition, FIG. 73 is a diagram illustrating a configuration example in which the dome display 100 includes four projectors in the present configuration example. In the example illustrated in FIGS. 72 and 73, a configuration other than the projector disposition may be similar to that of the example illustrated in FIGS. 66 to 71.

In the example illustrated in FIG. 72, disposition of the projector 103 (not illustrated) is similar to that of the example illustrated in FIGS. 66 to 71. In addition, projectors 104 and 108 illustrated in FIG. 72 are mounted on a dome support frame 101C of the edge of the dome screen 101 and are disposed to be bilaterally symmetric. In this configuration, since the weight is balanced in the horizontal direction and the load is concentrated on the second support unit 802 and the third support unit 803 serving as one supporting brace, stability of the entire dome display 100 is maintained. In addition, the three projectors 103, 104, and 108 may be disposed so that an angle is substantially equal from the center of the dome outer surface 101B. In this configuration, the luminance or resolution of a video projected to the dome projection surface 101A is equalized.

In the example illustrated in FIG. 73, disposition of the projector 103 and disposition of the projector 104 (not illustrated) are similar to the example illustrated in FIGS. 66 to 71. In addition, projectors 108 and 109 illustrated in FIG. 73 are mounted on a dome support frame 101C of the edge of the dome screen 101 and are disposed to be bilaterally symmetric. In this configuration, since the weight is balanced in the horizontal direction and the load is concentrated on the second support unit 802 and the third support unit 803 serving as one supporting brace, stability is maintained. In addition, the four projectors 103, 104, 108, and 109 may be disposed so that an angle is substantially equal from the center of the dome outer surface 101B. In this configuration, the luminance or resolution of a video projected to the dome projection surface 101A is equalized.

(Second Configuration Example of further Miniaturized Dome Display 100)

Figure 74:
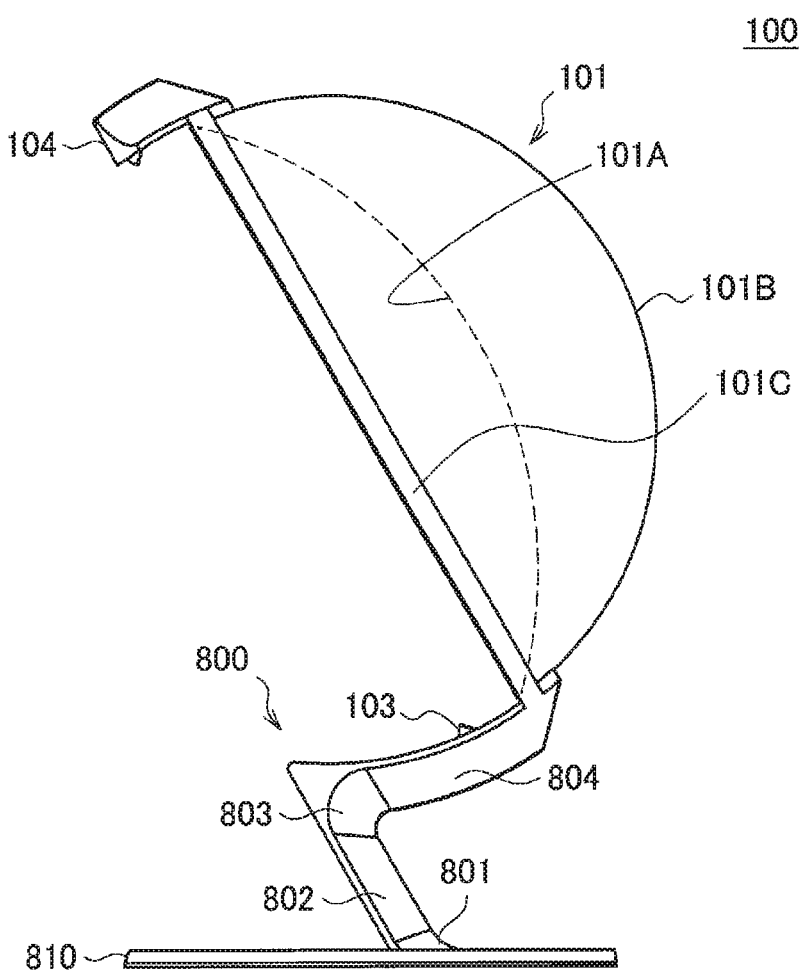
FIG. 74 is a diagram illustrating a second configuration example of the smaller dome display 100.
Figure 75:
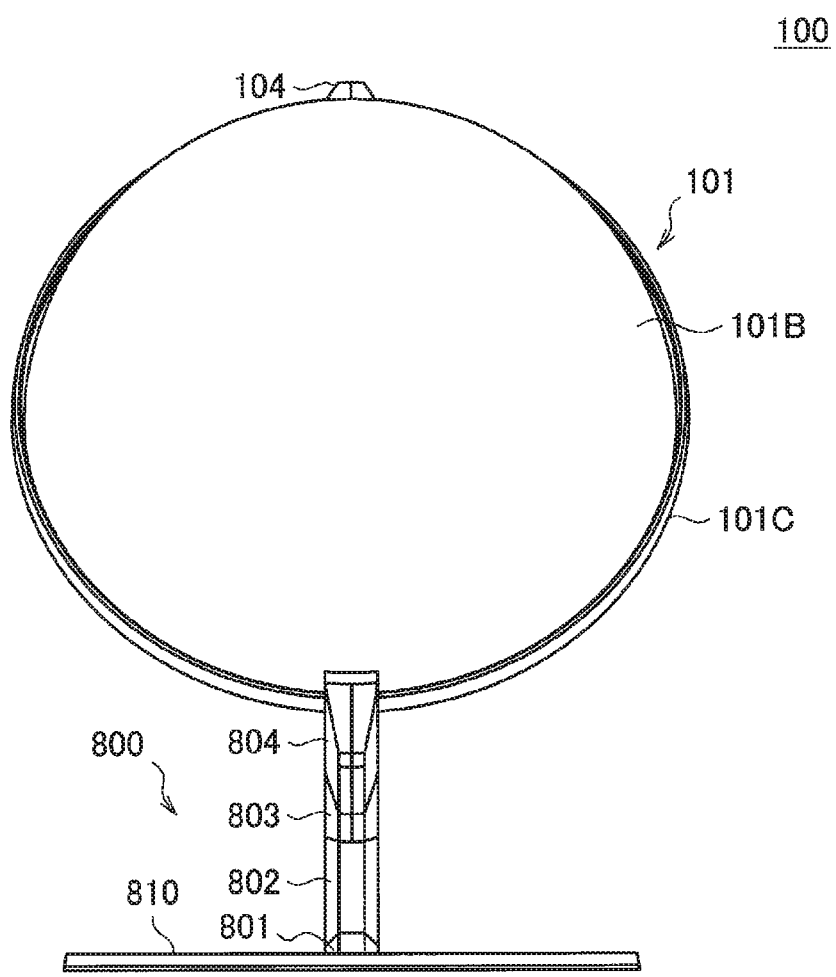
FIG. 75 is a diagram illustrating a second configuration example of the smaller dome display 100.
Figure 76:
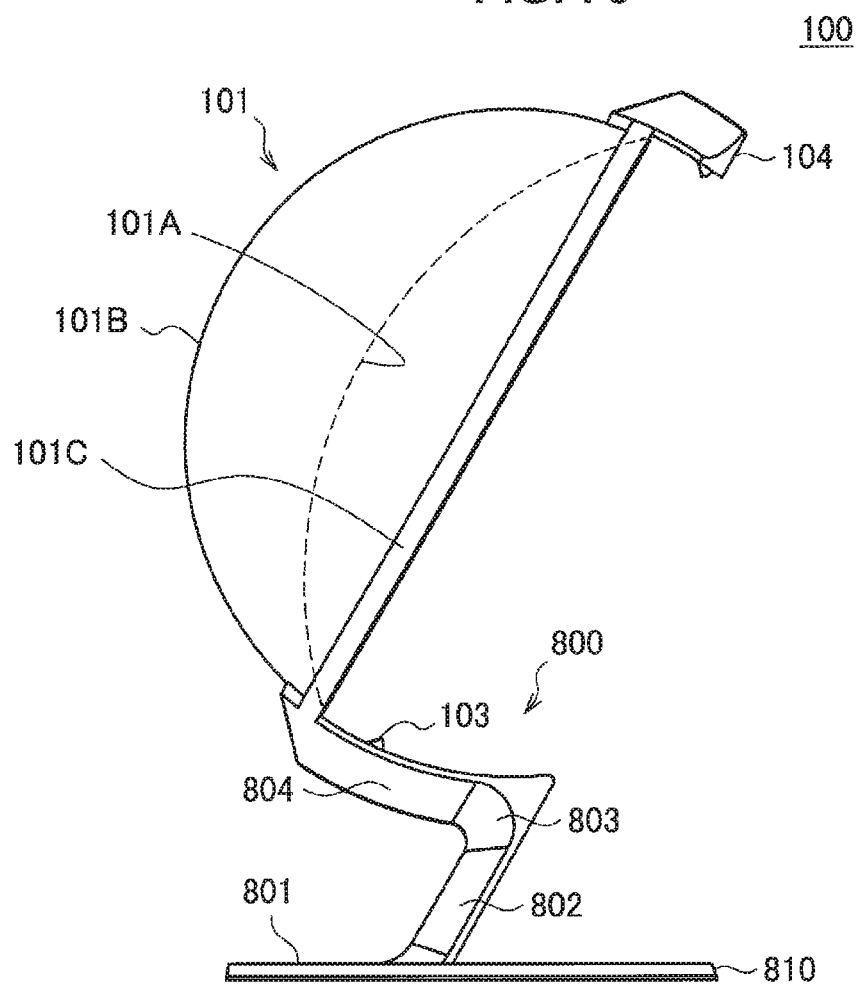
FIG. 76 is a diagram illustrating a second configuration example of the smaller dome display 100.
Figure 77:
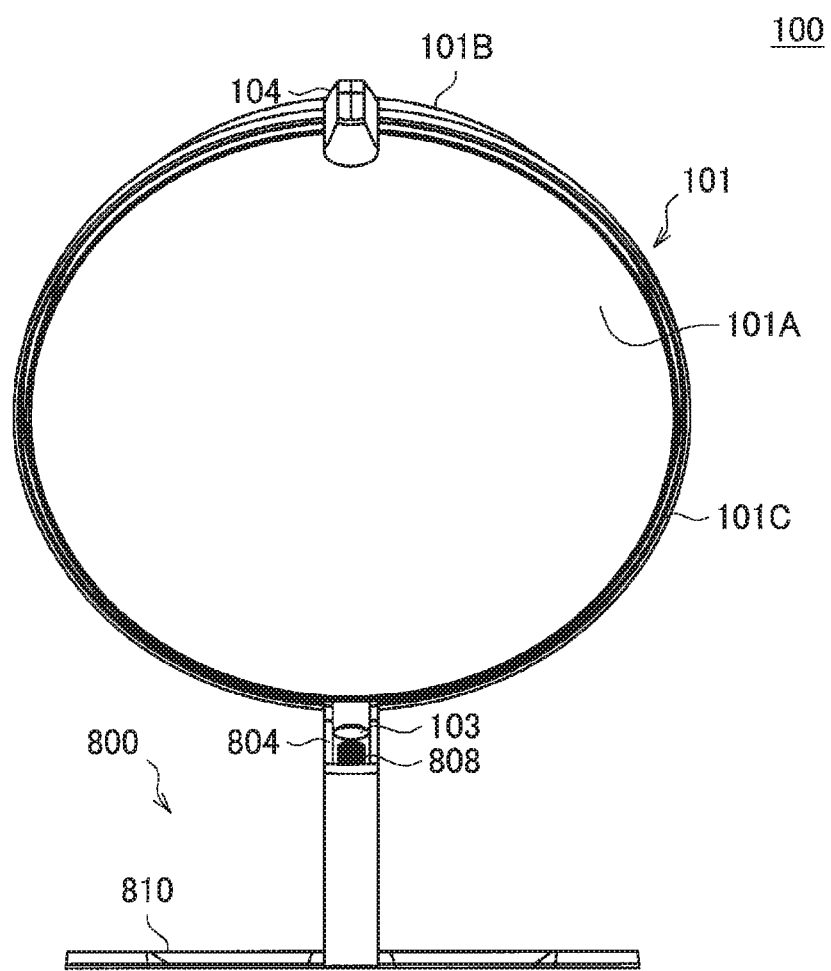
FIG. 77 is a diagram illustrating a second configuration example of the smaller dome display 100.
Figure 78:
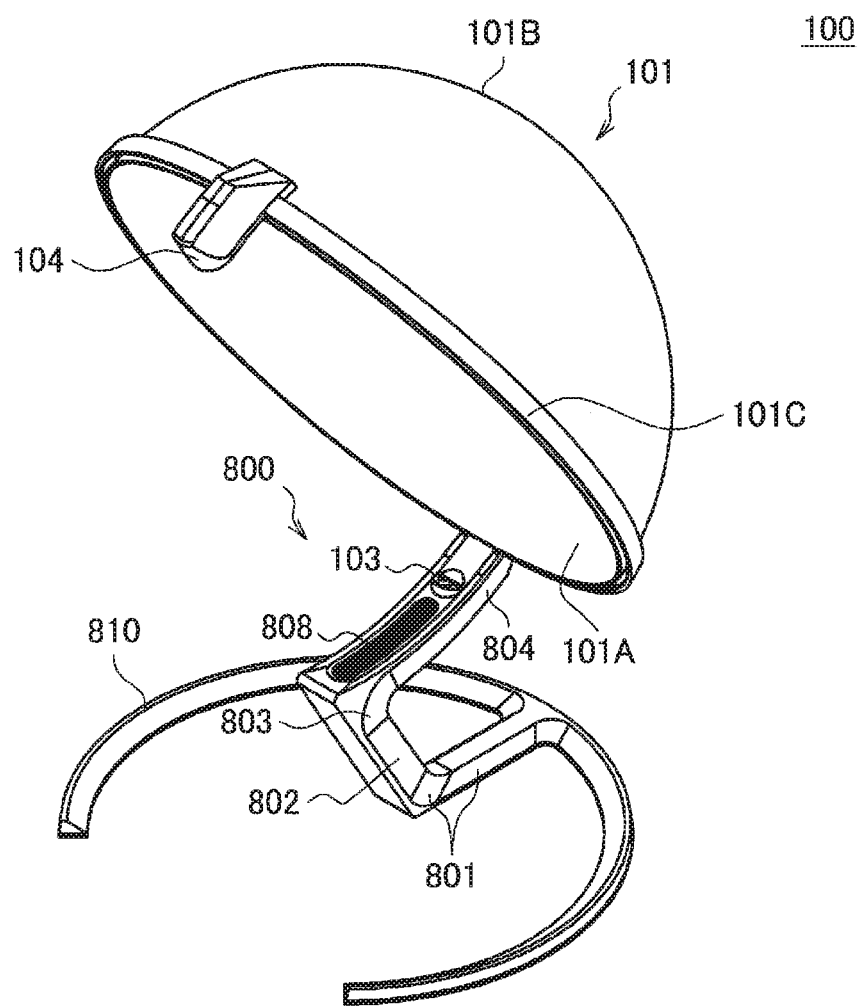
FIG. 78 is a diagram illustrating a second configuration example of the smaller dome display 100.
Figure 79:
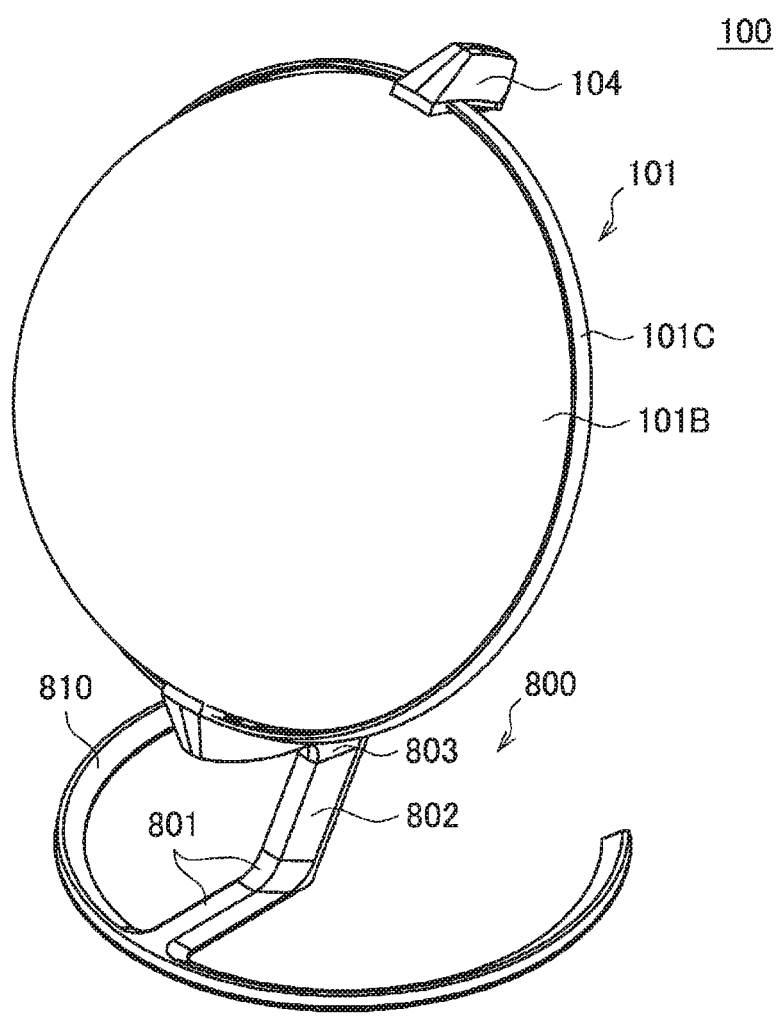
FIG. 79 is a diagram illustrating a second configuration example of the smaller dome display 100.

FIGS. 74 to 79 are diagrams illustrating a second configuration example of the further miniaturized dome display 100. FIGS. 74 to 79 are diagrams illustrating the same dome display 100 when viewed in different directions. FIG. 74 is a right-side view, FIG. 75 is a rear-side view, FIG. 76 is a left-side view, FIG. 77 is a front-side view, and FIGS. 78 and 79 are perspective views.

The dome display 100 illustrated in FIGS. 74 to 79 is a display device that includes the dome screen 101 that has a substantial dome shape, the projector 103, the projector 104, and the support body 800. Note that since each configuration of the dome display 100 illustrated in FIGS. 74 to 79 is a configuration partly similar to the configuration of the above-described dome display 100 illustrated in FIGS. 66 to 71, description of similar portions will be appropriately omitted.

The dome screen 101 includes the dome projection surface 101A (some surface) to which a video is projected, the dome outer surface 101B, and the dome support frame 101C. In the example illustrated in FIGS. 74 to 79, a width between the dome projection surface 101A and the dome outer surface 101B may not be constant. For example, the shapes of the dome projection surface 101A and the dome outer surface 101B may be parts of spheres that share a center and different diameters. In addition, in a case where the dome projection surface 101A is viewed from the side surfaces as in FIGS. 74 and 76, the dome projection surface 101A may have a circular arc shape with a diameter of 2200 mm and the dome outer surface 101B may have a circular arc shape with a diameter of 1600 mm.

In this configuration, compared to the dome screen 101 illustrated in FIGS. 66 to 71, a physical intensity and resistance to thermal deformation can increase in the dome screen 101 illustrated in FIGS. 74 to 79.

Additionally, each configuration of the dome support frame 101C, the projector 103, the projector 104, and the support body 800 illustrated in FIGS. 74 to 79 is similar to each corresponding configuration described with reference to FIGS. 66 to 71. In addition, in the dome screen 101 illustrated in FIGS. 74 to 79, the dome outer surface 101B is larger compared to the dome screen 101 illustrated in FIGS. 66 to 71. Therefore, the weight of the dome screen 101 can increase. However, as in the example described with reference to FIGS. 66 and 68, the weight is balanced in the dome display 100 illustrated in FIGS. 74 to 79. Therefore, the support body 800 can be stable and support the dome screen 101 and the projectors 103 and 104.

The second configuration example of the more miniature dome display 100 has been described above with reference to FIGS. 74 to 79. Note that the example in which the dome display 100 includes two projectors 103 and 104 has been described with reference to FIGS. 74 to 79, but the dome display 100 may include more projectors.

Figure 80:
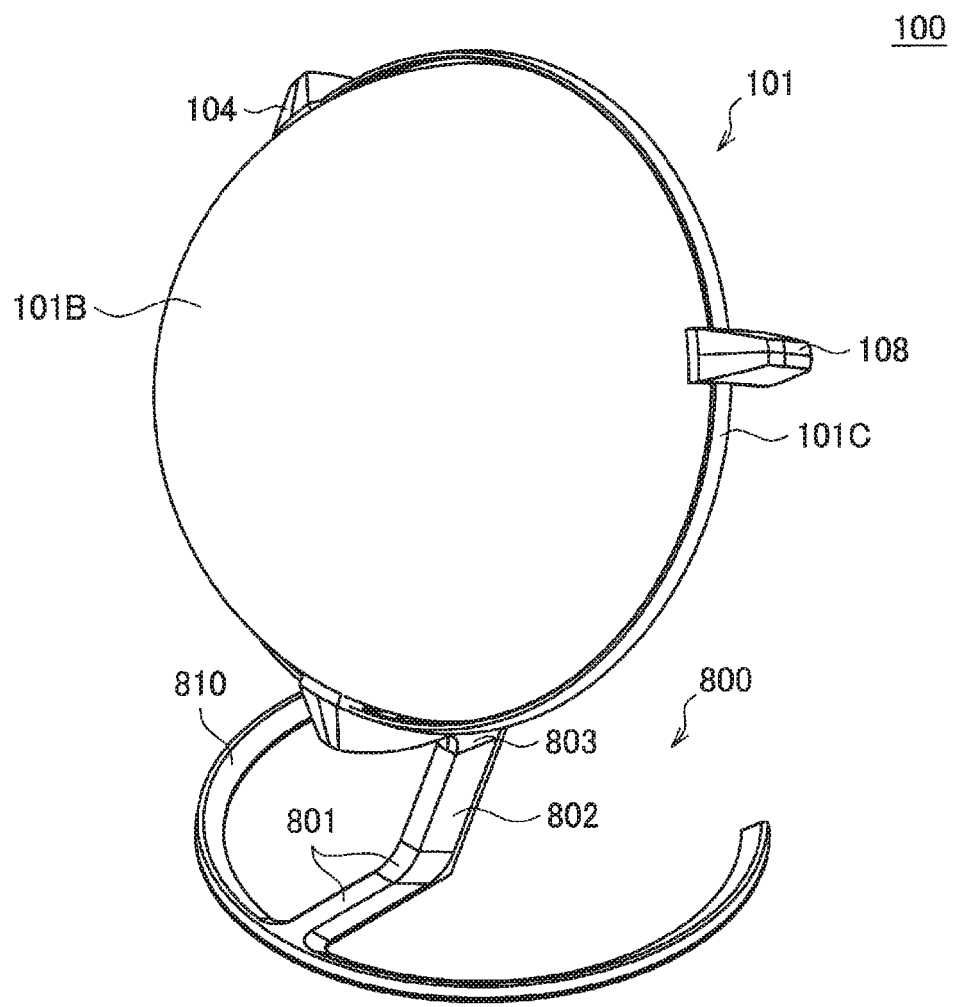
FIG. 80 is a diagram illustrating a configuration example in which the dome display 100 includes three projectors in the configuration example.
Figure 81:
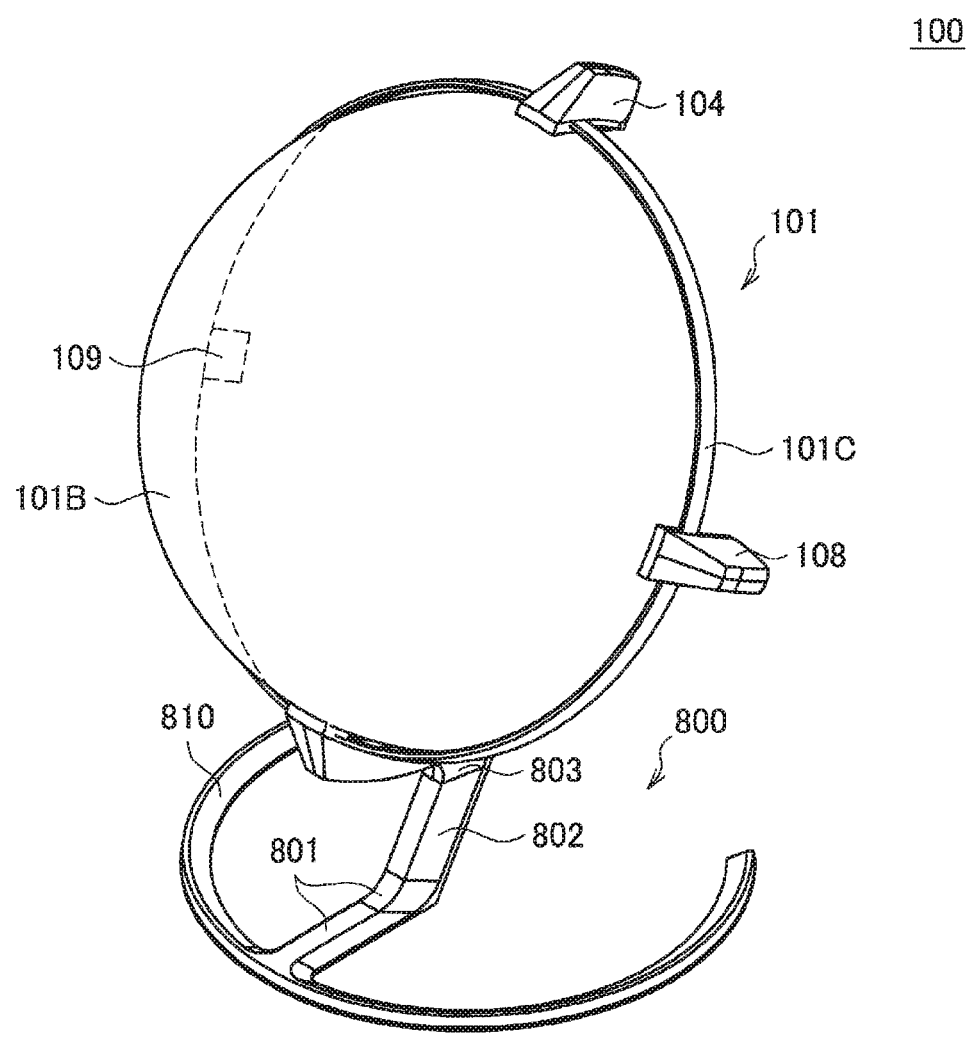
FIG. 81 is a diagram illustrating a configuration example in which the dome display 100 includes four projectors in the configuration example.

FIG. 80 is a diagram illustrating a configuration example in which the dome display 100 includes three projectors in the present configuration example. In addition, FIG. 81 is a diagram illustrating a configuration example in which the dome display 100 includes four projectors in the present configuration example. In the example illustrated in FIGS. 80 and 81, a width between the dome projection surface 101A and the dome outer surface 101B may not be constant, as described above, and the example may be similar to the example illustrated in each of FIGS. 72 and 73 except that the shape of the dome outer surface 101B is different.

(Third Configuration Example of further Miniaturized Dome Display 100)

Figure 82:
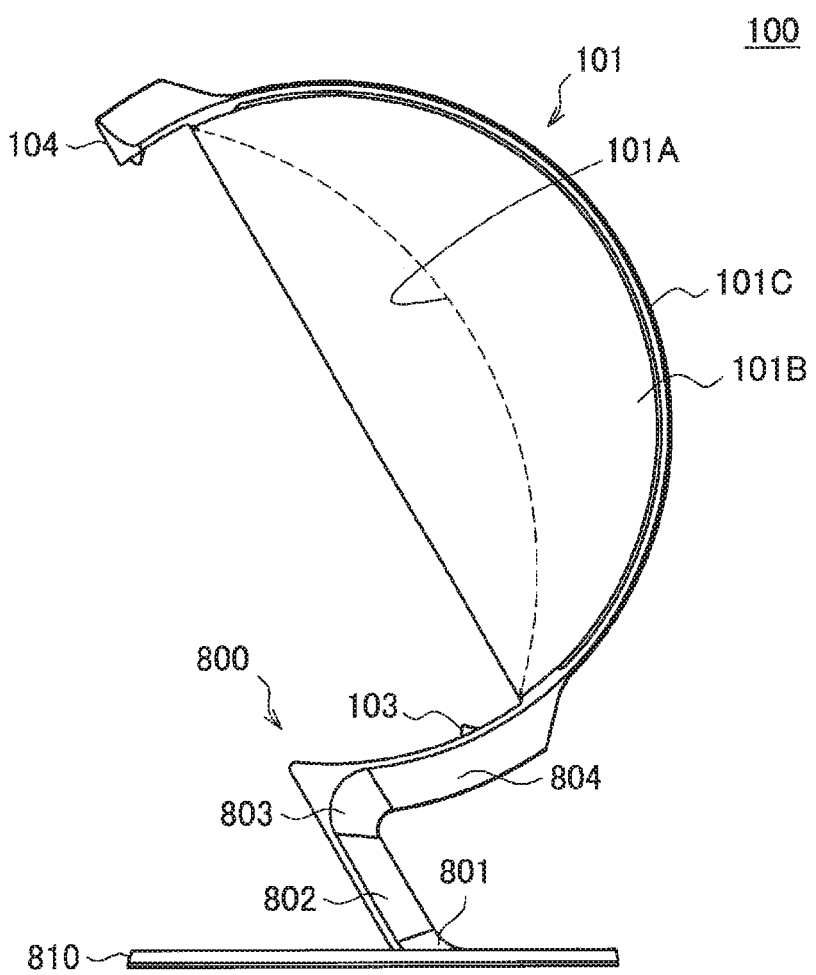
FIG. 82 is a diagram illustrating a third configuration example of a configuration example of the smaller dome display 100.
Figure 83:
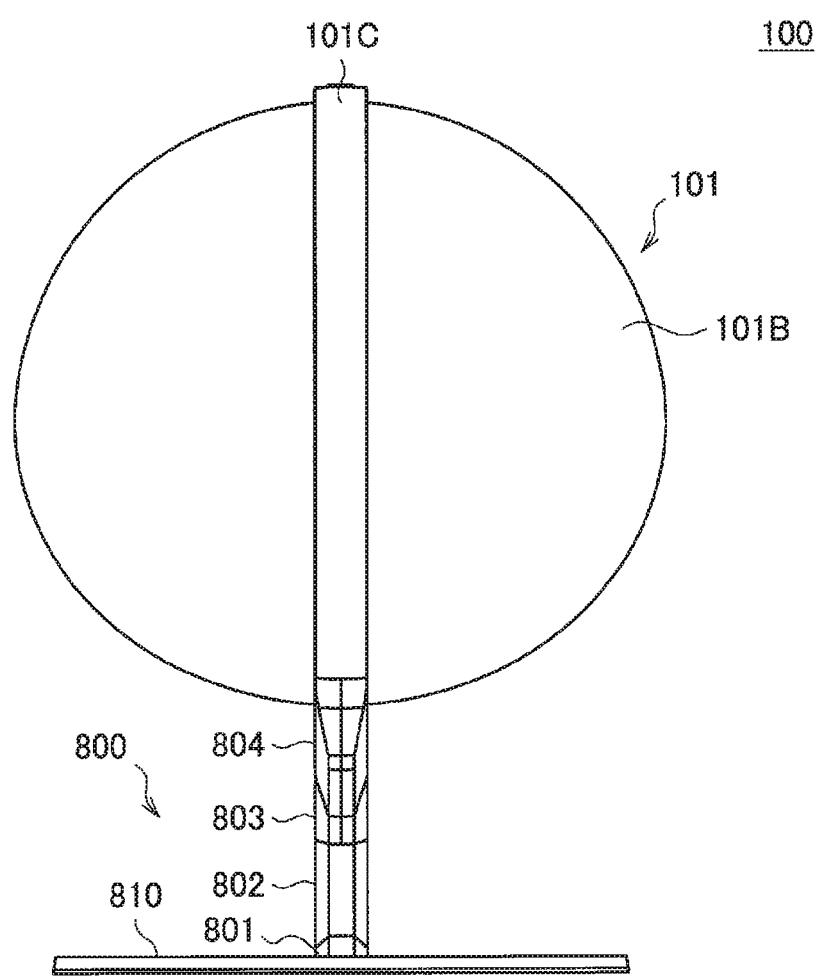
FIG. 83 is a diagram illustrating a third configuration example of a configuration example of the smaller dome display 100.
Figure 84:
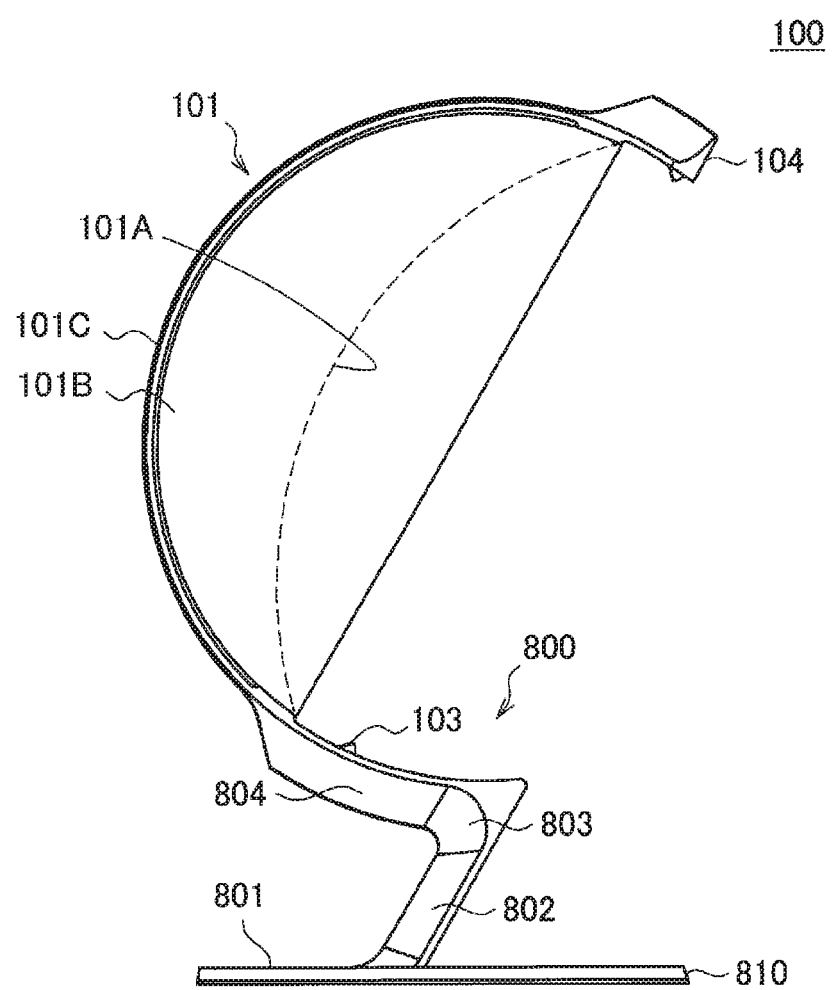
FIG. 84 is a diagram illustrating a third configuration example of a configuration example of the smaller dome display 100.
Figure 85:
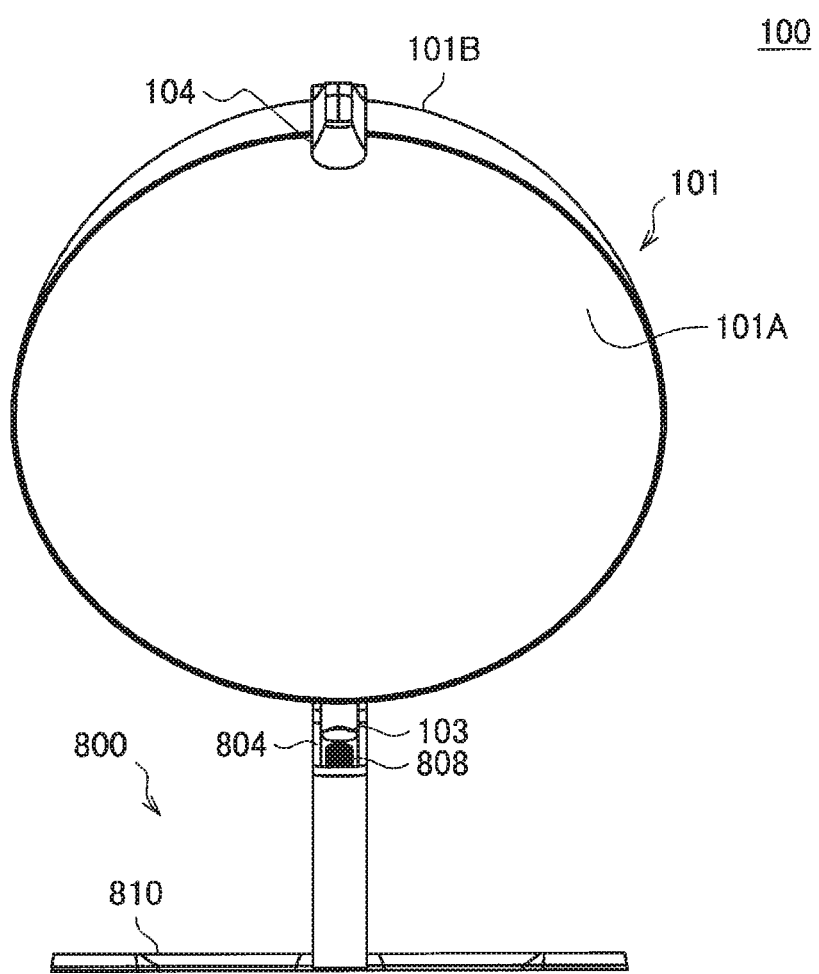
FIG. 85 is a diagram illustrating a third configuration example of a configuration example of the smaller dome display 100.
Figure 86:
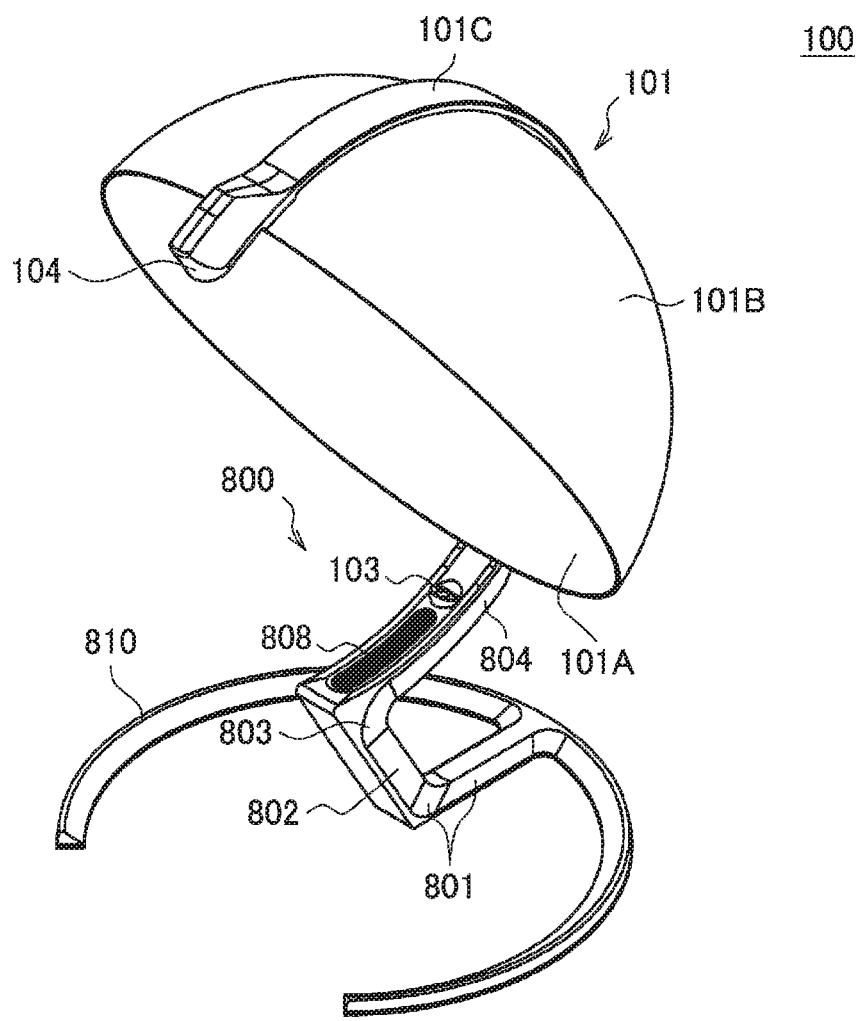
FIG. 86 is a diagram illustrating a third configuration example of a configuration example of the smaller dome display 100.
Figure 87:
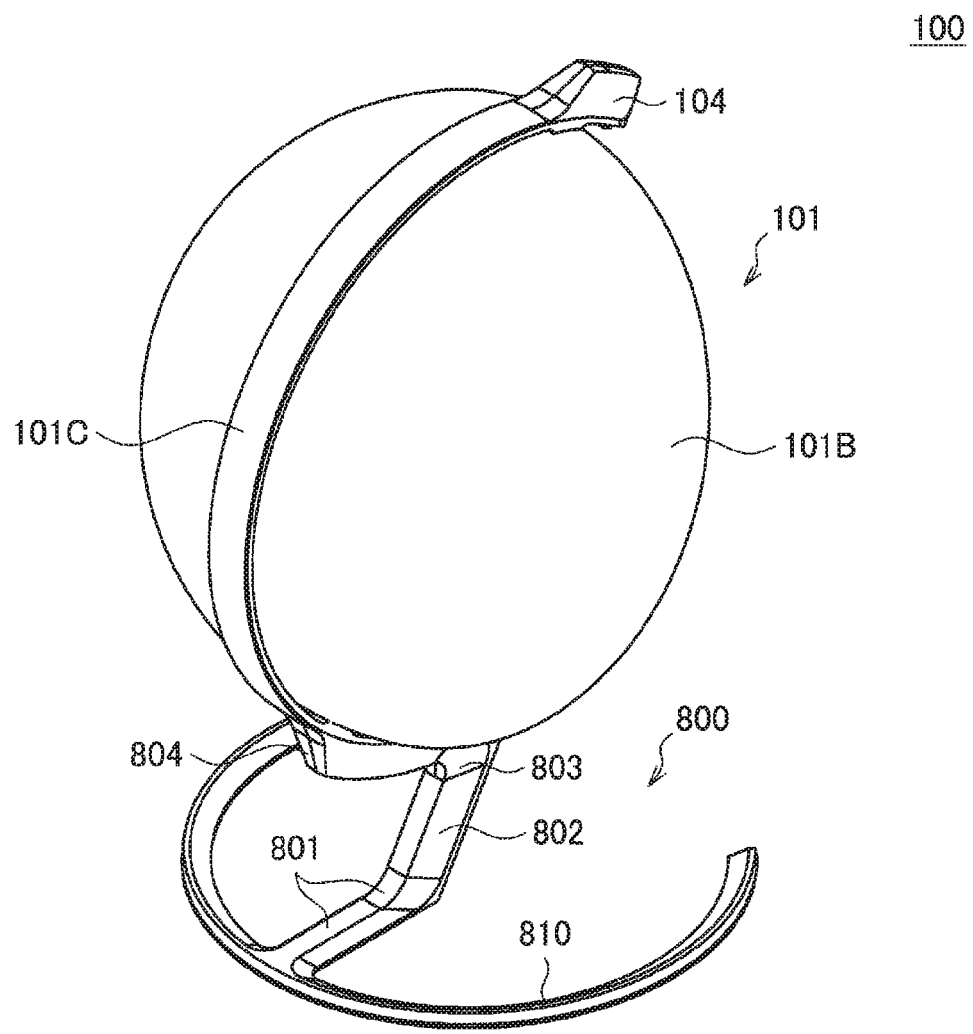
FIG. 87 is a diagram illustrating a third configuration example of a configuration example of the smaller dome display 100.

FIGS. 82 to 87 are diagrams illustrating a third configuration example of the further miniaturized dome display 100. FIGS. 82 to 87 are diagrams illustrating the same dome display 100 when viewed in different directions. FIG. 82 is a right-side view, FIG. 83 is a rear-side view, FIG. 84 is a left-side view, FIG. 85 is a front-side view, and FIGS. 86 and 87 are perspective views.

The dome display 100 illustrated in FIGS. 82 to 87 is a display device that includes the dome screen 101 that has a substantial dome shape, the projector 103, the projector 104, and the support body 800. Note that since each configuration of the dome display 100 illustrated in FIGS. 82 to 87 is a configuration partly similar to the configuration of the above-described dome display 100 illustrated in FIGS. 74 to 79, description of similar portions will be appropriately omitted.

The dome display 100 illustrated in FIGS. 82 to 87 is different from the dome display 100 illustrated in FIGS. 74 to 79 in that the shape of the dome support frame 101C included in the dome screen 101 is different. Accordingly, this point will be mainly described below.

In the example illustrated in FIGS. 82 to 87, the dome support frame 101C is connected to the support body 800 and supports the dome projection surface 101A and the dome outer surface 101B, thereby improving rigidity (solidity) of the entire device. Here, the dome support frame 101C illustrated in FIGS. 82 to 87 is an arm type frame that has a circular arc shape fixed to the rear surface side of the dome screen 101 along the dome outer surface 101B. In addition, in the example illustrated in FIGS. 82 to 87, the projector 104 is supported by the dome support frame 101C.

Note that, as in the above-described example, although not illustrated, an electric system (for example, an electric wiring or the like) capable of supplying at least power to the plurality of projectors 103 and 104 may be provided inside the dome support frame 101C. In addition, although not illustrated, in the dome support frame 101C, connection units (for example, plug-in ports, outlets, or the like) to which power from the electric system can be supplied to the plurality of projectors 103 and 104 may be provided.

Additionally, each configuration of the dome projection surface 101A, the dome outer surface 101B, the projector 103, and the support body 800 illustrated in FIGS. 82 to 87 may be similar to each corresponding configuration described with reference to FIGS. 74 to 79. Note that in the example illustrated in FIGS. 82 to 87, a width between the dome projection surface 101A and the dome outer surface 101B is not constant, as in the example illustrated in FIGS. 74 to 79, but the width between the dome projection surface 101A and the dome outer surface 101B may be constant as in the example illustrated in FIGS. 66 to 71.

In addition, as in the example described with reference to FIGS. 66 and 68, the weight is also balanced in the dome display 100 illustrated in FIGS. 82 to 87. Therefore, the support body 800 can be stable and support the dome screen 101 and the projectors 103 and 104.

The weight balance of the dome display 100 illustrated in FIGS. 82 to 87 will be described specifically. A sum load of the projectors 103 and the dome screen 101 is mainly applied to the fourth support unit 804 that contains the projector 103. On the other hand, a load of the projector 104 is mainly applied to the projector 104 located above the fourth support unit 804 that contains the projector 103 and mounted on the dome support frame 101C. Accordingly, in a case where the weights of the projectors 103 and 104 are nearly the same, a larger load is applied to the fourth support unit 804 that contains the projector 103 located lower than on the projector 104 located higher. Therefore, the load is concentrated on the second support unit 802 and the third support unit 803 located between the projectors 103 and 104 and serving as one supporting brace in the horizontal direction.

In addition, as illustrated in FIGS. 82 to 87, the dome display 100 has a substantially bilateral symmetric structure in the horizontal direction. In addition, in the present configuration example, the dome support frame 101C that has a circular arc shape is provided along the central axis of the dome display 100 in the horizontal direction and is connected to the fourth support unit 804. That is, the dome support frame 101C and the support units have a structure along the central axis of the dome display 100 in the horizontal direction. As described above, since the dome display 100 has the substantially bilateral symmetric structure in the horizontal direction, the weight of the dome screen 101 and the projectors 103 and 104 can be stably supported by the dome support frame 101C and the support units.

The third configuration example of the more miniature dome display 100 has been described above with reference to FIGS. 82 to 87. Note that the example in which the dome display 100 includes two projectors 103 and 104 has been described with reference to FIGS. 82 to 87, but the dome display 100 may include more projectors.

Figure 88:
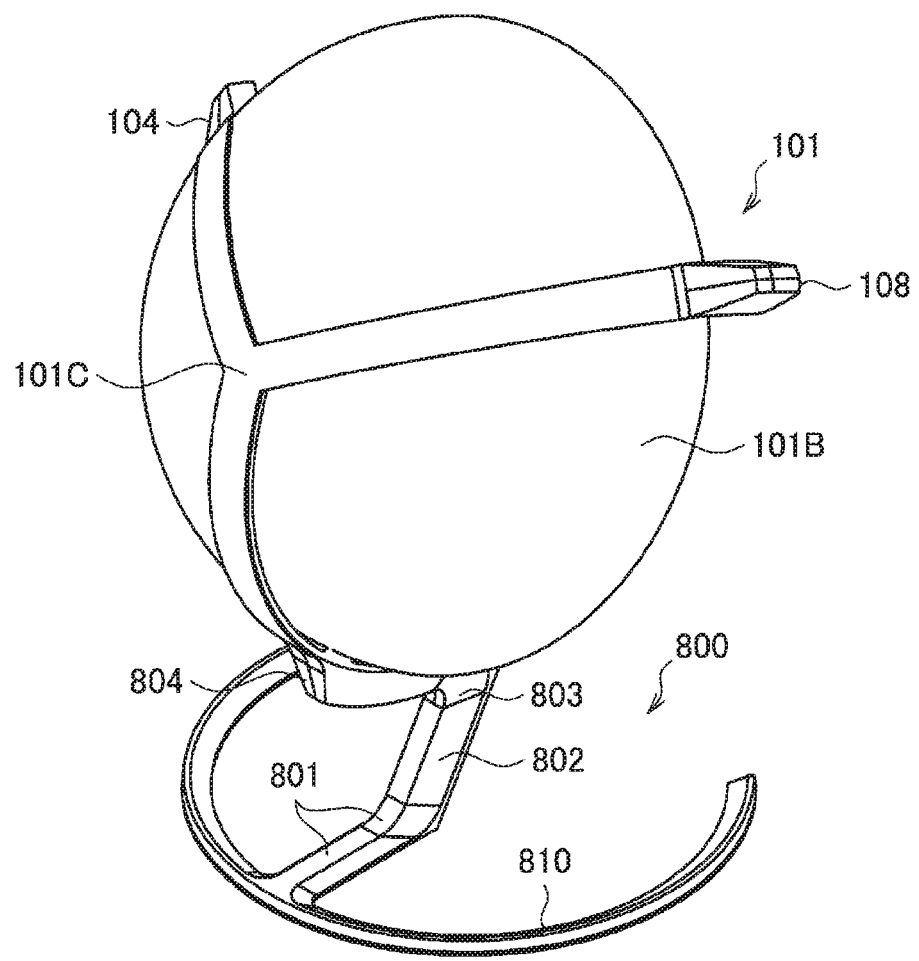
FIG. 88 is a diagram illustrating a configuration example in which the dome display 100 includes three projectors in the configuration example.
Figure 89:
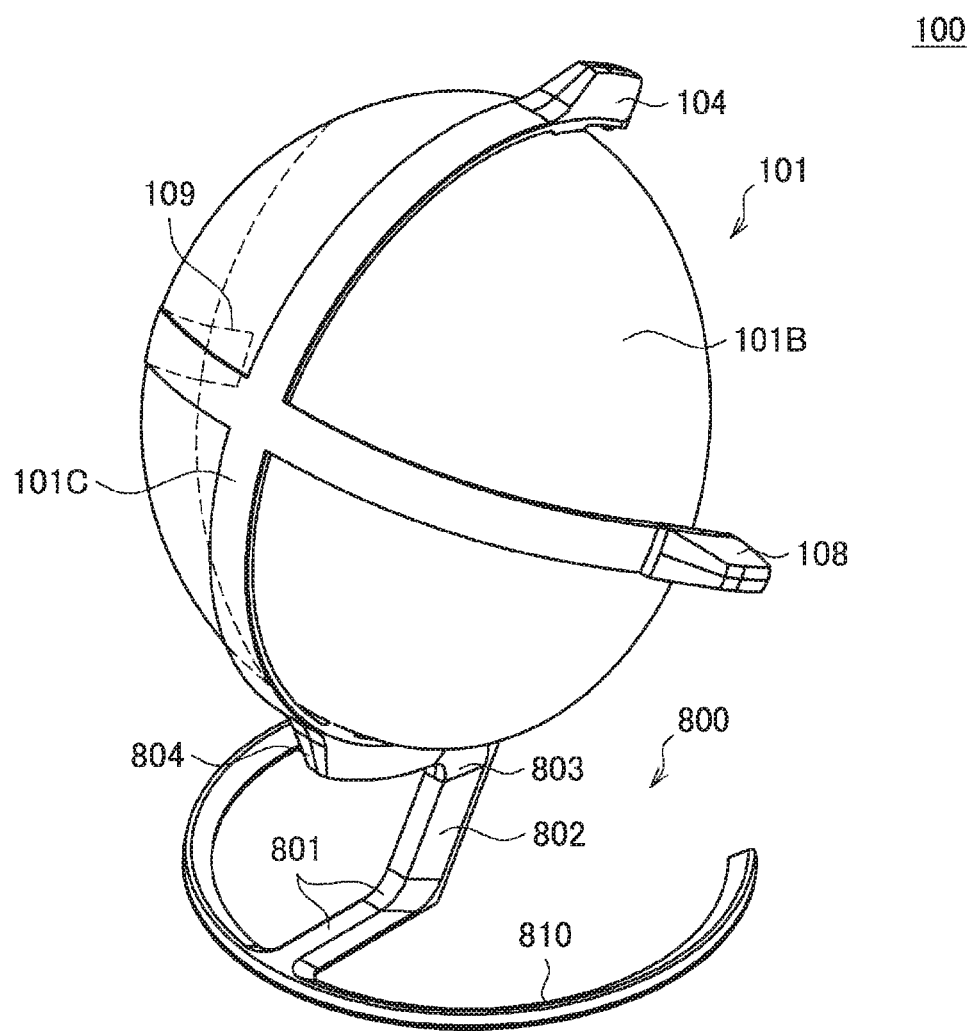
FIG. 89 is a diagram illustrating a configuration example in which the dome display 100 includes four projectors in the configuration example.

FIG. 88 is a diagram illustrating a configuration example in which the dome display 100 includes three projectors in the present configuration example. In addition, FIG. 89 is a diagram illustrating a configuration example in which the dome display 100 includes four projectors in the present configuration example. In the examples illustrated in FIGS. 88 and 89, the configuration except for projector disposition and a shape of the dome support frame 101C that supports each projector may be similar to the example illustrated in FIGS. 82 to 87.

In the example illustrated in FIG. 88, disposition of the projector 103 (not illustrated) is similar to the example illustrated in FIGS. 82 to 87. In addition, the projectors 104 and 108 illustrated in FIG. 88 are disposed at the edge of the dome screen 101 to be bilaterally symmetric as in the example illustrated in FIG. 72. Here, the projectors 104 and 108 illustrated in FIG. 88 are supported by the dome support frame 101C fixed to the rear surface side of the dome screen 101 along the dome outer surface 101B. The dome support frame 101C illustrated in FIG. 88 has a Y shape that extends upwards along the dome outer surface 101B from the fourth support unit 804 and branches into two portions at angles substantially equal on the right and left side near the center of the dome outer surface 101B. In this configuration, the weight can be balanced in the horizontal direction and the stability of the entire dome display 100 can be maintained.

In the example illustrated in FIG. 89, disposition of the projector 103 and disposition of the projector 104 (not illustrated) are similar to the example illustrated in FIGS. 82 to 87. In addition, the projectors 108 and 109 illustrated in FIG. 89 are disposed at the edge of the dome screen 101 to be bilaterally symmetric as in the example illustrated in FIG. 73. Here, the projectors 108 and 109 illustrated in FIG. 89 are supported by the dome support frame 101C fixed to the rear surface side of the dome screen 101 along the dome outer surface 101B. The dome support frame 101C illustrated in FIG. 89 has a cross shape that branches into four portions at angles substantially equal on the upper, lower, right, and left side near the center of the dome outer surface 101B. In this configuration, the weight can be balanced in the horizontal direction and the stability of the entire dome display 100 can be maintained.

(Configuration Example of Dome Display 100 in which Fitness Bike is Integrated)

Figure 90:
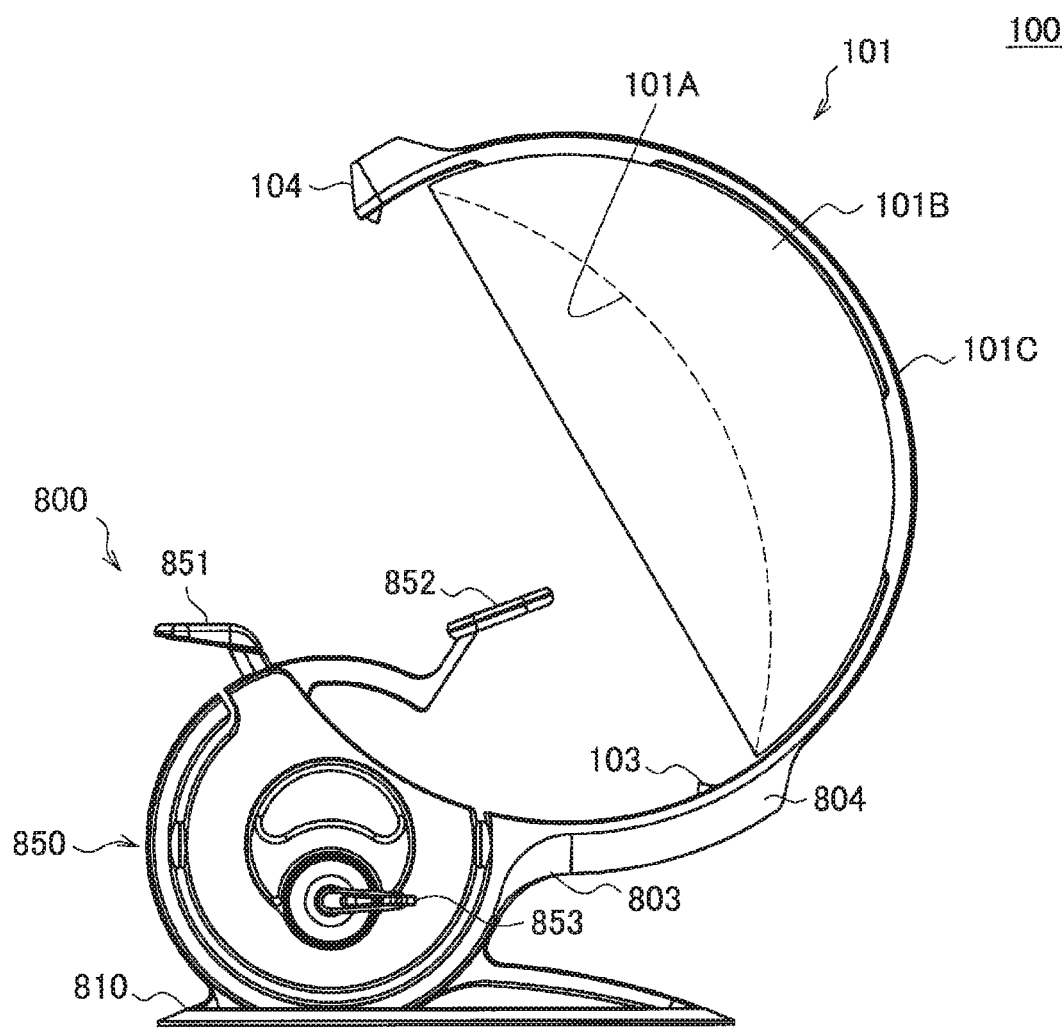
FIG. 90 is a diagram illustrating a configuration example of the dome display 100 in which a fitness bike is integrated.
Figure 91:
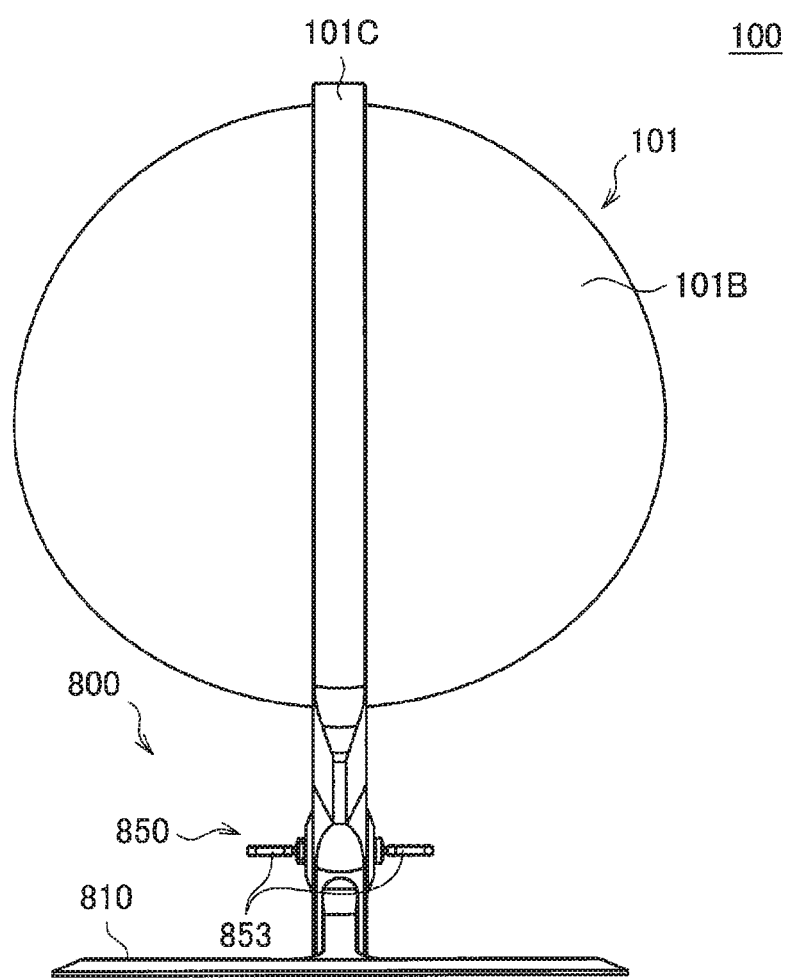
FIG. 91 is a diagram illustrating a configuration example of the dome display 100 in which a fitness bike is integrated.
Figure 92:
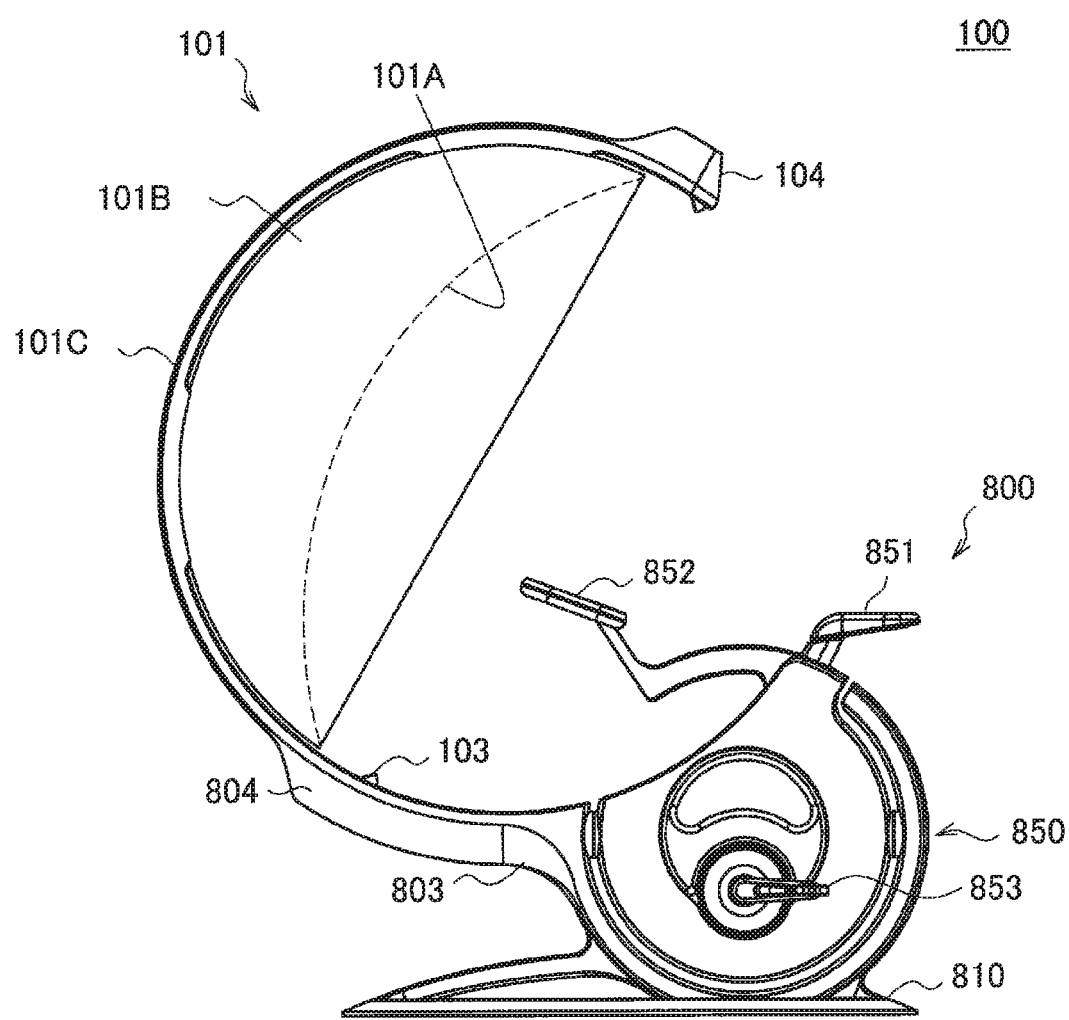
FIG. 92 is a diagram illustrating a configuration example of the dome display 100 in which a fitness bike is integrated.
Figure 93:
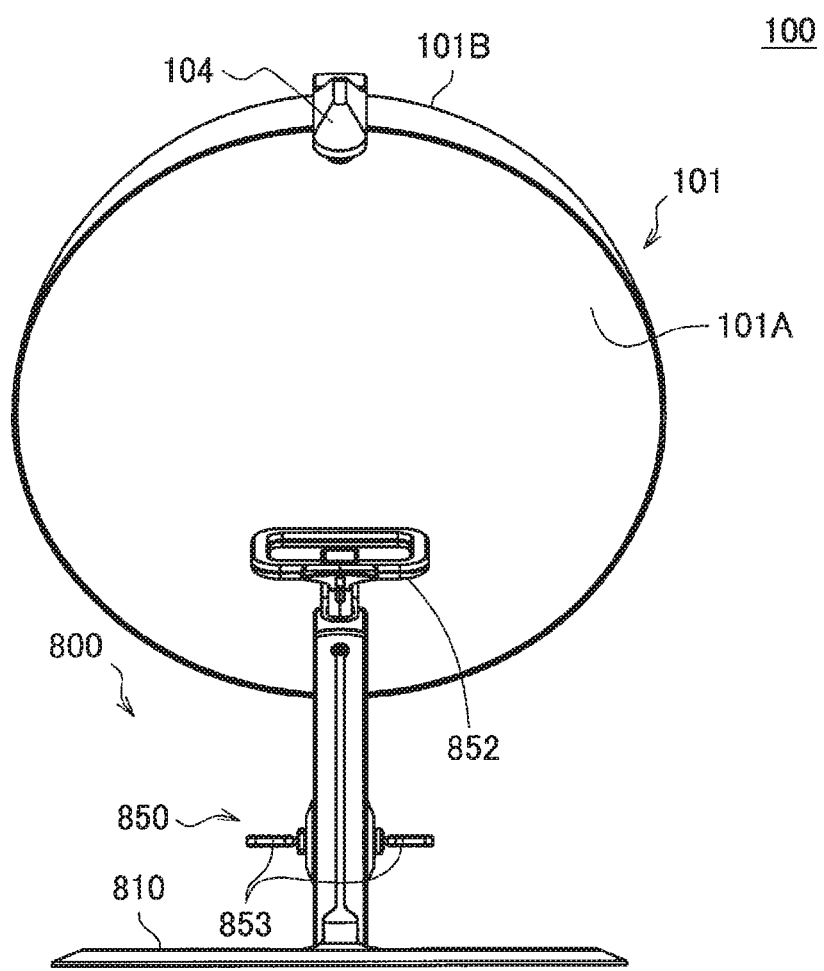
FIG. 93 is a diagram illustrating a configuration example of the dome display 100 in which a fitness bike is integrated.
Figure 94:
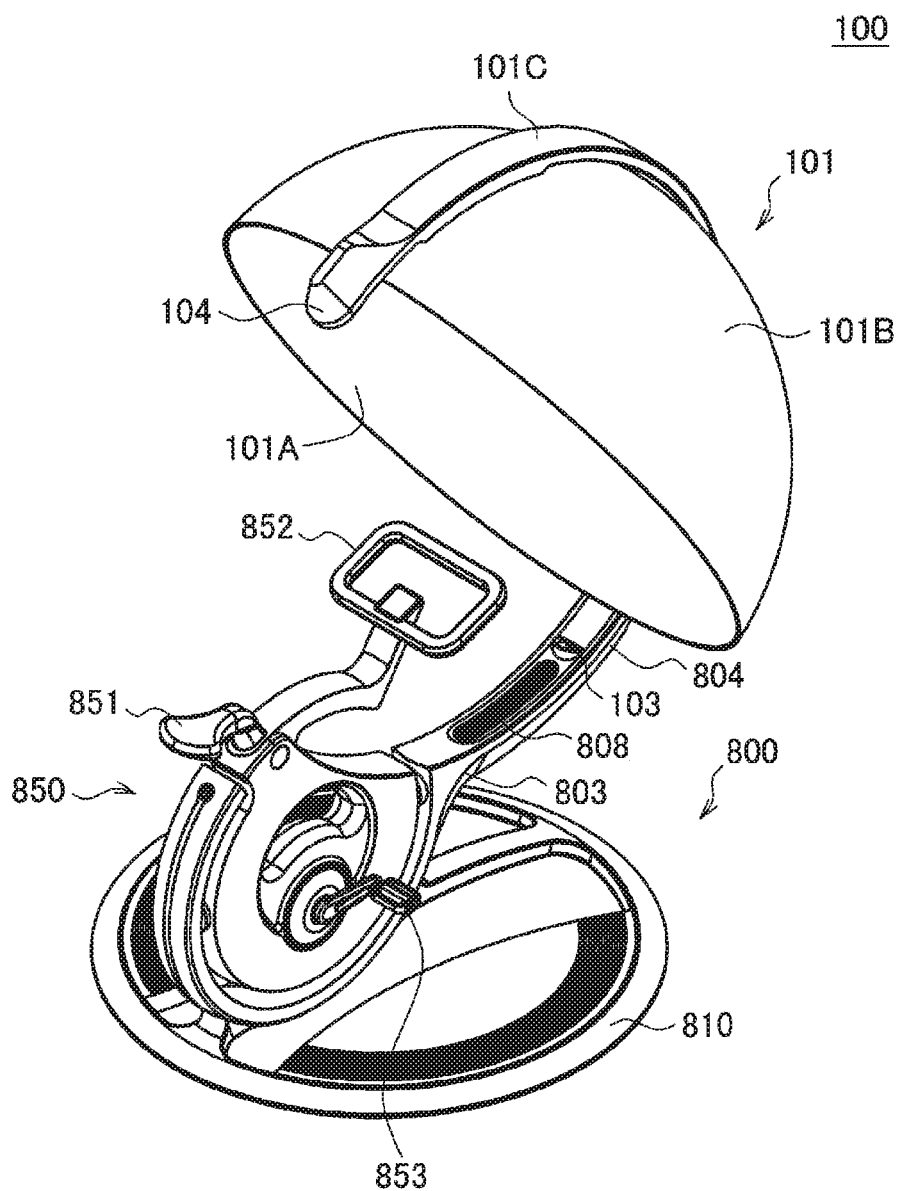
FIG. 94 is a diagram illustrating a configuration example of the dome display 100 in which a fitness bike is integrated.
Figure 95:
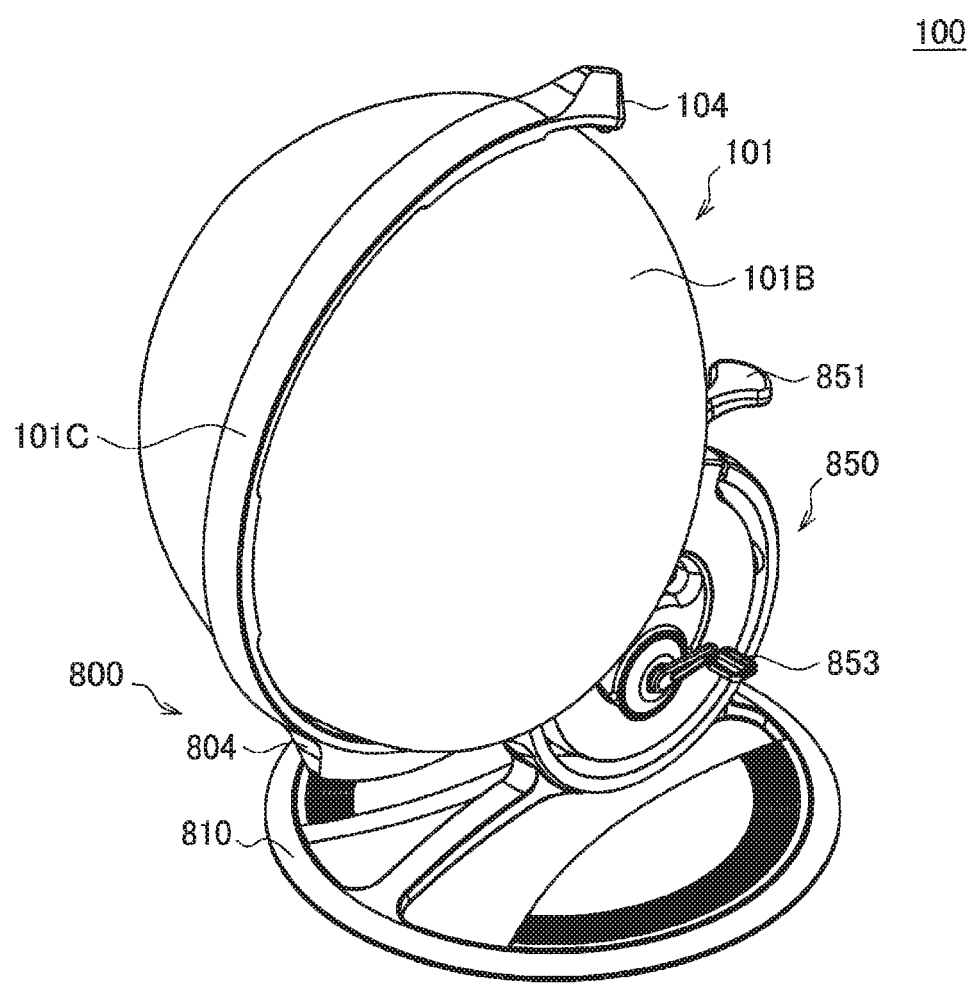
FIG. 95 is a diagram illustrating a configuration example of the dome display 100 in which a fitness bike is integrated.

FIGS. 90 to 95 are diagrams illustrating a configuration example of the dome display 100 in which a fitness bike is integrated. FIGS. 90 to 95 are diagrams illustrating the same dome display 100 when viewed in different directions. FIG. 90 is a right-side view, FIG. 91 is a rear-side view, FIG. 92 is a left-side view, FIG. 93 is a front-side view, and FIGS. 94 and 95 are perspective views.

The dome display 100 illustrated in FIGS. 90 to 95 is a display device that includes the dome screen 101 that has a substantial dome shape, the projector 103, the projector 104, and a support body 800. Note that since each configuration of the dome display 100 illustrated in FIGS. 82 to 87 is a configuration partly similar to the configuration of the above-described dome display 100 illustrated in FIGS. 82 to 87, description of similar portions will be appropriately omitted.

In the dome display 100 illustrated in FIGS. 90 to 95, the configuration of the dome screen 101, the projector 103, and the projector 104 may be similar to that of the dome display 100 illustrated in FIGS. 82 to 87. The dome display 100 illustrated in FIGS. 90 to 95 is different from the dome display 100 in FIGS. 82 to 87 in that the configuration of the support body 800 is different. Accordingly, the configuration of the support body 800 illustrated in FIGS. 90 to 95 will be described mainly below.

In the example illustrated in FIGS. 90 to 95, the support body 800 includes the third support unit 803, the fourth support unit 804, the base unit 810, and a fitness bike unit 850. The third support unit 803 illustrated in FIGS. 90 to 95 connects the fitness bike unit 850 to the fourth support unit 804. The fourth support unit 804 illustrated in FIGS. 90 to 95 connects the third support unit 803 to the dome screen 101 and extends from the third support unit 803 to the dome screen 101 on the front side when viewed from a user side (not illustrated) as in the example described with reference to FIGS. 66 to 71. As in the example described with reference to FIGS. 66 to 71, the projector 103 and the wind blowing fan 808 may be disposed inside the fourth support unit 804 illustrated in FIGS. 90 to 95.

The base unit 810 illustrated in FIGS. 90 to 95 is connected to the fitness bike unit 850, ensures a grounding area so that the load of the entire dome display 100 can be withstood, and supports the entire dome display 100. In the example illustrated in FIGS. 90 to 95, the base unit 810 may have a circular arc shape. In this configuration, the base unit 810 can be stable and support the load of the entire dome display 100.

The fitness bike unit 850 is an object which a user can mount. The fitness bike unit 850 acquires displacement information in accordance with a body motion of the user as in the fitness bike 1600 in the above-described Example 2. The fitness bike unit 850 is connected to the third support unit 803 and the base unit 810 and is fixed to the dome screen 101 with a predetermined positional relation.

The fitness bike unit 850 includes a saddle 851, a manipulation unit 852, and a pedal 853. The user can sit astride the saddle 851 to view a video projected to the dome projection surface 101A from the lower side. The manipulation unit 852 is an object which can be manipulated by the user and receives, for example, a user manipulation on the fitness bike unit 850. In addition, the manipulation unit 852 may have a function of displaying information regarding the fitness bike unit 850. In addition, the manipulation unit 852 can be used as a handle and can be held with both hands of the user sitting astride the saddle 851 and taking a forward bending posture.

In addition, the user sits on the saddle 851 to operate the pedal 853. As in the above-described example in Example 2, a marker (not illustrated) may be mounted on the pedal 853 and displacement information in accordance with a body motion of the user may be detected and input to the control unit 910. Then, the control unit 910 may control an output of a video by the projectors 103 and 104 or an output of the wind blowing fan 808, as described above, in accordance with, for example, displacement information such as a speed at which the user is operating the pedal 853.

Note that FIGS. 90 to 95 illustrate the example in which the configuration except for the support body 800 is similar to that of the dome display 100 in FIGS. 82 to 87, but the support body 800 having the above-described fitness bike unit 850 may also be applied to the configuration. For example, in the dome display 100 in FIGS. 66 to 71 or the dome display 100 in FIGS. 74 to 79, the support body 800 can also have a configuration including the fitness bike unit 850.

In addition, the example in which the dome display 100 includes two projectors 103 and 104 has been described with reference to FIGS. 90 to 95, but more projectors may be included as in the example described with reference to FIGS. 72, 73, 80, 81, 88, and 89.

In addition, the example in which the fitness bike unit 850 is integrated with the dome display 100 has been described above, but the present technology is not limited to this example. Another object used by the user, for example, an object such as the chair, the treadmill, or the bed described above, can also be integrated with the dome display 100 in this way.

As described above, by integrating the object used by the user with the dome display 100, it is possible to cause the object to be integrated harmoniously with the entire device and unify the appearance design. In addition, by integrating the object used by the user with the dome display 100, it is possible to fix a positional relation between the object and the dome screen 101 to, for example, a predetermined positional relation in which it is easy to heighten a sensation of immersion of the user. In addition, by integrating the object used by the user with the dome display 100, it is possible to miniaturize the entire system and further facilitate transportation and installation.

(Disposition and Configuration of Projector)

The new configuration example of the dome display 100 has been described above according to Example 8. Hereinafter, a configuration and disposition of the projectors according to the above-described example will be described in more detail.

Figure 96:
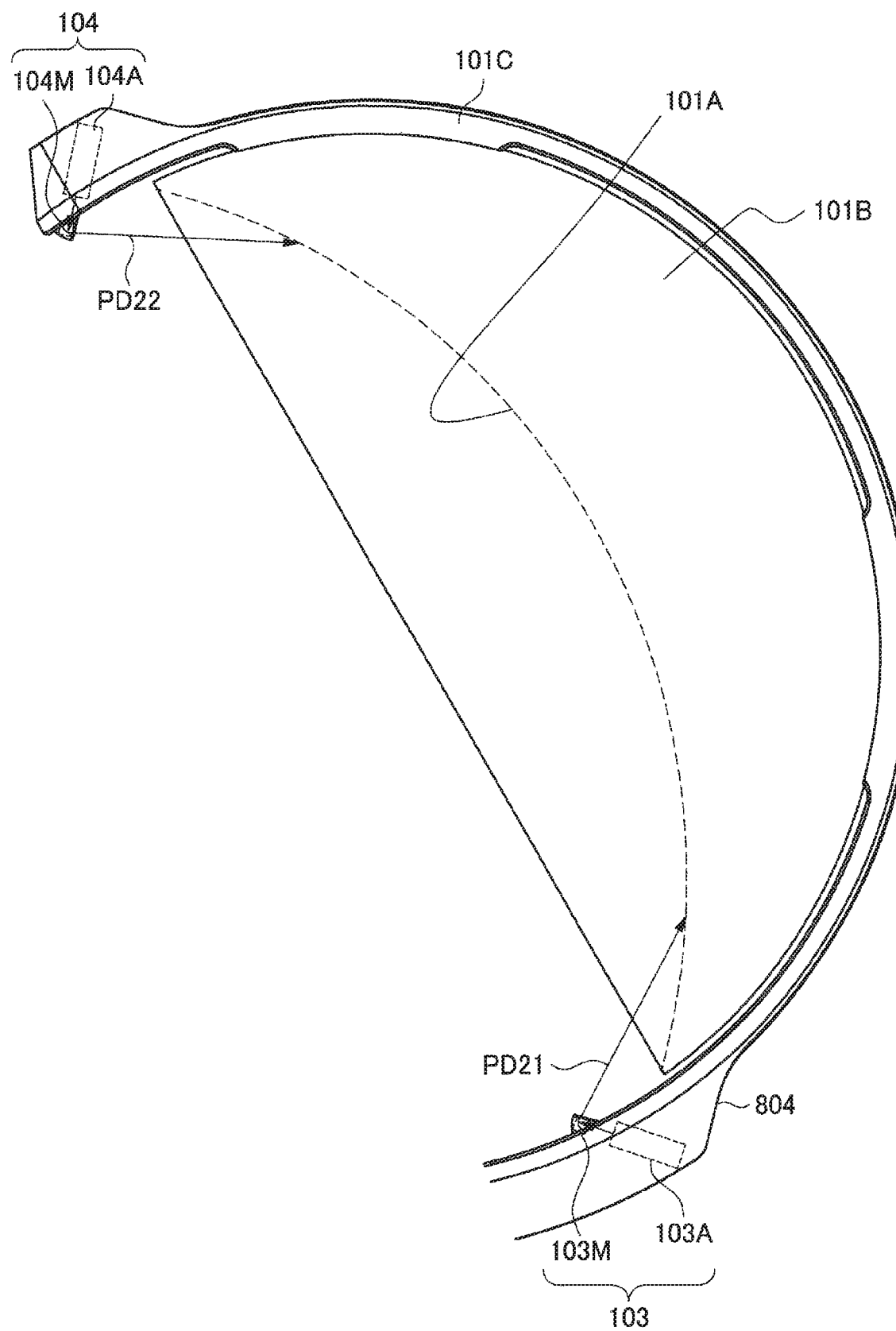
FIG. 96 is an explanatory diagram illustrating a configuration and disposition of projectors according to Example 8 in more detail.

FIG. 96 is a partially expanded diagram illustrating the dome display 100 in which the fitness bike illustrated in FIG. 90 is integrated. Note that the configuration and disposition of the projectors will be described below exemplifying the dome display 100 in which the fitness bike is integrated. Any configuration described with reference to FIGS. 66 to 95 can be similar in the present example.

As illustrated in FIG. 96, the projector 103 includes a light source unit 103A that is contained in the fourth support unit 804 and emits light and a mirror unit 103M that protrudes from the fourth support unit 804. Note that the projector 103 may include one optical member or a plurality of optical members (not illustrated) between the light source unit 103A and the mirror unit 103M. As illustrated in FIG. 96, light emitted from the light source unit 103A of the projector 103 is reflected from the mirror unit 103M to go toward the dome projection surface 101A of the dome screen 101.

In addition, as illustrated in FIG. 96, the projector 104 includes a light source unit 104A that emits light and a mirror unit 104M. Note that the projector 104 may include one optical member or a plurality of optical members (not illustrated) between the light source unit 104A and the mirror unit 104M. As illustrated in FIG. 96, light emitted from the light source unit 104A of the projector 104 is reflected from the mirror unit 104M to go toward the dome projection surface 101A of the dome screen 101.

As illustrated in FIG. 96, a projection direction PD21 of the projector 103 and a projection direction PD22 of the projector 104 are preferably configured not to cross each other when viewed from the side of the dome screen 101. Note that in the present specification, the projection direction of the projector means a direction of an optical axis in an optical system of each projector including a mirror.

Note that FIG. 96 illustrates an example in which projection directions of the plurality of projectors disposed to face in the vertical direction do not cross when viewed from the side of the dome screen 101. In a case where the plurality of projectors are disposed to face in the horizontal direction, the projection directions of the plurality of projectors preferably do not cross when viewed from the vertical upper side of the dome screen 101. Hereinafter, an effect obtained by configuring the projection directions of the plurality of projectors not to cross when viewed in a direction vertical to a facing direction of the plurality of projectors will be described with reference to FIGS. 97A, 97B, 98, 99A, 99B, and 100.

Figure 97A:
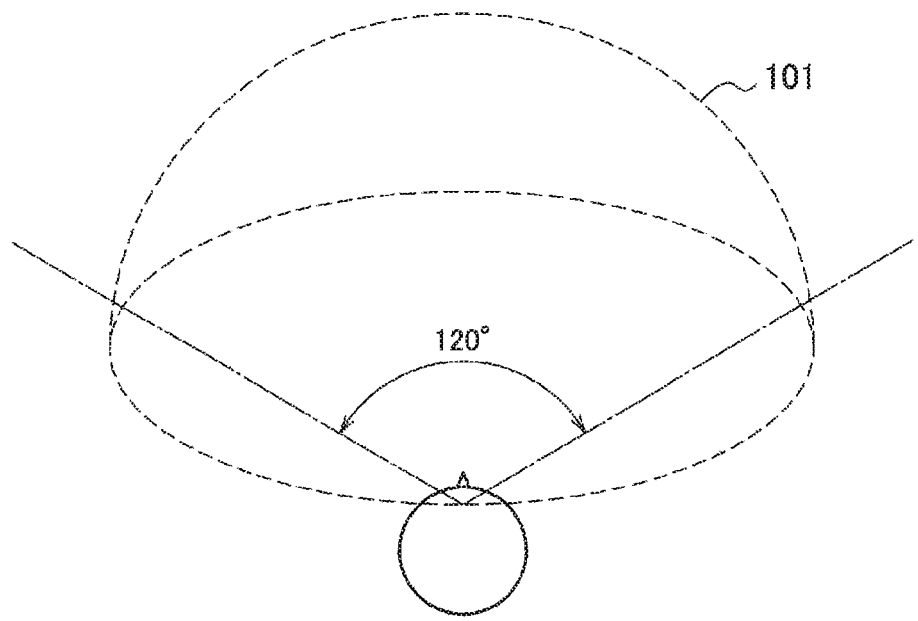
FIG. 97A is a diagram illustrating an example of a positional relation between the dome screen 101 and the head of a user.
Figure 97B:
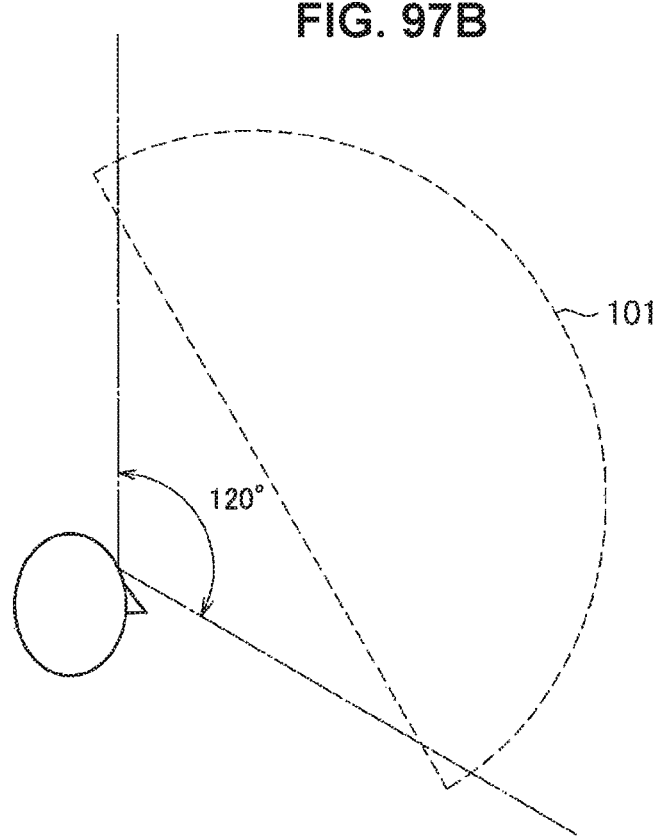
FIG. 97B is a diagram illustrating an example of a positional relation between the dome screen 101 and the head of a user.

The head of a user mounting object such as a fitness bike is assumed to be located as in FIG. 97A or 97B by disposing the dome screen 101 to be slanted downwards with respect to the user, as described above. Note that FIG. 97A is a diagram illustrating the dome screen 101 when viewed in the vertical upper side and FIG. 97B is a diagram illustrating the dome screen 101 when viewed from the right side.

Since a human visible angle is said to be 120 degrees, a viewing field range of the user is covered with the dome screen 101, as illustrated in FIGS. 97A and 97B. Therefore, the user can concentrate on a video projected to the dome screen 101 and obtain a sensation of immersion.

Figure 98:
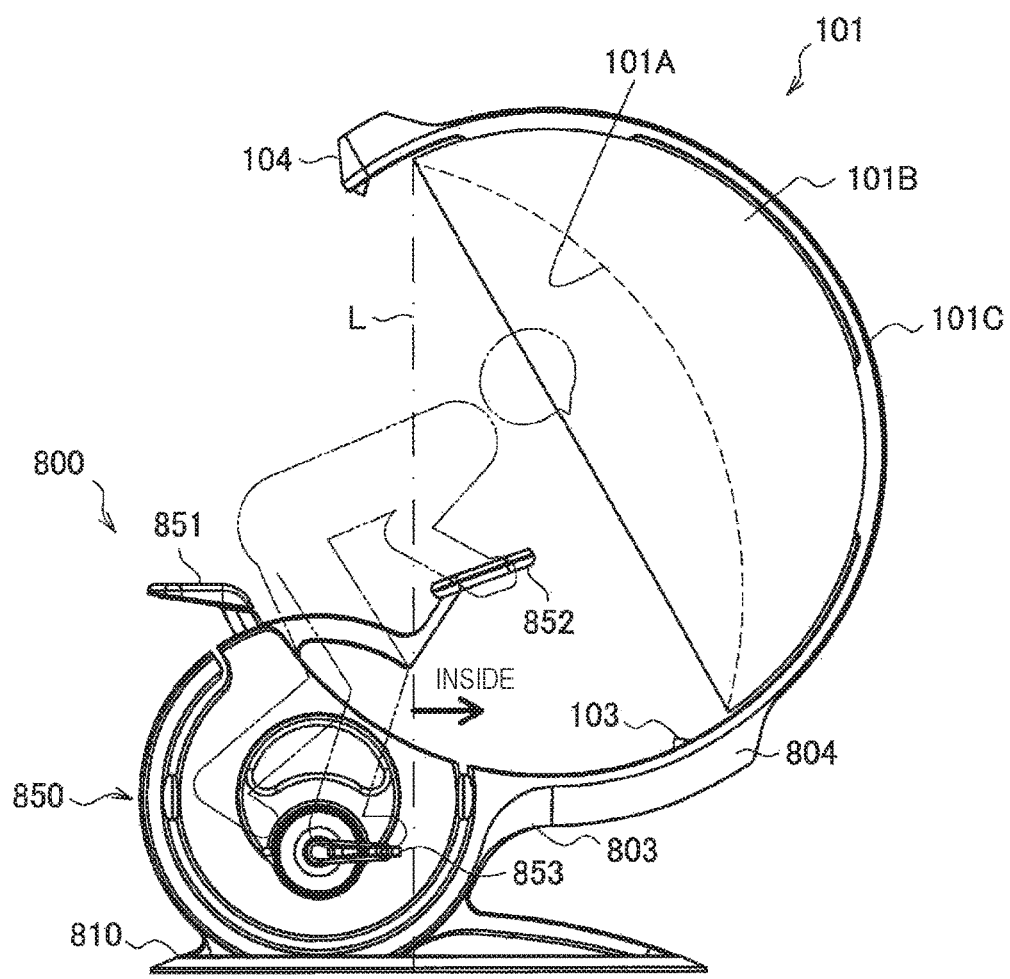
FIG. 98 is a diagram illustrating an example of a positional relation between the dome screen 101 and the head of the user in a case where the user is performing a stand-pedaling motion.

Incidentally, it is considered that the user further approaches his or her head to the dome screen 101 in order to further obtain the sensation of immersion. In addition, in a case where the user mounts a fitness bike, it is considered that the user performs a stand-pedaling motion so that his or her head approaches the dome screen 101. For example, as illustrated in FIG. 98, in a case where the manipulation unit 852 (an example of an object) is disposed inside the dome screen 101 when viewed from the vertical upper side, the head of the user holding the manipulation unit 852 becomes closer to the dome screen 101. Note that the inside of the dome screen 101 when viewed from the vertical upper side means a side closer to the dome projection surface 101A than a straight line L in the vertical direction from the upper end of the dome screen 101 when the dome screen 101 is viewed from the side, as illustrated in FIG. 98.

Figure 99A:
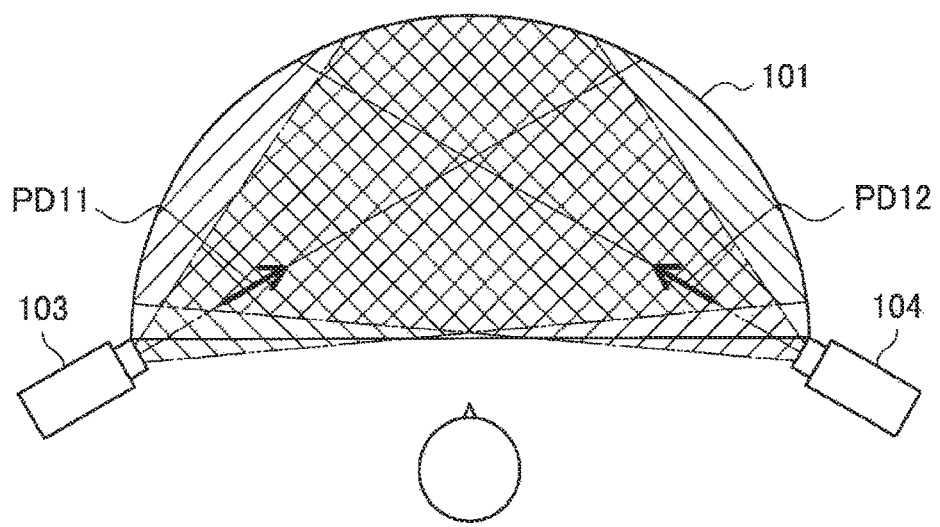
FIG. 99A is a diagram illustrating an example of a projection range in a case where projection directions of projectors 103 and 104 disposed to face in the horizontal direction cross when viewed from the vertical upper side.
Figure 99B:
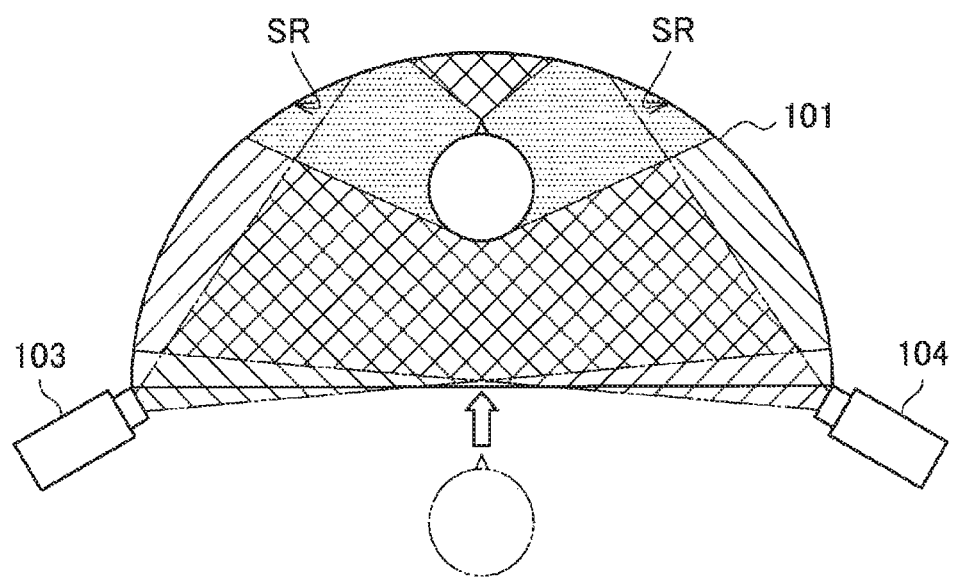
FIG. 99B is a diagram schematically illustrating an example of a projection range in a case where projection directions of the projectors 103 and 104 disposed to face in the horizontal direction cross when viewed from the vertical upper side.

In this way, in a case where the head of the user approaches the dome screen 101, there is concern of a shadow occurring on the video projected by the projectors. This example will be described with reference to FIGS. 99A and 99B. FIGS. 99A and 99B are schematic diagrams illustrating projection ranges of the projectors 103 and 104 disposed to face in the horizontal direction when viewed from the vertical upper side.

As illustrated in FIG. 99A, the projectors 103 and 104 are disposed so that the projection direction PD11 of the projector 103 and the projection direction PD12 of the projector 104 cross when viewed from the vertical upper side, and a video is therefore projected to the entire projection surface of the dome screen 101. As illustrated in FIG. 99B, however, when the head of the user approaches the dome screen 101, light projected from the projectors 103 and 104 is shielded by the head of the user, and thus a shadow SR can occur on the projection surface of the dome screen 101. In addition, when the head of the user approaches the dome screen 101 as in FIG. 99B, the light projected to the projectors 103 and 104 enters the eyes of the user, and thus there is concern of the user feeling dazzling. In this way, in a case where the projection directions of the plurality of projectors cross when viewed from a direction vertical to the facing direction of the plurality of projectors, it is not preferable that the user approach the dome screen 101.

Figure 100:
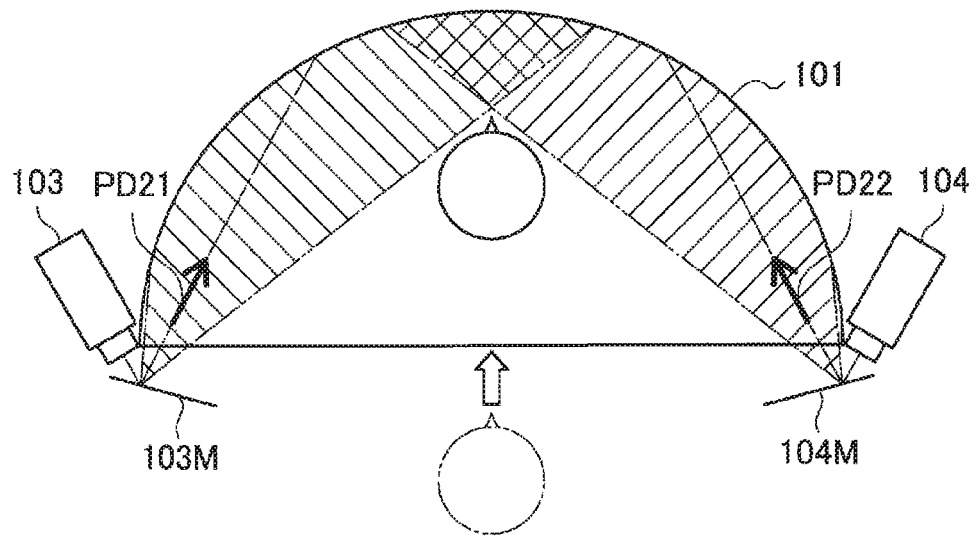
FIG. 100 is a diagram schematically illustrating an example of a projection range in a case where projection directions of the projectors 103 and 104 disposed to face in the horizontal direction do not cross when viewed from the vertical upper side.

As described above, however, in a case where the plurality of projectors are disposed so that the projection directions of the projectors do not cross when viewed from the direction vertical to the facing direction of the plurality of projectors, the user can further approach the dome screen 101. FIG. 100 is a schematic diagram illustrating a projection range of the projectors 103 and 104 disposed to face in the horizontal direction so that projection directions do not cross when viewed from the vertical upper side, when viewed from the vertical upper side.

In the example illustrated in FIG. 100, the projection direction PD21 of the projector 103 and the projection direction PD22 of the projector 104 do not cross when viewed from the vertical upper side. However, the projectors 103 and 104 include mirror units 103M and 104M, respectively, and are configured so that a video is projected to the entire projection surface of the dome screen 101. Then, in the example illustrated in FIG. 100, even in a case where the head of the user approaches the dome screen 101, there is an effect that the light projected from the projectors 103 and 104 is rarely shielded by the head of the user and the shadow rarely occurs on the projection surface of the dome screen 101. In addition, in the example illustrated in FIG. 100, even in a case where the head of the user approaches the dome screen 101, there is an effect that the light projected from the projectors 103 and 104 rarely enters the eyes of the user and the user rarely feels dazzling. Accordingly, by configuring the projection direction PD21 of the projector 103 and the projection direction PD22 of the projector 104 not to cross when viewed from the vertical upper side, the user can further approach the dome screen 101, and can obtain the sensation of immersion more easily.

Note that the example in which the projectors 103 and 104 are disposed to face in the horizontal direction has been described above, but similar effects can be obtained even in a case where the projectors 103 and 104 are disposed to face in the vertical direction.

In addition, when the projection directions of the projectors 103 and 104 do not cross the facing direction of the projectors 103 and 104 when viewed in a direction vertical to the facing direction and a video is projected to the entire projection surface of the dome screen 101, the projectors 103 and 104 may not include mirrors. Here, to realize this configuration, the projectors 103 and 104 are preferably so-called short-focus projectors capable of projecting a video in a broad range even at a short projection distance.

INDUSTRIAL APPLICABILITY

The foregoing thus describes the technology disclosed in this specification in detail and with reference to specific embodiments. However, it is obvious that persons skilled in the art may make modifications and substitutions to these embodiments without departing from the spirit of the technology disclosed in this specification.

The interaction technology proposed in the present specification can be developed as an alternative input function substituted for a controller or a console for a disabled person of which a body motion is unnatural, since a body motion of the user such as displacement of the trunk can be detected through furniture such as a chair, a bed, or the like used in a daily life and can be substituted for an input.

In addition, the interaction technology proposed in the present specification can be used not only in a general household but also a hospital, a rehabilitation facility, or the like. Further, the interaction technology proposed in the present specification can also be used for a moving body for which a space is limited, such as an airplane, a train, a bus, or a passenger car corresponding to automatic driving.

Essentially, the technology disclosed in this specification has been described by way of example, and the stated content of this specification should not be interpreted as being limiting. The spirit of the technology disclosed in this specification should be determined in consideration of the claims.

Additionally, the present technology may also be configured as below.

(1)

An information processing device including:

a displacement information acquisition unit configured to acquire displacement information corresponding to 3-dimensional displacement of a predetermined portion of a predetermined object that a user mounts in accordance with a body motion of the user on the basis of positional information of the predetermined portion; and an output control unit configured to perform control such that an output unit performs a predetermined output on the basis of the acquired displacement information.

(2)

The information processing device according to (1), in which the predetermined object is an object on which the user is able to sit, and the body motion of the user includes an inclination motion of an upper half of the body of the user.

(3)

The information processing device according to (2), in which the predetermined object has a seatback, and the displacement information acquisition unit acquires the displacement information corresponding to a change in a position of the seatback in at least one of front and rear directions, right and left directions, or upward and downward directions.

(4)

The information processing device according to (3), in which the displacement information acquisition unit acquires the displacement information corresponding to a tilting angle of the seatback in the front and rear directions.

(5)

The information processing device according to (4), in which the displacement information acquisition unit acquires a first tilting angle and a second tilting angle greater than the first tilting angle as the displacement information, the output unit performs the predetermined output including a first output and a second output different from the first output, and the output control unit performs control such that the output unit performs the first output in a case where the seatback has the first tilting angle, and performs control such that the output unit performs the second output in a case where the seatback has the second tilting angle.

(6)

The information processing device according to (4) or (5), in which the displacement information acquisition unit acquires displacement information corresponding to a tilting angle per predetermined time of the seatback.

(7)

The information processing device according to any one of (3) to (6), in which the displacement information acquisition unit acquires displacement information corresponding to a tilting angle acceleration of the seatback, the output unit performs the predetermined output including a third output, and the output control unit performs control such that the output unit performs the third output in a case where the tilting angle acceleration is equal to or greater than a predetermined threshold.

(8)

The information processing device according to any one of (2) to (7), in which the displacement information acquisition unit acquires the displacement information corresponding to a change in a position in at least one of front and rear directions, right and left directions, or upward and downward directions of a seat of the predetermined object.

(9)

The information processing device according to any one of (2) to (8), in which the displacement information acquisition unit acquires the displacement information corresponding to a change in a position in at least one of front and rear directions, right and left directions, or upward and downward directions of an armrest of the predetermined object.

(10)

The information processing device according to any one of (2) to (9), in which the output unit includes a display unit that displays a video.

(11)

The information processing device according to (10), in which the output control unit controls brightness of the video on the basis of a tilting angle in right and left directions of the predetermined object.

(12)

The information processing device according to (10) or (11), in which the output control unit controls a parallax of the video on the basis of a tilting angle in right and left directions of the predetermined object.

(13)

The information processing device according to any one of (10) to (12), in which the output control unit controls a transition direction of the video on the basis of a tilting angle in right and left directions of the predetermined object.

(14)

The information processing device according to any one of (10) to (13), in which the output control unit causes an effect image in accordance with an audio signal to be displayed.

(15)

The information processing device according to (14), in which the output control unit causes the effect image to be changed in accordance with an analysis result of the audio signal.

(16)

The information processing device according to (14) or (15), in which the effect image includes a particle displayed so that a relative length extends as the particle is closer to the vicinity of an outer edge of the display unit.

(17)

The information processing device according to any one of (14) to (16), in which the effect image includes a plurality of particle group layers which overlaps in a depth direction in a virtual space and moves away from or toward each other in the depth direction in the virtual space in accordance with a change in the audio signal.

(18)

The information processing device according to (1), in which the displacement information acquisition unit acquires the displacement information corresponding to a change in a position in at least one of front and rear directions, right and left directions, or upward and downward directions of an upper surface of the predetermined object.

(19)

The information processing device according to (18), in which the output unit includes a display unit that is installed above the predetermined object and displays a video, and the output control unit controls the video in accordance with at least one of a front direction or a head position of the user estimated on the basis of the displacement information.

(20)

The information processing device according to (19), in which the output control unit controls a display position of the video in accordance with at least one of the estimated front direction or head position of the user.

(21)

The information processing device according to (19) or (20), in which the output control unit controls a direction of the video in accordance with at least one of the estimated front direction or head position of the user.

(22)

The information processing device according to (5), in which the output unit performs the predetermined output including a fourth output different from both the first output and the second output, the displacement information acquisition unit acquires the displacement information corresponding to vibration or oscillation of the predetermined portion, and the output control unit performs control such that the output unit performs the fourth output in accordance with the vibration or the oscillation.

(23)

The information processing device according to any one of (1) to (22), in which the output unit includes a speaker that outputs an audio sound and the speaker is installed so that a straight line facing in a vibration direction of the speaker crosses the face of the user.

(24)

The information processing device according to (23), in which the straight line facing in the vibration direction of the speaker is not obstructed between the speaker and the face of the user.

(25)

An information processing method including:

a displacement information acquisition step of acquiring displacement information corresponding to 3-dimensional displacement of a predetermined portion of a predetermined object that a user mounts in accordance with a body motion of the user on the basis of positional information of the predetermined portion; and an output control step of performing control such that an output unit performs a predetermined output on the basis of the acquired displacement information.

(26)

A computer program described in a computer-readable format for causing a computer to function as:

a displacement information acquisition unit configured to acquire displacement information corresponding to 3-dimensional displacement of a predetermined portion of a predetermined object that a user mounts in accordance with a body motion of the user on the basis of positional information of the predetermined portion; and an output control unit configured to perform control such that an output unit performs a predetermined output on the basis of the acquired displacement information.

(27)

An information processing device including:

a displacement information acquisition unit configured to acquire first displacement information corresponding to 3-dimensional rotational displacement of a straight line formed by at least two feature portions of a predetermined object in accordance with a body motion of a user; and an output control unit configured to perform control such that an output unit performs a predetermined output on the basis of the acquired first displacement information.

(28)

The information processing device according to (27), in which the displacement information acquisition unit acquires the first displacement information corresponding to 3-dimensional rotational displacement of a plane formed by at least three feature portions, and the output control unit controls the output unit on the basis of the acquired first displacement information.

(29)

The information processing device according to (28), in which the predetermined output includes a first output and a second output different from the first output, and the output control unit performs control such that the output unit performs the first output in a case where rotational displacement substantially in a first direction is acquired as the first displacement information, and performs control such that the output unit performs the second output in a case where rotational displacement substantially in a second direction different from the first direction is acquired as the first displacement information.

(30)

The information processing device according to (29), in which the first direction and the second direction correspond to a displacement direction of the predetermined object in accordance with 3-dimensional displacement of the trunk of the user.

(31)

The information processing device according to (29) or (30), in which the predetermined output further includes a third output different from both the first output and the second output, and the output control unit performs control such that the output unit performs the first output in a case where a first displacement amount substantially in the first direction is acquired as the first displacement information, and performs control such that the output unit performs the third output in a case where a second displacement amount greater than the first displacement amount substantially in the first direction is acquired as the first displacement information.

(32)

The information processing device according to any one of (29) to (31), in which the predetermined output further includes a fourth output different from both the first output and the second output, the displacement information acquisition unit further acquires second displacement information corresponding to translational displacement of at least one of the feature portions in accordance with a body motion of the user, and the output control unit performs control such that the output unit performs the fourth output on the basis of the second displacement information.

(33)

The information processing device according to any one of (29) to (32), in which the predetermined output further includes a fifth output different from both the first output and the second output, the displacement information acquisition unit further acquires third displacement information corresponding to reciprocative translational displacement of at least one of the feature portions in accordance with a body motion of the user, and the output control unit performs control such that the output unit performs the fifth output on the basis of the third displacement information.

(34)

The information processing device according to any one of (27) to (33), in which the predetermined object is an object which is placed on a floor and does not substantially perform relative movement to the floor in the body motion of the user, and the output control unit controls an output of the output unit on the basis of the first displacement information and a constraint condition related to the predetermined object in the placed state.

(35)

The information processing device according to any one of (27) to (34), in which the feature portion is a marker installed in the predetermined object.

(36)

The information processing device according to (35), in which the marker is a marker installed in an edge of the predetermined object.

(37)

The information processing device according to any one of (27) to (34), in which the feature portion is a feature point of the predetermined object recognized through an image recognition process.

(38)

The information processing device according to any one of (27) to (37), in which the output unit includes a display unit that displays a stereoscopically visible video, and the output control unit controls a parallax of the video on the basis of the acquired first displacement information.

(39)

The information processing device according to (38), in which the output control unit controls brightness of the video on the basis of the acquired first displacement information.

(40)

The information processing device according to (38) or (39), in which the output unit further includes a feedback unit that outputs at least one piece of feedback information among a temperature, a wind, humidity, a smell, a sensation of touch, and a sound in accordance with the video, and the output control unit controls at least one of an output direction or an output amount of the feedback information output from the feedback unit on the basis of the acquired first displacement information.

(41)

The information processing device according to any one of (38) to (40), further including:

a visual line information acquisition unit configured to acquire visual line information of the user, in which the output control unit controls a viewing angle range of the video on the basis of the acquired visual line information and controls a parallax of the video on the basis of the acquired first displacement information.

(42)

The information processing device according to any one of (27) to (41), in which the displacement information relates to an angular velocity or angular acceleration of the predetermined object.

(43)

The information processing device according to any one of (27) to (42), in which the predetermined object is an object which the user is able to mount.

(44)

An information processing method including:

a displacement information acquisition step of acquiring first displacement information corresponding to 3-dimensional rotational displacement of a straight line formed by at least two feature portions of a predetermined object in accordance with a body motion of a user; and an output control step of performing control such that an output unit performs a predetermined output on the basis of the acquired first displacement information.

(45)

A computer program described in a computer-readable format for causing a computer to function as:

a displacement information acquisition unit configured to acquire first displacement information corresponding to 3-dimensional rotational displacement of a straight line formed by at least two feature portions of a predetermined object in accordance with a body motion of a user; and an output control unit configured to perform control such that an output unit performs a predetermined output on the basis of the acquired first displacement information.

(46)

An information processing device including:

an output unit configured to have a dome shape capable of covering a viewing field of a user and configured to output a video or an audio sound; and an output control unit configured to control the output unit on the basis of sensor information regarding a body motion of the user and terminal information acquired from a user terminal including at least one of a portable terminal or a wearable terminal of the user.

(47)

The information processing device according to (46), in which the terminal information includes profile information regarding the user included in a storage of the user terminal, and the output control unit controls the output unit on the basis of the profile information.

(48)

The information processing device according to (46) or (47), in which the terminal information includes environmental information regarding a surrounding environment of the user terminal, and the output control unit controls the output unit on the basis of the environmental information.

(49)

The information processing device according to (48), in which the environmental information includes sound information acquired by a microphone included in the user terminal.

(50)

The information processing device according to any one of (46) to (49), in which the user terminal includes a first sensor unit configured to acquire the sensor information, and the output control unit controls the output unit on the basis of the sensor information acquired from the user terminal.

(51)

The information processing device according to (50), further including:

a second sensor unit different from the first sensor unit and configured to acquire the sensor information, in which the output control unit controls the output unit on the basis of the sensor information acquired from the first sensor unit and the sensor information acquired by the second sensor unit.

(52)

The information processing device according to (51), further including:

a display unit configured to cover a substantially entire range of the viewing field of the user in which the output control unit controls a parallax of a video presented from the output unit to the display unit on the basis of the sensor information acquired from the first sensor unit and the sensor information acquired by the second sensor unit.

(53)

The information processing device according to (52), in which the sensor information acquired by the first sensor unit includes input manipulation information of the user to the user terminal, the sensor information acquired by the second sensor unit includes rotational motion information regarding a rotational motion of the user, and the output control unit controls a parallax of the video on the basis of the rotational motion information and the input manipulation information.

(54)

The information processing device according to any one of (50) to (53), in which the output control unit controls the output unit on the basis of the sensor information acquired from the user terminal disposed on a predetermined object which the user is able to mount.

(55)

A display device including:

a screen configured to have a substantially dome shape;

a first projector and a second projector fixed to the screen; and a support body disposed below the screen and configured to support the screen, in which the first projector and the second projector project a video to the screen in cooperation, the second projector is disposed above the first projector, and at least a part of the support body is located between the first projector and the second projector in a horizontal direction.

(56)

A display device including:

a screen configured to have a substantially dome shape;

a first projector disposed in a first edge of the screen; and a second projector disposed in a second edge of the screen facing the first edge in a horizontal direction, in which the first projector and the second projector project a video to the screen in cooperation, and the first projector and the second projector are disposed so that a first projection direction of the first projector and a second projection direction of the second projector do not cross when viewed from an upper side of the screen.

(57)

A display device including:

a screen configured to have a substantially dome shape;

a first projector disposed in a first edge of the screen; and a second projector disposed in a second edge of the screen facing the first edge in a vertical direction, in which the first projector and the second projector project a video to the screen in cooperation, and the first projector and the second projector are disposed so that a first projection direction of the first projector and a second projection direction of the second projector do not cross when viewed from a side of the screen.

(58)

The display device according to (56) or (57), in which the display device further includes an object which is fixed to the screen, and a user is able to mount or the user is able to manipulate, and in which the object is disposed inside the screen when viewed from the upper side of the screen.

(59)

A display device including:

a screen configured to have a substantially dome shape;

a dome support frame fixed along an edge or an outer surface of the screen; and an electric system installed inside the dome support frame and capable of supplying at least power to a plurality of projectors, in which the dome support frame includes a connection unit capable of supplying power from the electric system to each of the plurality of projectors.

REFERENCE SIGNS LIST 100 dome display
101 dome screen
101A dome projection surface
101B dome outer surface
101C dome support frame
102 support body
102A, 102B shaft portion
103, 104 projector
105 video decoding unit
106 chair
108, 109 projector
800 support body
801 first support unit
802 second support unit
803 third support unit
804 fourth support unit
810 base unit
850 fitness bike unit
900 system
910 control unit
911 main controller
912 main memory
913 communication unit
914 video DSP
915 audio DSP
931 DAC
932 amplification unit
933 headphone
934 headrest speaker
935 subwoofer 936 speaker
937 rear speaker
941 displacement sensor
942 head detection camera
943 external sensor
944 audio player
950 MCOM
951 driving system output unit
952 external output unit
953 display UI unit
1000 chair
1010 seatback
1011 to 1014 marker
1021, 1022 camera
1030 armrest
1500 treadmill
1510 tread stand
1511 endless belt
1520 manipulation panel
1521, 1522 handrail frame
1531, 1532 marker
1541, 1542 marker
1551, 1552 camera
1600 fitness bike
1610 saddle
1620 handle
1630 front wheel
1641 marker
1651, 1652 marker
1661, 1662 camera
2000 ceiling or wall surface of room
2100 chair
2101 hood
2111, 2112 marker
2120 camera
2300 interior of passenger car
2301 seat
2311 marker
2320 camera
2400 bed
2401, 2402 marker
2411, 2412 camera
2500 bed
2501 reclining
2510 display
2521, 2522 marker
2531, 2532 camera

The invention claimed is:

1. An information processing device comprising:
a displacement information acquisition unit configured to acquire displacement information that corresponds to 3-dimensional displacement of a predetermined portion of a predetermined object that a user mounts based on a body motion of the user and positional information of the predetermined portion; and
an output control unit configured to:
perform control such that an output unit performs one or more predetermined outputs based on the acquired displacement information, wherein the one or more predetermined outputs include display of a video;
estimate a head position of the user based on the acquired displacement information of the predetermined portion of the predetermined object that the user mounts; and
control a display position of the displayed video based on the acquired displacement information and the head position of the user.

2. The information processing device according to claim 1,
wherein the predetermined object is an object on which the user is able to sit, and
the body motion of the user includes an inclination motion of an upper half of a body of the user.

3. The information processing device according to claim 2,
wherein the predetermined object has a seatback, and
the displacement information corresponds to a change in a position of the seatback in at least one of front and rear directions, right and left directions, or upward and downward directions.

4. The information processing device according to claim 3, wherein the displacement information further corresponds to a tilting angle of the seatback in the front and rear directions.

5. The information processing device according to claim 4,
wherein the displacement information acquisition unit is further configured to acquire a first tilting angle and a second tilting angle greater than the first tilting angle as the displacement information, and wherein the one or more predetermined outputs further include a first output and a second output different from the first output, and
the output control unit is further configured to perform control such that the output unit performs the first output in a case where the seatback has the first tilting angle, and the second output in a case where the seatback has the second tilting angle.

6. The information processing device according to claim 5,
wherein the one or more predetermined outputs further include a fourth output different from both the first output and the second output,
the displacement information further corresponds to vibration or oscillation of the predetermined portion, and
the output control unit is further configured to perform control such that the output unit performs the fourth output based on the vibration or the oscillation.

7. The information processing device according to claim 3, wherein the displacement information further corresponds to a tilting angle per predetermined time of the seatback.

8. The information processing device according to claim 3,
wherein the displacement information further corresponds to a tilting angle acceleration of the seatback,
the one or more predetermined outputs further include a third output, and
the output control unit is further configured to perform control such that the output unit performs the third output in a case where the tilting angle acceleration is equal to or greater than a predetermined threshold.

9. The information processing device according to claim 2, wherein the displacement information corresponds to a change in a position in at least one of front and rear directions, right and left directions, or upward and downward directions of a seat of the predetermined object.

10. The information processing device according to claim 2, wherein the displacement information corresponds to a change in a position in at least one of front and rear directions, right and left directions, or upward and downward directions of an armrest of the predetermined object.

11. The information processing device according to claim 2, wherein the output unit includes a display unit that is configured to display the video.

12. The information processing device according to claim 11, wherein the output control unit is further configured to control a brightness of the video based on a tilting angle in right and left directions of the predetermined object.

13. The information processing device according to claim 11, wherein the output control unit is further configured to control a parallax of the video based on a tilting angle in right and left directions of the predetermined object.

14. The information processing device according to claim 11, wherein the output control unit is further configured to control a transition direction of the video based on a tilting angle in right and left directions of the predetermined object.

15. The information processing device according to claim 11, wherein the output control unit is further configured to cause an effect image based on an audio signal to be displayed.

16. The information processing device according to claim 15, wherein the output control unit is further configured to cause the effect image to be changed based on an analysis result of the audio signal.

17. The information processing device according to claim 15, wherein the effect image includes a particle displayed so that a relative length extends as the particle is closer to a vicinity of an outer edge of the display unit.

18. The information processing device according to claim 15, wherein the effect image includes a plurality of particle group layers which overlaps in a depth direction in a virtual space and moves away from or toward each other in the depth direction in the virtual space based on a change in the audio signal.

19. The information processing device according to claim 1, wherein the displacement information corresponds to a change in a position in at least one of front and rear directions, right and left directions, or upward and downward directions of an upper surface of the predetermined object.

20. The information processing device according to claim 19, wherein the output unit includes a display unit that is installed above the predetermined object and is configured to display the video, and
the output control unit is further configured to:
estimate a front direction of the user based on the acquired displacement information; and
control the video based on at least one of the front direction of the user or the head position of the user.

21. The information processing device according to claim 1, wherein the output control unit is further configured to:
estimate a front direction of the user based on the acquired displacement information; and
control a direction of the video based on at least one of the estimated front direction of the user or the estimated head position of the user.

22. The information processing device according to claim 1, wherein the output unit includes a speaker that is configured to output an audio sound and the speaker is installed so that a straight line facing in a vibration direction of the speaker crosses a face of the user.

23. The information processing device according to claim 22, wherein the straight line facing in the vibration direction of the speaker is not obstructed between the speaker and the face of the user.

24. An information processing method comprising:
a displacement information acquisition step of acquiring displacement information corresponding to 3-dimensional displacement of a predetermined portion of a predetermined object that a user mounts based on a body motion of the user and positional information of the predetermined portion; and
a first output control step of performing control such that an output unit performs one or more predetermined outputs based on the acquired displacement information, wherein the one or more predetermined outputs include display of a video;
a second output control step of estimating a head position of the user based on the acquired displacement information of the predetermined portion of the predetermined object that the user mounts; and
a third output control step of controlling a display position of the displayed video based on the acquired displacement information and the head position of the user.

25. A non-transitory computer-readable medium having stored thereon, computer-executable instructions which, when executed by a processor, cause the processor to execute operations, the operations comprising:
acquiring displacement information corresponding to 3-dimensional displacement of a predetermined portion of a predetermined object that a user mounts based on a body motion of the user and positional information of the predetermined portion;
performing control such that an output unit performs one or more predetermined outputs based on the acquired displacement information, wherein the one or more predetermined outputs include display of a video;
estimating a head position of the user based on the acquired displacement information of the predetermined portion of the predetermined object that the user mounts; and
controlling a display position of the displayed video based on the acquired displacement information and the head position of the user.

* * * * *